(12) United States Patent
McHenry et al.

(10) Patent No.: US 8,155,649 B2
(45) Date of Patent: Apr. 10, 2012

(54) METHOD AND SYSTEM FOR CLASSIFYING COMMUNICATION SIGNALS IN A DYNAMIC SPECTRUM ACCESS SYSTEM

(75) Inventors: Mark Allen McHenry, McLean, VA (US); Igor Bazarov, Herndon, VA (US); Dmitry Dain, Herndon, VA (US); Jevgenijs Livsics, Reston, VA (US); Olga K. Ritterbush, Arlington, VA (US); Karl N. Steadman, Arlington, VA (US)

(73) Assignee: Shared Spectrum Company, Vienna, VA (US)

(*) Notice: Subject to any disclaimer, the term of this patent is extended or adjusted under 35 U.S.C. 154(b) by 412 days.

(21) Appl. No.: 12/541,624

(22) Filed: Aug. 14, 2009

(65) Prior Publication Data

US 2010/0097952 A1    Apr. 22, 2010

Related U.S. Application Data

(63) Continuation-in-part of application No. 11/582,496, filed on Oct. 18, 2006, now Pat. No. 8,027,249, and a continuation-in-part of application No. 11/783,563, filed on Apr. 10, 2007, and a continuation-in-part of application No. 11/839,496, filed on Aug. 15, 2007, and a continuation-in-part of application No. 11/839,503, filed on Aug. 15, 2007, now Pat. No. 8,055,204, and a continuation-in-part of application No. 12/487,257, filed on Jun. 18, 2009, now Pat. No. 8,064,840, which is a continuation-in-part of application No. 11/432,536, filed on May 12, 2006, now Pat. No. 7,564,816.

(60) Provisional application No. 61/090,076, filed on Aug. 19, 2008, provisional application No. 60/877,656, filed on Dec. 29, 2006.

(51) Int. Cl.
*H04W 4/00* (2009.01)
(52) U.S. Cl. ........ 455/434; 455/418; 455/450; 455/515; 455/522
(58) Field of Classification Search .................. 455/434, 455/515, 418, 522, 450
See application file for complete search history.

(56) References Cited

U.S. PATENT DOCUMENTS 3,893,064 A    7/1975    Nishihara et al.
(Continued)

FOREIGN PATENT DOCUMENTS

EP    1220499 A2    3/2002
(Continued)

OTHER PUBLICATIONS

PCT Office Communication in the PCT application No. PCT/US2008/073193 dated Jun. 2, 2009.

(Continued)

*Primary Examiner* — Nick Corsaro
*Assistant Examiner* — Inder Mehra
(74) *Attorney, Agent, or Firm* — Kilpatrick Townsend & Stockton LLP

(57) ABSTRACT

Methods and systems for dynamic spectrum access (DSA) in a wireless network are provided. A DSA-enabled device may sense spectrum use in a region and, based on the detected spectrum use, select one or more communication channels for use. The devices also may detect one or more other DSA-enabled devices with which they can form DSA networks. A DSA network may monitor spectrum use by cooperative and non-cooperative devices, to dynamically select one or more channels to use for communication while avoiding or reducing interference with other devices.

30 Claims, 55 Drawing Sheets

U.S. PATENT DOCUMENTS

| | | | |
|---|---|---|---|
| 3,935,572 A | 1/1976 | Broniwitz et al. |
| 4,107,613 A | 8/1978 | Queen et al. |
| 4,119,964 A | 10/1978 | Fletcher et al. |
| 4,227,255 A | 10/1980 | Carrick et al. |
| 4,305,150 A | 12/1981 | Richmond et al. |
| 4,398,220 A | 8/1983 | Satoh |
| 4,501,020 A | 2/1985 | Wakeman |
| 4,672,657 A | 6/1987 | Dershowitz |
| 4,736,453 A | 4/1988 | Schloemer |
| 4,783,780 A | 11/1988 | Alexis |
| 4,803,703 A | 2/1989 | Deluca et al. |
| 4,878,238 A | 10/1989 | Rash et al. |
| 4,881,271 A | 11/1989 | Yamauchi et al. |
| 4,918,730 A | 4/1990 | Schulze |
| 4,977,612 A | 12/1990 | Wilson |
| 5,040,238 A | 8/1991 | Comroe et al. |
| 5,093,924 A | 3/1992 | Toshiyuki et al. |
| 5,093,927 A | 3/1992 | Shanley |
| 5,142,690 A | 8/1992 | McMullan et al. |
| 5,142,691 A | 8/1992 | Freeburg et al. |
| 5,151,747 A | 9/1992 | Nourrcier et al. |
| 5,155,590 A | 10/1992 | Beyers et al. |
| 5,162,937 A | 11/1992 | Heidemann et al. |
| 5,177,604 A | 1/1993 | Martinez |
| 5,177,767 A | 1/1993 | Kato |
| 5,179,722 A | 1/1993 | Gunmar et al. |
| 5,203,012 A | 4/1993 | Patsiokas et al. |
| 5,225,902 A | 7/1993 | McMullan, Jr. |
| 5,239,676 A | 8/1993 | Strawczynski et al. |
| 5,247,701 A | 9/1993 | Comroe et al. |
| 5,260,974 A | 11/1993 | Johnson et al. |
| 5,271,036 A | 12/1993 | Lobert et al. |
| 5,276,908 A | 1/1994 | Koohgoli et al. |
| 5,325,088 A | 6/1994 | Willard et al. |
| 5,375,123 A | 12/1994 | Andersson et al. |
| 5,402,523 A | 3/1995 | Berg |
| 5,410,737 A | 4/1995 | Jones |
| 5,412,658 A | 5/1995 | Arnold et al. |
| 5,422,912 A | 6/1995 | Asser et al. |
| 5,422,930 A | 6/1995 | McDonald et al. |
| 5,428,819 A | 6/1995 | Wang et al. |
| 5,448,753 A | 9/1995 | Ahl et al. |
| 5,475,868 A | 12/1995 | Duque-Anton et al. |
| 5,497,505 A | 3/1996 | Koohgoli et al. |
| 5,502,688 A | 3/1996 | Recchione et al. |
| 5,511,233 A | 4/1996 | Otten |
| 5,548,809 A | 8/1996 | Lemson |
| 5,553,081 A | 9/1996 | Downey et al. |
| 5,585,850 A | 12/1996 | Schwaller |
| 5,608,727 A | 3/1997 | Perreault et al. |
| 5,655,217 A | 8/1997 | Lemson |
| 5,668,747 A | 9/1997 | Ohashi |
| 5,748,678 A | 5/1998 | Valentine et al. |
| 5,752,164 A | 5/1998 | Jones |
| 5,794,151 A | 8/1998 | McDonald et al. |
| 5,822,686 A | 10/1998 | Lundberg et al. |
| 5,828,948 A | 10/1998 | Almgren et al. |
| 5,850,605 A | 12/1998 | Souissi et al. |
| 5,862,487 A | 1/1999 | Fujii et al. |
| 5,884,181 A | 3/1999 | Arnold et al. |
| 5,889,821 A | 3/1999 | Arnstein et al. |
| 5,939,887 A | 8/1999 | Schmidt et al. |
| 5,943,622 A | 8/1999 | Yamashita |
| 5,960,351 A | 9/1999 | Przelomiec |
| 5,999,561 A | 12/1999 | Naden et al. |
| 6,011,970 A | 1/2000 | McCarthy |
| 6,044,090 A | 3/2000 | Grau et al. |
| 6,047,175 A | 4/2000 | Trompower |
| 6,049,707 A | 4/2000 | Buer et al. |
| 6,049,717 A | 4/2000 | Dufour et al. |
| 6,141,557 A | 10/2000 | Dipiazza |
| 6,147,553 A | 11/2000 | Kolanek |
| 6,154,501 A | 11/2000 | Friedman |
| 6,157,811 A | 12/2000 | Dent |
| 6,178,328 B1 | 1/2001 | Tang et al. |
| 6,188,873 B1 | 2/2001 | Wickman et al. |
| 6,208,858 B1 | 3/2001 | Antonio et al. |
| 6,240,274 B1 | 5/2001 | Izadpanah |
| 6,269,331 B1 | 7/2001 | Alanara et al. |
| 6,295,289 B1 | 9/2001 | Ionescu et al. |
| 6,304,140 B1 | 10/2001 | Thron et al. |
| 6,356,555 B1 | 3/2002 | Rakib et al. |
| 6,380,879 B2 | 4/2002 | Kober et al. |
| 6,522,885 B1 | 2/2003 | Tang et al. |
| 6,526,264 B2 | 2/2003 | Sugar et al. |
| 6,529,715 B1 | 3/2003 | Kitko et al. |
| 6,570,444 B2 | 5/2003 | Wright |
| 6,597,301 B2 | 7/2003 | Cerra |
| 6,606,593 B1 | 8/2003 | Jarvinen et al. |
| 6,615,040 B1 | 9/2003 | Benveniste |
| 6,625,111 B1 | 9/2003 | Sudo |
| 6,671,503 B1 | 12/2003 | Niwamoto |
| 6,675,012 B2 | 1/2004 | Gray |
| 6,687,492 B1 | 2/2004 | Sugar et al. |
| 6,690,746 B1 | 2/2004 | Sills et al. |
| 6,697,436 B1 | 2/2004 | Wright et al. |
| 6,700,450 B2 | 3/2004 | Rogers |
| 6,714,605 B2 | 3/2004 | Sugar et al. |
| 6,714,780 B1 | 3/2004 | Antonio et al. |
| 6,728,517 B2 | 4/2004 | Sugar et al. |
| 6,771,957 B2 | 8/2004 | Chitrapu |
| 6,785,520 B2 | 8/2004 | Sugar et al. |
| 6,792,268 B1 | 9/2004 | Benveniste et al. |
| 6,799,020 B1 | 9/2004 | Heidmann et al. |
| 6,816,832 B2 | 11/2004 | Alanara et al. |
| 6,847,678 B2 | 1/2005 | Berezdivin et al. |
| 6,850,735 B2 | 2/2005 | Sugar et al. |
| 6,850,764 B1 | 2/2005 | Patel |
| 6,862,456 B2 | 3/2005 | Sugar et al. |
| 6,904,269 B1 | 6/2005 | Deshpande et al. |
| 6,941,110 B2 | 9/2005 | Kloper et al. |
| 6,952,563 B2 | 10/2005 | Brown et al. |
| 6,959,178 B2 | 10/2005 | Macedo et al. |
| 6,965,762 B2 | 11/2005 | Sugar et al. |
| 6,990,087 B2 | 1/2006 | Rao et al. |
| 6,993,440 B2 | 1/2006 | Anderson et al. |
| 7,013,345 B1 | 3/2006 | Brown et al. |
| 7,035,593 B2 | 4/2006 | Miller et al. |
| 7,054,625 B2 | 5/2006 | Kawasaki et al. |
| 7,058,383 B2 | 6/2006 | Sugar et al. |
| 7,089,014 B2 | 8/2006 | Brown et al. |
| 7,227,974 B2 | 6/2007 | Kamijo et al. |
| 7,260,156 B2 | 8/2007 | Krupezevic et al. |
| 7,269,151 B2 | 9/2007 | Diener et al. |
| 7,313,393 B2 | 12/2007 | Chitrapu |
| 7,342,876 B2 | 3/2008 | Bellur et al. |
| 7,424,268 B2 | 9/2008 | Diener et al. |
| 7,428,270 B1 | 9/2008 | Dubuc et al. |
| 7,457,295 B2 | 11/2008 | Saunders et al. |
| 7,463,952 B2 | 12/2008 | Bidou et al. |
| 7,483,700 B2 | 1/2009 | Buchwald et al. |
| 7,532,857 B2 | 5/2009 | Simon |
| 7,564,816 B2 | 7/2009 | McHenry et al. |
| 7,610,036 B2 | 10/2009 | Teo et al. |
| 7,613,148 B2 | 11/2009 | Hong et al. |
| 7,616,604 B2 * | 11/2009 | Abdelhamid et al. ........ 370/329 |
| 7,742,764 B2 | 6/2010 | Gillig et al. |
| 7,826,839 B1 | 11/2010 | Nicholas |
| 2001/0013834 A1 | 8/2001 | Yamazaki |
| 2001/0046843 A1 | 11/2001 | Alanara et al. |
| 2002/0002052 A1 | 1/2002 | McHenry |
| 2002/0196842 A1 | 12/2002 | Onggosanusi et al. |
| 2003/0027577 A1 | 2/2003 | Brown et al. |
| 2003/0081628 A1 | 5/2003 | Sugar et al. |
| 2003/0099218 A1 | 5/2003 | Tillotson |
| 2003/0165187 A1 | 9/2003 | Tesfai et al. |
| 2003/0181173 A1 | 9/2003 | Sugar et al. |
| 2003/0181211 A1 | 9/2003 | Razavilar et al. |
| 2003/0181213 A1 | 9/2003 | Sugar et al. |
| 2003/0198200 A1 | 10/2003 | Diener et al. |
| 2003/0203743 A1 | 10/2003 | Sugar et al. |
| 2004/0017268 A1 | 1/2004 | Rogers |
| 2004/0023674 A1 | 2/2004 | Miller et al. |
| 2004/0047324 A1 | 3/2004 | Diener |
| 2004/0072546 A1 | 4/2004 | Sugar et al. |
| 2004/0121753 A1 | 6/2004 | Sugar et al. |
| 2004/0136466 A1 | 7/2004 | Tesfai et al. |

| | | | |
|---|---|---|---|
| 2004/0142696 | A1 | 7/2004 | Saunders et al. |
| 2004/0203474 | A1 | 10/2004 | Miller et al. |
| 2005/0070294 | A1 | 3/2005 | Lyle et al. |
| 2005/0119006 | A1 | 6/2005 | Cave et al. |
| 2005/0192011 | A1 | 9/2005 | Hong et al. |
| 2005/0213580 | A1 | 9/2005 | Mayer et al. |
| 2005/0213763 | A1 | 9/2005 | Owen et al. |
| 2005/0270218 | A1 | 12/2005 | Chiodini |
| 2006/0075467 | A1 | 4/2006 | Sanda et al. |
| 2006/0211395 | A1 | 9/2006 | Waltho |
| 2006/0220944 | A1 | 10/2006 | Ikeda |
| 2006/0234716 | A1 | 10/2006 | Vesterinen et al. |
| 2006/0246836 | A1 | 11/2006 | Simon |
| 2007/0008875 | A1 | 1/2007 | Gerhardt et al. |
| 2007/0019603 | A1 | 1/2007 | Gerhardt et al. |
| 2007/0046467 | A1 | 3/2007 | Chakraborty et al. |
| 2007/0053410 | A1 | 3/2007 | Mahonen et al. |
| 2007/0076745 | A1 | 4/2007 | Manjeshwar et al. |
| 2007/0091998 | A1 | 4/2007 | Woo et al. |
| 2007/0100922 | A1 | 5/2007 | Ashish |
| 2007/0165664 | A1 | 7/2007 | Gerhardt et al. |
| 2007/0165695 | A1 | 7/2007 | Gerhardt et al. |
| 2007/0183338 | A1 | 8/2007 | Singh et al. |
| 2007/0253394 | A1 | 11/2007 | Horiguchi et al. |
| 2008/0010040 | A1 | 1/2008 | McGehee |
| 2008/0014880 | A1 | 1/2008 | Hyon et al. |
| 2008/0031143 | A1 | 2/2008 | Ostrosky |
| 2008/0069079 | A1 | 3/2008 | Jacobs |
| 2008/0228446 | A1 | 9/2008 | Baraniuk et al. |
| 2008/0261537 | A1 | 10/2008 | Chen |
| 2008/0267259 | A1 | 10/2008 | Budampati et al. |
| 2008/0284648 | A1 | 11/2008 | Takada et al. |
| 2009/0074033 | A1 | 3/2009 | Kattwinkel |
| 2009/0161610 | A1 | 6/2009 | Kang et al. |
| 2009/0190508 | A1 | 7/2009 | Kattwinkel |
| 2009/0252178 | A1 | 10/2009 | Huttunen et al. |
| 2010/0008312 | A1 | 1/2010 | Viswanath |
| 2010/0220618 | A1 | 9/2010 | Kwon et al. |
| 2010/0296078 | A1 | 11/2010 | Forrer et al. |
| 2011/0051645 | A1 | 3/2011 | Hong et al. |

FOREIGN PATENT DOCUMENTS

| | | |
|---|---|---|
| GB | 2260879 | 4/1993 |
| WO | WO/2004/054280 A2 | 6/2004 |
| WO | WO 2006-101489 A1 | 9/2006 |
| WO | WO 2007-034461 A2 | 3/2007 |
| WO | WO/2007/058490 A1 | 5/2007 |
| WO | WO/2007/094604 A1 | 8/2007 |
| WO | WO/2007/096819 A2 | 8/2007 |
| WO | WO/2007/108963 A2 | 9/2007 |
| WO | WO/2007/108966 A2 | 9/2007 |
| WO | WO/2007/109169 A2 | 9/2007 |
| WO | WO/2007/109170 A2 | 9/2007 |

OTHER PUBLICATIONS

Cabric et al. "Implementation issues in spectrum sensing for cognitive radios" Signals Systems and Computers, 2004. Conference record of the 38th Asilomar Conference on Pacific Grove, CA, USA, Nov. 7-10, 2004, NJ, USA, vol. 1, pp. 772-776, sections I-IV, Nov. 7, 2004.
Ning Han et al., "Spectral correlation based on signal detection method for spectrum sensing in IEEE 802.22 WRAN systems" Advanced Communication Technology, 2006. ICACT 2006. The 8th International Conference, vol. 3, Feb. 20-22, 2006, NJ, USA, pp. 1765-1770.
Falconer, D. et al., "Frequency Domain Equalization for Single-Carrier Broadband Wireless Systems", IEEE Communications Magazine (Apr. 2002).
Rohde, U. L. et al., "RF/Microwave Circuit Design for Wireless Applications", published by Wiley-Interscience (Mar. 2000).
The International Search Report, mailed Mar. 25, 2005, in related International Application No. PCT/US04/17883, filed Jun. 9, 2004.
Tenhula, Policy-Based Spectrum Access Control for Public Safety Cognitive Radio Systems, 2008.
Erpek, Location-based Propagation Modeling for Opportunistic Spectrum Access in Wireless Networks, 2007.
Perich, Policy-Based Network Management for NeXt Generation Spectrum Access Control, 2nd IEEE International Symposium on New Frontiers in Dynamic Spectrum Access Networks, 2007.
Seelig, A Description of the Aug. 2006 XG Demonstrations at Fort A.P. Hill, 2nd IEEE International Symposium on New Frontiers in Dynamic Spectrum Access Networks, 2007.
SSC, Shared Spectrum Company to Demonstrate XG Radio Technology At IEEE Dyspan Conference, 2007.
SSC, Shared Spectrum Company to Introduce Dynamic Spectrum Access Technology At Wimax Conference, 2007.
SSC, Thales Communications and Shared Spectrum Company Team to Add Dynamic Spectrum Access Technology to Military Radios, 2007.
Steadman Dynamic Networks, Spectrum Sharing Detectors, 2nd IEEE International Symposium on New Frontiers in Dynamic Spectrum Access Networks, 2007.
Zeng, Maximum-Minimum Eigenvalue Detection for Cognitive Radio, Personal, Indoor and Mobile Radio Communications, EEE 18th International Symposium on, 2007, pp. 1-5.
Adaptive Spectrum Technology: Findings From the DARPA XG Project, 2007.
McHenry, XG dynamic spectrum access field test results [Topics in Radio Communications], Communications Magazine, IEEE, 2007, no vol. 45, Issue: 6.
Tenhula, Shared Spectrum Company Successfully Demonstrates Next Generation (XG) Wireless System, 2006.
Anticipated XG VIP Demo Invitees, 2006.
Dynamic Spectrum Sharing Bid, Lease \&, MVNO/MVNE: Spectrum Options for Operators, 2006.
Secondary Markets \& Spectrum Leasing UTC Telecom 2006, Tampa, FL May 23, 2006.
XG Dynamic Spectrum Experiments, Findings and Plans Panel, 2006.
Zheng, Device-centric spectrum management, New Frontiers in Dynamic Spectrum Access Networks, 2005. DySPAN 2005. 2005 First IEEE International Symposium on, 2005, pp. 56-65.
Ackland, High Performance Cognitive Radio Platform with Integrated Physical and Network Layer Capabilities, Network Centric Cognitive Radio, 2005.
Leu, Ultra sensitive TV detector measurements, New Frontiers in Dynamic Spectrum Access Networks, 2005.
McHenry, The probe spectrum access method, New Frontiers in Dynamic Spectrum Access Networks, 2005. DySPAN 2005. 2005 First IEEE International Symposium on, 2005, pp. 346-351.
Ramanathan and Partridge, Next Generation (XG) Architecture and Protocol Development (XAP), 2005.
Steenstrup, Channel Selection among Frequency-Agile Nodes in Multihop Wireless Networks, 2005.
Zhao, Distributed coordination in dynamic spectrum allocation networks, New Frontiers in Dynamic Spectrum Access Networks, 2005. DySPAN 2005. First IEEE International Symposium on, 2005, pp. 259-268.
Dynamic Spectrum Sharing Presentation, 2005.
The International Search Report mailed Oct. 6, 2008, issued in corresponding International Application No. PCT/US07/22356, filed Oct. 19, 2007.
The International Search Report mailed Feb. 8, 2002, issued in corresponding International Application No. PCT/US01/14853.
The International Search Report mailed Mar. 18, 2008, issued in corresponding International Application No. PCT/US07/11414.
The International Search Report mailed Sep. 28, 2009, issued in corresponding International Application No. PCT/US08/073194.
The International Search Report mailed Feb. 14, 2008, issued in corresponding International Application No. PCT/US07/21940.
Zhou et al., "Detection timing and channel selection for periodic spectrum sensing in cognitive radio", 2008 IEEE, p. 1-5.
Mahbubani et al., "Dynamic channel allocation in wireless ad-hoc networks" pp. 1-12.
Project: IEEE P802.15 working group for wireless personal area networks (WPANs), pp. 1-25.
D'Itri, Dynamic spectrum access moves to the forefront, 2008.
McHenry, XG DSA Radio System, New Frontiers in Dynamic Spectrum Access Networks, 2008.

Perich, Experimental Field Test Results on Feasibility of Declarative Spectrum Management, 3rd IEEE International Symposium on New Frontiers in Dynamic Spectrum Access Networks, 2008.

Tenhula, Update on XG and Follow-on Programs: Cognitive Radio for Tactical and Public Safety Communications, 2008.

SSC Products, 2007.

McHenry, Creation of a Spectrum Sharing Innovation Test-Bed and The President's Spectrum Policy Initiative Spectrum Sharing Innovation Test-Bed, 2006.

SSC, Shared Spectrum Company Successfully Demonstrates Next Generation (XG) Wireless Communications System, 2006.

\* cited by examiner

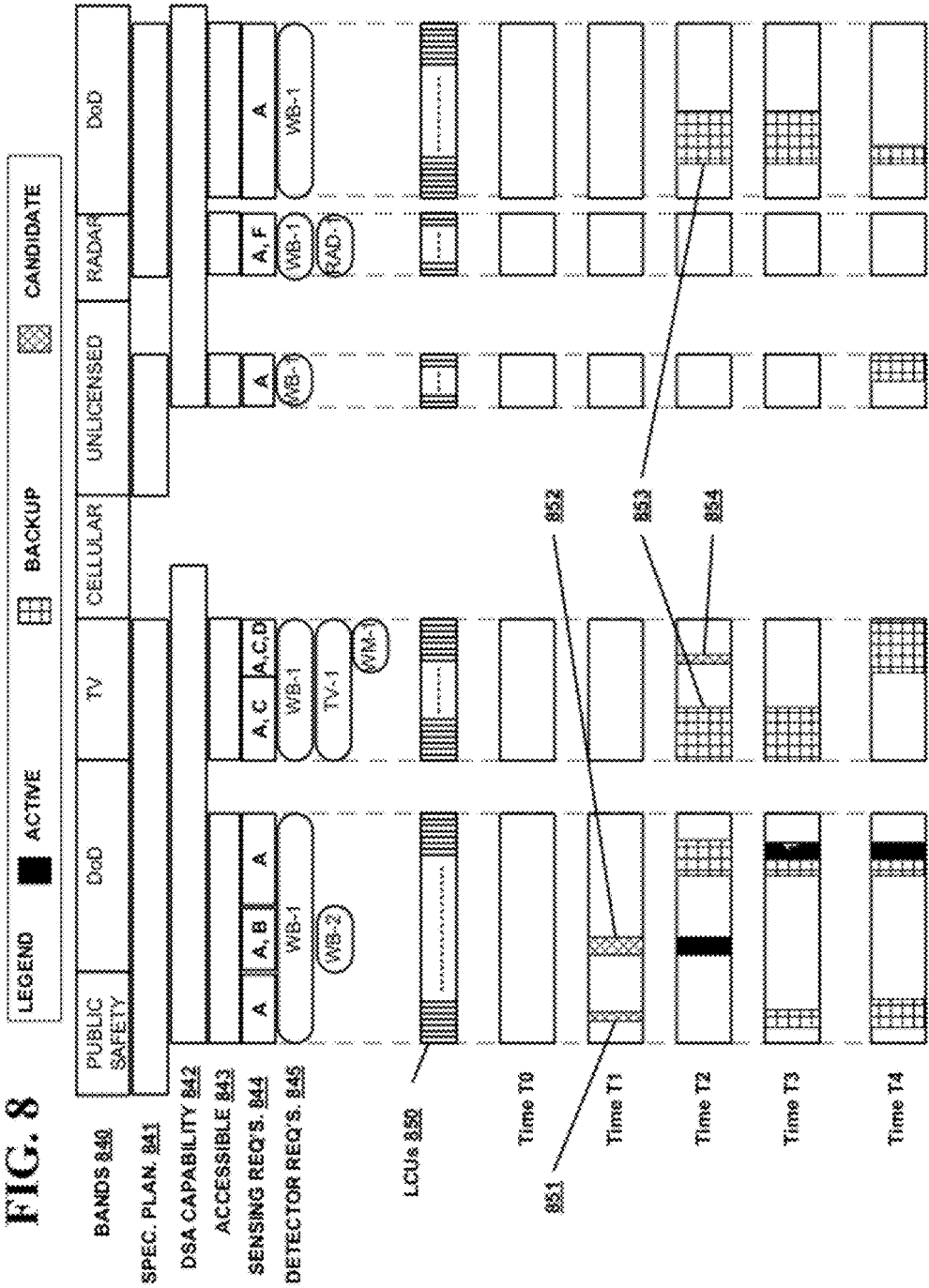

FIG. 9

| Sensing Req'ts | A | B | C | D | F |
|---|---|---|---|---|---|
| Co-Channel Threshold (dBm/Hz) | -140 | -152 | -180 | -180 | -120 |
| Co-channel Check Period (sec) | 0.1 | 0.1 | 1800*α [1] | 10 | 1800*α [1] |
| Co-Channel Availability Check | 3 | 3 | 30 | 3 | 1800 |
| Non-Occupancy Period | 1 sec | 1sec | 60 min | 10 min | 24 hr |
| Adjacent Channel Threshold | -100 | -112 | -140 | -140 | -80 |
| ... | | | | | |

[1] α = (1+1/v), v = node speed in (km/hour)

| Detector Req'ts | WB-1 | WB-2 | TV-1 | WM-1 | RAD-1 |
|---|---|---|---|---|---|
| Detector Type | Wideband | Wideband | TV | WirelessMic | Radar |
| Detector Scan Rate (Hz) | 10 | 10 | 1/(1800*α) | 0.1 | 1/(1800*α) |
| ... | | | | | |

| Wideband Detector Config | WB-1 | WB-2 |
|---|---|---|
| Resolution (kHz) | 25 kHz | 6.25 kHz |
| Integration Time (usec) | 50 | 400 |
| Max Hold Period (usec) | 50 | 200 |
| ... | | |

| TV Detector Config | TV-1 |
|---|---|
| Resolution (Hz) | 100 |
| ... | |

| Wireless Mic Detector Config | WM-1 |
|---|---|
| ... | |

| Radar Detector Config | RAD-1 |
|---|---|
| ... | |

Upper MAC Diagram of a typical radio with interface to DSA software

DSA Receiver Hardware Configuration w/four configuration items (pre-selector, RF ATT, IF ATT and ADC SHIFT)

DSA Transmitter Hardware Configuration w/three configuration items (IF ATT, RF ATT and pre-selector).

METHOD AND SYSTEM FOR CLASSIFYING COMMUNICATION SIGNALS IN A DYNAMIC SPECTRUM ACCESS SYSTEM

RELATED APPLICATIONS

This application claims priority to U.S. Application No. 61/090,076, filed Aug. 19, 2008, the disclosure of which is incorporated by reference in its entirety for all purposes; this application also is a continuation-in-part of the following applications: U.S. application Ser. No. 11/582,496, filed Oct. 18, 2006; U.S. application Ser. No. 11/783,563, filed Apr. 10, 2007, which claims priority to U.S. Provisional Application No. 60/877,656, filed Dec. 29, 2006; U.S. application Ser. No. 11/839,496, filed Aug. 15, 2007; U.S. application Ser. No. 11/839,503, filed Aug. 15, 2007; and U.S. application Ser. No. 12/487,257, filed Jun. 18, 2009, which is a continuation of U.S. application Ser. No. 11/432,536, filed May 12, 2006, now U.S. Pat. No. 7,564,816, the disclosure of each of which is incorporated by reference in its entirety for all purposes.

STATEMENT AS TO RIGHTS TO INVENTIONS MADE UNDER FEDERALLY SPONSORED RESEARCH AND DEVELOPMENT

This invention was made with Government support under contracts FA8750-05-C-0150, FA8750-07-C-0168, FA8750-07-0005, and FA8750-07-C-0169 awarded by the Air Force. The Government has certain rights in this invention.

BACKGROUND OF THE INVENTION

Cellular phones, personal digital assistants, walkie-talkies, garage door openers, computers, wireless routers and other communication devices all incorporate radio technology to establish and maintain communications over the electromagnetic frequency spectrum. Some radio frequency (RF) devices, such as cordless telephones, may automatically search for a channel from among those channels assigned for use by the device to establish communications and then release the channel when the radio is finished. However, such devices are unable to automatically adapt to significant or challenging changes within the network or spectrum environment such as those discussed below.

Networked radios and other devices designed to operate within one particular channel or set of channels cannot operate outside of the designated channels without appropriate authorization from regulatory authorities or spectrum owners and/or modification of the radios. For example, a radio may search a specified band to find an open channel for communications with the network. The radio will sequentially or randomly step or hop through the band until an open channel is found or an indication is given (e.g., through a control signal) that the network is otherwise busy (e.g., no channels are available). Such a radio, however, does not determine a new band or frequency range from which to search for channels if a channel is not found. Rather, the radio either works within its prescribed frequency band according to its fixed characteristics (such as transmit power, bandwidth, and modulation scheme), or it does not work at all.

If a typical radio confronts interference, then its communications signals may not be transmitted or received. The radio also might receive a command from a base station to shut down for any number of reasons. As a specific example, under U.S. government regulations, radios operating on certain frequencies in the 5 GHz band must cease transmissions on that channel within a specified time from the detection of radar signals, which have priority over radio transmissions. A typical radio communication system, however, is not able to adjust its own operation, and typically cannot independently determine how to overcome interference problems such as harmful interference that may endanger the functioning of the system, or degrade, obstruct, or repeatedly interrupt service.

Some radios, known as software-defined radios, can be reconfigured using user-defined parameters and software-based mechanisms. These radios, however, are not able to dynamically adjust their operating behavior outside of a predetermined, fixed set of parameters without uploading new software to the radio or modifying its hardware.

BRIEF SUMMARY OF THE INVENTION

In an aspect of the invention, a dynamic spectrum access-enabled (DSA-enabled) device may include a detector configured to detect use of a first region of spectrum during a first time period during which the device and a cooperative device refrain from transmitting, a first circuit configured to receive data from the detector and to determine a type of signal present in the first region of spectrum, a second circuit configured to identify at least one channel suitable for use by the device to communicate with the cooperative device based on data generated by the detector and the first circuit, a third circuit to initiate and maintain communication with the cooperative device, and a transceiver to communicate with the cooperative device on the at least one channel according to instructions received from the third circuit, said transceiver not transmitting during the first time period. The dynamic spectrum access-enabled device may include various components. For example, the first, second, and third circuits may include a signal classifier, channel manager, and/or communication coordinator, respectively. Other components may be included, such as a scheduler to direct scanning by the detector. The detector may be configured to detect a transmission sent by the cooperative device during a second time period that does not coincide with the first time period, and may include various detectors such as a narrow-band detector, wide-band detector, TV detector, radar detector, a wireless microphone detector, or any combination thereof. Other cooperative devices also may refrain from transmitting during the first time period. The DSA-enabled device may include a policy module to store and enforce a spectrum use policy, which may specify a spectrum range not available for use by the device, that is different than the channel identified by the second circuit. Multiple spectrum use policies may be stored, each of which may define access rules for a different spectrum range. The DSA-enabled device may periodically receive spectrum use information from the policy module based on the spectrum use policies, at a frequency that may be defined by each of the policies. The DSA-enabled device may be capable of detecting use of the first region of spectrum after initiating communication with a cooperative device, without causing an interruption in communication with the cooperative device. The first region of spectrum may overlap partially or entirely with the channel identified by the second circuit. The device may detect use of the first region of spectrum while concurrently communicating with the cooperative device. The DSA-enabled device may store one or more channel use tables that list channels in the first region of spectrum in various categories, such as backup, active, and other categories. The different categories of channels may be scanned by the detector at different rates. The DSA-enabled device may include an antenna, which may be used by the detector to detect spectrum use, by the transceiver to communicate with the cooperative device, or a combination thereof. The DSA-enabled device may be a secondary device relative to a primary network in the first region of spectrum. The DSA-enabled device also may be a base station, and the cooperative device a subscriber unit or other communication device.

An aspect of the invention may include an environmental sensing module to detect spectrum availability on a first channel, a module to coordinate dynamic spectrum access by the device and at least one other cooperative device based on the spectrum availability detected by said environmental sensing module, and a transceiver to communicate with the at least one other cooperative device on a second channel different from the first channel and identified as available for use by the device based on the spectrum availability detected by the environmental sensing module, where the environmental sensing module may be configured to detect spectrum availability on the first channel concurrently with said transceiver communicating with the at least one other cooperative device on the second channel. The first and second channels may be, for example, active and backup channels, respectively. The environmental sensing module may detect spectrum availability of the first channel at a first rate, and of the second channel at a second rate different from the first rate. It also may detect spectrum availability on the first channel during a first time period during which the device and the at least one other cooperative device refrain from transmitting. The environmental sensing module may include a first detector to detect within a first region of spectrum that includes the first channel and a second detector to detect within a second region of spectrum, which may overlap some, all, or none of the first region. The environmental sensing module also may detect spectrum availability on the second channel concurrently with the transceiver communicating with the at cooperative device on the second channel. The device also may include a signal classifier to classify a signal in the first channel as being sent by a cooperative device or a non-cooperative device.

In an aspect of the invention, a dynamic spectrum access-enabled device may include a first circuit to receive spectrum use data for a region of spectrum from at least one cooperative device, a second circuit to identify at least one channel in the region of spectrum suitable for use by the device to communicate with the at cooperative device based on data received from the cooperative device, a third circuit to initiate and maintain communication with the cooperative device, and a fourth circuit configured to schedule a time period during which each of the device and the cooperative device refrain from transmitting. The spectrum use data may be collected by the cooperative device during the time period during which the devices refrain from transmitting. The device may include a policy module to store and enforce a spectrum use policy that specifies a spectrum range not available for use by the device, which may be different than the channel identified by said second circuit. The device may include a detector to detect non-cooperative spectrum use in the first region of spectrum. The device may operate as a base station in an infrastructure-type network, and may include a fifth circuit to communicate with other base stations in the network. The device may be a primary device for the first region of spectrum.

In an aspect of the invention, a method of operating a dynamic spectrum access-enabled device may include determining a first channelization of a first region of spectrum, classifying each of a plurality of channels defined by the first channelization according to whether the channel is available for use by the device, verifying that each of the plurality of channels classified as available for use by the device is not prohibited by a spectrum use policy, communicating with a cooperative device on a first of the plurality of channels identified as available for use by the device, monitoring a second region of spectrum for non-cooperative use, upon detecting non-cooperative use of the second region of spectrum, re-classifying at least one of the plurality of channels as no longer available for use by the device, and upon determining that the detected non-cooperative use is in a region of spectrum identified by the device as being likely to experience interference from the communication with the cooperative device, ceasing communication on the first channel, and establishing communication with the cooperative dynamic spectrum access-enabled device on a second of the plurality of channels identified as available for use, where the second of the plurality of channels has not been re-classified as no longer available for use by the device. The steps of monitoring and communicating may be performed concurrently. The second region of spectrum may partially or entirely overlap the first region of spectrum. The spectrum use policy may set various requirements on channel detection and classification, such as a requirement that a channel is classified as available for use a minimum number of consecutive times prior to it being verified as available for use, requiring that a channel is classified as available for use during a minimum period of time prior to it being verified for use, or other requirements. The region of spectrum identified by the device as being likely to experience interference from the communication with the cooperative device may include a channel that is a harmonic of the first channel, a cross-product of the first channel and a channel in which the non-cooperative use occurs, a pre-defined offset from the first channel, or a combination thereof. The step of monitoring may include detecting use of the first region of spectrum using a plurality of detectors, each of which may be configured to sense transmissions within a portion of the first region of spectrum corresponding to the detector. The step of monitoring also may include defining a second channelization of the first region of spectrum different from the first channelization, and detecting use of the first region of spectrum based on the second channelization. The method may include applying a spectrum use policy to at least one channel not identified as available for use by the device, periodically verifying that each of the channels is available for use by the device based on the spectrum use policy, or a combination thereof. Each of the plurality of channels may assigned to at least one of a plurality of classifications, and the rate at which each channel is verified as available for use may be determined by the classification to which the channel is assigned. The classifications may include active, backup, candidate, or possible, where an active channel is a channel in use by the device, a backup channel is a channel available for use by the device, a candidate channel is a channel available for use by the device and the device has detected a cooperative signal on the channel, and a possible channel is a channel accessible by the device and not otherwise classified. Each channel classified as active may be verified as available for use more frequently than each channel classified as backup, candidate, or possible. The step of monitoring may be performed without interrupting communication with a cooperative device. The non-cooperative use may be by a device that is a primary device relative to the cooperative device. The method may include scheduling a first time period during which the device and the cooperative device refrain from transmitting. During a second time period not coinciding with the first, the cooperative device may sense at least one channel to detect spectrum use by a second cooperative device.

According to an aspect of the invention, a method of operating a dynamic spectrum access-enabled device may include communicating among a plurality of cooperative devices on a first channel, determining a channelization that defines a plurality of channels in the first region of spectrum, assigning each of the plurality of channels in the first region of spectrum to at least one of a plurality of classifications, concurrently with said communicating, monitoring the first region of spectrum for use by a non-cooperative node by sensing the first region of spectrum with a detector at a first rate, verifying whether each of the plurality of channels is available for use at a rate determined by the classification to which the channel is assigned, and if a non-cooperative signal is detected on the first channel, ceasing communication among the cooperative nodes on the first channel and communicating among the plurality of nodes on a channel selected from the plurality of channels in the first region of spectrum, the selected channel being different from the first channel. The first rate may be selected to prevent interference with the non-cooperative node and to maintain uninterrupted communication among the plurality of cooperative nodes. The channelization of the first region of spectrum may be different from a channelization used to communicate among the plurality of cooperative nodes on the first channel. The method may include applying a spectrum use policy to at least one channel not identified as available for use by the device. The rate at which each of the plurality of channels in the first region of spectrum is verified as available for use by the device may be based on the spectrum use policy. Each of the plurality of channels may be classified as active or candidate, wherein an active channel is a channel being used by the device, and a candidate channel is a channel on which the device has detected a cooperative signal on the channel. Each channel classified as active may be verified as available for use more frequently than each channel classified as candidate. Each of the plurality of channels may be classified as active, backup, candidate, or possible, where an active channel is a channel being used by the device, a backup channel is a channel available for use by the device, a candidate channel is a channel on which the device has detected a cooperative signal on the channel, and a possible channel is a channel that is accessible by the device. Each channel classified as active is verified as available for use more frequently than each channel classified as backup, candidate, or possible.

According to an aspect of the invention, a method of coordinating communication among a plurality of devices may include scheduling a first time period during which the plurality of devices refrain from transmitting that is synchronized among the plurality of devices, and during a second time period that does not coincide with the first time period, sensing at least one channel to detect spectrum use by at least one cooperative device on the at least one channel. Each of the plurality of devices may be a dynamic spectrum access-enabled device, and may be capable of communicating on a plurality of channels after initialization of communication among the plurality of devices. The devices may not be primary devices with respect to the plurality of channels. The method also may include scheduling a first plurality of time periods at regularly-spaced time intervals during which the plurality of devices refrain from transmitting, and repeating the sensing step during each of a second plurality of time periods that do not coincide with any of the first plurality of time periods. The first time period may occur at different points in adjacent communication frames. The second time periods may be scheduled to have random time intervals between adjacent periods. During the first time period, at least one of the plurality of devices may use a detector to detect non-cooperative spectrum use. The first time period may be synchronized among substantially all dynamic spectrum access-enabled devices in a geographic region, among all devices in a plurality of dynamic spectrum access networks, or a combination thereof. The networks may be non-cooperative or cooperative each other. The step of sensing may include sensing at least one channel to detect cooperative spectrum use at a time selected by the device that does not coincide with the first time period. The first time period may be synchronized among a plurality of non-cooperative dynamic spectrum-enabled networks, for example during the synchronizing step. The plurality of devices may include devices from a plurality of non-cooperative dynamic spectrum-enabled networks.

A system according to an aspect of the invention may include a plurality of dynamic spectrum access-enabled devices, each of which may refrain from transmitting during a first time period synchronized among the plurality of devices, and at least one of the devices may include a sensor module to detect spectrum use by a device not in the plurality of devices during the first time period, and to detect spectrum use by a cooperative device during a second time period that does not coincide with the first time period. Each of the plurality of devices may be a dynamic spectrum access-enabled device, and the device not in the plurality of communication devices may be non-cooperative with said plurality of communication devices. The sensor module may include multiple sensors. The system may include a circuit such as a scheduler to schedule time periods at regularly-spaced time intervals, during which the plurality of devices refrain from transmitting. The circuit may be integral to or separate from the devices. At least one of the devices may include a detector to repeat sensing during each of a second plurality of time periods, each of which does not coincide with any of the first time periods. The second time periods may be scheduled with random time intervals between adjacent periods. The detector may be actuated to detect non-cooperative spectrum use. The first time period may be synchronized among substantially all the dynamic spectrum access-enabled devices in a geographic region, and may occur at different points in adjacent communication frames. Each of the plurality of devices may sense a channel to detect cooperative spectrum use at a time selected by the device, which may not coincide with the first time period. The devices may include devices from one or more non-cooperative dynamic spectrum-enabled networks, and each of the devices may not transmit any data other than control data to devices in any of the other non-cooperative networks.

According to an aspect of the invention, a dynamic spectrum access (DSA)-enabled device may include a first circuit that causes the device to refrain from transmitting during a first time period, which may be synchronized among a plurality of other DSA-enabled devices, and a second circuit to sense at least one channel to detect spectrum use by at least one cooperative DSA-enabled device on the at least one channel during a second time period, which may not coincide with the first time period. The first time period may be synchronized among all devices in a plurality of dynamic spectrum access networks, each of which may be non-cooperative with each of the other networks. The device also may schedule a first plurality of time periods at regularly-spaced time intervals during which the device refrains from transmitting, which may be synchronized with the other DSA-enabled devices. The device also may repeat sensing during each of a second plurality of time periods, each of which may not coincide with any of the first time periods. The second time periods may be scheduled to have random time intervals between adjacent periods. During the first time period, at least one of the plurality of DSA-enabled devices may actuate a detector to detect non-cooperative spectrum use. The first time period may be synchronized among substantially all DSA-enabled devices in a geographic region, and may occur at different points in adjacent communication frames. Each of the plurality of devices may include a third circuit to sense at least one channel to detect cooperative spectrum use during a third time period selected by the device, which may not coincide with the first time period. Each of the second and/or third circuits may include a detector.

According to an aspect of the invention, a method of coordinating communication among a plurality of devices in a network may include, at a first of the plurality of devices: detecting spectrum use in a plurality of channels, based on the detected spectrum use, selecting a communication channel, and transmitting an initial communication packet on the selected channel, and, at a second of the plurality of devices: receiving the communication packet; and responding to the initial communication packet. The method also may include, by at least one of the plurality of devices, periodically measuring spectrum use of the selected channel, and, responsive to detecting spectrum use identified as likely to cause interference to a non cooperative device, sending an indication thereof to the first device, the second device, or both. Each of the devices may be a dynamic spectrum access-enabled device, and may be capable of communicating on a plurality of channels after initialization of communication among the plurality of devices. The devices may not be primary devices with respect to the plurality of channels. The selected channel may not be reserved for use by the DSA network in a regulatory scheme, and may be reserved for use by a primary network in a regulatory scheme. The second of the plurality of devices may receive a communication packet from a non-cooperative device, select the communication channel based on an identifier in the communication packet received from the first of the plurality of devices, and send the response to the initial communication packet on the communication channel. The second device also may receive spectrum use information for at least one of the plurality of channels from at least the second of the plurality of devices, and select the communication channel further based on the received spectrum use information. The initial communication packet may include an indication of the selected channel. Each of the first and second devices may operate as a base station or a subscriber unit.

A system according to an aspect of the invention may include a first device configured to detect spectrum use in a plurality of channels, based on the detected spectrum use, select a communication channel, and transmit an initial communication packet on the selected channel; and a second device configured to receive the communication packet, and respond to the initial communication packet. One or both of the devices may periodically measure spectrum use of the selected channel, and, responsive to detecting spectrum use identified as likely to cause interference to a non-cooperative device, send an indication thereof to the other device.

According to an aspect of the invention, a method of coordinating communication among a plurality of dynamic spectrum access (DSA)-enabled devices in a DSA-enabled network may include, at a first of the plurality of devices: detecting spectrum use in a plurality of channels, based on the detected spectrum use, generating a candidate channel list identifying channels suitable for use by the DSA-enabled devices in the DSA-enabled network, selecting a communication channel from the candidate channel list, and transmitting an initial communication packet on the selected channel, where the initial communication packet identifies the first of the plurality of devices as a cooperative device for the DSA-enabled network. The selected channel may not be reserved for use by the DSA-enabled network in a regulatory scheme, and may be reserved for use by a primary network in a regulatory scheme. The method also may include receiving a packet from a second device in the DSA-enabled network, that indicates that the selected channel is unsuitable for use by the DSA-enabled network, sending a second communication packet to other devices in the DSA-enabled network, receiving channel preference data from at least one other device in the DSA-enabled network, based on the channel preference data, selecting a new communication channel, and sending a third communication packet on the new communication channel.

According to an aspect of the invention, a device suitable for use in a dynamic spectrum access (DSA)-enabled network may include a communication coordinator to manage communication with a cooperative device, the communication coordinator including an initialization module configured to identify use of a first communication channel by a cooperative device based on detected spectrum use in a region, a channel maintenance module configured to initialize and maintain communication with the cooperative device on the first channel, and a channel switching module configured to cause the device to stop using the first channel to communicate with the cooperative device and begin using a second channel to communicate with the cooperative device, where the communication coordinator may activate each of the initialization module, the channel maintenance module, and the channel switching module based on a communication received from the at least one other cooperative device. The communication coordinator may activate the channel switching module in response to a communication received from the cooperative device which indicates the presence of non-cooperative spectrum use, a communication received from the cooperative device which indicates the cooperative device is going to switch channels to a channel not usable by the device, or a combination thereof. The second channel may not be reserved for use by the device in a regulatory scheme, and may be reserved for a primary network in a regulatory scheme.

According to an aspect of the invention, a method of communicating with at least one cooperative device may include detecting use of a first communication channel by the at least one cooperative device based on detected spectrum use in a region, initializing and maintaining communication with the at least one cooperative device on the first communication channel, and ceasing communication with the at least one cooperative device on the first communication channel and initializing communication with the at least one cooperative device on a second communication channel selected based on data describing non-cooperative use of the second communication channel. The method may include receiving a communication from the cooperative device indicating non-cooperative use of the first communication channel, and ceasing communication with the cooperative device in response to the communication. The method also may include receiving a communication from the at least one cooperative device indicating the device is going to switch channels to an unusable channel, and detecting use of a first communication channel in response to receiving the communication.

According to an aspect of the invention, a method of classifying the status of a channel by a dynamic spectrum access-enabled device may include determining a channelization for a region of spectrum, measuring the energy present in a plurality of channels defined by the channelization, generating a first confidence score indicating the difference between a predefined signal mask and energy levels measured in a first group of the plurality of channels, generating a second confidence score indicating the difference between the predefined signal mask and energy levels measured in a second group of the plurality of channels including at least one channel at a higher frequency than each channel in the first group of channels, and, in response to at least one of the first and second confidence scores exceeding a predefined threshold, classifying the corresponding group of channels as containing a cooperative signal. The method also may include classifying the corresponding group of channels as containing a dynamic spectrum access signal. The first and second group of channels may have zero, one, or more channels in common. The frequency range encompassed by the first and second group of channels may correspond to a predefined channelization. The channelization may be different than a channelization associated with a non-cooperative signal expected in the region of spectrum.

According to an aspect of the invention, a method of operating a dynamic spectrum access-enabled device may include determining a channelization for a region of spectrum, measuring energy present in at least one channel defined by the channelization, based on the measured energy, identifying a signal in the at least one channel, comparing the detected signal to a predefined signal mask that defines a power-frequency relationship for a modeled signal in the at least one channel, calculating a confidence score based on the comparison of the detected signal to the signal mask that indicates the likelihood that the signal is a cooperative signal, and based on the confidence score, classifying the signal identified in the at least one channel as at least one of a non-cooperative signal, a primary signal, and a cooperative signal. The channelization may be different than a channelization associated with a non-cooperative signal expected in the region of spectrum. The method may include communicating with a cooperative device on the at least one channel. The method also may include identifying a known non-cooperative signal bandwidth corresponding to a region of spectrum that includes the at least one channel, and selecting the signal mask to have a bandwidth different than the non-cooperative signal bandwidth. The method may include identifying the type of signal detected in the at least one channel as being a type expected for a cooperative signal. The method also may include, prior to identifying the signal in the at least one channel, measuring noise occurring in the channel for a period of time, and reducing the value of the measured energy used to identify the signal in said identifying step based on the noise measured during the period of time. Calculating the confidence score further may include calculating the difference in mean values between the signal mask and the detected signal in one or more pass-bands, calculating the difference in mean values between the signal mask and the detected signal in one or more stop-bands, calculating the difference in the variance between the signal mask and the detected signal in one or more pass-bands, calculating the difference in the variance between the signal mask and the detected signal in one or more stop-bands, calculating the distance between the amplitude of the center pass-band of the detected signal and the side guard-bands of the detected signal, and calculating the difference between the calculated distance and the distance between the amplitude of the center pass-band of the signal mask and the side guard-bands of the signal mask, calculating the difference between the peak-to-mean ratio of the signal mask and the peak-to-mean ratio of the detected signal, or any combination thereof.

An aspect of the invention may include a detector configured to measure energy present in at least one channel, a first circuit to identify a signal in the channel based on the energy measured by the detector, compare the detected signal to a predefined signal mask that defines a power-frequency relationship for a modeled signal in the at least one channel, calculate a confidence score based on the comparison of the detected signal to the signal mask, the confidence score indicating the likelihood that the signal is a cooperative signal; and, based on the calculated confidence score, classify the signal identified in the at least one channels as available for use by the device node. The device may include a signal classifier. The detector may measure energy present in at least one of a first side portion and a second side portion of a narrow channel, the first side portion being defined by a first frequency range and the second side portion being defined a second frequency range, the second frequency range being higher than and non-overlapping with the first frequency range. The device may include a second circuit to define an energy threshold equal to the measured energy level, measure energy present in a central portion of the narrow channel, the central portion being defined by a central frequency range between the first and second frequency ranges and, if the energy measured in the central portion is at least as great as the threshold, classify a signal detected in the narrow channel as a cooperative signal. Such a device may include a second circuit to determine the availability of the at least one channel for use by the device based on signal classification data received from the first circuit. The device may include a policy module to specify how often the detector measures energy in the at least one channel. The device may be a secondary device in the channel, and may be a base station or a subscriber unit.

An aspect of the invention includes a method of identifying a cooperative signal by a dynamic spectrum access-enabled device, which may include measuring energy present in at least one of a first side portion and a second side portion of a narrow channel, the first side portion being defined by a first frequency range and the second side portion being defined a second frequency range higher than and non-overlapping with the first frequency range, setting an energy threshold to be the value of the energy measured in said side portion measuring step, measuring energy present in a central portion of the narrow channel, the central portion being defined by a central frequency range between the first and second frequency ranges, and, if the energy measured in the central portion is at least as great as the threshold, classifying a signal detected in the narrow channel as a cooperative signal. The narrow channel may be defined by a channelization different than a channelization associated with a non-cooperative signal expected in a region of spectrum that includes the narrow channel. The method may include communicating with a cooperative device on the narrow channel. The method also may include, prior to classifying the signal as a cooperative signal, measuring noise occurring in the channel for a period of time, and reducing the value of the measured energy used to identify the signal in said classifying step based on the noise measured during the period of time.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification; illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 8 shows an example spectrum plan that omits the cellular band and portions of unlicensed, radar, and government bands from consideration for use by a DSA system according to an embodiment of the invention.

FIG. 9 shows examples of band-specific sensing requirements and detector requirements according to embodiments of the invention.

DETAILED DESCRIPTION OF THE INVENTION

Figure 1A:
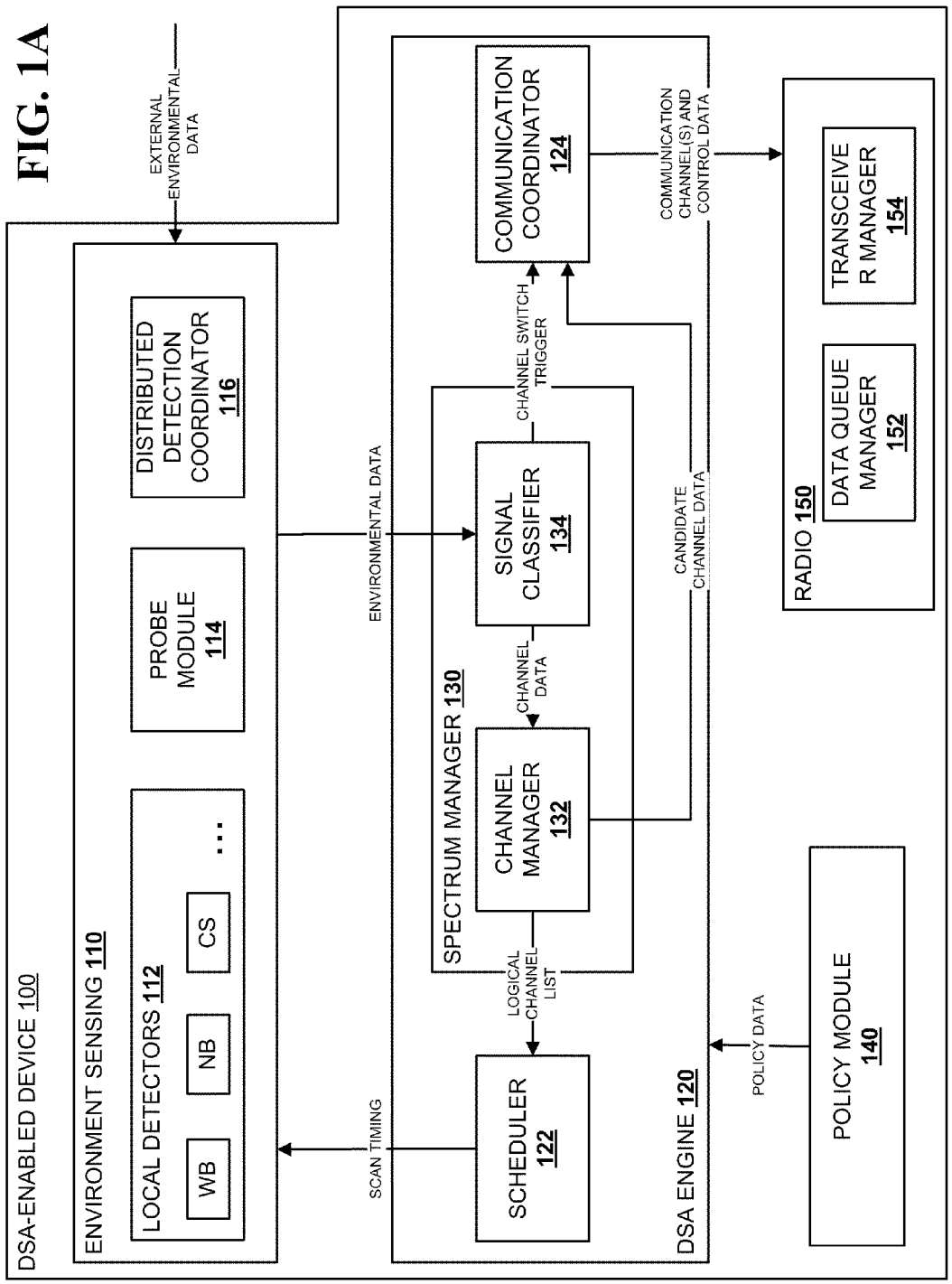
FIG. 1A shows an example DSA-enabled device according to an embodiment of the invention.

It is understood that the invention is not limited to the particular methodology, protocols, topologies, etc., as described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Any numerical values recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32 etc., are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Particular methods, devices, and materials are described, although any methods and materials similar or equivalent to those described herein can be used in the practice or testing of the invention. All references referred to herein are incorporated by reference herein in their entirety.

Moreover, provided immediately below is a "Definition" section, where certain terms related to the invention are defined specifically and use of these terms in the specification and the claims have the meanings ascribed herein. Particular methods, devices, and materials are described, although any methods and materials similar or equivalent to those described herein can be used in the practice or testing of the invention. All references referred to herein are incorporated by reference in their entirety.

DEFINITIONS

Unless indicated otherwise, as used herein and in the appended claims, the following terms have the meanings ascribed below:

the term "channel" refers to a logical channel, which may include one or more physical channels or frequencies. Typically, a logical channel can be mapped to a communication frequency or a set of communication frequencies used to communicate among devices that use the channel. A channel typically is defined as a range of frequencies (e.g. 900-910 Mhz). "Channelization" refers to the definition of one or more channels within a defined spectrum range. A channel may be described as in use or occupied if at least one frequency in the channel is in use by a device, or if a signal is otherwise detected in at least one frequency in the channel. The term "center frequency" may be used to refer to a frequency at or near the center of a logical channel. Thus, a channel also may be specified in terms of a center frequency and channel width.

"Dynamic Spectrum Access" (DSA) refers to the process of communicating on one or more channels which are selectable subsequent to initialization of communication between two devices. Typically a DSA process may use regions of spectrum to which the devices do not have priority use rights, i.e., the devices may not be primary devices, or may not be providing a primary use of the region of spectrum. A Dynamic Spectrum Access-enabled ("DSA-enabled") device is a device that is capable of communicating with one or more other DSA-enabled devices using a dynamic spectrum access process. Typically, DSA-enabled devices can autonomously assess the radio spectrum environment, and may automatically select a communication channel based on capacity, interference, and/or other conditions. A DSA-enabled device also may be referred to herein as a DSA node. DSA-enabled devices typically operate within the radio frequency (RF) regions of the electromagnetic spectrum.

Two DSA-enabled devices are described herein as "cooperative" devices if they engage in communication and channel switching among identified available channels. A DSA-enabled device that is not engaging in communication with another DSA-enabled device may be described herein as "non-cooperative" with the other DSA-enabled device. Thus, two DSA networks may overlap in channel use without the members of each network being considered as "cooperative" with members of the other network. Non-cooperative DSA-enabled devices typically do not exchange communication data, but may share or exchange control data, such as when non-cooperative DSA networks in a geographic region are configured to use a synchronized detection gap. A DSA signal or device may further be classified as cooperative or non-cooperative. A non-DSA-enabled device or signal may be described as non-DSA and/or non-cooperative. That is, a device may be incapable of performing, or not configured to perform, dynamic spectrum allocation, but also may be described as non-cooperative. Thus, in some contexts the term "non-cooperative" may encompass a non-DSA-enabled device. For example, a signal detected on a channel may be classified initially as DSA or non-DSA. An unclassified signal may be treated and described as a non-DSA signal unless and until it is classified otherwise. A "DSA signal" refers to a transmission sent by or identified as sent by a DSA-enabled device, whether cooperative or non-cooperative. A signal may be described as "cooperative" or "non-cooperative" based on whether it was sent by or identified as sent by a cooperative or non-cooperative DSA-enabled device, respectively. A "non-cooperative signal" also may refer to a signal from a non-DSA-enabled device.

The term "detector" refers to a sensor capable of sensing energy at one or more frequencies. A detector typically includes a hardware sensor and additional software, hardware, or both to perform additional processing of received or sensed transmissions. Various detectors are described herein. Unlike a receiver, a detector typically does not demodulate or otherwise extract information from received energy, such as information contained in a signal sent on a channel. A detector may calculate or infer information about the energy itself, such as amplitude and frequency at which the energy is detected. A detector may also be referred to as a "sensor."

The term "detection distance" or "detection radius" refers to the distance at which a detector is capable of detecting a transmission or at which it is believed that a detector is capable of detecting a transmission.

The term "detection gap" or "gap" refers to a synchronized time period during which DSA-enabled devices in a DSA network refrain from transmitting, which may allow for more efficient or successful environmental sensing. The detection gap also may be referred to as a "quiet period." Typically, one or more devices in a DSA-enabled network may perform detection during this period.

The term "interference distance" refers to the distance at which a device may interfere with the operation of another device or the transmission/reception of another device, or at which it is believed that the device may interfere with the operation of another device or the transmission/reception of another device.

A "primary" device, network, operator, or other entity is one that has a priority right to a portion of the spectrum relative to another device, network, operator, or other entity. Similarly, a "primary" spectrum use has a priority right to a portion of spectrum relative to another use of the spectrum. A lower-priority entity may be referred to as "secondary," and a lower-priority use may be referred to as a "secondary use." A licensee of a particular region of spectrum in a regulatory scheme typically is a primary user. A single entity or use may be primary to one entity or use but secondary to another. A "co-primary" or "co-secondary" device, network, operator, use, or other entity is one that has the same right to operate in a portion of the spectrum as another respective co-primary or co-secondary device, network, operator, use, or other entity. Typically, neither device may cause harmful interference to the other and, in certain cases, they must accept harmful interference from each other. For example, a regulatory scheme may assign a hierarchy of licensees or uses for a particular region of spectrum, or may allocate or assign spectrum for certain primary, co-primary, secondary, co-secondary, or unlicensed use (or combinations thereof) within a geographic region.

The term "maximum interference free transmit power" (MIFTP) refers to a determined power level that can be transmitted by a DSA-enabled device without exceeding interference requirements for non-cooperative transmission sources or other DSA-enabled devices, such as non-cooperative DSA-enabled devices, that utilize the same portion of wireless spectrum. Interference requirements may include metrics such as the interference-to-noise-ratio, probability of interference occurrence, and other metrics.

The terms "module" and "circuit" refer to a device or device component that performs one or more logically-related functions. A module or circuit may include any combination of hardware and/or software, or both hardware and software, and may implement one or more logical processes.

The term "rendezvous" refers to a process of multi-frequency neighbor and network discovery and ongoing negotiation of one or more control and/or data channels among multiple DSA-enabled devices.

The terms "wideband" and "narrowband" refer to signals, detectors, or portions of spectrum that are relatively wide or narrow, respectively. The particular division between wideband and narrowband may vary somewhat depending on the specific region of spectrum or use case being considered, as will be understood by one of skill in the art. In embodiments of the invention, a narrowband signal typically is any signal of about 1 MHz or less, and a wideband signal typically is any signal requiring more bandwidth. Signals, detectors, or other devices may operate in a sub-region of a narrow- or wideband region of spectrum. For example, an illustrative wideband detector may detect signals up to 20 MHz wide with a 20 kHz resolution bandwidth. It will be understood that other ranges and configurations may be used. For example, in some embodiments a "narrowband" signal or region may refer to a signal sufficient to contain a particular type of data, such as where 4 kHz narrowband channels or signals correspond to voice transmissions, and larger wideband signals correspond to greater amounts of data.

A "DSA-enabled network" or "DSA network" refers to a network of DSA-enabled devices that operate "cooperatively."

An "ad-hoc" network is a network that does not have a pre-planned topology, and/or one that uses a non-static, dynamically-selectable base station or other central controller.

A "peer-to-peer" network is a network that does not use any base station or other central controller. In some configurations, one or more DSA-enabled devices in a "peer-to-peer" network may perform some or all of the functions associated with a central controller in a non-peer-to-peer network.

An "infrastructure" network is a network that uses a base station or other central controller.

The term "local" may refer to a module, device, component, circuit, or data that is integral to an individual DSA-enabled device or other device. For example, each DSA-enabled device in a DSA-enabled network may include a local detector that is used by the device. Similarly, each DSA-enabled device may maintain a local set of ranked channels or other data.

Wireless spectrum is in increasing demand for a variety of consumer, corporate, government, military, and other uses. Since the amount of spectrum is limited, regulatory schemes are commonly used to allocate spectrum to particular uses or licensees. Such schemes may be inefficient since, for example, a particular license or use may not efficiently or fully utilize all of the allocated and assigned spectrum. For example, communication resources may be modeled as a three-dimensional space with axes of space/beam angle, time, and frequency. These three-dimensional communications resources represent the entirety of the resource available to satisfy the demands of legacy communications systems and also the escalating demands of highly mobile, wide band communications services.

Using conventional spectrum allocation and assignment techniques, there may not be sufficient spectrum available to satisfy all emerging demands. However, as previously mentioned, relatively large sub-spaces of the communications resources space remain unused; major reserved spectral slots either are not utilized at all, or are grossly underutilized.

Methods, devices, and systems according to embodiments of the invention may allow for more efficient use of the RF spectrum. Embodiments may dynamically and efficiently distribute the communications resources (i.e., volumetric elements of the three-dimensional communications resource space) to multiple legacy uses as well as to evolving wide band communications services for mobile users, by using dynamic spectrum access (DSA) techniques in which communication resources may be assigned during operation of one or more communication systems, including DSA-enabled systems. Specifically, embodiments may include the following two main features or elements:

1. Local "hole" sensing (or monitoring) and local adaptation techniques that enable individual DSA-enabled devices to identify available communications resources without causing interference. That is, DSA-enabled devices may identify unused portions of the communications resources space (i.e. unused regions of frequency, spatial/angle, and/or time).

2. Network-based resource allocation and media access control (MAC) functionality may dynamically route incoming message traffic through stable frequency, spatial/angle, and time holes.

In some embodiments, the first element (local "hole" sensing/monitoring and local adaptation) may be accomplished using various types of determinations, such as: (a) propagation loss between cooperative DSA-enabled devices; (b) maximum allowable transmit power; (c) beam angles required to restrict interference with other users to, at most, a certain threshold level; and (d) spectrum occupancy. In various embodiments, passive and active sensing techniques may be used to make these determinations, as described in further detail below. The system may use measurements at each DSA-enabled device and/or active probing techniques to locally and adaptively determine the frequencies, beam angles, and/or power levels available to each DSA-enabled device. In some embodiments, much or all of the decision logic regarding available and/or preferred communication channels is within each DSA-enabled device.

In some embodiments, the second element (resource allocation and MAC function) may be addressed through several sub-features: (a) deciding what information needs to be sent and to whom; (b) optimizing frequency assignments, transmit power levels, time slots, routes, and/or other aspects of communication among DSA-enabled devices; and (c) coordination of time slot and frequency decisions locally. It has been found that when allowable spectrum choices dynamically vary within local groups, large amounts of spectrum may be found that are locally stable and uniform.

Embodiments of the invention may be implemented over a broad range of scenarios, such as terrestrial, airborne, training, low and high capacity links, denial-of-service scenarios, and other situations. Some embodiments may perform DSA techniques using a radio that operates with a relatively low transmit power, and/or in early-entry situations with minimal advanced planning and constant network changes (network topology, traffic flow and volume, and network size). Embodiments may be highly robust, fault tolerant, have simple user interfaces, and may be compatible with existing uses and systems.

According to embodiments of the invention, a Dynamic Spectrum Access (DSA) network may use one or more DSA-enabled devices that can autonomously assess the radio spectrum environment; and may automatically (i.e., without human intervention) adjust communication channels used by the DSA-enabled devices based on various capacity, interference, and other conditions. A DSA-enabled device may use a portion of spectrum that is assigned for use by, or that may be in use by another systems or network. The DSA-enabled device may seek to avoid or minimize interference with other wireless signals in a spectral region used by the DSA system.

Figure 1B:
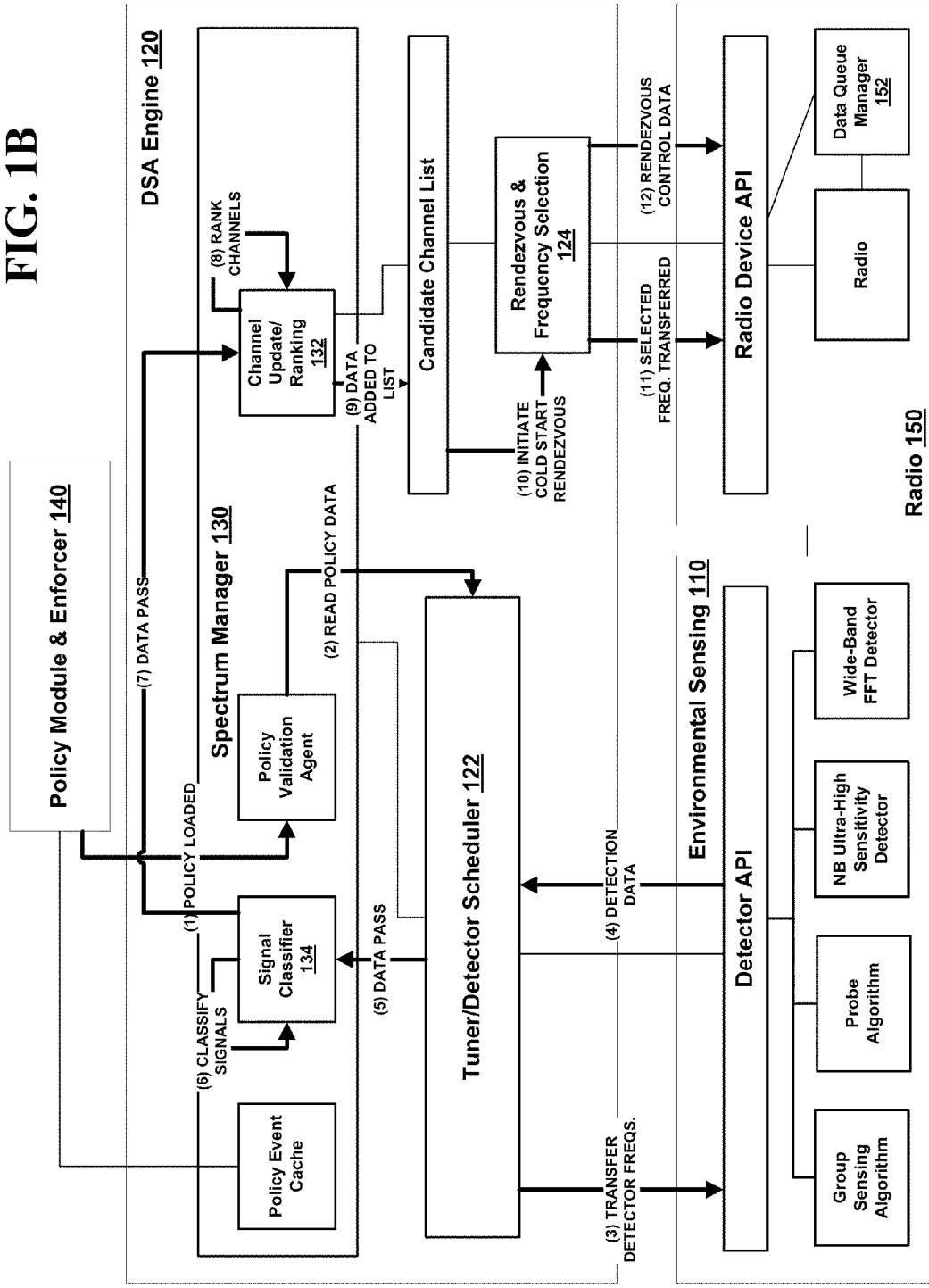
FIG. 1B shows an example DSA-enabled device and an example information flow according to an embodiment of the invention.

FIGS. 1A and 1B show examples of DSA-enabled devices and example data flows according to embodiments of the invention. In some embodiments, a DSA-enabled device 100 may include four main components: an environment sensing and detection module 110; a DSA engine 120; a radio or other communications module 150, and a policy module 140.

The environmental sensing module 110 may monitor or sample a portion of spectrum, such as a range of frequencies defined by a set of logical channels, to determine whether the portion of spectrum is in use. One or more local detectors 112 may be used to measure energy across channels. Various types of local detectors may be used, including wideband detectors, narrowband detectors, application-specific detectors such as detectors configured to specifically detect television, cellular, wireless microphone, or other specific signals, and any other suitable detector. The environmental sensing module may include a distributed detection coordinator 116 to manage the distribution and receipt of distributed environmental sensing information among one or more DSA-enabled devices, such as when Group Behavior—type techniques or distributed sensing techniques are used. The environmental sensing information may include, for example, an indication of energy and/or signals detected by each DSA-enabled device in one or more channels. The distributed detection coordinator 116 also may manage low-level security information between the DSA-enabled devices when these devices exchange sensor data. The environmental sensing module also may include a probe signal module 114 to coordinate sending/receiving probe signals that are used to identify signal propagation characteristics between DSA-enabled devices in a DSA network. The environmental sensing module 110 may provide environmental sensing information (also called detection data) to the DSA engine module 120, including radio frequency (RF) environment information such as energy levels, specific signal types and strengths, power levels and structures of signals in a region of spectrum detected by the local detectors, environmental sensing information received from other cooperative devices, signal propagation data, and any other environmental data detectable by the DSA-enabled device. The environmental sensing module may receive control inputs from the DSA engine module 120 that specify when and upon which portions of the spectrum the local detectors 112 are utilized, when the probe operates, and how cooperative sensing information is collected, reported, and secured. In some embodiments, some DSA-enabled devices in a system or network include detectors, while other DSA-enabled devices do not include or use a detector. In such a configuration, the DSA-enabled devices which include detectors may provide spectrum usage information to the other DSA-enabled devices that do not have detectors. External spectrum measurement systems also may be used. For example, one or more detectors that are not DSA-enabled devices or are not in a DSA-enabled network may gather and distribute spectrum information to the DSA-enabled devices, which may or may not include detectors.

A DSA-enabled device typically may perform environmental sensing, including detection of other signals, at a separate time from when it performs routine transmission and reception of data and control information. This may allow the automatic gain control (AGC) and/or other receiver parameters to be optimized for detection independently from data reception. In some configurations, sensing may take place during the reception of data if there are two simultaneous data paths to the radio or other transceiver and to the detector and if the detector bandwidth is greater than the bandwidth of the received signals. In this case, detection sensitivity may be reduced when DSA transmissions are received during a time period when the DSA-enabled device is in a mode configured to detect transmissions from non-DSA sources.

The DSA engine module 120 may comprise several components, such as a spectrum manager 130; a communication coordinator 124; and a high-level scheduler 122. Within each DSA-enabled device, the scheduler 122 may manage operation of the detectors. The channel manager 132 may generate and maintain a list of candidate channels available for use by the DSA-enabled device. The communication coordinator 124 may use channels identified by the spectrum manager for network discovery and frequency negotiation with other cooperative DSA-enabled devices. The operation of these components and subsystems is described in further detail below.

According to embodiments of the invention, a DSA-enabled device may support concurrent connections to a plurality of DSA-enabled networks. In an example embodiment, the DSA-enabled device may simultaneously join multiple DSA-enabled networks by maintaining separate instances of rendezvous state, channel control lists, policy information, and any other information related to each DSA-enabled network. A collection of such information specific to an individual DSA-enabled network or a cluster of DSA-enabled nodes is called a DSA-enabled network context. The number of different DSA-enabled networks that a specific DSA-enabled device may join may be limited by the amount of memory available in the device to store DSA-enabled network contexts.

The DSA-enabled device may select a DSA-enabled network context to complete a specific operation with respect to a specific DSA-enabled network and/or cluster. For example, a DSA-enabled device may maintain a first set of DSA-enabled network information corresponding to a first DSA-enabled network, and use that set of information for managing the first DSA-enabled network. It also may maintain, a second set of DSA-enabled network information for a second DSA-enabled network, a third set for a third network, and so on. In other embodiments, a DSA-enabled device may maintain a single context.

The DSA engine module may coordinate communications between the DSA-enabled device and other cooperative DSA-enabled devices. One aspect of this coordination may be the association of each action of the DSA-enabled device with a specific context. For example, the DSA engine module may receive information from the environmental sensing module regarding the radio frequency (RF) environment observed by the DSA-enabled device, environment information observed by the environmental sensing modules of other cooperative DSA-enabled devices, and similar data, and then use this data for classification, interference avoidance, and channelization of the spectrum for use by the DSA-enabled device. The classification, interference avoidance, and channelization may be applied with respect to a DSA-enabled network context.

The DSA engine module also may include a scheduler 122 to coordinate transmitting, receiving, and sensing times. For example, the scheduler may define various times in each frame during which the DSA-enabled device performs different operations, such as sending and receiving data and/or control information using the radio 150, making observations about spectrum usage using the environmental sensing module 110 (and remote environmental sensing modules of other cooperating DSA-enabled devices), and performing analysis of RF environment information and signals observed by the DSA-enabled device. The scheduler 122 may be part of or controlled by the DSA engine module, or it may be a separate module within the DSA-enabled device.

The DSA engine module may include or control a spectrum manager 130 to analyze signals or potential signals for which information is obtained by the DSA-enabled device, analyze spectrum usage, and identify potential channels for use by the radio. For example, the spectrum manager may include one or more signal classifiers 134 and a channel manager 132. Each signal classifier 134 may receive some or all of the information from the sensing module 110, such as power levels and structures of signals in a region of spectrum observed by the sensing module. A signal classifier may use various RF filters, signal masks, prior classification results, demodulation, and other analysis techniques to identify signals contained in the information provided by the environmental sensing module. For example, a signal classifier may discriminate between cooperative signals, non-cooperative DSA signals, and non-cooperative non-DSA signals. In addition, the signal classifier may store information about the classification process for later use by the classification manager. This stored information is called classification results. Classification results may be used by a classifier to "learn" classifications in order to reduce future classification errors, or to speed classification of previously viewed information. A signal classifier 134 may then send data describing the presence or absence of signals and, if present, the types of signals in various channels to the channel manager 132. For example, in an embodiment, a DSA-enabled device may store detection data and classification results for later reuse or analysis, such as in a database used by the channel classifier. Such stored data may be used to reduce subsequent processing errors. As a specific example, if a signal classifier incorrectly identifies a particular signal within data received from a detector, the stored classification results may be referred to at a later point in time to prevent the classifier from making the same incorrect identification if the signal is detected again.

A signal classifier 134 also may detect a non-cooperative signal in a channel being used by the DSA-enabled device. In response, a signal classifier 134 or spectrum manager 130 may send an immediate message, such as a request to change channels, to the communication coordinator 124. The request may cause the communication coordinator to initiate a change in the channel used by the DSA-enabled device for communication with other cooperative DSA-enabled devices. Such requests and channel change processes are described in further detail below.

The channel manager 132 may analyze channel data received from the signal classifier to identify one or more available channels that may be available for use by the DSA-enabled device. For example, the channel manager may assign a preference rating or other indication of the desirability of using each channel to communicate with other cooperative DSA-enabled devices. Various metrics may be applied based on what is known about each channel. For example, channels which include lower frequencies may be preferred over those with higher frequencies; channels more likely to avoid interference with non-cooperative non-DSA-enabled devices may be preferred over channels that may incur some interference with non-DSA and/or non-cooperative DSA-enabled devices, and channels having the least energy detected may be preferred. Other metrics and comparisons may be used to select one or more preferred channel(s). The specific metrics used may be partially or wholly dictated by a policy data (for example, as provided by a policy manager as described herein). In some embodiments, the specific metrics may be included, in whole or in part, within a spectrum plan, such as the example spectrum plan 841 illustrated in FIG. 7, which is described in further detail below. Once the channel manager 132 has identified a list of candidate channels and/or ranked some or all of the channels that may be available for use by the DSA-enabled device, a candidate channel list may be generated. Each of these steps may be performed within the scope of a specific DSA-enabled network context, or may be performed by the DSA-enabled device in a global context.

The candidate channel list generated by the channel manager 132 may be provided to a communication coordinator. The communication coordinator includes one or more modules that perform negotiation, monitoring, and frequency maintenance among DSA-enabled devices in a DSA network. These modules and the associated process(es) may be referred to as a rendezvous module and/or process. In some cases, the term "rendezvous" also may refer to initial discovery performed by a DSA-enabled device to initially join a specific DSA-enabled network, such as where two DSA-enabled devices are described as "attempting to rendezvous" or similar. The communication coordinator 124 may receive information regarding the availability of channels for use by the DSA network from the channel manager and from other sources, such as other DSA-enabled devices in the DSA network. Based on this information, one or more channels may be selected for use.

A DSA-enabled device also may include a policy module 140 to receive and store policy information that may be provided to other modules in the DSA-enabled device. Policies may specify, for example, channels that the DSA-enabled device should prioritize for use or non-use, channel use restrictions such as maximum transmitting power, geographic restrictions, and other restrictions or limitations on spectrum usage. Policy data may be used, for example, by the channel manager during creation of a candidate channel list, and/or by the communication coordinator as part of a channel management process between multiple DSA-enabled devices in a DSA network. The policy module also may include components or sub-modules for manipulating, enforcing, or otherwise managing policies. A policy may be associated with specific contexts, or may be generally provided for a DSA-enabled device.

A DSA-enabled device also may include one or more radios 150, which may include one on more hardware transceivers or other communication devices. A transceiver may include an API that allows the communication coordinator to change the frequencies on which the transceiver operates. The API may also include media access control (MAC) layer functions such as parameterization of frame rate, frame structure, transmitter power, and other similar capabilities. Typically, the communication coordinator manages communication functions of the transceiver(s). Other components of the DSA-enabled device may coordinate operation of the transceivers with the rest of the DSA-enabled device. For example, a data queue manager 152 and/or a transceiver manager 154 may manage data sent and received by the transceivers. As another example, a transceiver manager 154 may generate and coordinate an operating schedule of operation for the radio 150 and one or more detectors, and may do so in conjunction with or instead of the scheduler 122. In some embodiments, a single transceiver may be used for spectrum sensing as well as communicating with other DSA-enabled devices. In such an embodiment, different components may control the transceiver during times when it is used to sense spectrum and when it is used to communicate. In some embodiments, the transceiver manager provides a MAC interface to a transceiver. In other embodiments, the transceiver itself provides the MAC interface. For example, the DSA engine 120 may provide instructions to a MAC (not shown) to change the channel on which the transceiver operates. The DSA engine also may provide the MAC with a list of channels and times on which to perform spectrum sensing, and the MAC may then control the spectrum sensing operation of the transceiver.

The environmental sensing module 110 may perform two main functions: detection of non-cooperative, non-DSA signals, and detection of other DSA-enabled devices or DSA-enabled networks. By detecting non-cooperative, non-DSA signals, a DSA-enabled device may reduce or minimize the potential for interference with the associated non-DSA sources. Detection of other DSA-enabled devices may allow the DSA-enabled device to join one or more DSA-enabled networks, and/or to avoid other, non-cooperative DSA-enabled devices and thus reduce or minimize mutual interference. For example, the environmental sensing module may provide data used to determine the maximum transmitting power the DSA-enabled device can or should use to limit harmful interference to other users of the spectrum to a specific amount, or to minimize or eliminate such interference. The detector information also may be used by the spectrum manager and/or communication coordinator to identify and classify other DSA signals. A higher sensitivity of detection may allow for more accurate identification and classification of sensed signals, may enable the DSA-enabled device to transmit at higher power levels without causing interference, and may enable a DSA-enabled device to find other DSA-enabled devices at greater distances.

Variations on the specific configurations described herein may be used. For example, various control channels and device architectures may be used. In some embodiments, DSA-enabled devices may use a channel on which the devices are communicating to exchange control messages. In other embodiments, a separate and/or dedicated control or pilot channel may be used to transfer control data between DSA-enabled devices.

Referring to FIG. 1B, an example process and data flow according to embodiments of the invention is shown by numbered steps 1-12. The illustrated process may be used, for example, during a "cold start" of a DSA-enabled device, i.e., when a DSA-enabled device initially begins operation. At 1, a policy may be loaded from a policy module into a policy validation agent or other component of the spectrum manager. At 2, the policy may be read and validated, such as by a policy validation agent or other module, and policy data may be provided to the scheduler 122. In some embodiments, the policy data is validated using cryptographic means such as cryptographic hashes, digital signatures, and the like. The scheduler 122 may then identify one or more channels to be sensed to the environment sensing module 110 at 3, In some embodiments, the DSA-enabled device may be configured to sense within certain regions of spectrum or certain channels when first beginning operation, i.e., at a cold start. For example, a DSA-enabled device may be configured to search for other cooperative DSA-enabled devices in one or more pre-set channels. The scheduler may receive detection data at 4. The detection data provided at 4 which is then provided to the signal classifier 134 at 5. Alternatively, as previously described, detection data may be provided directly to the classifier 134. At 6, the classifier 134 may identify specific signals and types of signals present in the detection data. The classifier may then provide information about identified signals to a channel manager's update/ranking module 132 at step 7, and at 8 the channels may be ranked according to their preference for use by the DSA-enabled device. Preferred and potential channels may be added to a candidate channel list at 9, which is then used by a rendezvous module at 10 to initiate and coordinate communication among DSA-enabled devices. At 11, information about potential and/or preferred channels may be provided to the radio 150. The rendezvous module may then provide control data at 12 to the DSA-enabled device, such as information received from other DSA-enabled devices. The specific process shown in FIG. 1B is illustrative of the type used by embodiments of the invention, but it will be understood that other processes may be performed, and more or fewer modules may be used than those specifically shown or described. Other steps may be performed. For example, a DSA-enabled device may validate the integrity of the hardware and software that comprises the device. This may ensure that the DSA-enabled device (including hardware and/or software) has not been tampered with. General tamper-resistant methods of verifying hardware and software are well known to those skilled in the art. This verification may be performed, for example, prior to beginning the "cold start" process.

Figure 2:
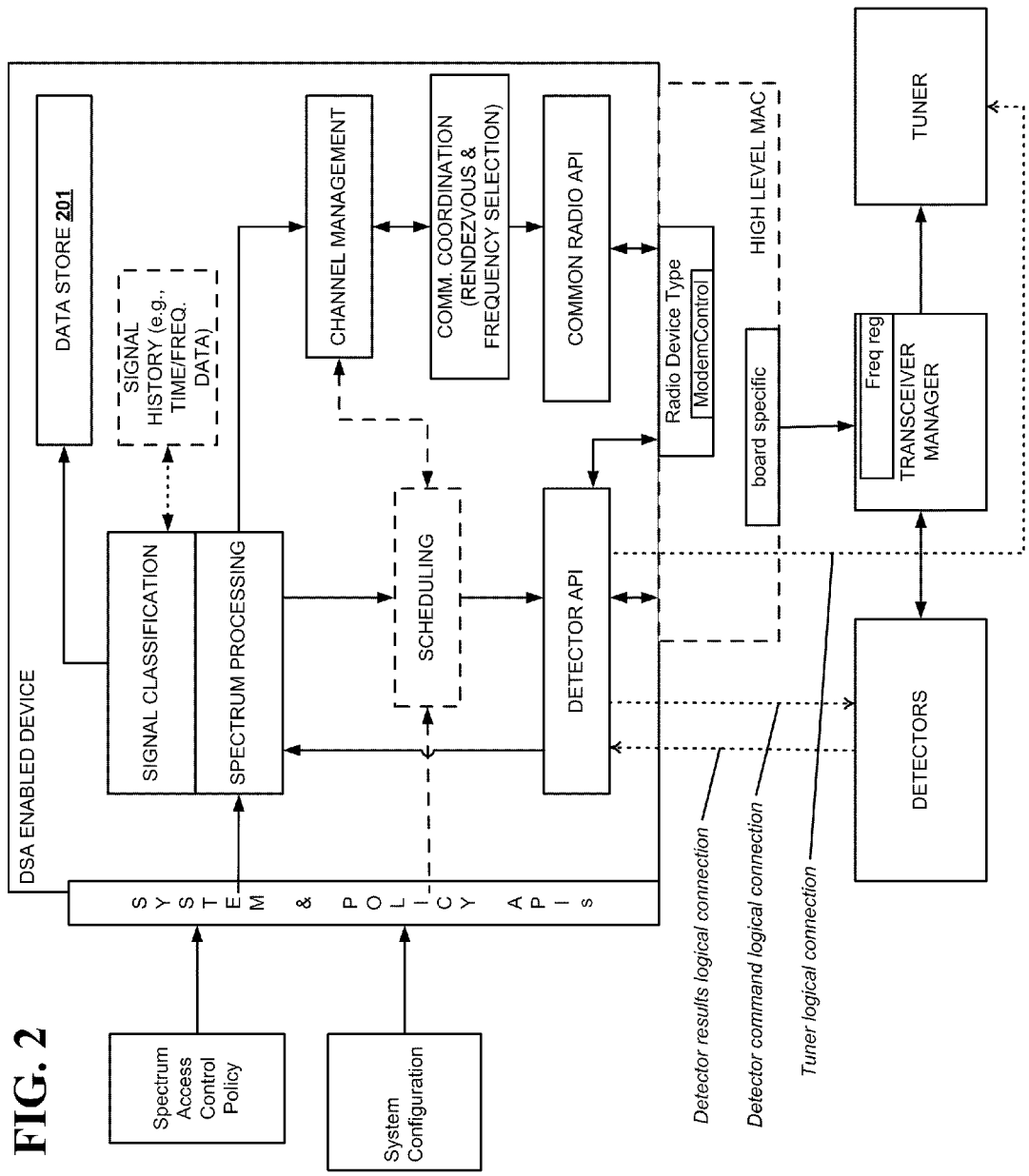
FIG. 2 shows an example logical framework for a DSA-enabled device according to an embodiment of the invention.

FIG. 2 shows an example software framework for a DSA-enabled device according to an embodiment of the invention. As can be seen by comparing FIGS. 1A and 1B to FIG. 2, many of the modules in the DSA-enabled device may correspond to or be implemented partially or entirely by various software components. For example, a spectrum manager may use channel classifier, spectrum processor, channel manager, and other software components as shown, which correspond to modules in the spectrum manager 130. As a specific example, a spectrum processor may format detector data into a format that allows for efficient use by the signal classifier. It also may perform additional pre-processing tasks, such as calculating a max hold array for data received from one or more detectors and/or signal classifiers.

As previously described, in some embodiments a DSA-enabled device may store detection data and classification results for later reuse or analysis, such as in a data store 201. Such stored data may be used to reduce subsequent processing errors. As a specific example, if a signal classifier incorrectly identifies a particular signal, the stored classification results may be referred to at a later point in time to prevent the classifier from making the same incorrect identification if the signal is detected again.

The example software components may be implemented using a general purpose processor, or they may use specialty processors. A single processor or other circuit may be used to implement multiple modules or functionality related to multiple modules, or multiple processors may be used. In a specific example embodiment, the DSA-enabled device, system and policy APIs, internal APIs, and media access control (MAC) are implemented using a general purpose processor, and the transceiver manager is implemented using a FPGA processor.

The system and policy APIs may provide programming interfaces outside the DSA-enabled device. For example, a web-based or other user interface may be used to access configuration, policy, or other files used by the DSA-enabled device via the API.

Internal APIs also may be used to allow for modification and/or re-use of common software tasks. For example, a detector API may be used to provide a consistent interface to multiple detectors or types of detectors.

The individual modules shown in FIGS. 1A-1B and the related software components of FIG. 2 are described in further detail below. It will be understood that although the functions of a DSA-enabled device and other aspects of the invention are described herein with reference to various modules, specific functionality may be implemented in different combinations of hardware and software than specifically described for each module without departing from the scope of the invention.

Figure 3:
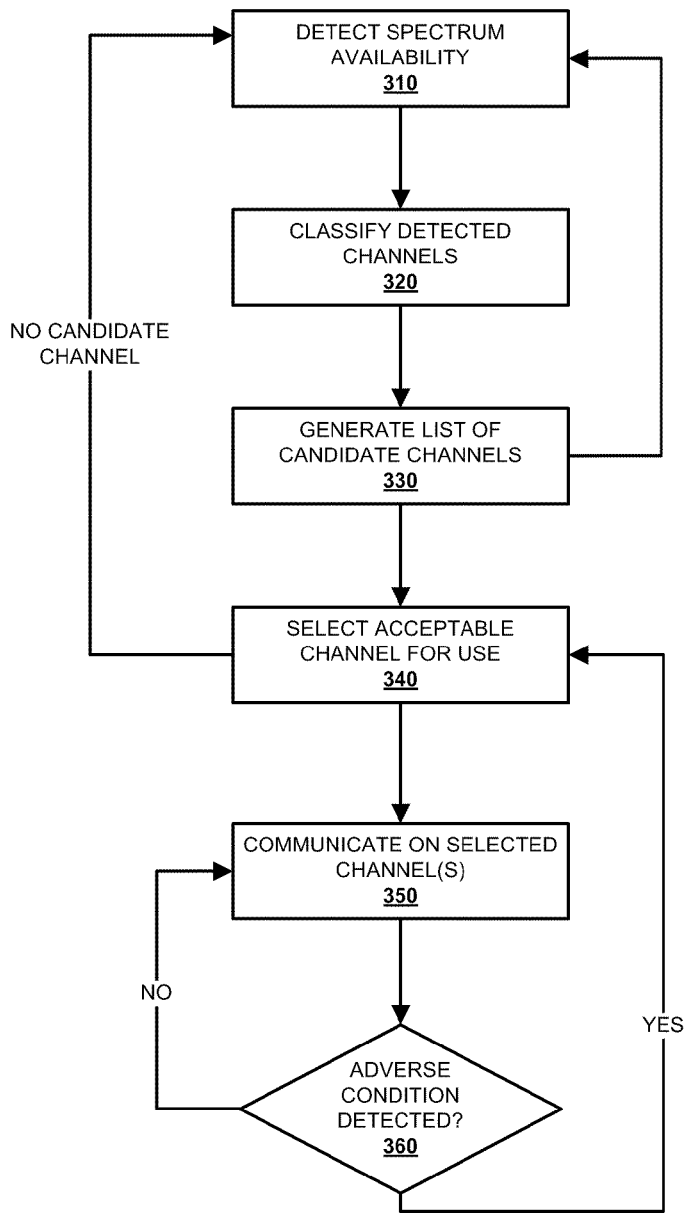
FIG. 3 shows an example process for communicating in a DSA system according to an embodiment of the invention.

FIG. 3 shows an example of a basic process performed by one or more DSA-enabled devices operating in a network according to an embodiment of the invention. At 310, one or more of the DSA-enabled devices may perform environmental sensing to detect spectrum use and/or availability. At 320, detected spectrum information may be used to classify channels based on whether or not various signals were detected in the channels. At 330, one or more DSA-enabled devices may generate a list of candidate channels suitable for use in communicating with other DSA-enabled devices. Steps 310-330 may be repeated at various times while the remainder of the illustrated process is performed, and while the DSA-enabled devices communicate within the network. At 340, one or more DSA-enabled devices may then select an acceptable channel for use from the candidate channel list and proceed to communicate on one or more selected channels at 350 or, if no further candidate channels are available, the device may return to 310 to attempt to identify an available channel. The channel selected at 350 may be selected using various techniques. For example, a coordinating DSA-enabled device may select one or more acceptable channel(s) based on channel information received from one or more cooperating DSA-enabled devices, such as channel utilization channel preferences, non-cooperative channel use, and other environmental data. The coordinating DSA-enabled device may then provide an indication of the selected channel(s) to cooperative DSA-enabled devices Additional examples of techniques for selecting a channel are described with respect to FIGS. 21-22 herein. So long as no adverse condition is detected, the DSA-enabled device may continue communicating on the selected channels. When an adverse condition is detected at 360, the DSA-enabled device may examine a current candidate channel list and select one or more new channel(s) for use. The adverse condition may be detected by the DSA-enabled device or by another DSA-enabled device with which the first DSA-enabled device is in communication. A new channel also may be selected for reasons other than an adverse condition. As described in further detail herein, the steps illustrated in FIG. 3 may be performed by one or more DSA-enabled devices in a DSA-enabled network, or may be performed by a combination of devices, such as where a coordinating device makes determinations regarding channel use based on data received from other devices in the network.

DSA-enabled devices and DSA-enabled networks according to the invention may utilize and be used in various network topologies that use various configurations and arrangements of DSA-enabled devices. In one configuration, a coordinating DSA-enabled device may coordinate and direct communication between DSA-enabled devices in a DSA-enabled network or a portion of a DSA-enabled network. In general, a coordinating DSA-enabled device may be any suitable DSA-enabled device that provides centralized control and/or coordination within the DSA-enabled network, including a base station, cell site, master device, access point, beacon device, coordinating node, or other suitable device. A coordinating DSA-enabled device may have a particular role or roles within a DSA-enabled network, in which a subset of all control or coordination for the network is performed. For example, the coordinating device may forward messages between devices, networks, and/or clusters; route messages among devices, networks, and/or clusters; provide policies to other devices; perform some or all of the channel management functions for one or more DSA-enabled networks; provide instructions or information to other devices regarding channel switching; manage one or more detectors; provide gap and other timing and scheduling information to other devices; provide software updates to other devices; analyze or record network topologies for DSA-enabled networks in a geographic region; and any combination thereof and of other management functions. The various roles and functionality may be distributed among multiple devices in a DSA-enabled network, i.e., each function associated with a coordinating DSA-enabled device need not be performed by a single device in the network. It will be understood by one of skill in the art that any appropriate coordinating DSA-enabled device may be used, although the present description may describe example embodiments using a particular term or example coordinating device, such as where an example network is described in terms of a base station and/or subscriber DSA-enabled devices or units. A configuration having a base station or other coordinating DSA-enabled device may be referred to as an infrastructure network. The non-coordinating DSA-enabled devices may communicate directly only with the base station, in which case the base station may relay communication between the other DSA-enabled devices. A non-coordinating DSA-enabled device also may be referred to as a subscriber DSA-enabled device, subscriber unit (SU), handset, portable unit, customer premises equipment (CPE), mobile station, slave device, user DSA-enabled device, end-user DSA-enabled device, peer, cellular telephone, consumer device, cognitive radio, software defined radio, or scanner device. In another configuration, the base station may manage or direct communication within a DSA-enabled network and subscriber units may communicate directly with other subscriber units and with the base station.

In another configuration, the DSA network may not use a base station or other specially-designated DSA-enabled device to manage communications among DSA-enabled devices in a DSA-enabled network. Such a network may be referred to as an ad-hoc network. In an ad-hoc network, a subscriber unit may be designated or elected as a temporary "lead DSA-enabled device," which may perform some or all of the functions typically performed by a base station in an infrastructure network. The lead DSA-enabled device may be designated or elected temporarily, and the specific DSA-enabled device performing one or more functions of a "lead DSA-enabled device" may change over time, such as where a new lead DSA-enabled device is chosen or designated each time a control function is to be performed, or when a "lead DSA-enabled device" moves or otherwise becomes unreachable. In another configuration, no lead DSA-enabled device is designated, and communication among the DSA-enabled devices in the network is managed by way of control messages between the network DSA-enabled devices.

Figure 4A:
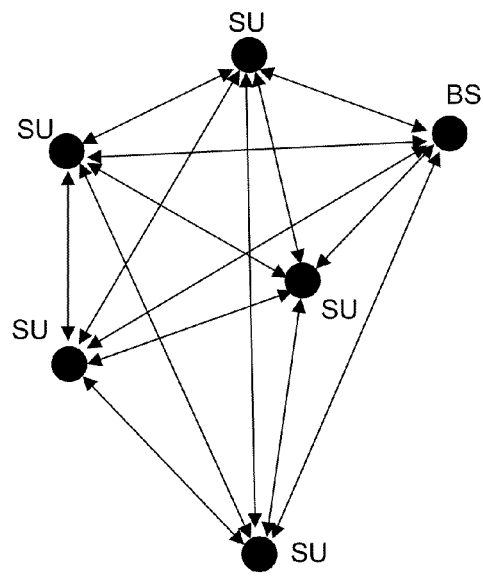
FIG. 4A is a schematic of an example DSA network topology according to an embodiment of the invention.
Figure 4B:
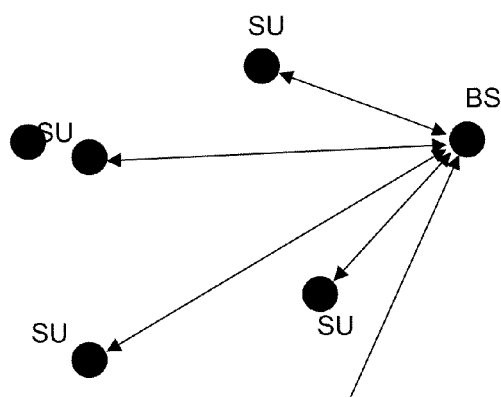
FIG. 4B is a schematic of an example DSA network topology according to an embodiment of the invention.
Figure 4C:
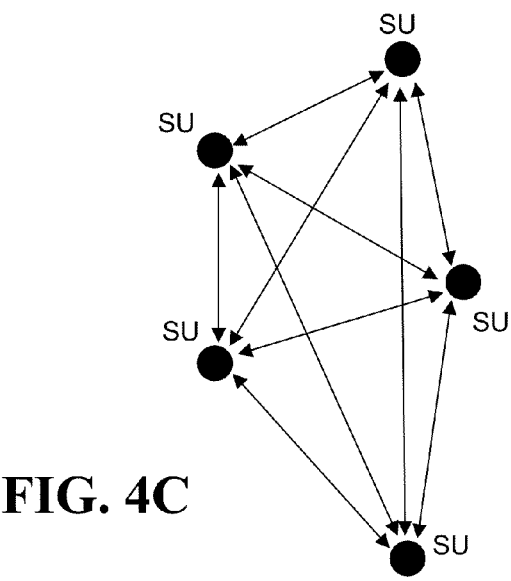
FIG. 4C is a schematic of an example DSA network topology according to an embodiment of the invention.

FIGS. 4A-C show schematic representations of three example network types according to embodiments of the invention. In FIGS. 4A and 4B, one or more subscriber units (SUs) communicate with a base station (BS). In some embodiments, such as the narrowband push-to-talk-implementation described herein and other DSA network configurations, the BS and related functions may be referred to as a "beacon" or "master" and the SU may be referred to as a "scanner" or "user". The base station may manage or direct communication between and among the subscriber units. In FIG. 4A, the base station may manage communication in the DSA-enabled network while allowing subscriber units to communicate directly with other subscriber units. In FIG. 4B, the base station may manage every communication channel, so that a communication from one subscriber unit to another will pass through or be forwarded by the base station. The topologies illustrated in FIGS. 4A-B may be referred to as infrastructure topologies due to the use of a base station or other specialized DSA-enabled device that manages communication within a DSA-enabled network.

FIG. 4C shows a peer-to-peer network containing only subscriber units (SUs). Such a network may be referred to as an ad-hoc network; in an ad-hoc or similar network the subscriber units may be referred to as "peers" due to the lack of a base station or other permanently-designated controlling DSA-enabled device. In an ad-hoc DSA-enabled network, one or more of the DSA-enabled devices may temporarily perform some or all of the functions that would be performed by a base station in an infrastructure-type DSA-enabled network. The same DSA-enabled device may perform base station functions each time a management function is required, or a new DSA-enabled device may be selected or elected each time a base station function is required. In another example embodiment, a DSA-enabled device may assume one or more functions of a base station, and provide these functions to a DSA-enabled network for a period of time, and may subsequently relinquish these functions at some future time.

In some embodiments, a base station may have the same or similar configuration as a subscriber unit. Such a DSA-enabled device may be configured to perform as either a base station or a subscriber unit, or it may be configured to perform as a base station on a first DSA-enabled network and as a subscriber unit on a second DSA-enabled network. In some embodiments, a subscriber unit may temporarily or permanently assume the functions of a base station.

One potential limitation of some DSA-enabled and other radio systems is that they may be unable to maintain connections with more than one DSA-enabled network at a time. As DSA-enabled networks become more common, this limitation may undesirably limit the usefulness of a DSA-enabled device. In some embodiments of the invention, a DSA-enabled device may be capable of operating in multiple DSA-enabled networks concurrently.

Figure 4D:
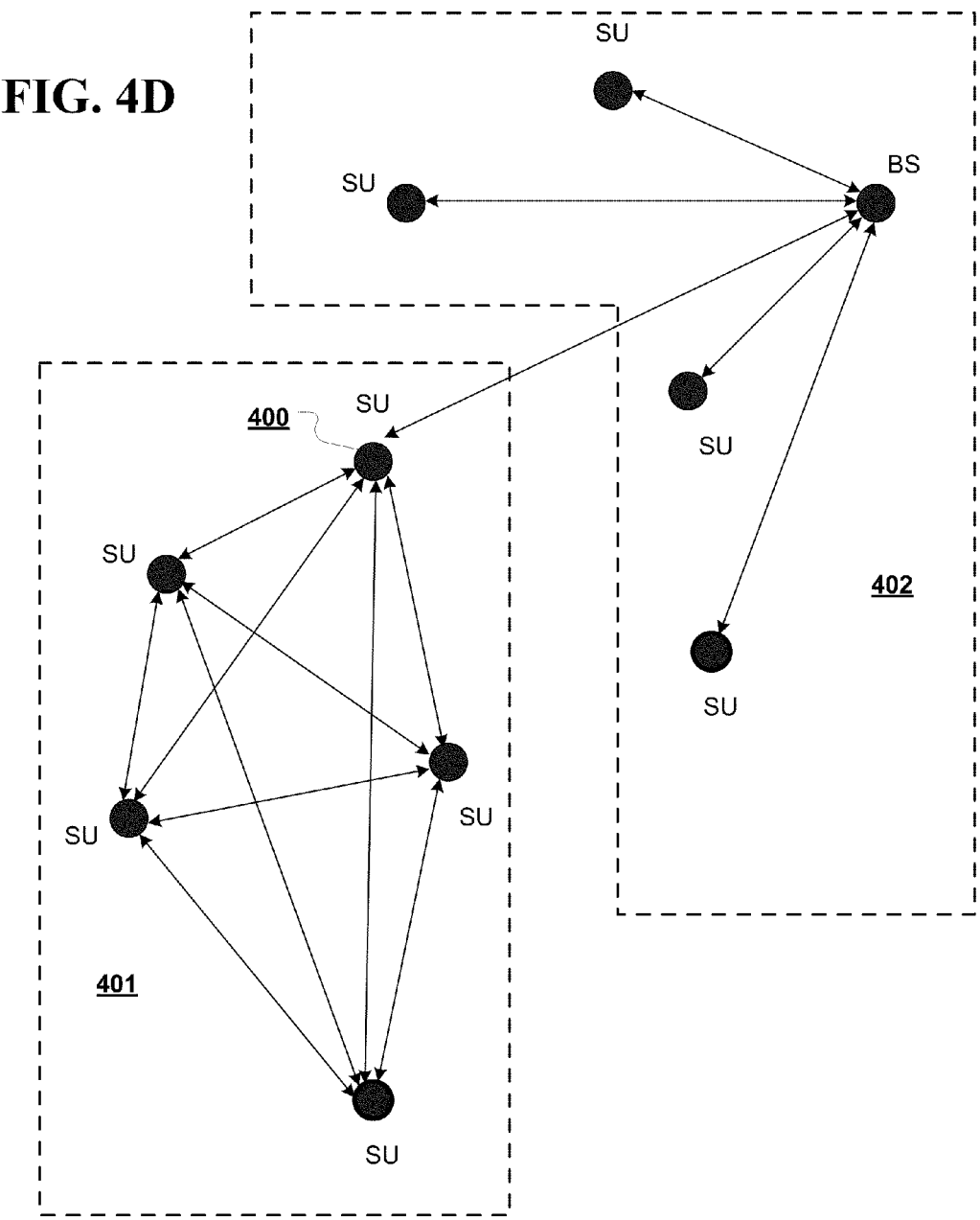
FIG. 4D shows an example of a DSA-enabled device operating concurrently in two DSA-enabled networks according to an embodiment of the invention.

FIG. 4D shows an example of a DSA-enabled device operating concurrently in two DSA-enabled networks according to an embodiment of the invention. In the example shown, a DSA-enabled device 400 has initiated communication with ("rendezvoused with") two DSA-enabled networks 401, 402, and may send and receive information as part of each network. Specifically, DSA-enabled device 400 can operate as a DSA-enabled device on DSA-enabled network 401 (including participation as a base station, controlling DSA-enabled device, or other role), and can sense on behalf of DSA-enabled network 401, change channels, and perform other aspects of being joined to DSA-enabled network 401. Concurrently, the DSA-enabled device 400 can operate as a DSA-enabled device on DSA-enabled network 402 (including operating as a subscriber device (as shown in diagram), as a base station, as a controlling DSA-enabled device, or in any other permitted role), and can sense on behalf of the DSA-enabled network 402, change channels, and perform other aspects of being joined to DSA-enabled network 402. In some cases, the DSA-enabled device 400 may perform different roles in each DSA-enabled network to which it is joined. This capability may be advantageous in several operating modes. For example, a DSA-enabled device user may be permitted to use a plurality of DSA-enabled networks, such as when there are multiple DSA-enabled networks established for a geographic region. A user who is permitted to receive information from both a first DSA-enabled network, and a second DSA-enabled network concurrently can receive information from the first DSA-enabled network while using the second DSA-enabled network, on the same DSA-enabled device. As a specific example, the first DSA-enabled network may be a digital content broadcast network (a DSA-enabled network that provides content, such as a 802.22-based network that supports digital TV broadcasts), and the second network may be a DSA-enabled digital content broadcast network, a DSA-enabled communications network, a DSA-enabled public safety network, or another type of DSA-enabled network.

As another example, the ability to concurrently operate in a plurality of DSA-enabled networks may be used when a DSA-enabled device is mobile and is travelling among DSA-enabled networks, and it may join a first DSA-enabled network and subsequently join one or more additional DSA-enabled networks as they become available. Transmission traffic may be routed to the DSA-enabled network that provides connectivity to the originating DSA-enabled device, the nearest DSA-enabled device, the DSA-enabled device with the strongest signal, the DSA-enabled device with the best connectivity, or combinations thereof.

Figure 4E:
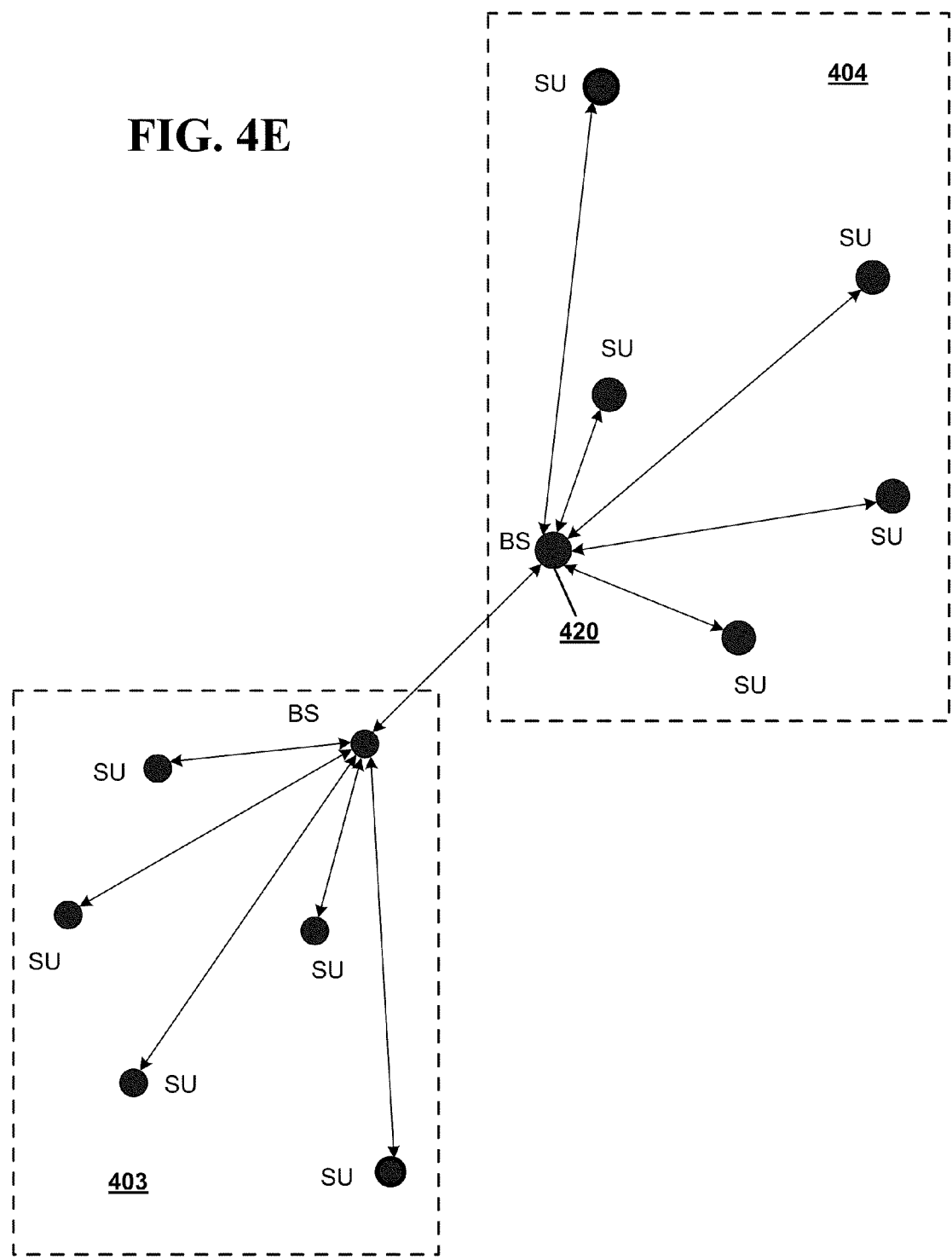
FIG. 4E shows an example of a DSA-enabled device operating concurrently in two DSA-enabled networks according to an embodiment of the invention.

FIG. 4E shows an example of a DSA-enabled device operating concurrently in two DSA-enabled networks according to an embodiment of the invention. In this configuration, a DSA-enabled device 420 has rendezvoused with two DSA-enabled networks 403, 404, and may send and receive information as part of each network. Specifically, the DSA-enabled device 420 can operate as a DSA-enabled device on DSA-enabled network 403 and can sense on behalf of DSA-enabled network 403, change channels, and perform other aspects of being joined to DSA-enabled network 403. Similarly, DSA-enabled device 420 may operate as a DSA-enabled device on another DSA-enabled network 404 as a controlling DSA-enabled device for the network 404, and can sense on behalf of DSA-enabled network 404, change channels, and perform other aspects of being joined to the second DSA-enabled network 404. The DSA-enabled device 420 may route network packets between the DSA-enabled networks 403 and 404 in accordance with policies established for either or both DSA-enabled networks 403 and 404. For example, a single network operator may establish a plurality of networks, and allow users to "roam," i.e., move between the networks using mobile DSA-enabled devices. Such a configuration may be used, for example, when it is desirable not to incur delays associated with re-establishing connections to alternate networks as the DSA-enabled device moves in and out of range of base stations on the networks. For example, when a voice conversation is transmitted between the DSA-enabled device 420 and a recipient operating in either of the DSA-enabled networks, or in an external network (not shown), the latency caused by re-connecting to a new network each time a mobile DSA-enabled device moves between a plurality of DSA-enabled networks may cause unacceptable delays to the voice traffic. A DSA-enabled device may reduce or eliminate this limitation by supporting multiple networks as described. As illustrated in FIG. 4E, the DSA-enabled networks 403, 404 may each be an infrastructure network. However, it will be understood by one of skill in the art that this is provided merely as an example, and any other network structures and topologies may be used. Further, the DSA-enabled device may perform any role or function within each of the networks 403, 404, such as base station, subscriber unit, or other role.

Figure 4F:
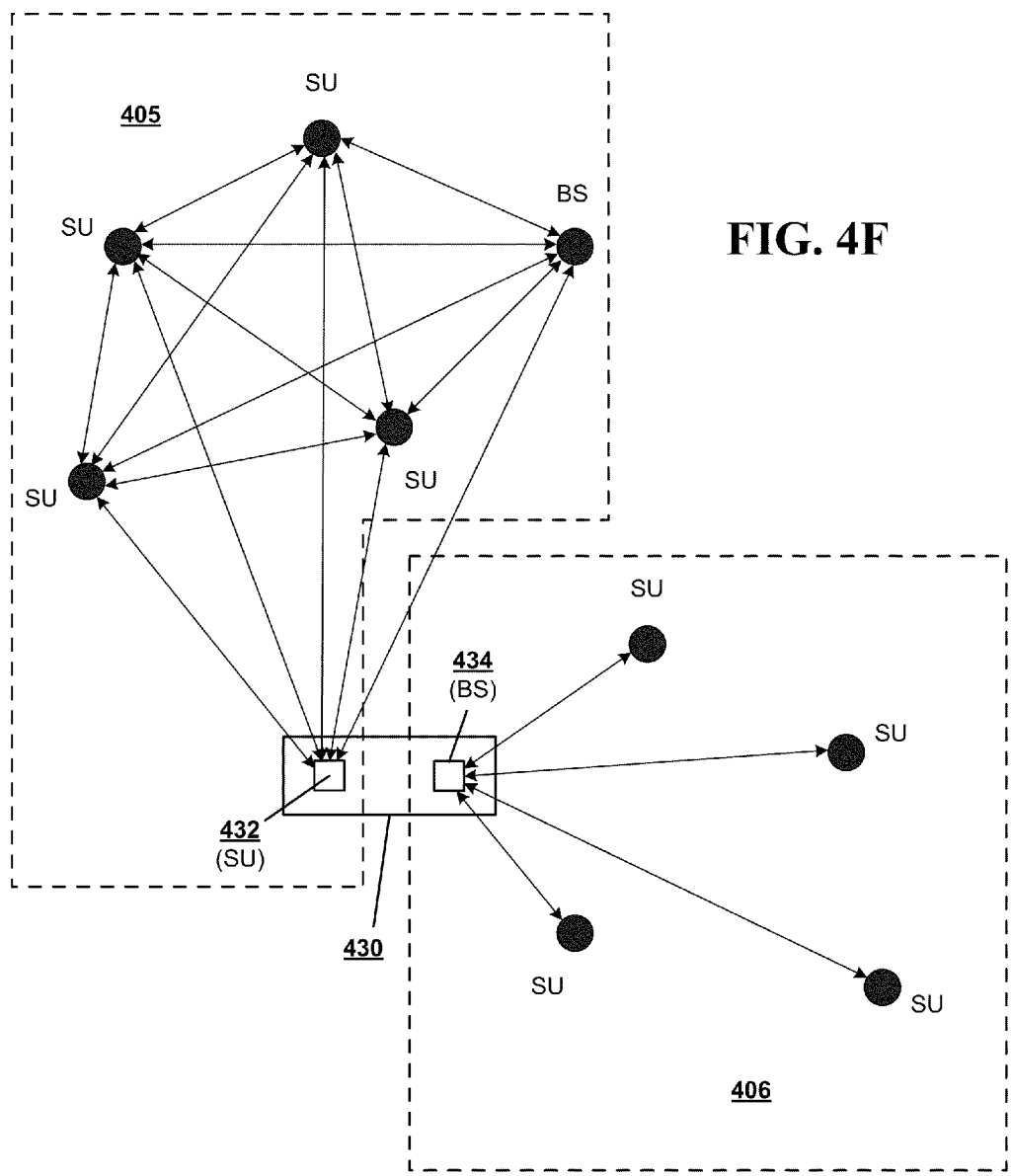
FIG. 4F shows an example of a DSA-enabled device operating concurrently in two DSA-enabled networks according to an embodiment of the invention.

FIG. 4F shows an example of a DSA-enabled device operating concurrently in two DSA-enabled networks according to an embodiment of the invention. A DSA-enabled device 430 may operate concurrently in two DSA-enabled networks 405, 406 using a plurality of transceivers 432, 434. In this configuration, the DSA-enabled device 430 has rendezvoused with both DSA-enabled networks 405, 406 and may send and receive information as part of each network. Specifically, DSA-enabled device 430 may operate as a DSA-enabled device on DSA-enabled network 405 and can sense on behalf of DSA-enabled network 405, change channels, and perform other aspects of being joined to the DSA-enabled network 405. Similarly, the DSA-enabled device 430 may operate as a DSA-enabled device on DSA-enabled network 406 as a controlling DSA-enabled device and can sense on behalf of DSA-enabled network 406, change channels, and perform other aspects of being joined to DSA-enabled network 406. The DSA-enabled device 430 may operate in any role (e.g. base station, subscriber unit) within each of the networks, and may have differing roles in different networks 405, 406. As a specific example, FIG. 4F shows a configuration in which the DSA-enabled device 430 uses a first transceiver 432 to operate as a subscriber node in a first DSA-enabled network 405, and a second transceiver 434 to operate as a base station in a second DSA-enabled network 406. In addition, the DSA-enabled device 430 may route network packets between DSA-enabled networks 405 and 406 in accordance with policies established for either or both DSA-enabled networks 405 and/or 406. For example, a plurality of network operators may establish a plurality of networks, and a particular DSA-enabled device may operate on both networks and pass traffic between the networks. A multi-transceiver configuration as illustrated in FIG. 4F also may be used when multiple DSA-enabled networks 405 and/or 406 have high utilization, are not synchronized (e.g. they have different framing and/or gap rates), or use substantially different channels. A multi-transceiver DSA-enabled device may partially or entirely mitigate undesirable effects arising from such situations and configurations.

Each of the example networks illustrated in FIGS. 4A-4F may be a portion of a larger network. For example, each illustrated network may be a cell or cluster in a cellular network or other similar network topology.

Unless stated otherwise, the methods, devices, and systems described herein may operate in any network topology. In general, a DSA-enabled device as described herein may be a base station, a subscriber unit, or an ad-hoc DSA-enabled device that may function as a base station and/or a subscriber unit. For example, although some functionality is described as performed by a base station, it will be understood that similar operations and processes may be performed by, for example, a lead DSA-enabled device or temporary lead DSA-enabled device in an ad-hoc system, or may be distributed among subscriber units in an ad-hoc system.

DSA systems according to embodiments of the present invention may perform communication and spectrum scanning and analysis functions as described herein without noticeable or appreciable interruption to the communications between cooperative DSA-enabled devices. To do so, various scheduling and resource management techniques may be used. For example, spectrum sensing/detection may be performed at a rate sufficient to detect a non-cooperative signal and prevent or reduce interference with the non-cooperative system, but at a low enough rate to avoid noticeable interruption of communication with other cooperative DSA-enabled devices. For example, within a given time frame, communication times and spectrum sensing times may be interleaved in time slots sufficiently small to prevent communication from being noticeably interrupted, but large enough for spectrum sensing to be effective at finding other signals. In an embodiment, about 10% of resources may be allocated to sensing functions. For example, about 10% of any given time frame may be used to perform spectrum sensing. As described in further detail below, this time may be scheduled to perform different amount or degree of spectrum sensing for different channels, such as where high-priority channels receive a greater share of the sensing time. As another example, each frame may include a sensing period that represents a relatively small portion of the frame, such as where a sensing period of about 0.5 ms is scheduled within a 20 ms frame. In some embodiments, concurrent sensing and communication methods may allow for specific hardware configurations, or make certain hardware configurations more efficient. For example, in an embodiment a DSA-enabled device may communicate and monitor spectrum usage concurrently using a single antenna, though in general multiple antennas also may be used. In some embodiments, the concurrent sensing and communication techniques described herein may allow a single-antenna device to operate more efficiently than would be possible using a simplistic scheduling technique.

In some embodiments, spectrum monitoring may be performed on channels that are in use by the DSA-enabled device, channels that may be available for use but not currently used, channels that are not available for use, or various combinations thereof. Monitoring channels other than those in use may allow a DSA-enabled device or network to more rapidly switch channels than would otherwise be possible, as well as reducing or eliminating the need to perform additional scanning once a channel switch takes place. Multiple detectors may be used and, in some embodiments, different detectors are applied to specific frequency bands so as to improve sensitivity or performance of the DSA-enabled device or network. In some embodiments, a DSA-enabled device may perform detection and communication using a single antenna. Embodiments of the present invention may allow a DSA-enabled device to communicate and to perform sensing in the same region of spectrum and, more specifically, on the spectrum specified as part of a channel or set of channels. Thus, it will be understood by one of skill in the art that when a DSA-enabled device or network is described herein as communicating on a channel, the DSA-enabled device or network also may perform environmental sensing of the same channel using the techniques described herein.

Sensing regions of spectrum that include channels other than those channels currently in use by a DSA-enabled device or network may reduce the delay involved in moving to another channel once a non-cooperative signal is detected in a channel being used by a DSA-enabled network by reducing or avoiding additional delay involved in scanning other channels. Also, with some applications a non-occupancy time period (i.e., the time the system must wait before using a channel after a primary signal has been detected in it) may be relatively high, for example up to 30 minutes. By sensing on numerous channels, the DSA-enabled device may know of several candidate backup channels should the channel need to be changed and one of the backup channels is found to be unavailable for the non-occupancy time period. It also may be more convenient and/or straightforward to sense on all channels within a particular region of spectrum rather than to decide on a subset of channels to scan prior to sensing.

Figure 5:
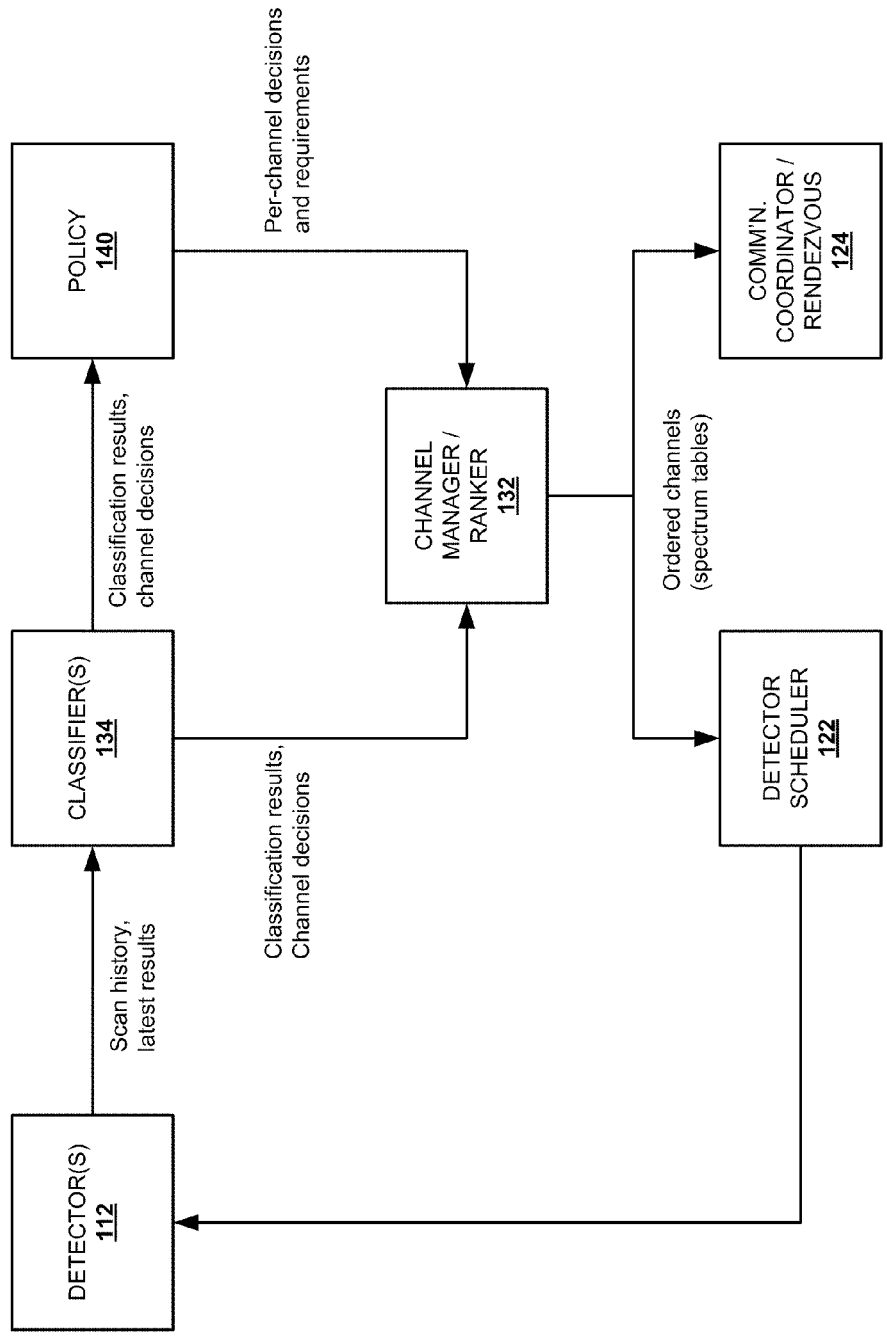
FIG. 5 shows an example system flow diagram for a DSA-enabled device performing a concurrent scanning and communication process according to an embodiment of the invention.
Figure 6:
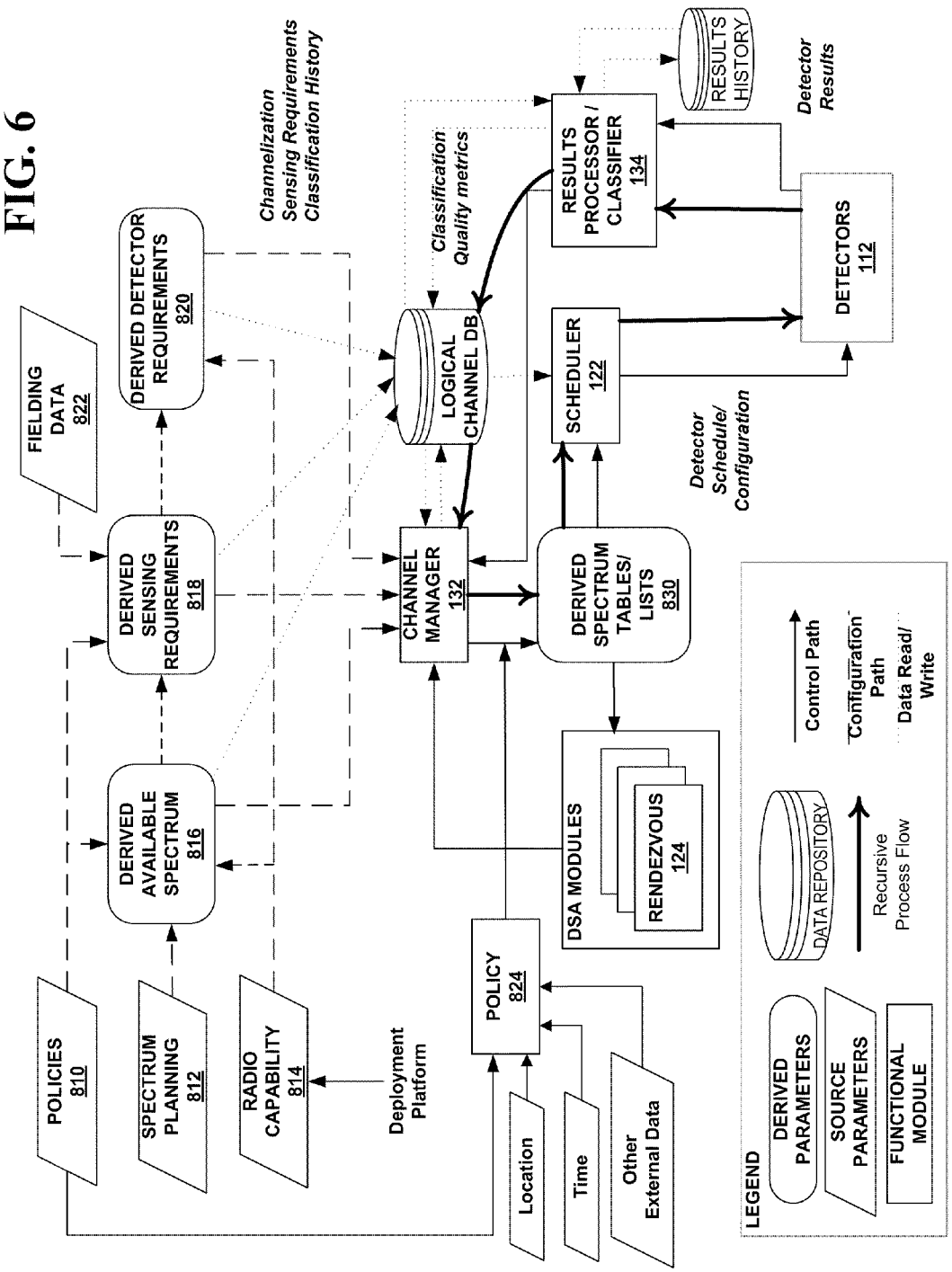
FIG. 6 shows an example system flow diagram for a DSA-enabled device performing a concurrent scanning and communication process according to an embodiment of the invention.

FIGS. 5 and 6 show example system flow diagrams for a DSA-enabled device performing a concurrent scanning and communication process according to embodiments of the invention. One or more detectors 112 may be configured to detect cooperative and/or non-cooperative signals in one or more channels. Multiple detectors may be used, even where a single channel or a group of channels is being detected. For example, wireless microphones operate in the TV region of the radio spectrum; thus, when detecting in the TV bands both wireless microphone and TV detectors may be used. Other detectors and combinations of detectors as described herein may be used. Further details regarding the use of detectors in a DSA system and specific examples of suitable detectors are provided in further detail below.

Figure 7:
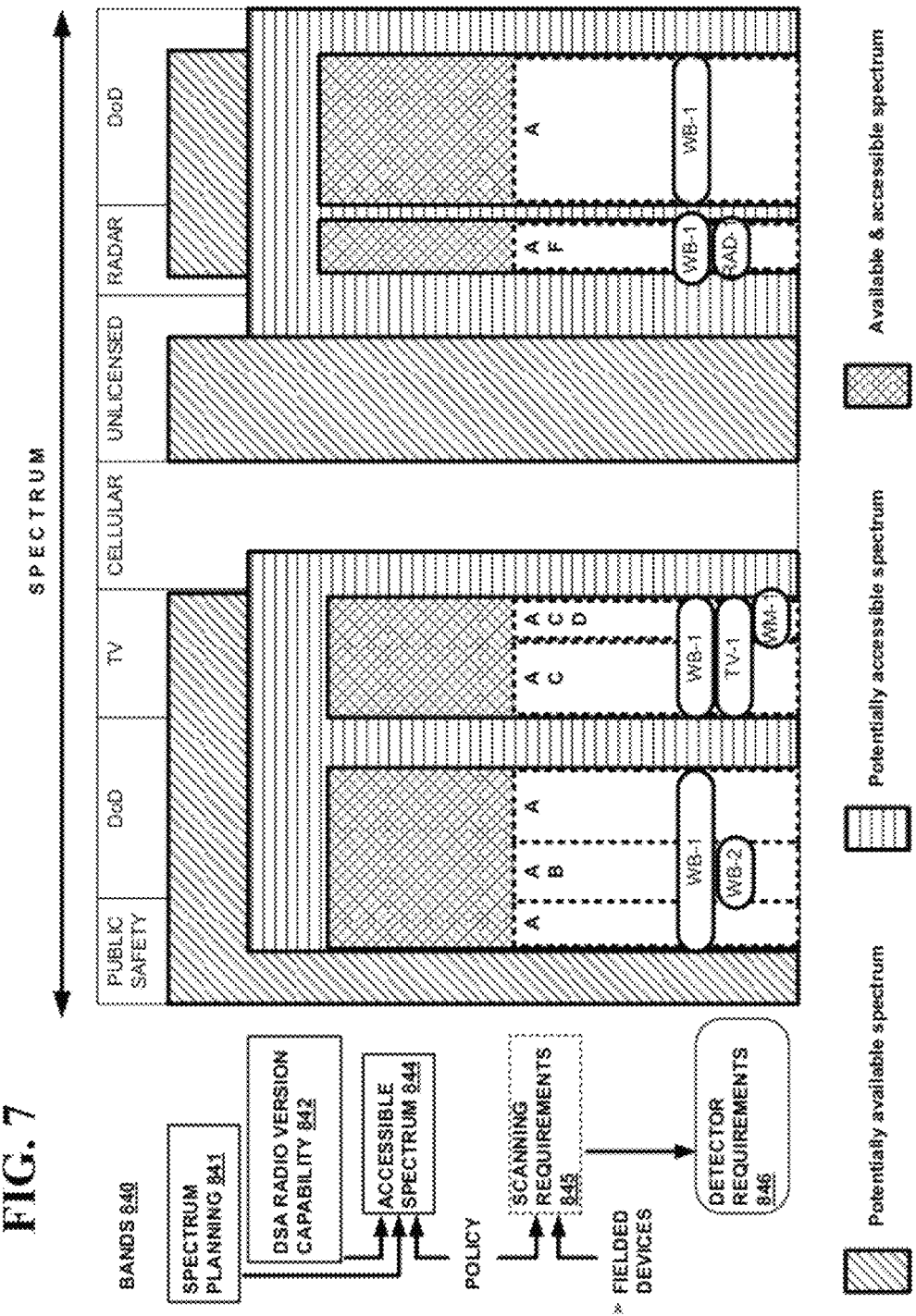
FIG. 7 is an illustration of various regions of spectrum utilized by a DSA system according to an embodiment of the invention.

The portions of spectrum available for use and actually used by a DSA-enabled device or network may be defined by a combination of the spectrum selected by an operator of the device or network, the spectrum in which the DSA-enabled devices are capable of operating, and access limitations set by policy, regulatory, service provider, and other requirements. FIG. 7 is a specific example showing how various regions of spectrum may be utilized by a DSA-enabled network in an embodiment of the invention. At the top, various spectrum regions and definitions are identified. One or more spectrum bands 840, such as bands licensed for specific use by a regulatory agency, may define regions of the spectrum. A spectrum plan 841 may be pre-defined for a DSA-enabled device or a DSA-enabled network, which restricts the DSA-enabled device and/or the DSA-enabled network to using certain regions of the spectrum. A spectrum plan or frequency plan may define one or more channels for a particular DSA-enabled network. The spectrum plan may operate as a constraint on DSA operation, similar to a set of policy rules, which define the set of channels to be used by the DSA-enabled network. The example shown in FIG. 8 shows a spectrum plan that omits the cellular band and portions of unlicensed, radar, and government (DoD) bands from consideration for use by the DSA system. A DSA-enabled device also may have a particular capability range 842 that determines what portions of spectrum the DSA-enabled device is physically able to use. For example, certain spectrum ranges may be omitted from design of a DSA-enabled device due to power or processing considerations, regulatory requirements, physical antenna limitations, or other reasons. Thus, the total accessible spectrum 844 may be defined by the spectrum plan 841, the DSA-enabled device or system capability 842, and policy requirements. Scanning and detector requirements 845, 846, respectively, may describe the detectors used by the DSA-enabled device and various metrics applied across the accessible spectrum 844. The requirements 845, 846 may be provided as input to a scheduler or other component of a DSA-enabled device.

In an embodiment, the detectors 112 may operate primarily or only on accessible regions of the spectrum. A DSA-enabled device may sense its RF environment based on the regulatory bands 840 in which sensing occurs, the devices expected to be operating in each band, and the capabilities and configuration of the DSA-enabled device. Examples of band-specific sensing requirements and detector requirements are shown in FIG. 9. However, it will be understood that other requirements and configurations may be used. The regions of spectrum corresponding to each set of requirements are labeled with corresponding letters (A, B, C, D, F) in FIGS. 7-10.

Various techniques may be used to distribute the spectrum scanning load (i.e., to distribute the scheduled sensing times among various channels). In an embodiment, a bounded, greedy algorithm, in which a locally-optimal choice, i.e., a choice made at each step of the allocation process that is optimal or believed optimal at that step, is used to reduce or minimize the demand on device resources and increase communications. This may satisfy band-specific sensing requirements at a minimum "cost" in terms of communication resource utilization and device processing load. As described in further detail herein, a detector scheduler (i.e., a "high-level scheduler") may arrange sensing schedules by sensing a particular portion of spectrum using specific detectors. For example, the scheduler may attempt to optimize the schedule based on the sensing requirements, such as the scan rate specified for that portion of the spectrum, and/or using only specific detectors configured for that portion of spectrum, or detectors that are particularly suited for the given region. Notably, the scheduler and detectors may use a different channelization than the transceiver such as the radio 150 described with respect to FIGS. 1A and B, that is used by the DSA-enabled device. For example, for ease of use a radio in a DSA-enabled device may communicate at previously-defined channels in terms of regulatory bands. However, the DSA-enabled device may detect and evaluate spectrum using a channelization designed to improve efficiency and/or increase the chance of detecting a non-cooperative transmission. The channelization suitable for detection and evaluation may not match the channelization used to communicate with other DSA-enabled devices. For example, in some embodiments one or more detectors may use channelizations that differ from those used by other parts of a DSA-enabled device or system, such as the logical channel table and use tables described in further detail below.

Band-specific sensing requirements may be used to prevent or reduce the chance of interference with non-cooperative, non-DSA signals or devices, and/or non-cooperative DSA signals or devices, and to enable discovery of and connection with cooperative DSA-enabled devices. For example, different bands may have different technical or regulatory requirements, and there may be little or no benefit to using more stringent or burdensome sensing requirements.

Band-specific detector requirements may be derived from the sensing requirements and the detection capabilities of the DSA-enabled device. Detector requirements may be translated into detector configurations which specify detector type and type-specific parameters. For example, FIGS. 7-9 refer to four detector types (wideband, TV, wireless microphone and radar) and five detector configurations (including two different wideband types). Detector configurations may be derived from the detector requirements to efficiently distribute communication resource utilization and processing load. The accessible spectrum, sensing and detector requirements may be determined prior to initiation of a DSA-enabled device or system, or during operation of the DSA system. Examples of specific detectors and detector configurations are described in further detail below.

Referring again to FIGS. 5-6, the detectors 112 may provide raw data including the latest results of sensing in one or more channels and scan history data to one or more classifiers 134. In some embodiments, each detector is associated with a classifier using a classification algorithm tailored to or otherwise particularly suited to its associated detector type. The latest scan results and a scan history may be provided to the classifiers.

After the classifiers 134 process the raw data, classification results and channel decisions may be provided to a policy module 140, channel manager 132, or other modules in the DSA-enabled device as described herein. Information from the classifiers and the policy module may be used by a channel manager 132 to generate channel rankings that specify preferred channels for use or scanning by the DSA system. In an embodiment, the channel manager 132 maintains spectrum data in a Logical Channel Table (LCT). The LCT may include only information regarding spectrum that is potentially-accessible to the DSA system, including sensing and detector requirements. Such a configuration may prevent or reduce use of detection resources on inaccessible or undesirable regions of the spectrum. An LCT may represent spectrum in Logical Channel Units (LCUs), which quantize available spectrum into logical channels. A smaller LCU (i.e., encompassing less spectrum) may allow for greater potential spectrum utilization, but also may require additional detection and processing resources relative to a larger LCU.

The various outputs described with respect to FIG. 5 may be stored in one or more computer readable storage mechanisms, such as data tables stored in the memory of a general purpose processor. In some embodiments, historical data also may be retained. For example, detection results may be stored in a data store for various amounts of time depending on the specific channels associated with the results. The classifier 134 also may use historical detection data to classify signals detected by the detectors. Examples of using historical data, such as with Group Behavior techniques, are described herein and in U.S. patent application Ser. No. 11/432,536, filed May 12, 2006 and published as U.S. Pub. No. 2007/0263566 on Nov. 15, 2007, the disclosure of which is incorporated by reference in its entirety.

The channel manager may use various techniques to store and manage data in the LCT. In an embodiment, LCUs may be defined based on detector characteristics, detector availability, and spectrum requirements. The channel manager may then assign each LCU to a use category, such as by placing the LCU in a virtual use table. The use tables are then used by the DSA system to discriminate between channels based on channel priority and preference. In an embodiment, the use tables may categorize LCUs as active, backup, candidate, and possible. Active channels are those that are currently in use for communication by a DSA-enabled device. Backup channels represent spectrum that can be used if it becomes necessary for the DSA-enabled device to stop use of one or more active channels and move to a different region of the spectrum. If the amount of spectrum accessible to the DSA-enabled device is relatively large, the DSA-enabled device may assess a subset of the spectrum for potential inclusion as backup channels. Candidate channels are those where cooperative DSA signals have been detected. These channels may be used by a communication coordinator (rendezvous) module to establish and maintain communication with other cooperative DSA-enabled devices. Possible channels refer to spectrum that is accessible by the DSA-enabled device. As previously indicated, a subset of the accessible spectrum may be designated as "possible" when the accessible spectrum is relatively large. Further details regarding operation of a scheduler and specific examples of scheduling processes are provided in further detail below. Different priorities may be assigned to different use tables, and the channels listed in each use table may be managed differently by a DSA-enabled device or network. For example, a scheduler may direct additional or higher-fidelity detection at candidate channel spectrum to improve and assist in the process of establishing and maintaining communication with other cooperative DSA-enabled devices. As another example, spectrum sensing may be performed on backup channels more often than on other channels to increase the chance that a usable backup channel is available when needed, which may result in the backup channel list being of a higher fidelity than if the entire range of accessible spectrum was monitored equally. As another example, active channels may be verified as being available for use by the DSA-enabled network more frequently than backup, candidate, and/or possible channels, to reduce the likelihood of creating interference with a non-cooperative device.

Different detection requirements also may be applied to each use table. For example, co-channel sensing requirements may be applied to active and backup channels. Co-channel sensing requirements cause the DSA-enabled device to examine channels or regions of spectrum expected to have a high likelihood of interference from the relevant channels more closely. Examples of such regions of spectrum include channels that are harmonics of a channel used by the device, cross-products of a channel used by a device and an expected non-cooperative channel, and predefined offsets of a channel used by a device. DSA detection requirements, in which the DSA-enabled device examines the relevant spectrum for use by other cooperative or non-cooperative DSA-enabled devices, may be applied to candidate channels. For possible channels, "best effort" requirements may be applied, in which the DSA-enabled device makes a best reasonable attempt to include these channels in its spectrum monitoring schedule.

FIG. 8 shows an example set of use tables as channels are assigned during a span of time. The regulatory bands 840, spectrum plan 841, DSA-enabled device capability 842, DSA accessible spectrum 843, sensing requirements 834, and detector requirements 845 as shown in FIG. 7 are reproduced at the top of the spectrum chart for reference. It will be understood that the specific arrangement of spectrum classification, DSA capability, sensing and detector requirements, and LCU arrangement is provided as an example, and other configurations may be used. As previously indicated, spectrum may be divided into logical channel units (LCUs) 850 that are assigned to various categories within the LCT. The LCUs 850 illustrated in FIG. 8 are provided as examples only. The LCUs and other regions of spectrum are not necessarily shown to scale relative to the other portions of the spectrum, such as the bands 840.

At a time T0, all channels in the LCT may be assigned as possible channels, i.e., listed in the possible channel use table. The DSA-enabled device may perform spectrum sensing and detection during this period. At a later time T1, channels in two regions of spectrum 851, 852 are assigned as candidate channels. Each region may include one or more channels, although channels assigned to a particular category need not be adjacent or otherwise in the same region of spectrum. At a later time T2, one or more of the previously candidate channels 852 are assigned as active channels, indicating that the DSA-enabled device is using them for communicating with other cooperative DSA-enabled devices. Other channels 853 are assigned as backup channels, and additional candidate channels 854 may be identified. A previous candidate channel 851 may be un-assigned, so that it is no longer assigned as a candidate channel. For example, a channel may be un-assigned because a previous classification expires (i.e., a set time for which the classification was to be considered valid or appropriate expired) the classification otherwise becomes no longer valid, because the DSA network is not able to perform a rendezvous process on the channel, or for other reasons. As shown, various other channels may be assigned as active, backup, candidate, and possible channels at subsequent times T3, T4.

In some embodiments, a single channel may be sensed by multiple detectors or multiple configurations of a single detector. For example, the second candidate channel 852 assigned at time T1 can be sensed by two detectors (WB-1 and WB-2) instead of only one detector (WB-1) available for the first channel 851. The example detectors WB-1 and WB-2 may be separate physical detectors, or they may represent different configurations or operating modes of a single physical detector. Multiple detectors may be used to sense a single channel, for example, when sensing requirements demand better sensitivity than is available with a single detector. As a specific example, a first detector WB-1 may be used for initial DSA detection while performing an initial rendezvous process. A second detector WB-2 may be configured with a smaller resolution bandwidth, and used to detect non-cooperative signals. As another example, multiple detectors may be used when a region of spectrum may be used by different types of devices and/or for different uses, such as where the TV spectrum is used for both television broadcast and wireless microphone operation. In such a configuration, a different detector may be used for each expected use of spectrum corresponding to channels sensed by the detectors. In general, sensing requirements may imply or require the use of different detectors within different regions of the spectrum and/or with different expected types of non-cooperative spectrum usage.

Figure 10:
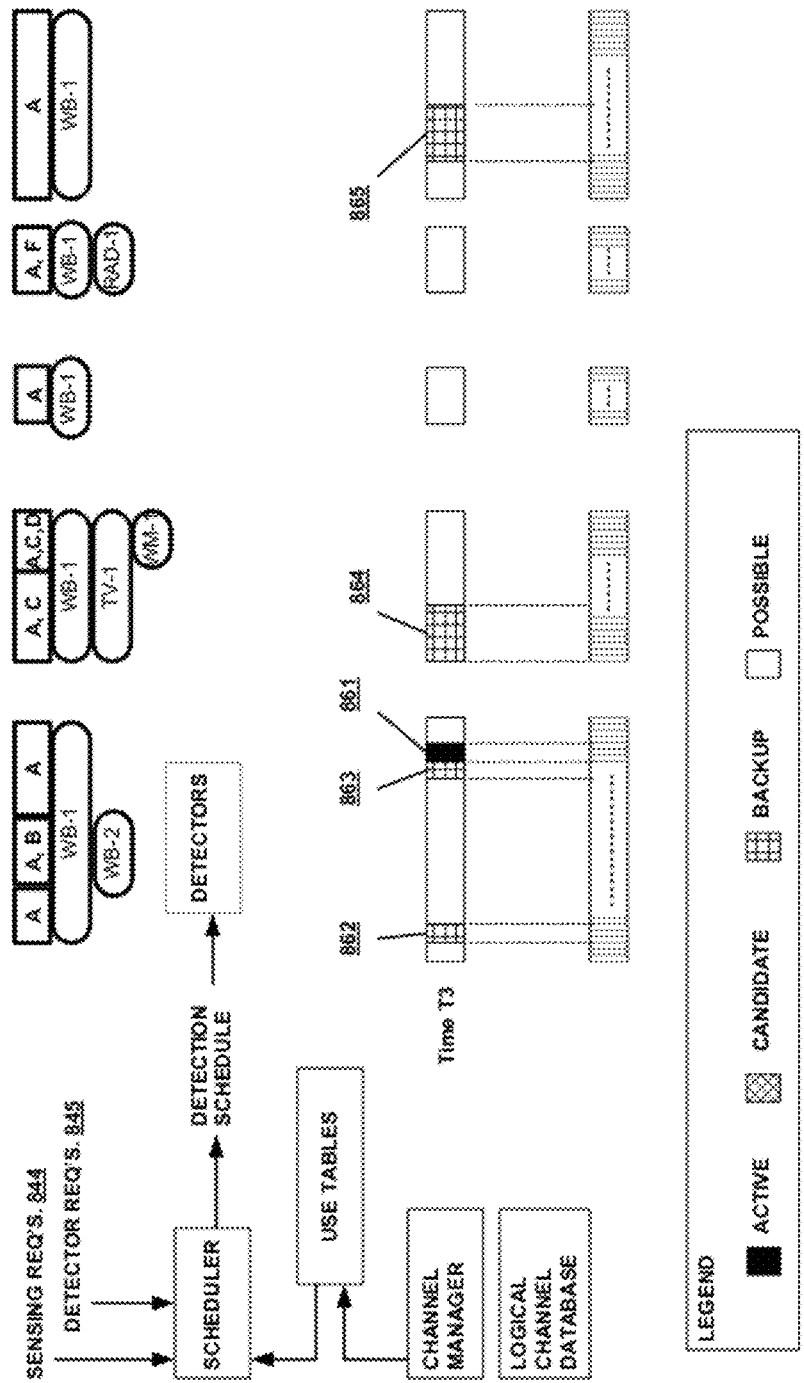
FIG. 10 shows an example spectrum plan using channel categories to schedule detector operations during an arbitrary window of time according to an embodiment of the invention.

Referring again to FIGS. 5-6, the channel list may be used by a scheduler 122 to manage operation of the detectors 112 to scan channels that may be suitable for use by the DSA system. FIG. 10 shows a specific example of using different channel categories during an arbitrary window of time between T3 and T4 in FIG. 8 to schedule detector operations according to an embodiment of the invention. The sensing and detector requirements as shown in FIGS. 7-8 are reproduced at the top of FIG. 10 for reference. Different sensing schemes may be used based on how spectrum is categorized in the LCT, and may result in various scanning techniques appropriate for specific portions of the spectrum. Scanning techniques may vary the scanning interval (the time between successive observations by a detector), the scanning frequency (the frequencies sensed in a region of spectrum), the frequency interval (how often a spectrum frequency range is scanned), the type and number of detectors used, and other variables related to scanning. For example, active (in-use) channels may be scanned as required to meet sensing requirements listed in the LCT. Spectrum associated with backup channels also may be scanned (i.e., these channels may be sensed with a detector) in accordance with the requirements in the LCT, but the sensing may be limited in embodiments by sensing allocation and processing capacity constraints. Finally, possible channel spectrum may be scanned on a "best efforts" basis as determined by the availability of sensing resources after higher priority sensing is accomplished as well as processing capacity. As a specific example, the active channel(s) 861 may be scanned using a wideband detector (e.g., WB-1) at a relatively high scanning interval, such as every 100 ms. The backup channels 862, 863, 864, and 865 may be scanned at a lower interval, e.g., every 200 ms using the WB-1 detector. In some embodiments, different channels of the same LCT category may have additional or different scanning requirements. For example, a backup channel 864 also may be scanned using an additional detector, such as the TV detector TV-1, at a different scanning interval, e.g., every 1800 ms. The possible channels may be scanned at the best rate available after other scanning requirements are met using band-appropriate detectors. For example, the channels may be scanned using a frequency interval of about 0.01 Hz using an appropriate detector. Other combinations and scanning requirements may be used.

In an embodiment, the scheduler may generate detection schedules that simultaneously or concurrently support multiple detection rates across one or more detector paths and/or multiple detector configurations. Detector schedules may be configured to reduce or minimize detection "costs" while satisfying sensing requirements. For example, TV-band detectors typically are more "costly" in terms of the time required for scanning. In an embodiment, such detectors may be used only for sensing in particular time segments, such as the spectrum time segment labeled 864 in FIG. 10. The sensing time may be set at low as allowed by policy management, technical, and regulatory considerations. For example, a regulatory scheme may require a TV detector to sense every 1800 seconds for 30 seconds. In the example, if a TV is detected in band 864, the next scan may be determined by a Non-Occupancy Time period, which specifies the time during which a band is considered off-limits for the DSA system following detection of the TV signal. As a specific example, a Non-Occupancy Time period may range from about 1 second for wideband signals to about 30 minutes for radar signals. Thus, the scheduler typically is configured to avoid unnecessary scanning.

Figure 11:
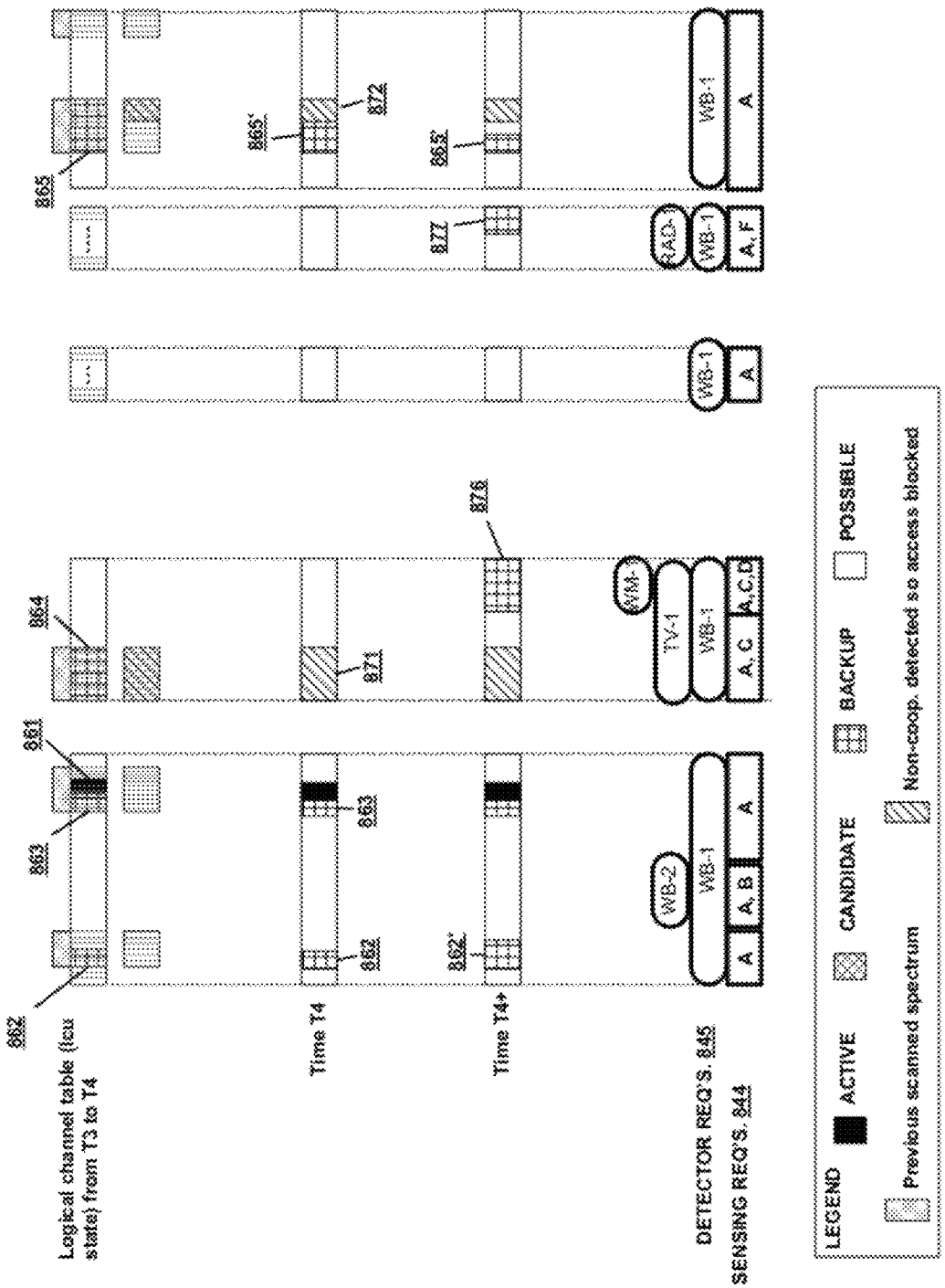
FIG. 11 shows an example of channel use table modification according to an embodiment of the invention.
Figure 12:
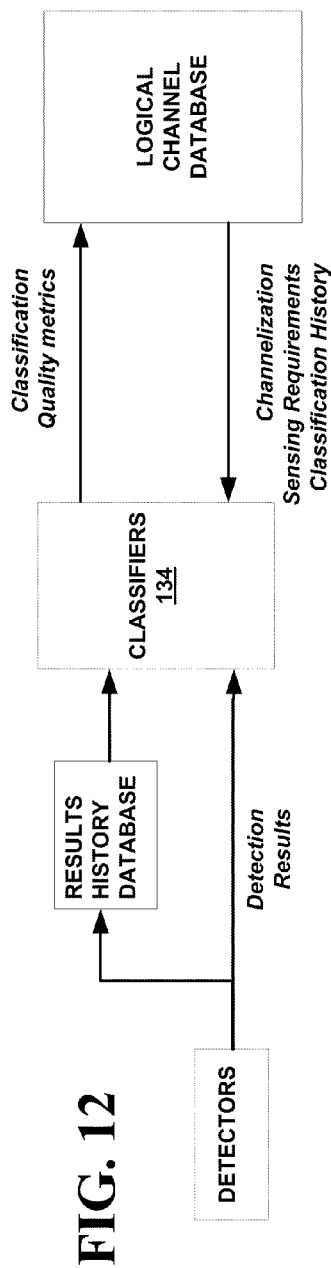
FIG. 12 shows an example data flow within a DSA-enabled device related to modifying a channel use table according to embodiments of the invention.
Figure 13:
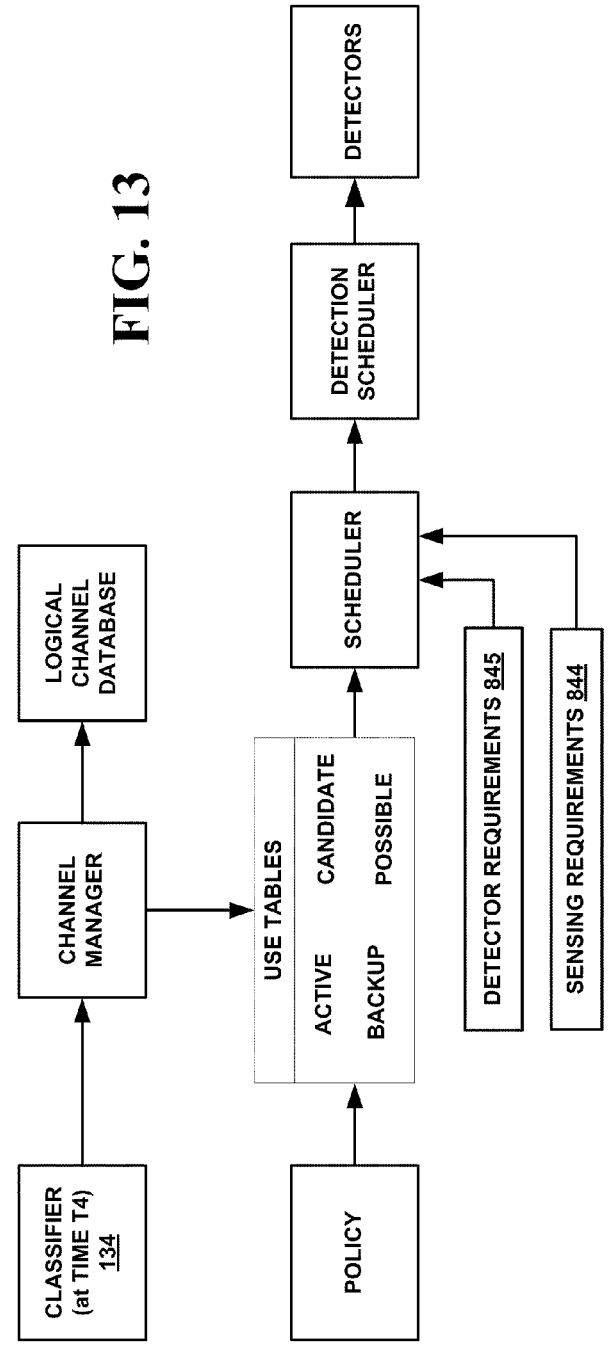
FIG. 13 shows an example data flow within a DSA-enabled device related to modifying a channel use table according to embodiments of the invention.

In an embodiment, all accessible channels are listed as possible channels. In addition, LCUs may be listed in other tables, such as a backup channel table. The use tables may be modified when non-cooperative signals are identified. For example, if a non-cooperative signal is identified on a backup channel, the channel may be removed from the use table. FIG. 11 shows an example of use how tables may be modified after time T4, when one or more non-cooperative (NC) signals are detected in two portions 871, 872 of the spectrum being monitored. FIGS. 12 and 13 show corresponding data flows within a DSA-enabled device according to embodiments of the invention. When an NC signal is detected, such as in channel regions 864 and a portion of 865, a corresponding LCU may be removed from the backup LCT but remain in the possible table. The channels may be reclassified by the channel manager, which may receive direction from a policy module. For example, some of the channels in region 865 may be removed from the backup channel table, resulting in fewer channels in the region 865' being classified as backup channels. The channel manager also may compensate for the reduction in backup spectrum, for example, by adding additional channels to the backup table. In the example shown in FIG. 11, for example, one backup interval 862 is expanded to include additional channels 862' (i.e., additional channels are classified as backup channels) and new channel 876, 877 are classified as backup channels. The scheduler may then generate a subsequent detector schedule based on the updated use tables and the sensing/detector requirements. When an LCU becomes non-accessible, such as due to a policy requirement, it may be removed from all use tables.

Figure 14:
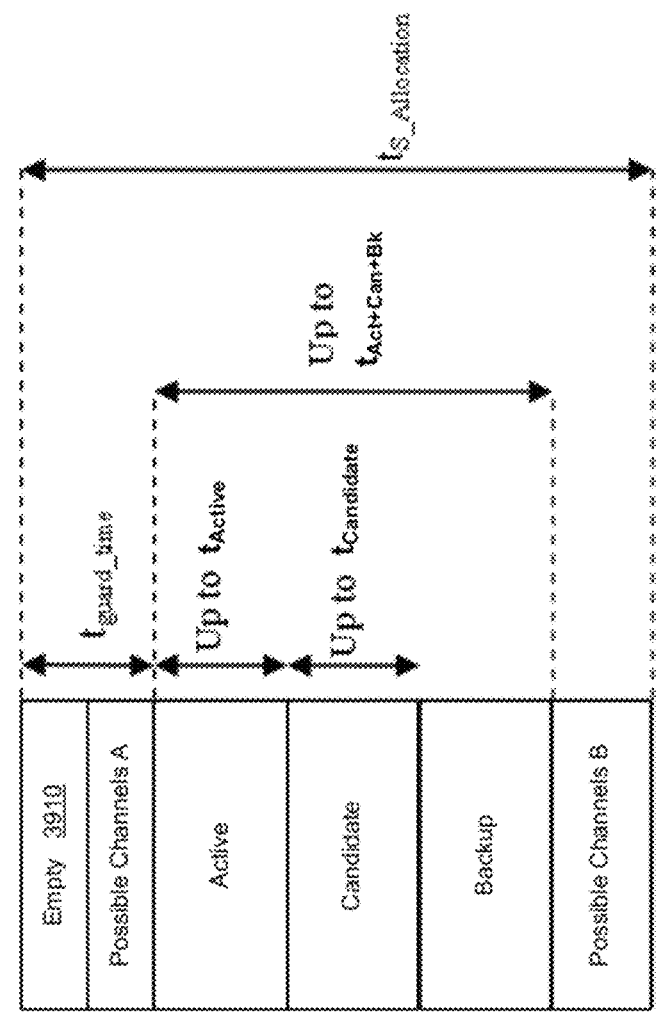
FIG. 14 shows an example allocation of sensing time periods according to an embodiment of the invention.

FIG. 14 shows an example of sensing time period allocation as may be performed by a scheduler according to an embodiment of the invention. The configurable parameter $t_{guard\_time}$ defines the time offset reserved between the start of executing a detector work list and the execution of the first measurement of spectrum from the active channel table. This offset may mitigate time uncertainty associated with synchronization of sensing allocations among cooperative DSA-enabled devices in a particular DSA network. To more efficiently use detection time during sensing allocations, the first spectrum measurements may be performed over channels from the possible table since possible channels typically are unaffected by synchronization uncertainty. The multiple detections may be performed during a single sensing allocation time (i.e., during a single gap). Allocation time uncertainty caused by imperfect time synchronization among a networks DSA-enabled devices may result in some DSA-enabled devices still transmitting during a portion of the time that others have already begun detecting on active channels. To avoid or reduce resulting problems, detections may be shifted over active channels so as to begin slightly after the beginning of the coordinated gap period. To use sensing time efficiently, sensing may be performed over possible channels at the beginning of the gap period—any "leftover" transmissions made by DSA-enabled devices that slightly lag the beginning of the gap period will be on different channels, and thus have less or no negative effect on the sensing of possible channels. In general the empty time period 3910 may be present in, for example, situations in which an additional measurement may not be performed within a sensing time period allocation (i.e., the empty duration 3910 is less than the time required to perform another measurement), or in which all the possible spectrum, or all spectrum of interest, has been sensed in less than a full sensing time period allocation.

Two types of sensing allocation may be used, including coordinated sensing allocation such as, for example, the sensing methods described herein with reference to distributed detection and group behavior, and local sensing allocation. As previously described, during coordinated sensing DSA-enabled devices may refrain from transmitting to allow for detection of non-cooperative signals on channels being used by a DSA-enabled network. In contrast, with a local sensing allocation scheme, neighbor DSA-enabled devices may not be required to cease transmission during the scan period. An individual DSA-enabled device may perform local sensing to enhance spectrum usage without causing interference with others. Local sensing allocation may be used for discovering existing DSA channels.

Work lists generated by the scheduler may outline detection events to be performed by one or more detectors during the allocated sensing time. As used herein, a "detection event" refers to an instruction to detect at one or more specified frequencies for a specified period of time, using one or more specified detectors. Upon completion of a work list, the scheduler 122 may send it to the media access control (MAC) which in turn forwards it to the physical layer or related API of an appropriate detector 112. The scheduler may coordinate detection to prevent the detector and the detector results processor from becoming overloaded. Various parameters may be specified for a detection event, such as frequency at which to detect, gain value, number of samples to be collected, detector type to use, configuration profile of the detector, output data format requested, whether to return the accumulated output (a.k.a. results fragment) via callback after completion of the detection event, length of the detection event output in samples, number of detection events in the work list, or any combination thereof. The detector type and configuration profile of the detector for each event may be computed based on the detection objective (e.g., neighbor discovery vs. non-cooperative detection) and sensing requirements received from the policy manager.

Figure 15A:
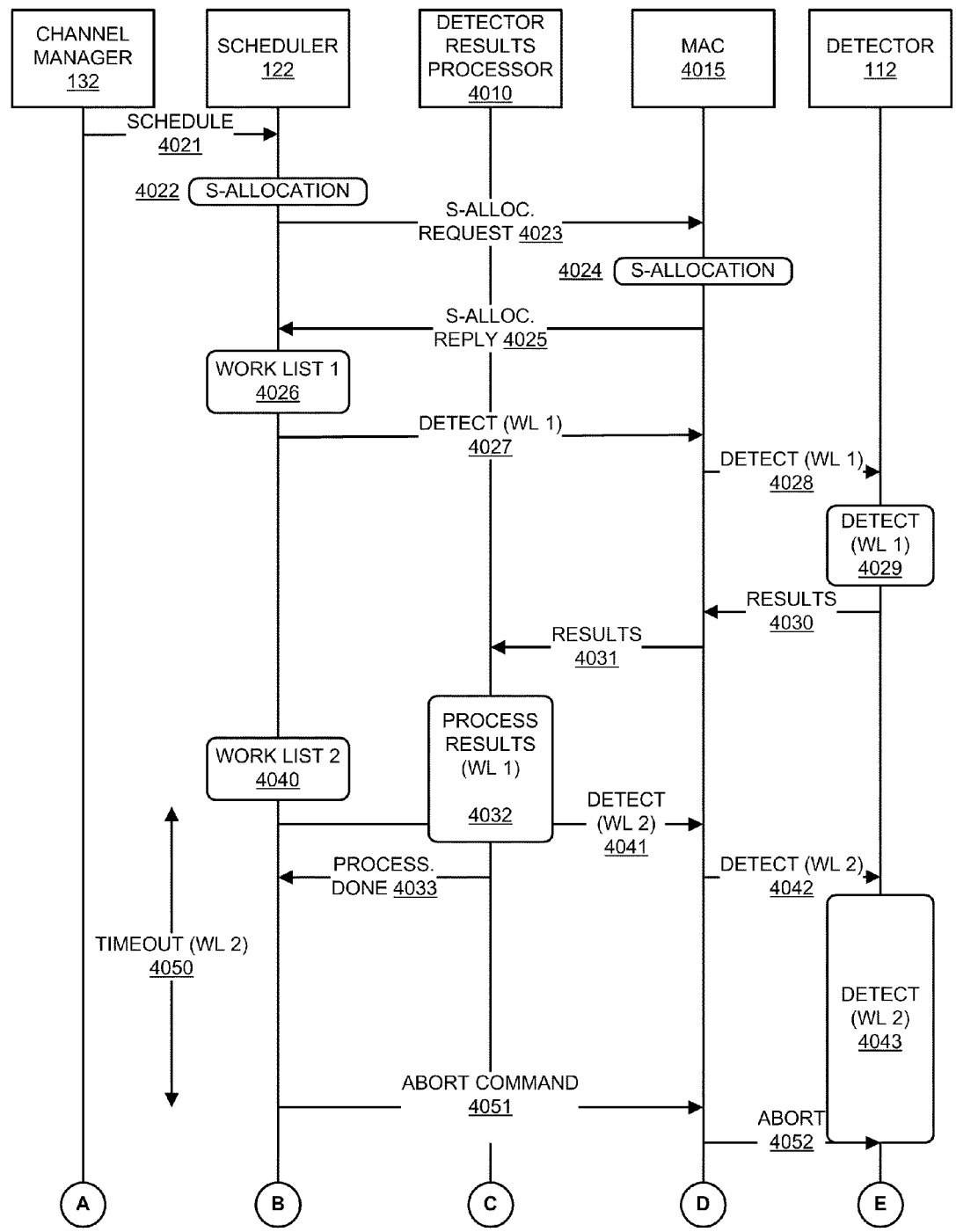
FIG. 15A shows an example message sequence diagram for an interaction between a scheduler and other DSA-enabled device components according to an embodiment of the invention.
Figure 15B:
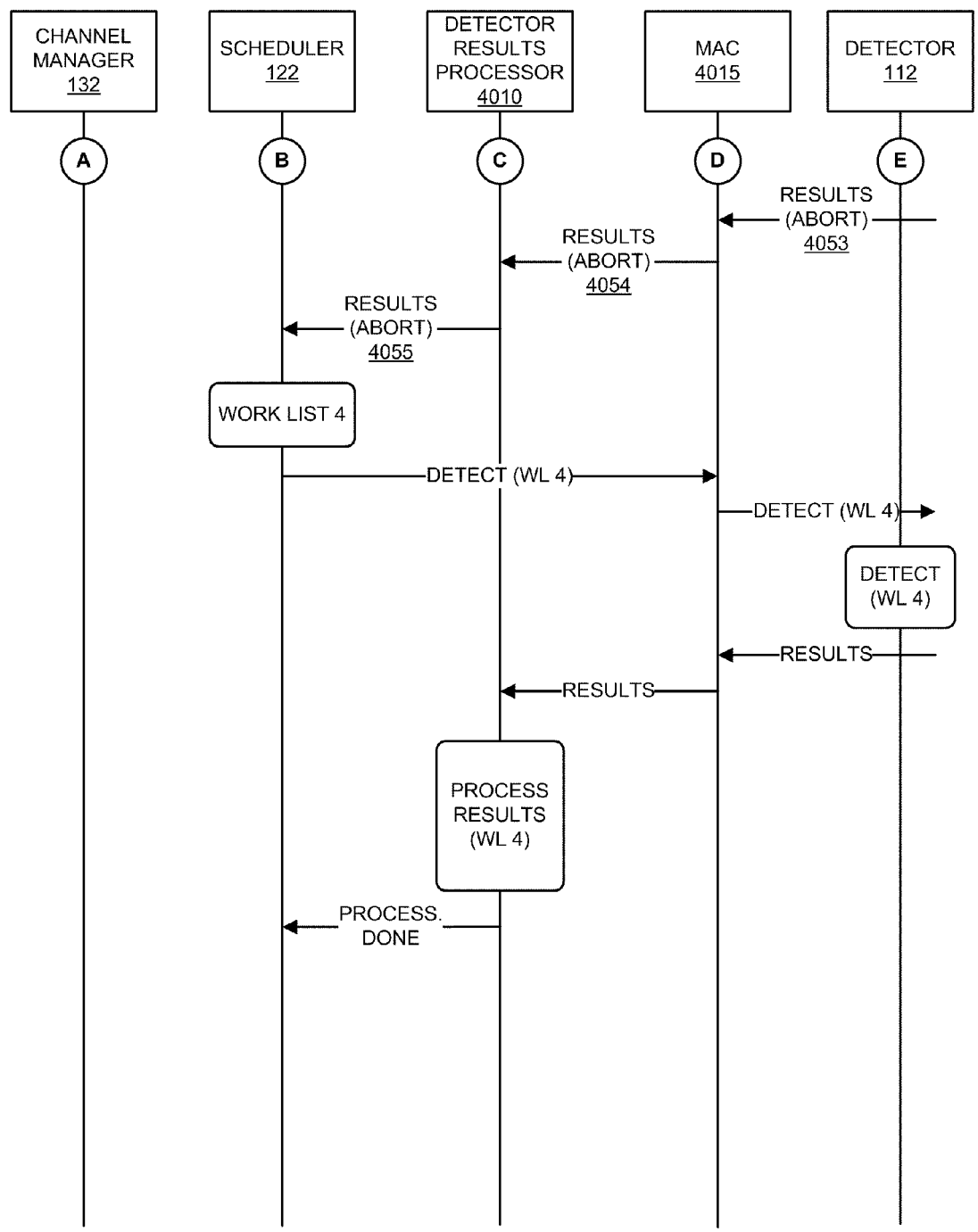
FIG. 15B shows an example message sequence diagram for an interaction between a scheduler and other DSA-enabled device components according to an embodiment of the invention.

In some embodiments, the scheduler may perform several functions: request and management of sensing allocations, generation of detector work lists, and control of detection pace. FIGS. 15A and 15B show an example message sequence diagram showing the interaction between a scheduler and other DSA components according to such an embodiment of the invention. For clarity, the diagram shows each portion of detector results returned in a single message. However, it will be understood that detection results could be received in multiple fragments. In addition, various instructions and requests may include a corresponding acknowledgement message which is not shown. For example, in response to a detect instruction sent from the scheduler 122 to the MAC 4015, the MAC may return a detect acknowledgement. In general, the scheduler 122 may generate two main items: sensor allocation (s-allocation) requests and work lists. A sensor allocation may include the following parameters: allocation ID, allocation period, size of sensing allocation, effective duration of sensing allocation, number of transceivers per allocation, and allocation type. Depending on requirements and the state of the entire system, a request can be sent to obtain a new sensor allocation, update an existing allocation, or release an existing allocation. Although FIGS. 15A-B show communication with the detector(s) 112, it will be understood that a series of communications related to a particular detection event referring to a single detector.

The scheduling process may begin when a channel manager 132 or other element of a DSA-enabled device sends a schedule request 4021 to the scheduler 122. The scheduler may then generate a sensor allocation at 4022, and send an allocation request or instruction 4023 to the MAC. The MAC may generate a sensor allocation at 4024 and send an acknowledgement to the scheduler at 4025.

The scheduler may generate a first work list (WL 1) at 4026, which specifies behavior for one or more detectors associated with the schedule received by the scheduler 4021. A detect instruction for the first work list is sent to the MAC at 4027 and, similarly, the MAC instructs one or more detectors 4028 to perform the appropriate detection 4029. After the detection is complete, the detector(s) send detection results 4030 to the MAC, which may forward results at 4031 to another component, such as a detector results processor 4010. In an embodiment, the detector results processor 4010 may be or may implement a signal classifier or signal classifier functions as previously described, such as the signal classifier 134 described with respect to FIG. 1A. The detector results processor processes the detection results at 4032 and notifies the scheduler when processing is completed at 4033. The analysis generated by the results processor 4010 may be sent to other DSA components, such as a channel manager.

The scheduler may generate a second work list (WL 2) at 4040. Notably, the work list may be generated prior to receiving an indication that detection scheduled by the first work list is complete. Detect commands 4041, 4042 are sent to the appropriate detector(s) as previously described with respect to WL 1, and the detector(s) perform detection 4043 as directed. In some cases, the scheduler may issue an abort command 4051, such as where detection is taking a longer time than expected or defined by the work list, or where the DSA-enabled device indicates a need to halt detection. The abort command may be acknowledged by the detector via appropriate messages 4053, 4054, 4055 to the MAC, detector results processor, and/or scheduler. In some embodiments, partial or full results may be returned by the detector(s) after detection is aborted. The results may be analyzed by the detector results processor, or they may be discarded.

In some cases a particular work list may not be performed. For example, in FIGS. 15A-B Work List 2 (WL 2) takes a longer time to perform than initially defined by the scheduler, as identified by the "timeout" period 4050 associated with WL 2. This may cause the scheduler to skip generation of the next Work List (e.g., WL 3), and continue to the next with Work List 4 (WL 4). The scheduler also may send an abort command 4051 to stop associated scanning as previously described. The subsequent work list WL 4 may then be processed and associated detection performed as previously described.

Additional details regarding the use of a scheduler in a DSA-enabled device and system, the interaction of the scheduler with various other hardware components of a DSA-enabled device, and specific examples of scheduler hardware and software configurations are provided in further detail below.

Figure 16:
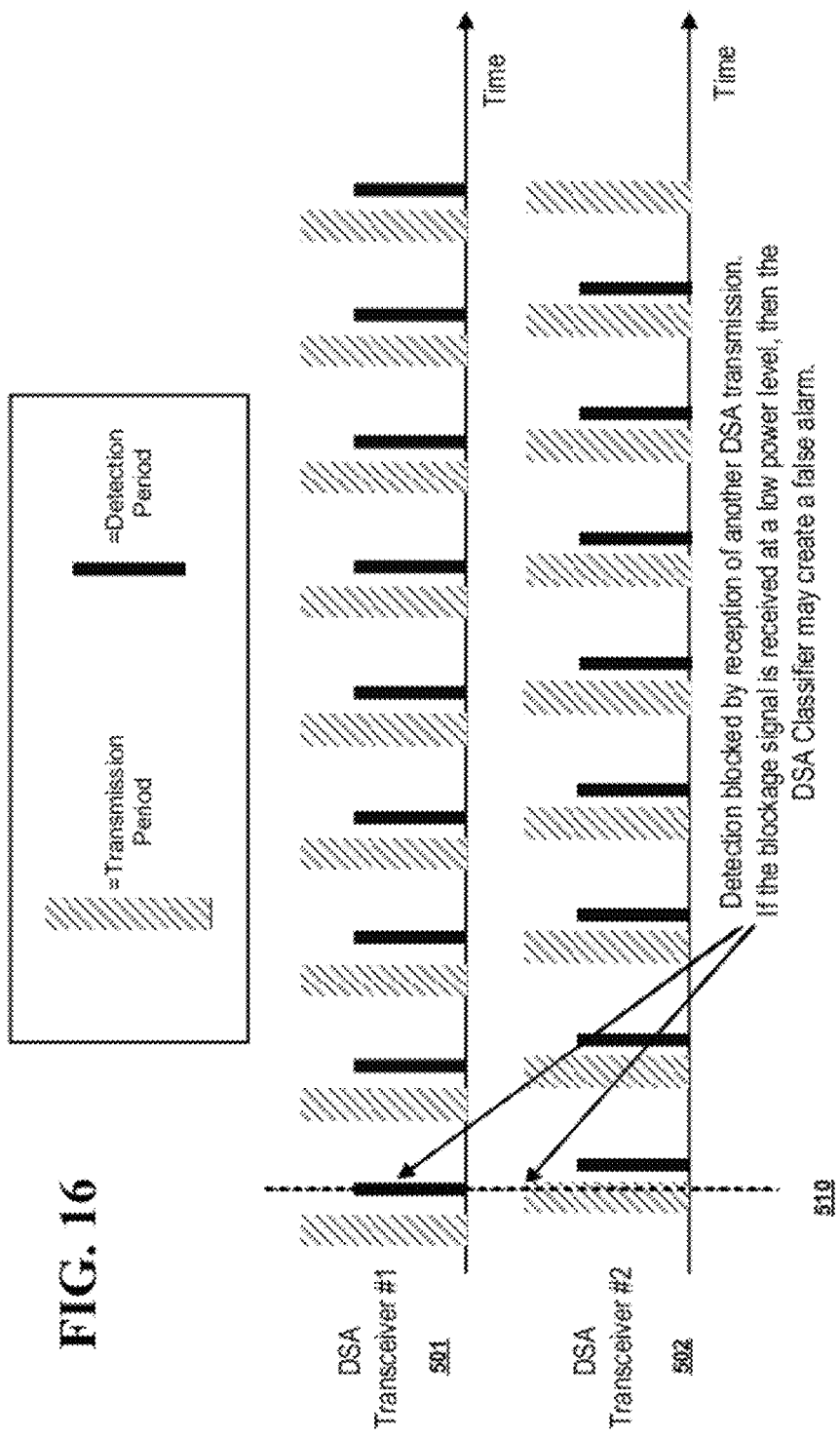
FIG. 16 shows operation timelines for two DSA-enabled devices operating during a time span in which each DSA-enabled device has various detection periods and transmission/reception periods.

FIG. 16 shows an example of two DSA-enabled devices operating during a time span in which each DSA-enabled device has various detection periods and transmission/reception periods. If one DSA-enabled device 501 attempts to perform detection during a time period 510 in which a second DSA-enabled device 502 is transmitting, the first DSA-enabled device 501 may detect transmissions from the second DSA-enabled device 502 as non-cooperative signals, which may then be mis-classified as originating from a non-cooperative source. Additionally, a signal transmitted by the second DSA-enabled device 502 may hide the presence of signals from one or more non-cooperative sources received by the first DSA-enabled device 501.

To reduce or eliminate these effects, a detection gap, or quiet period, may be used. Detection times may be coordinated between all or substantially all DSA-enabled devices in a network. "Substantially all" DSA-enabled devices refers to those DSA-enabled devices that are in a proximity or geographic region defined, for example, by a communication, detection, or interference distance. Those DSA-enabled devices that are outside of a communication, detection, or interference distance may not be synchronized with the DSA-enabled devices within the same range, but the lack of synchronization to out-of-range DSA-enabled devices typically does not adversely affect the ability to detect and classify received signals. Typically, the interference distance is the primary distance of concern in synchronizing. In an embodiment, the detection times may be coordinated between all DSA-enabled devices in a geographic region, including DSA-enabled devices and networks that would be considered non-cooperative by the other DSA-enabled devices or networks in the region. This synchronization could be achieved using, for example, a global positioning system (GPS) clock or other synchronization techniques.

In an embodiment, the synchronization of a detection gap may occur only between the DSA-enabled devices of a particular network. This can occur under instruction, either from a base station and/or by an external policy definition that defines the specific detection intervals. In another embodiment, the detection times may be coordinated between all DSA-enabled devices in a geographic region, across all DSA-enabled devices on a network, or across different DSA-enabled devices and networks, including DSA-enabled devices and networks that would be considered non-cooperative by the other DSA-enabled devices or networks in the region. In such an embodiment, DSA-enabled devices sharing a common detection gap may synchronize their timing to a common clock and use specific detection intervals. Policy definitions may be used to define the specific detection intervals, the intervals may be determined by the DSA-enabled devices based in part upon observations of surrounding spectrum usage, and/or the DSA-enabled devices can take their detection interval specifications from a common control channel. In general, time synchronization between DSA-enabled devices can occur at a MAC level or using a common broadcast time source, such as a GPS clock or a common clock control channel.

In an embodiment, all of the DSA-enabled devices within a region may cease transmissions for a synchronized time period, which may be relatively short and periodic. As a specific example, the synchronized time period may occur about 1-100 times a second, for times of about 1 μs to about 100 ms. A detection time period synchronized among DSA-enabled devices in a network or region may be referred to as a "detection gap". The use of a detection gap also may be useful for relatively closely-spaced DSA-enabled devices, particularly when devices are within the interference distance of other devices, since detection may be blocked for DSA-enabled devices in close proximity to other DSA-enabled devices as previously described. The detection gap may be scheduled to occur periodically, on a scheduled basis, according to a scheduling algorithm, pseudorandomly, and the like, or some combination thereof.

Other embodiments may include various changes to the synchronized gap timing, duration, or other characteristics. For example, the geographic breadth may be varied to include more or fewer cooperative DSA-enabled devices. The synchronized gap may be implemented on the fly, or it may occur at pre-set times or locations within a frame. A synchronized gap may be used with any structure of the network, e.g., infrastructure networks as well as with ad-hoc or peer-to-peer type networks.

Figure 17:
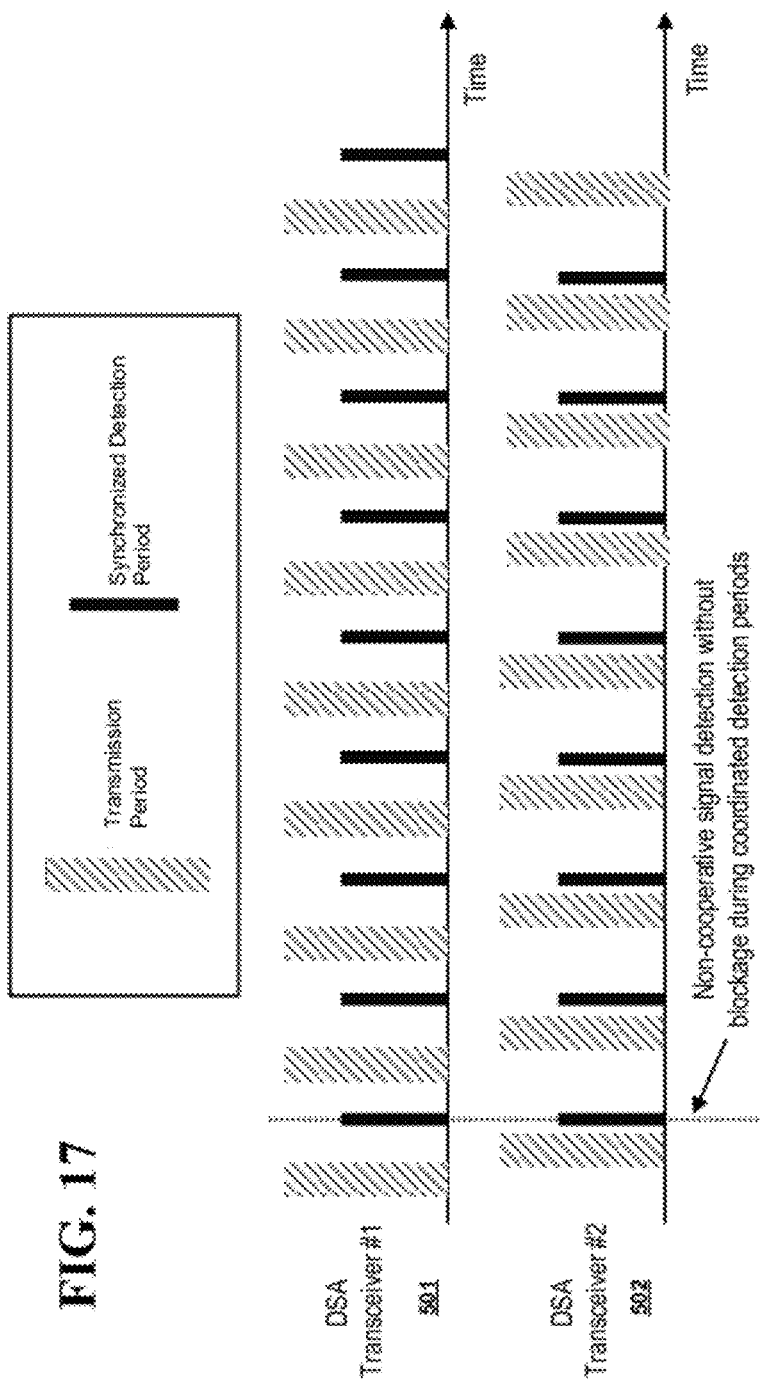
FIG. 17 shows operation timelines for two DSA-enabled devices with a coordinated detection period according to an embodiment of the invention.

FIG. 17 shows an example of two DSA-enabled devices that use a detection gap according to embodiments of the present invention. As shown in FIG. 17, the use of a detection gap may allow DSA-enabled devices to sense non-cooperative signals with a relatively high sensitivity. The use of this first detection gap also may reduce or eliminate false alarms caused by detection and incorrect characterization of other DSA signals, since DSA transmissions do not occur during the detection periods. In some embodiments, a detection gap may be shared among all cooperative DSA-enabled devices in a region or network. In other embodiments, a detection gap may be shared among all DSA-enabled devices in a region, even if they are in separate networks.

Coordination of the detection gap may be accomplished by a networking or MAC (media access control) protocol. For example, in a centralized or infrastructure-type network, a base station may mandate a synchronized detection time to other DSA-enabled devices in the network. An infrastructure-type network also may include many central controllers, such as in a cellular configuration, in which case each central controller may mandate the synchronized detection time for those DSA-enabled devices in its network. The synchronized detection time also may be synchronized among the multiple central controllers. In a distributed or ad-hoc system, a distributed detection time alignment protocol that operates without a central coordinator may be used. Such a protocol may operate with relatively little global information, and without relying on previous assignments of roles to DSA-enabled devices nor resource reservations. A specific example of a suitable distributed time alignment protocol is the Hybrid Contention/TDMA-based (HCT) MAC that is designed to work with ad-hoc wireless networks organized in clusters, providing timely bounded communications both inside and outside the clusters. An example of one such protocol is described in Ceara Fortaleza, "A wireless hybrid contention/TDMA-based MAC for real-time mobile application," Symposium on Applied Computing, Proceedings of the 2008 ACM symposium on Applied computing. In this example protocol, to create a detection slot, each of the DSA-enabled devices sets aside a portion of each TDMA frame. Because a DSA system may use multiple channels, which may be non-contiguous within the spectrum, all DSA-enabled devices in a network or region may coordinate the detection gap even if they operate on different frequencies.

In an embodiment, the synchronized detection period may be scheduled to occur at different points within communication frames. For example, a DSA network may use a frame structure in which the one or more gaps may be scheduled in any of 100 positions within the frame. The gaps may occur at the first position during a first frame, a second position during a second frame, and so on. The order of positions at which the synchronized gap occurs need not be sequential, and may be randomized. The order may be pre-set, or it may be set during operation of the DSA network, such as where a central controller, base station, or other coordinating device dictates the position of the gap and, therefore, the detection period, in various frames. Moving the location of one or more gaps within a frame structure changes the detection periods, which may improve the likelihood of accurately and quickly detecting non-cooperative signals. For example, moving the detection periods may prevent unintentional, and potentially-undetectable, synchronization with a non-cooperative frame structure, which may cause the detection period to occur at a time when the non-cooperative system is also not transmitting. The gap and detection period also may be synchronized to the synchronicity or frame structure of a known non-cooperative system or signal, to make sure that the detection period occurs during an expected transmission time of the non-cooperative system.

Other embodiments may include various changes to the synchronized gap timing, duration, or other characteristics. For example, the geographic breadth may be varied to include more or fewer cooperative DSA-enabled devices. The synchronized gap may be implemented on the fly, or it may occur at pre-set times or locations within a frame. A synchronized gap may be used with any DSA-enabled network structure, e.g. infrastructure, ad-hoc, and peer-to-peer type networks.

Since the synchronized gap may be synchronized between all or substantially DSA-enabled devices in a region, it also may prevent DSA-enabled devices from detecting one another. For example, by definition each of the DSA-enabled devices in FIG. 17 is silent during the gap period. Therefore, neither DSA-enabled device will detect the other. In principle, the use of a single coordinated detection gap among all DSA-enabled devices may make it difficult, unlikely, or impossible for a DSA-enabled device to join a DSA network, since it will not be able to detect transmissions of DSA-enabled devices in the network and, therefore, will not be able to perform initial communication coordination (rendezvous) with the network or receive appropriate control information. An example of a rendezvous process used to coordinate initialization of communications between a new DSA-enabled device and an existing DSA network according to embodiments of the invention is described in further detail below.

Figure 18:
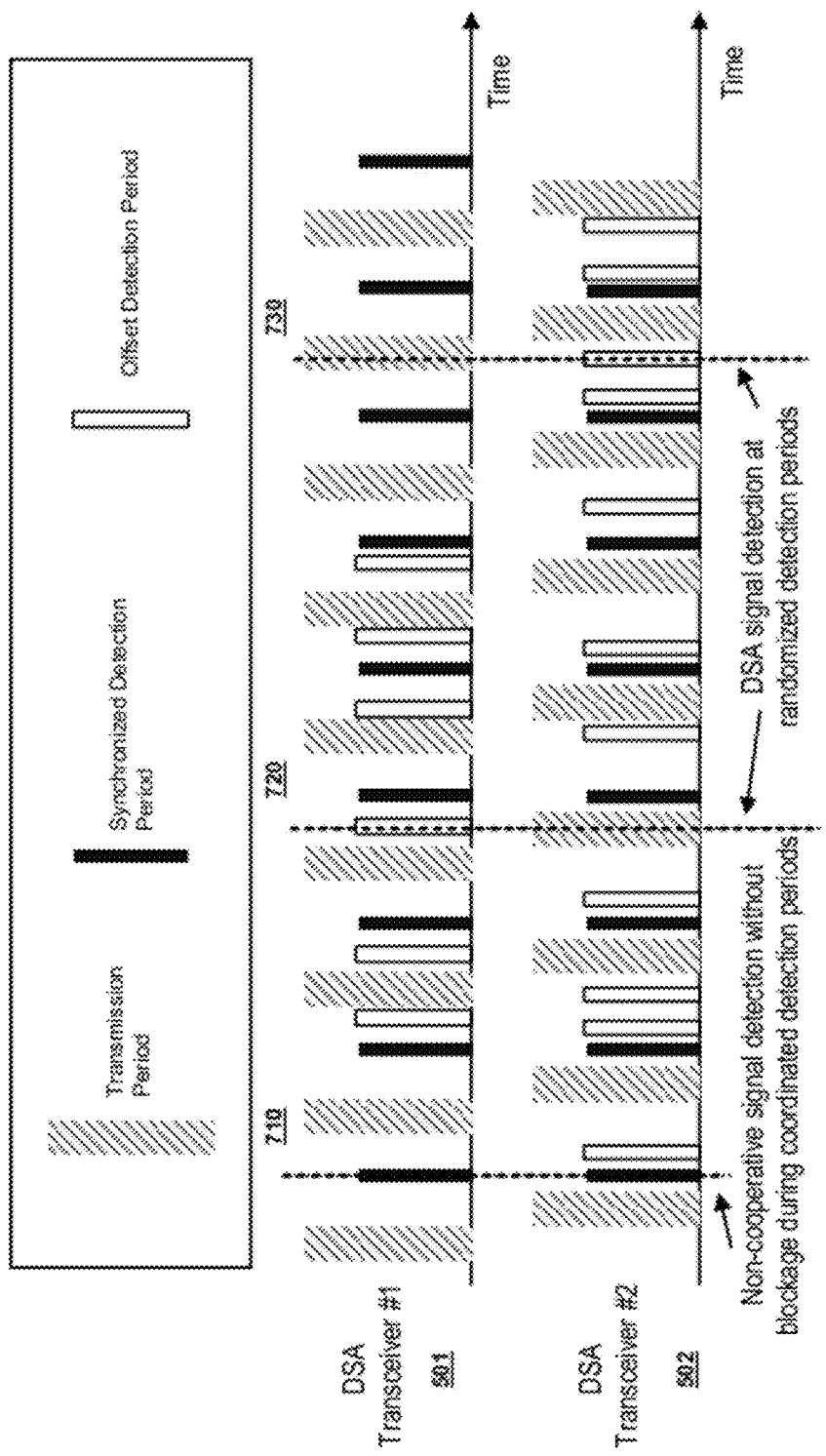
FIG. 18 shows operation timelines for two DSA-enabled devices with coordinated and uncoordinated detection periods according to an embodiment of the invention.

To enable DSA-enabled devices in a cooperative network and/or other DSA-enabled devices with which the detection gap is synchronized to detect one another, a second detection period or periods may be used. FIG. 18 shows an example of a time period in which each of two DSA-enabled devices uses a second detection period according to embodiments of the present invention. The second detection period may be set by each DSA-enabled device independently, i.e., it may not be synchronized among DSA-enabled devices in the network, and may be referred to as non-synchronized, asynchronous, randomized, or offset (relative to the synchronized detection period). Randomized timing may be used since each DSA-enabled device is unaware of specific times at which other DSA-enabled devices may be transmitting. Since the detection period is often short compared to the frame length, a random timing may increase the chance of detecting other DSA transmissions. As a specific example, a detection period may be on the order of about 40 µs for a frame length of about 5 to 20 ms. A detection gap may be, for example, 400 µs, and the corresponding detection period inside of the detection gap may be 40 µs. The time before and after the detection period, but inside the gap, may be reserved for frequency changes. The non-synchronized detection period may be offset from a detector schedule for the DSA-enabled device or network as well as being non-synchronized with the synchronized detection period shared with other DSA-enabled devices. That is, the detector may not be synchronized with the synchronized detection period. For example, a detector may detect continuously and a signal classifier or other device may be used to filter out known DSA signals. In general, DSA-enabled devices according to embodiments of the invention may use one or more local or separate detectors, and each detector may or may not be configured to operate during one or more detection gaps used by a particular DSA-enabled device or network. In an embodiment, one or more detectors may be operated continuously, which may require additional processing resources than embodiments in which it is only operated during a detection gap. In another embodiment, a DSA-enabled device may include a first detector that operates during the synchronized gap period, and a second detector that operates during the asynchronous gap period. Other configurations and combinations of detector operating time periods and detection gaps may be used.

As shown in FIG. 17, the use of a randomized or offset detection period by each DSA-enabled device may allow the DSA-enabled device to detect other DSA-enabled devices. For example, at time 710 each DSA-enabled device 501, 502 may cease transmissions for the coordinated detection gap. During this time, neither DSA-enabled device 501, 502 will detect the other (since neither is transmitting), but each may detect non-cooperative signals. At a second, non-coordinated time 720, the first DSA-enabled device 501 may enter a detection mode during which it refrains from transmitting and detects other signals, including the cooperative signal of the other DSA-enabled device 502. Similarly, at another time 730 the second DSA-enabled device 502 may be in a non-coordinated detection period, allowing it to detect transmissions from the first DSA-enabled device 501.

In some embodiments, the detection gap and/or non-synchronized detection periods may be omitted. Such embodiments may include other techniques to provide similar features to those typically provided by the detection periods. In an embodiment, a physically-separate or stand-alone detector in communication with the DSA network, such as via a base station, may be used to detect both cooperative and non-cooperative signals. In an embodiment, a DSA-enabled device may use a much faster detection sampling rate when sensing communications with a detector than is typically used in embodiments which include detection periods, so as to increase the odds of detecting a non-cooperative or non-DSA signal that is not blocked by other DSA transmissions. Such an embodiment may not be preferred, since the time spent in a detection mode is increased. In some embodiments in which detection periods are not used, a DSA-enabled device may spend approximately 10% of each frame detecting and 90% in transmitting or receiving data. In configurations where other DSA systems use a substantial portion of the channels available to the system, detectors may have to sample at a rate up to 2 to 5 times greater to detect other signals within an acceptable period of time. For example, regulatory, service provider, and/or other requirements may specify that a DSA-enabled device stop using a channel within a certain time after a non-DSA or non-cooperative signal has been detected by the DSA-enabled device, or other channel abandonment requirements. To meet such requirements, embodiments that do not use detection periods may have to sample at a much higher rate. Since the portion of time the DSA-enabled device spends transmitting data may be decreased, data throughput for the DSA-enabled device may be substantially decreased.

The use of one or both detection gaps as previously described also may reduce the "false alarm" rate experienced by a DSA-enabled device with respect to detecting and identifying non-DSA transmissions. A false alarm occurs when a DSA-enabled device identifies a detected signal as originating from a non-cooperative DSA-enabled device, when the signal actually is from another DSA-enabled device. A false alarm also may be caused due to a false identification of noise as an interfering signal. If there are DSA-enabled devices near each other, the probability of false alarms for each of the radios may be increased because a detected DSA signal typically is associated with a relatively low signal-to-noise ratio (SNR), for example 0 to 10 dB. This could cause the DSA-enabled device to incorrectly identify a DSA signal as noise, or incorrectly identify noise as a signal. In some embodiments, these determinations may be performed by a signal classifier as described in further detail below. A false alarm may adversely impact operation of a DSA-enabled device or system, by causing the DSA-enabled device to believe that one or more channels on which the false alarm occurred are being used, causing the DSA-enabled device to abandon the channel. If too many false alarms occur, the DSA-enabled device may believe that all channels are being used, and may stop operating completely. False alarms may partially or entirely define the amount of spectrum a DSA-enabled device believes is available for use when, much of the time, the spectrum is empty of non-cooperative signals, and the false alarms dominate the DSA decision process. Since the detection gaps allow DSA-enabled devices to more accurately identify the presence of cooperative and non-cooperative DSA-enabled devices as previously described, these gaps also may reduce the corresponding false alarm detection rates.

In another embodiment, one or more signal classifiers may examine data received from the detectors to identify detection data containing DSA or non-cooperative signals Further details regarding the operation of signal classifiers according to embodiments of the present invention are provided in further detail below. If the DSA-enabled device is to connect to a DSA network at high link distances, and/or operate at relatively high transmission power levels without causing interference to non-cooperative DSA-enabled devices, low detection thresholds may be used. However, a signal classifier may be inaccurate, especially when dealing with low signal-to-noise ratio data or operating at low threshold levels. Additionally, in multipath conditions, DSA signals may be distorted and look similar to non-cooperative signals, such as where a DSA detector is unable to resolve a multipath signal, causing a DSA-enabled device to unnecessarily abandon a channel that appears occupied. An inaccurate signal classifier also may cause more detection data to be collected, which may include relatively strong non-cooperative signals, leading to a higher false alarm rate. As a specific example, a configuration that does not use the detection gap may collect about 2 to 5 times more detection samples than a similar system that implements a detection gap. The DSA-enabled device may indicate the presence of about 10 to 100 times more non-cooperative signals, many of which may represent false alarms.

Different detection gap schemes may be used for radios with different hardware or operating characteristics. For example, Push-to-Talk (PTT) radios, devices with lower throughput, unsynchronized systems, and/or systems that cannot perform detection and communication transmission/reception concurrently, or that do not have a separate detector and transceiver at each DSA-enabled device may not be suitable for use with the detection gap previously described. Embodiments in which a synchronized detection gap is not used may allow DSA-enabled devices to communicate at arbitrary times, at the expense of increased difficulty in establishing or maintaining communication coordination among the DSA-enabled devices, since there may be no reliable way to predict when other DSA-enabled devices in a DSA network will be transmitting and/or detecting.

As a specific example, systems which use a time division duplex (TDD) frame structure may schedule a detection gap based on the TDD frame structure. Most PTT radios do not use a TDD frame structure. However, it has been found that a DSA network may still use PTT and similar devices by using periods when the device is not placed into a transmitting mode for detection. Specifically, a PTT radio may perform detection when the transmit button is not activated by a user.

To minimize the time required for a DSA-enabled device to initially join an existing DSA network or to establish a new DSA network with one or more other DSA-enabled devices, a DSA-enabled device may enter a "free wheel mode" in which it continually refrains from transmitting and only detects within one or more regions of the spectrum. For example, a DSA-enabled device may increase the amount of detection time by continuously calling a detector at different frequencies as it searches for a DSA base station or other DSA-enabled device. This may be equivalent to using effectively random detection period timing compared to frame timings used by any other DSA-enabled devices in the region.

A specific example of a network using detection gaps according to embodiments of the invention is described in further detail in U.S. application Ser. No. 11/582,496, filed Oct. 18, 2006, the disclosure of which is incorporated by reference in its entirety.

Some non-DSA networks use preset channels or a beacon to allow DSA-enabled devices in the networks to communicate. Such techniques may be unsuitable for DSA networks, especially in conditions in which large spectrum ranges may be available to the network or in which the network may be unstable or dynamic due to interference concerns, topological considerations, and other conditions. Thus, to join DSA-enabled devices to a particular network, a rendezvous process may be used to coordinate communication initiation and maintenance among DSA-enabled devices.

Referring again to FIGS. 1-2, a DSA-enabled device may include a communication coordinator to perform communication channel selection and coordinate channel selection and use with other devices in a DSA network. The coordinator may monitor, negotiate, adjust, and maintain communication channels among DSA-enabled devices. According to embodiments of the invention, these functions may be performed without causing noticeable interruptions to DSA communications or unacceptable interference to primary users. The process of initiating and maintaining communication among DSA-enabled devices in a DSA network may be referred to as a "rendezvous" or "spectrum state readiness" process.

Figure 19:
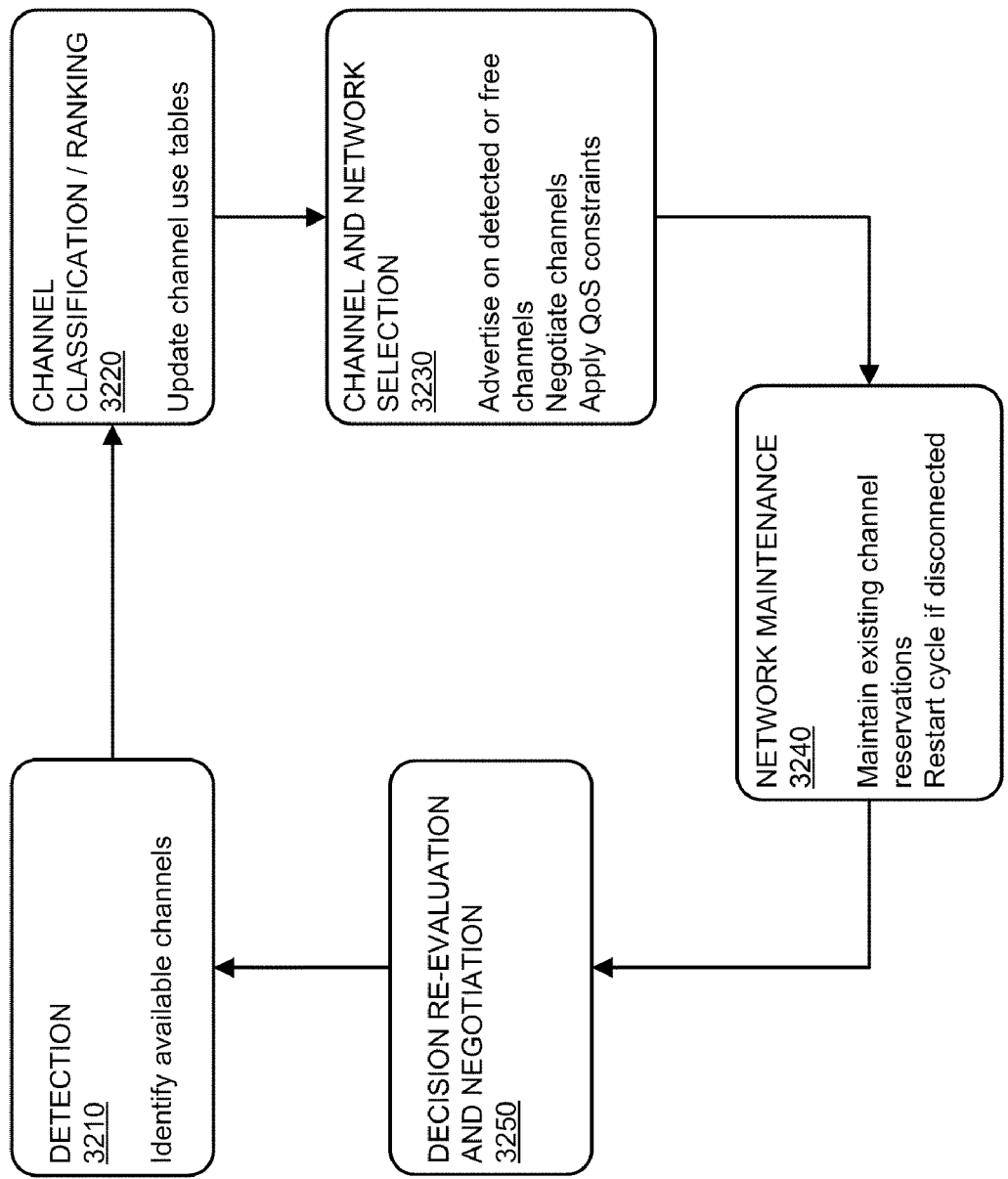
FIG. 19 shows an example high-level view of a DSA channel selection and maintenance process according to an embodiment of the invention.

FIG. 19 shows an example high-level view of a process that includes DSA spectrum sensing, channel selection, communication initialization, and network maintenance according to embodiments of the invention. As shown, the process of selecting and using channels may be a cyclical or continuous process. For example, a DSA-enabled device may perform the process continually while communicating in a DSA network, with periods of data transmission and/or reception interspersed with some or all of the shown functions. For example, in an embodiment transmission and reception periods may be interspersed with detection and channel changes. At 3210, the DSA-enabled device may perform spectrum sensing, i.e., detection, in which local spectrum usage is determined. This process may allow the DSA-enabled device to identify channels or regions of spectrum that may be available for use by the DSA-enabled device in communicating with other DSA-enabled devices. At 3220, the DSA-enabled device may perform channel classification and ranking as described elsewhere herein. For example, the DSA-enabled device may assign and re-assign channels to channel use tables to indicate whether the channels are available for use by the DSA-enabled device.

At 3230, the DSA-enabled device may select a channel to use in communicating with cooperative DSA-enabled devices in the region. The DSA-enabled device also may select which DSA network to join if it identifies multiple networks, effectively determining which of the networks will be a cooperative network. In some cases, the DSA-enabled device may be restricted as to which of multiple DSA networks it may join, such as where regulatory requirements or other policy considerations specify networks that a DSA-enabled device may or may not join. As part of the channel and network selection process, the DSA-enabled device may advertise its presence on one or more channels where DSA signals have been detected or that have been identified as empty channels. The DSA-enabled device may then negotiate a communication channel with other DSA-enabled devices in the DSA network. Quality of service (QoS) constraints also may be applied during the channel and network selection process at 3230. For example, if a channel with a high availability is desired, channels where the system has detected no noise, a minimal level of noise, or only a low level of man-made noise may be considered. As another example, a DSA-enabled device may omit channels at which its antenna performs poorly in comparison to other channels. Further details regarding the process by which a DSA-enabled device advertises its presence and joins a DSA network are provided below.

At 3230, the DSA-enabled device may perform network maintenance by maintaining one or more lists of preferred channels as described herein. If the DSA-enabled device determines that it has become disconnected from the DSA network, i.e., it is no longer receiving expected DSA signals, it may return to a detection mode 3210 or otherwise restart the process shown. At 3250, the DSA-enabled device may re-evaluate the channel selected at 3240 to verify that it is still an appropriate channel to use for communicating with cooperative DSA-enabled devices. For example, the DSA-enabled device may examine one or more channels currently in use to determine if non-cooperative signals have been detected.

In some embodiments, the channel selection 3230, network maintenance 3240, and re-evaluation 3250 functions may be considered the entirety of the rendezvous process. In performing the functions shown in FIG. 19, a communication coordinator module may interface with other DSA components such as a spectrum manager, a transceiver API, and other components or modules. For example, the communication coordinator may receive logical channel information such as a candidate channel list from a channel manager, which can be used to negotiate or select a communication channel for use by the DSA-enabled device. The coordinator also may maintain the channel once it is established and manage channel switching in response to changing interference or network capacity conditions identified by a detector and signal classifier.

Figure 20:
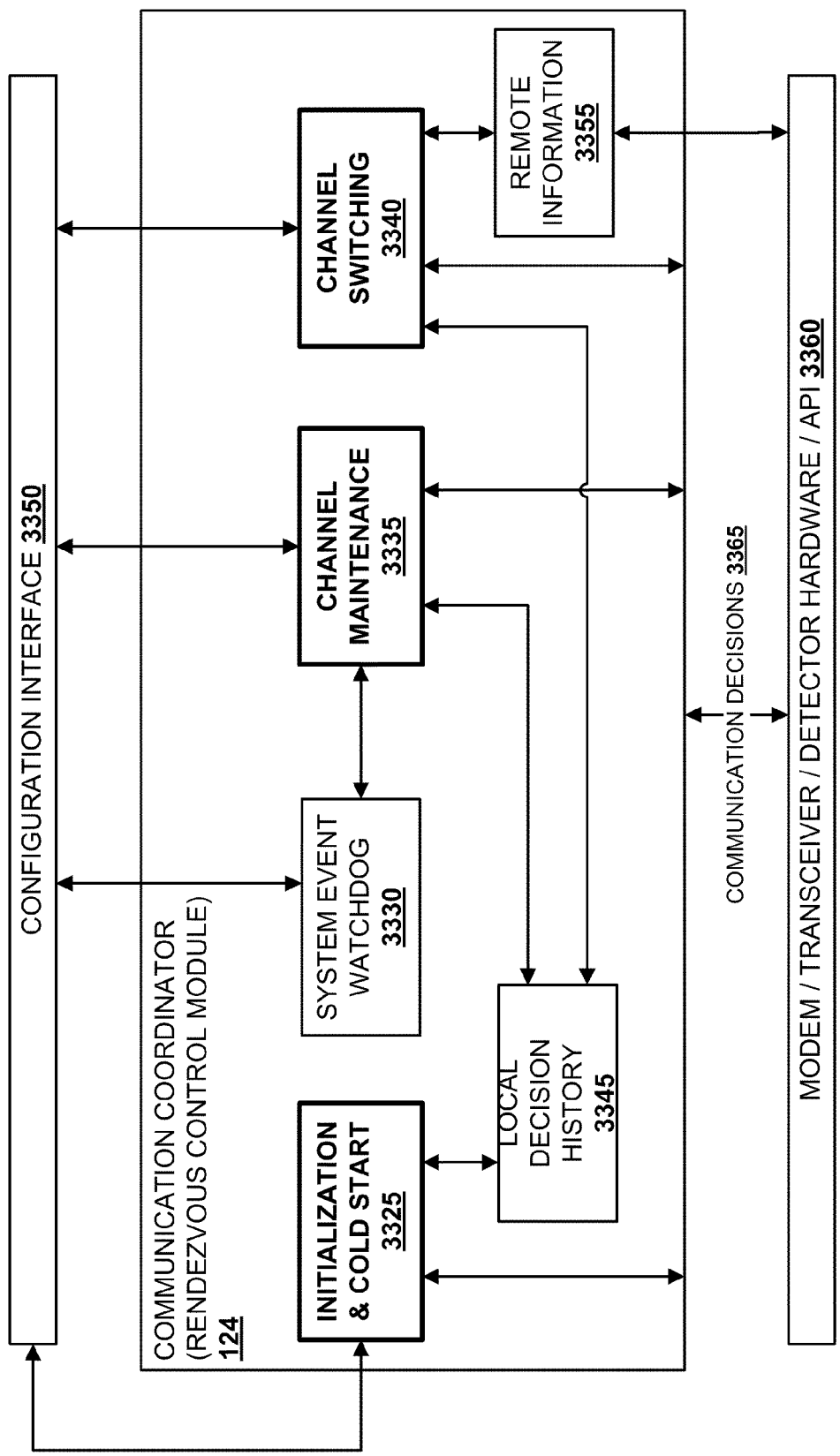
FIG. 20 is a block diagram of an example communication coordinator according to an embodiment of the invention.

FIG. 20 shows the structure of an example communication coordinator according to an embodiment of the invention. Arrows in FIG. 20 represent data flows that may occur between modules or other sources. The coordinator 124 may include separate modules to perform primary functions of the coordinator. For example, as shown in FIG. 20, the communication coordinator may include an initialization/cold start module 3325, a channel maintenance module 3335, and a channel switching module 3340. The initialization module 3325 may perform functions related to initial start-up of a DSA-enabled device, or functions that a DSA-enabled device performs when initially seeking to join an existing DSA network. The channel maintenance module 3335 may coordinate communication with other DSA-enabled devices on a selected channel. The channel switching module 3340 may coordinate movement of the DSA-enabled device from one channel to another, such as when it is determined that DSA-enabled devices in a DSA network should cease use of a particular channel. Each of the initialization, channel maintenance, and channel switching modes is described in further detail below. In general, the communication coordinator 124 will operate in one of these modes at a time. For example, the DSA-enabled device may operate in an initialization mode when first joining a cooperative network, operate in a channel maintenance mode when communicating with cooperative DSA-enabled devices in a DSA network, and operate in a channel switching mode when the DSA-enabled device or network changes communication channels. Each of the three corresponding modules may use and apply separate channel selection criteria so that the DSA-enabled device may use different criteria to classify channels when operating in the different modes. For example, in an initialization mode the DSA-enabled device may search for channels that contain a DSA signal or for empty channels; in maintenance mode the DSA-enabled device may search for empty channels that could be used if the in-use channel must be abandoned. When decisions regarding communication channels are made, they may be communicated 3365 to a modem, transceiver, detector, or other physical or logical interface 3360 to implement. For example, a radio may be tuned to a new channel as part of a channel switching process.

The coordinator 124 may receive information from various sources, such as detectors, users, and policymakers via, for example, a spectrum manager. The information may include, for example, channel ranking data, network topology or other radio input, and radio configuration data such as policy information. This information may be combined with environmental information provided by other DSA-enabled devices to make decisions regarding potential communication channels. For example, the coordinator may receive channel ranking data that describes the DSA-enabled device's relative preference for certain channels, such as generated by a channel manager as described herein. The coordinator also may receive network, topology, and radio data 3315 that provides information about network conditions. Policy requirements also may be received that specify operational constraints for the DSA. Remote rendezvous data, such as information regarding potential channel changes identified or suggested by cooperative DSA-enabled devices, may be provided to the channel switching module 3340 for use during channel switching operations or to initiate a channel move. Data used by the communication coordinator may be filtered through a policy module 140 as described with respect to FIGS. 1-2 and be delivered via a configuration interface 3350. For example, the policy module may identify certain channels that should not be used, and may accordingly alter the channel list provided to the communication coordinator by the channel manager 132. For example, a DSA-enabled device may receive a suggestion of a channel to use for communicating with a remote DSA-enabled device from the remote DSA-enabled device. The local policy module 140 may, via configuration interface 3350, indicate that the suggested channel is disallowed, such as due to historical data indicating non-cooperative use of the channel as collected by the local DSA-enabled device. Other considerations may cause the policy module to restrict use of some channels as described in further detail herein.

The coordinator 124 may store a local decision history 3345 that tracks channel data and channel selections made by the DSA-enabled device for later use by the coordinator 124. For example, a communication channel may be selected based on information received from a spectrum manager. Later, it may be determined that the selected channel was undesirable or less than optimal, such as where the spectrum manager did initially not have data indicating an existing adverse frequency condition in the selected channel. The coordinator may cause the DSA-enabled device to move to a new channel (i.e., cease use of the initially-selected channel and begin using a different channel), and store the initial decision to use the channel, and the resulting channel change in the local history 3345. If the same channel is again indicated as available at a later time, the coordinator may consult the local history to verify that the channel is not known to be occupied or otherwise undesirable. Upon doing so, the coordinator may use the previous channel change as evidence that the seemingly-available channel is non-optimal and, therefore, may select a different channel.

The coordinator also may include a system event watchdog module 3330. The watchdog module may monitor channel data, such as data received and processed by the channel maintenance module 3335. Upon detection of an adverse frequency condition, such as detected interference with a non-cooperative device, or detection of a signal indicating the presence of a non-cooperative device in a chosen channel, the watchdog 3330 may initiate a channel change. The watchdog module also may receive messages indicating a channel change, such as when a signal classifier generates a channel switch trigger as previously described.

A communication coordinator according to embodiments of the present invention may not include each and every module or function described. For example, a local decision history may not be maintained. As another example, a separate or dedicated detector may be omitted, and a DSA-enabled device may instead use a radio for both network detection and communication with other DSA-enabled devices.

The communication coordinator 124 and each module therein may be implemented as a general-purpose processor in combination with instructions stored in a computer-readable storage medium. When the processor executes the instructions, it may perform the functions and methods described. The general-purpose processor also may be transformed into a special-purpose computing device by implementing the instructions. The communication coordinator 124 and modules therein also may be implemented in a special-purpose processor and/or additional circuitry specifically designed to implement the functions and methods described.

Figure 21A:
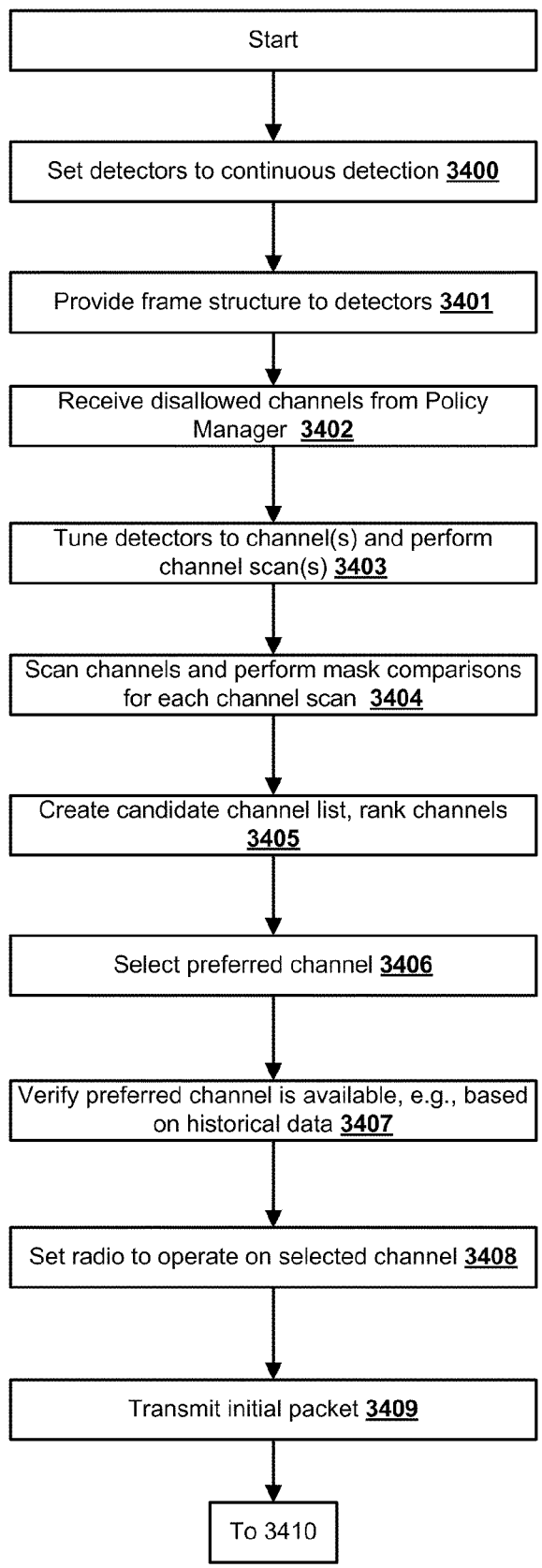
FIG. 21A shows an example process flow for a base station in a startup mode according to an embodiment of the invention.
Figure 21B:
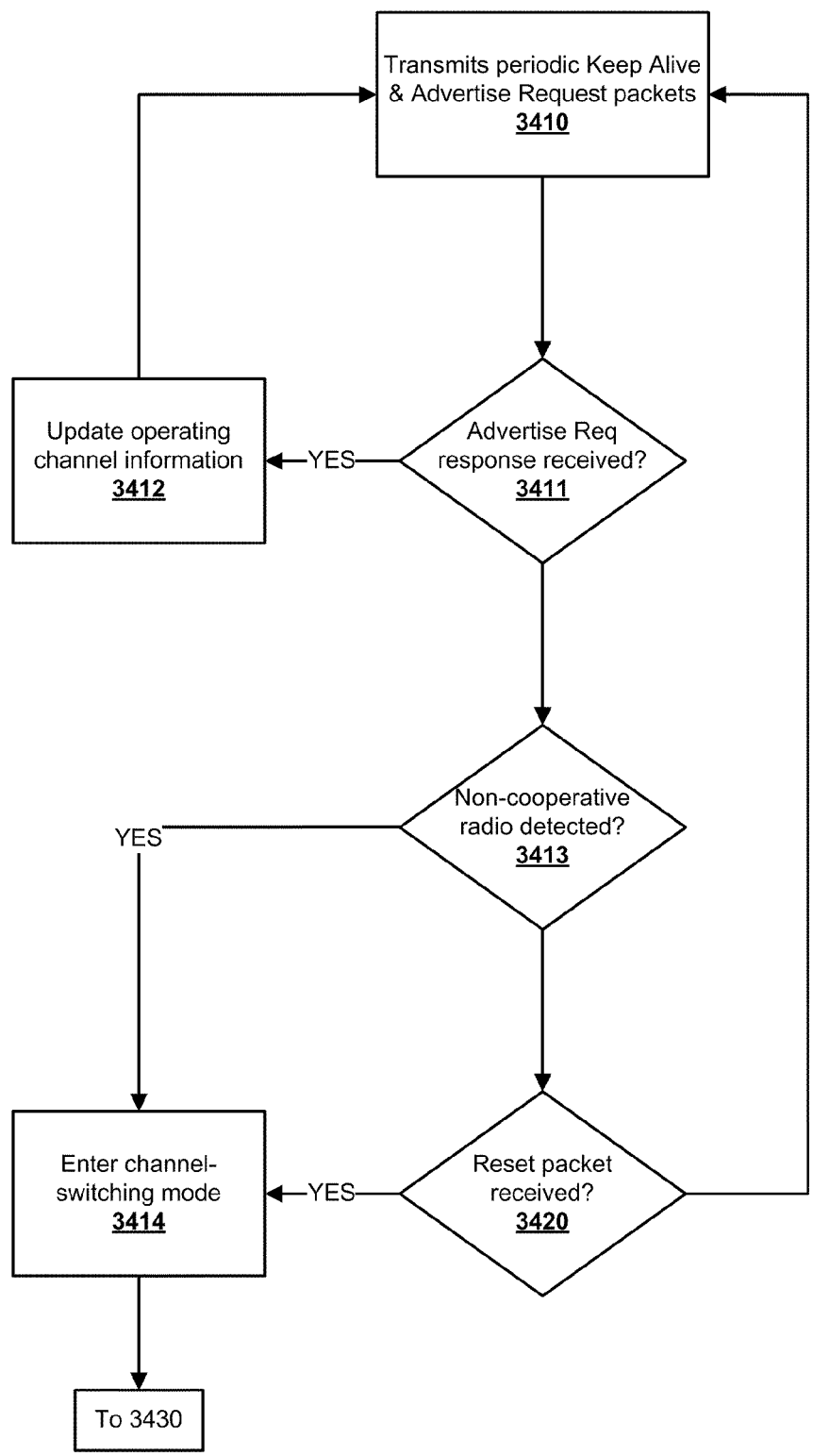
FIG. 21B shows an example process flow for a base station in a channel maintenance mode according to an embodiment of the invention.
Figure 21C:
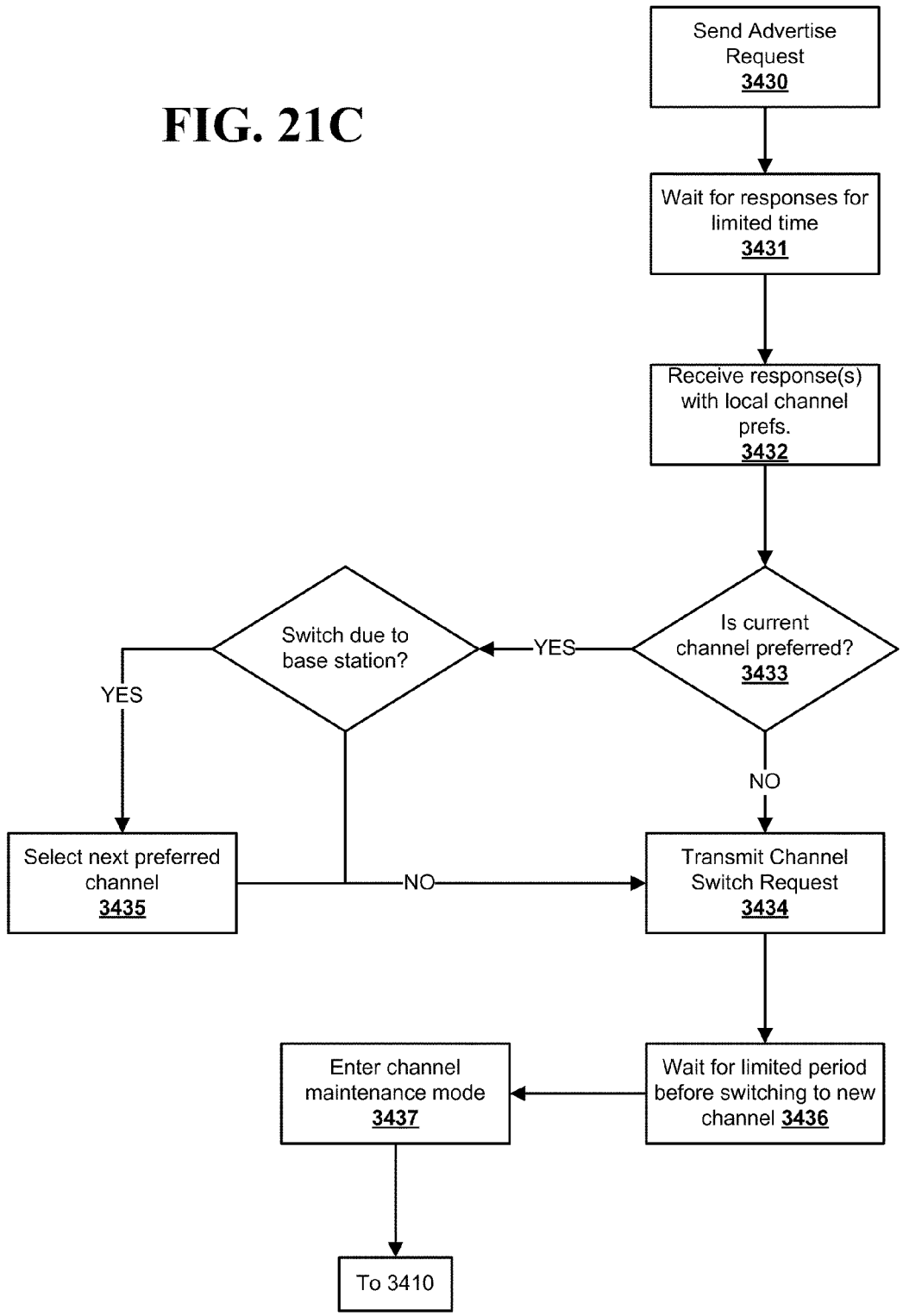
FIG. 21C shows an example process flow for a base station in a channel switching mode according to an embodiment of the invention.
Figure 21D:
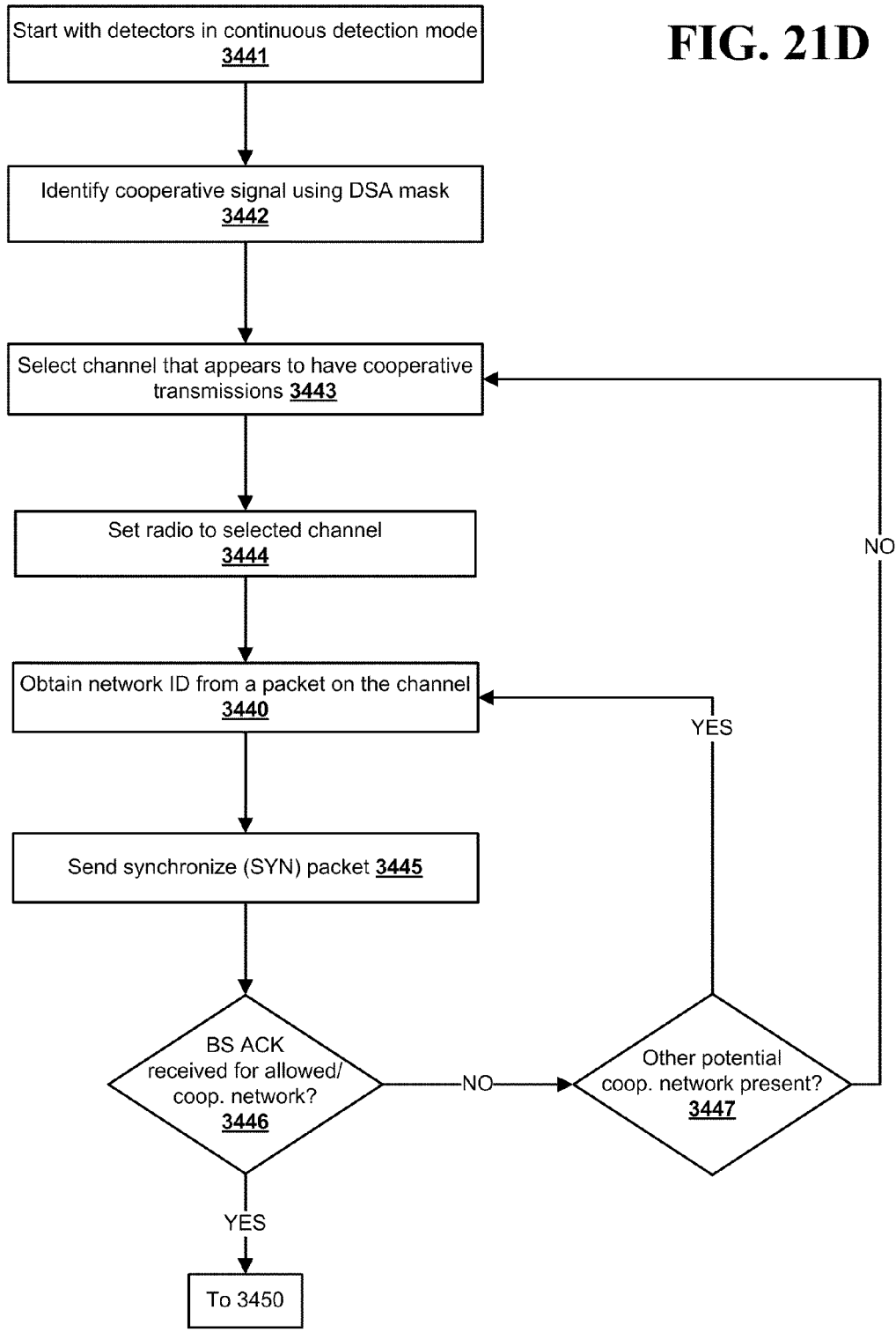
FIG. 21D shows an example process flow for a subscriber DSA-enabled device in a startup mode according to an embodiment of the invention.
Figure 21E:
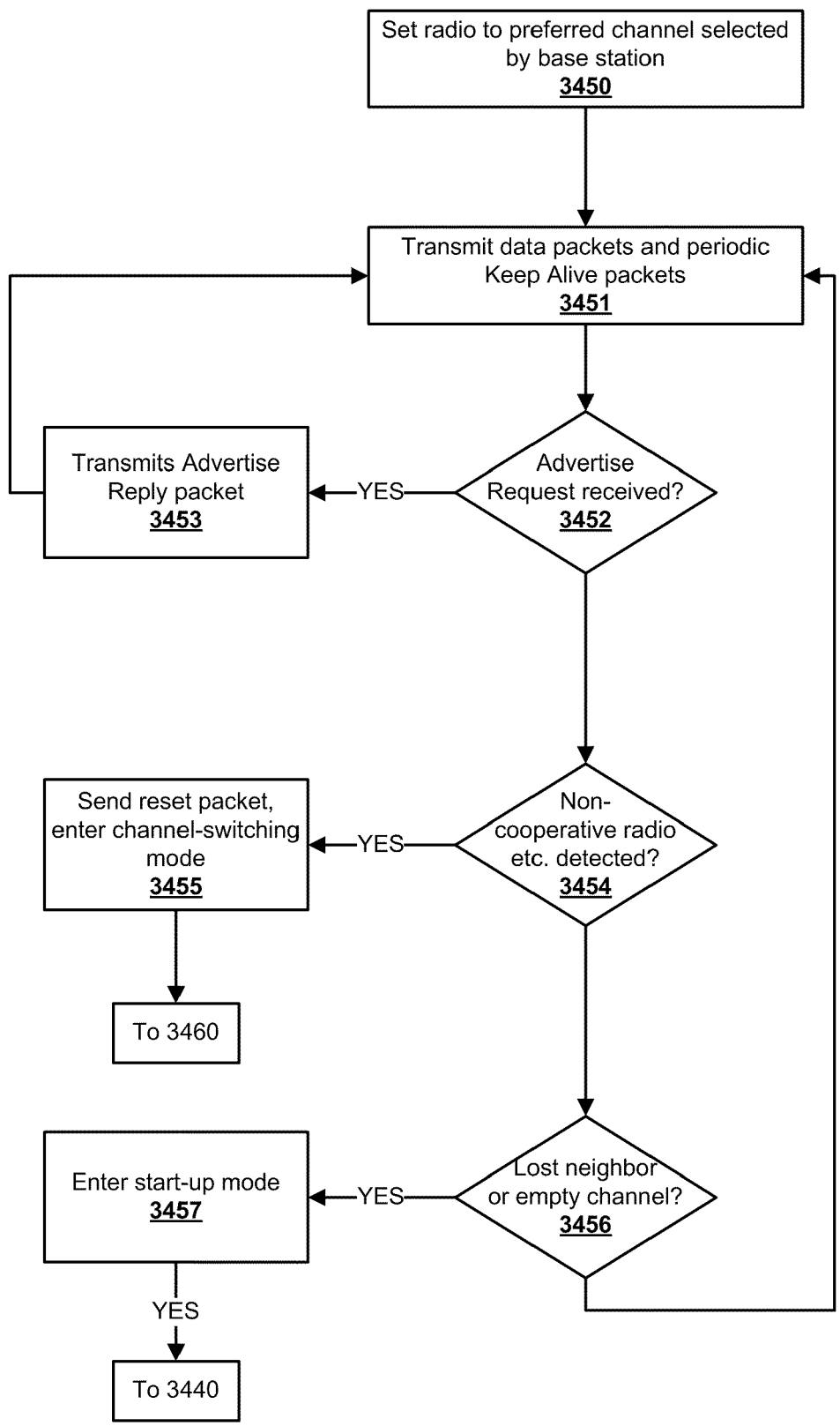
FIG. 21E shows an example process flow for a subscriber DSA-enabled device in a channel maintenance mode according to an embodiment of the invention.
Figure 21F:
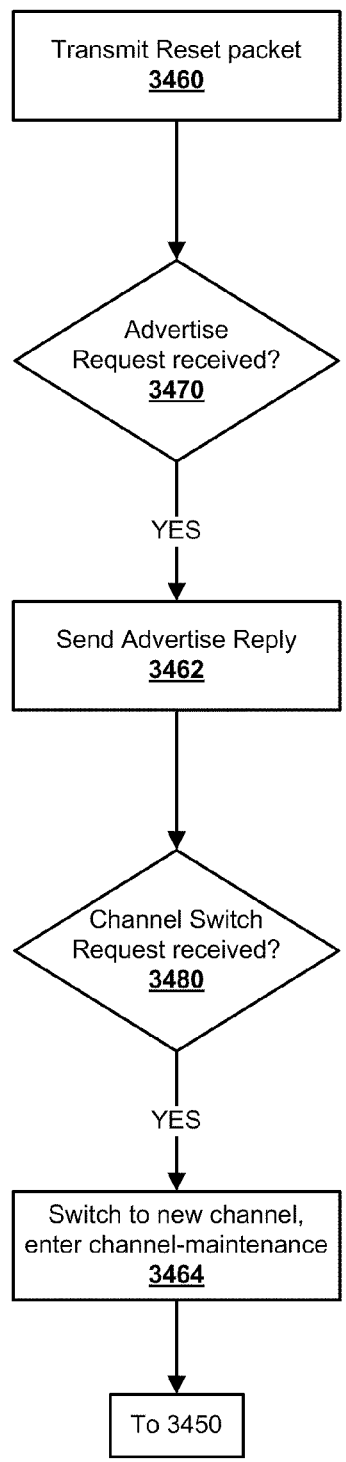
FIG. 21F shows an example process flow for a subscriber DSA-enabled device in a channel switching mode according to an embodiment of the invention.
Figure 22A:
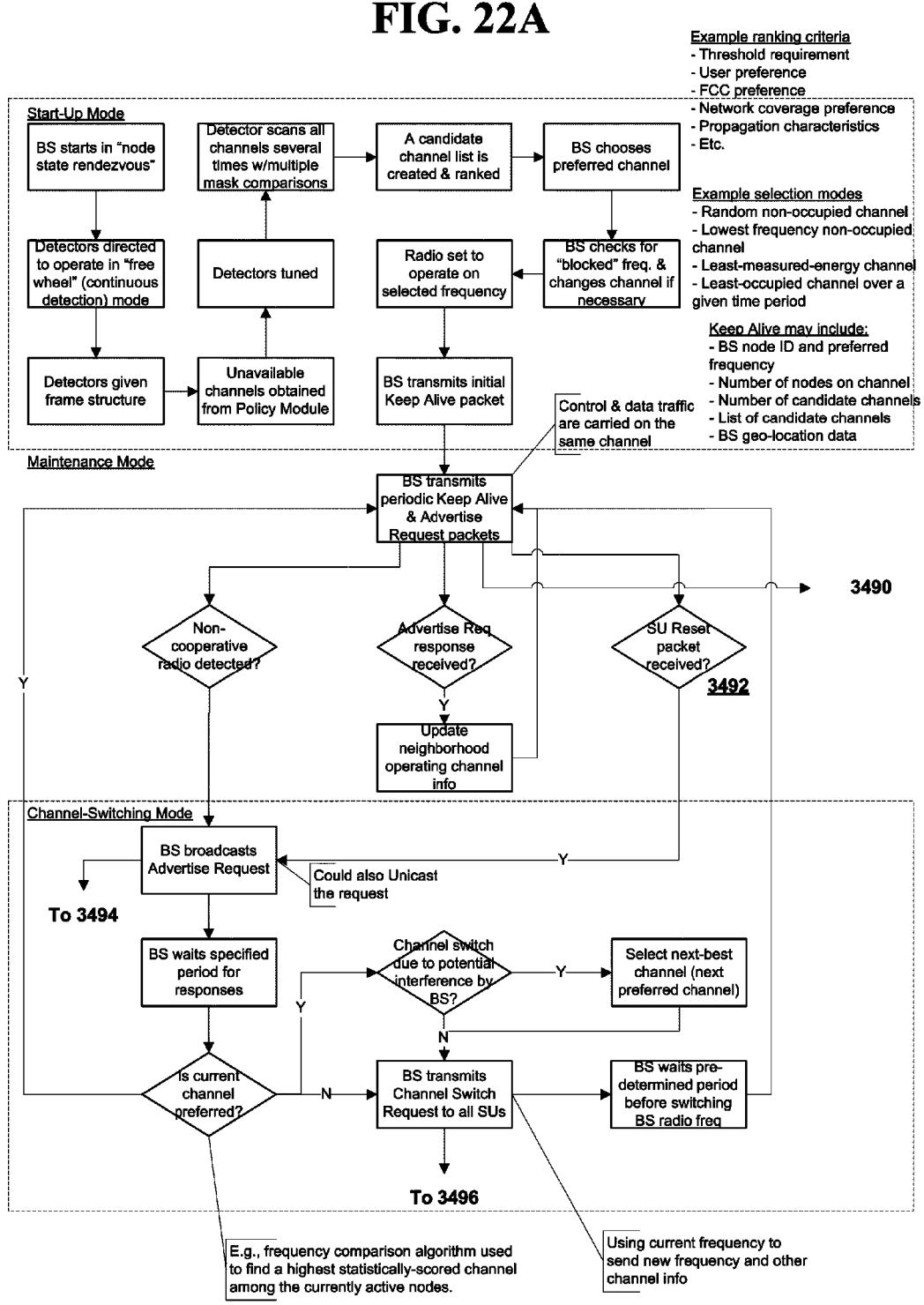
FIG. 22A shows an example process flow for a base station during a communication coordination process according to an embodiment of the invention.
Figure 22B:
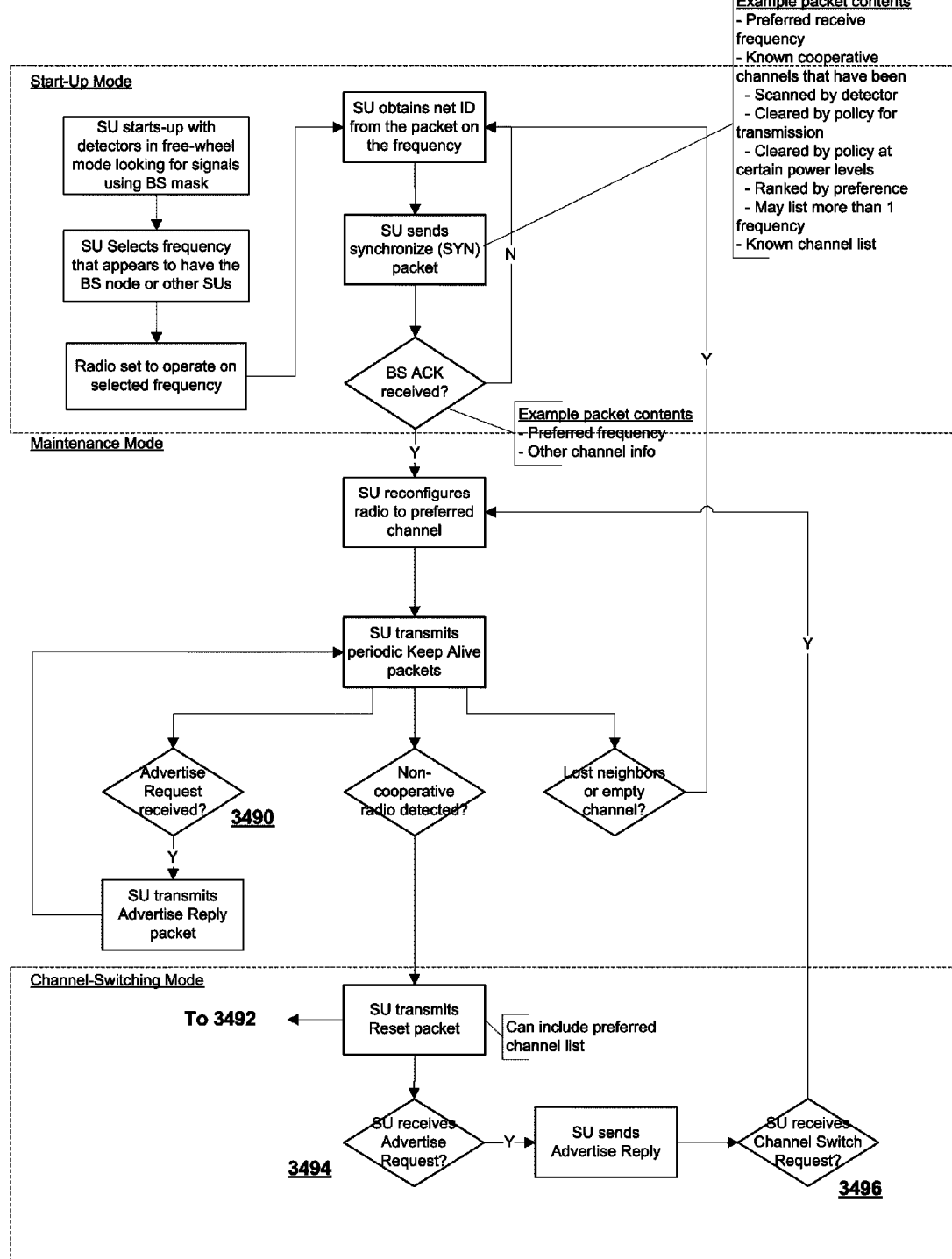
FIG. 22B shows an example process flow for a subscriber DSA-enabled device during a communication coordination process according to an embodiment of the invention.

FIGS. 21 and 22 show example process flows for performing DSA discovery and communication coordination according to embodiments of the invention. The various steps and functions may be performed by one or more communication coordinator modules in one or more DSA-enabled devices. FIGS. 21A-C show methods that may be performed by a base station during communication coordination according to embodiments of the invention. FIGS. 21D-F show methods that may be performed by a subscriber unit during communication coordination according to embodiments of the invention. FIG. 22A shows an example of the entire coordination process for a base station or similar DSA-enabled device according to an embodiment of the invention. Similarly, FIG. 22B shows an example of the entire coordination process for a subscriber unit according to an embodiment of the invention.

FIG. 21A shows an example process for a base station startup mode according to an embodiment of the invention. The process may begin, for example, upon a cold start of the DSA-enabled device. At 3400, the DSA-enabled device may enter a continuous detection, or "free wheel" mode, in which only detection is performed. At 3401, the detectors are provided with a data link layer frame structure that defines the timing of detections to be performed by the detectors. At 3402, a list of disallowed channels may be received from a policy manager or other source of policy information, which indicates channels or spectrum regions that the DSA-enabled device is not allowed to use for DSA communications, such as for regulatory, geographic, or other reasons as described herein. The detectors may be tuned to the appropriate channels as specified in the frame structure at 3403. At 3404 the detectors may scan the spectrum ranges associated with the channels one or more times. As described in further detail below, at 3404 potential signals detected by the detectors may be filtered through a signal classifier, such as by using one or more signal masks, to identify specific signals or types of signals. Where a channel is scanned multiple times, a signal mask comparison may be applied for each scan. Based on data received from the detectors, classification information and decisions, and policy requirements, a list of potential channels to be used for DSA communications may be generated and ranked at 3405. Examples of criteria applied to rank channels include threshold requirements that may indicate whether detected energy represents noise or a signal, detector threshold (the amount of energy required for a detector to indicate the presence of a signal), user preferences, preferences set by a regulatory agency, network coverage, and propagation characteristics of certain spectral regions. As a specific example, a channel may be required to have energy measurements below a certain level for a specified number of consecutive measurements before the channel is considered to be available for use by the DSA system. Other criteria may be applied. Further details regarding the process of ranking channels is described in further detail below.

At 3406, a preferred channel may be selected. The preferred channel is the channel the DSA-enabled device has identified as being the preferred match to the ranking criteria and policy requirements. Different selection modes may be used. That is, the communication coordinator may use different methods to select a preferred channel from multiple channels that meet the selection criteria and policy requirements. Examples of different selection modes include selecting a random, non-occupied channel, selecting the lowest-frequency non-occupied channel, selecting a channel in which the least total energy was detected, and selecting a channel that is least-occupied over a given time period. Other selection modes may be used. At 3407, the DSA-enabled device may verify that the preferred channel is not "blocked" from being used. For example, historical channel data may be consulted to verify that the selected preferred channel is not actually available or otherwise is a poor choice for use by the DSA-enabled device. The use of historical channel data is described in further detail herein.

At 3408, the DSA-enabled device's radio may be set to operate on the selected channel, i.e., to send and receive DSA communications on that channel. The DSA-enabled device may then send an initial packet at 3409. In some embodiments, the initial packet sent by a base station may include an ID of the base station, the preferred channel, the number of DSA-enabled devices operating on the channel of which the base station is aware, the number of candidate channels identified at 3405, the list of candidate channels identified at 3405, the rankings of channels generated at 3405, information about the DSA-enabled device's geographical location (e.g., latitude and longitude of the DSA-enabled device), and combinations thereof. Other data may be included. After transmitting the initial packet at 3409, the DSA-enabled device may enter a channel maintenance mode.

FIG. 21B shows an example process for a base station operating in a channel maintenance mode according to an embodiment of the invention. At 3410, the DSA-enabled device may periodically send Keep Alive and/or Advertise Request packets. In general, these packets may be sent to all DSA-enabled devices in a network or in a geographic region, or may be broadcast generally for reception by any DSA-enabled device capable of receiving them. Such packets may be used, for example, to keep subscriber units informed about the channel environment (such as preferred channel, known DSA channels, channel list, etc.) as detected by the base station. For example, a Keep Alive packet typically provides network information from the sending DSA-enabled device's perspective to other DSA-enabled devices in the network, such as when a base station provides network information to subscriber DSA-enabled devices. Advertise requests typically may request data from other DSA-enabled devices, such as when a base station requests subscriber DSA-enabled devices to provide network or other data to the base station. A DSA-enabled device that is attempting to connect to a base station may attempt to decode received packets to determine if they have been sent by a base station and, if the DSA-enabled device is able to decode the packet, may then analyze it to determine whether the address of the sending base station matches a desired address. For example, a signal classifier in the DSA-enabled device attempting to join a DSA network may identify an Advertise Request packet as having been sent by a DSA-enabled device.

As described in further detail elsewhere herein, the information provided in the packets sent by the base station may be stored in a neighborhood data structure maintained by other DSA-enabled devices in the DSA network. In some embodiments, control packets (including Keep Alive, Advertise Request, and other control packets) may be sent on the same channel or channels as data packets. In other embodiments, separate control channels may be used. At 3411, when the DSA-enabled device receives a response to an Advertise Request, it may update stored information regarding DSA-enabled devices in the network at 3412 and continue periodically transmitting Keep Alive and Advertise Request packets. For example, the response may indicate that a new DSA-enabled device has joined the network, and the base station may update the list of DSA-enabled devices in the network. If a non-cooperative radio is detected at 3413 or if a reset packet is received from a DSA-enabled device in the network at 3420, the base station may enter a channel-switching mode 3414. A reset packet may be sent by a DSA-enabled device in the network, for example, if the DSA-enabled device detects a non-cooperative DSA-enabled device using the preferred channel. It will be understood that the reception of an Advertise Request response, detection of a non-cooperative device and/or reception of a reset packet may not occur, may not occur at any particular time, and may not occur in any particular order. Thus, the specific flow shown in FIG. 21B is intended only as an example.

During a channel maintenance mode, a DSA-enabled device may detect a problem with the current operating channel. Examples of problems that may occur with a channel include conditions such as lost neighbors (DSA-enabled devices previously in the network that leave unexpectedly), an empty channel, detection of a non-cooperative signal on a channel being used by the DSA-enabled device, or a channel for which the DSA communications may be expected to cause interference, and other adverse conditions. Detecting a non-cooperative radio may cause the base station to designate the current operating channel as in use by a non-DSA system. In the case of a lost neighbor, the base station may periodically cycle through clear channels and transmit Keep Alive packets to attempt to relocate the missing DSA-enabled device. In an embodiment, detecting a non-cooperative device, identifying a potential for interference on a current channel, or otherwise detecting an adverse condition may cause the base station to enter a channel switching mode.

FIG. 21C shows an example process for a base station operating in a channel switching mode according to an embodiment of the invention. At 3430, the base station may transmit an Advertise Request upon detecting an adverse condition such as a non-cooperative signal. At 3431 the base station may then wait a period of time to receive one or more Advertise Replies from other DSA-enabled devices in the network at 3432. In an embodiment, the base station may wait a set period of time to receive replies. Advertise Replies may include available channel information based on spectrum detections performed by other DSA-enabled devices in the network and, therefore, may provide the base station the latest view of available channels as detected by the subscriber units. For example, Advertise Request responses may include channel preferences or ranked channel information from the responding DSA-enabled devices. At 3433, the base station may identify a new preferred channel and determine whether the new preferred channel is the same as a currently-used channel. For example, the base station may select an available channel that is most common to or preferred by a majority of or all other DSA-enabled devices that respond to the Advertise Request. The current channel may not be identified as the preferred channel, for example, when one or more DSA-enabled devices has sent a reset signal, or where a non-cooperative signal has been detected on a channel being used by the network. The current channel may be identified as the preferred channel, for example, when detected non-cooperative interference is limited to a relatively small number of DSA-enabled devices in the DSA network, in which case such DSA-enabled devices may disconnect from the network.

In an embodiment, the base station also may select a channel that is unavailable to one or more DSA-enabled devices but is preferred for other DSA-enabled devices in the network, which may cause those DSA-enabled devices for which the selected channel is unavailable to disconnect from the network.

In an embodiment, a channel comparison algorithm may be used to find a highest statistically-scored channel among the currently-active or responding DSA-enabled devices. For example, each DSA-enabled device in a DSA network may maintain a ranked list of locally-preferred channels. When a channel change is indicated, the base station may request these ranked lists from the other DSA-enabled devices in the network, compare the ranked lists to each other and to the base station's ranked list, and select a common preferred channel using a statistical algorithm. As a specific example, in some embodiments, the following general algorithm may be used:

1. For each region of spectrum or set of channels, at each channel within the region not being used by the DSA-enabled network, the quality of the channel is recorded and the number of cooperative devices that can use the channel is counted.
2. If more devices can use this channel than the previously-selected channel, or the channel is wider and can be used by at least as many devices as the previously-selected channel, or the channel is a higher-quality channel than the previously-selected channel, then select this channel.
3. Otherwise, continue using the present channel and repeat 1-2 for the next channel or region of spectrum.

If the current channel is identified as the new preferred channel, and the base station did not initiate the channel switching procedure because it detected a non-cooperative signal, communication may be maintained on the same channel and the base station may send a channel switch request at 3434. If unable to change to the new channel, one or more devices in the network may leave the network to avoid interference with non-cooperative signals as previously described. If the channel change results from an adverse condition detected by or caused by the base station, the base station may select the next preferred channel at 3435 and base station may transmit a Channel Switch Request packet to DSA-enabled devices in the network at 3434 to notify them of the new operating channel. The current channel may be used to send information about the newly-selected channel. After sending a channel switch request, the base station may wait a finite amount of time at 3436 before re-tuning its own radio to the new operating channel to transmit and receive data, and then enter a channel maintenance mode at 3437. A DSA-enabled device that receives the channel switch request may change its operating channel accordingly and may also enter a channel maintenance mode.

FIG. 21D shows an example process performed by a subscriber DSA-enabled device operating in a start-up mode according to an embodiment of the invention. The DSA-enabled device may start at 3441 with one or more detectors in a "free-wheel," or continuous detection, mode. The detectors may detect energy in one or more channels. A DSA signal mask may be applied to the detected energy at 3442 to identify detected DSA signals. At 3443, the DSA-enabled device may select a channel that appears to have DSA or cooperative transmissions, and tune its own radio to the channel at 3444. A network identifier may be obtained from a packet received on the selected channel at 3440. The identifier may indicate, for example, the identity of a base station or other cooperative DSA-enabled device in the network. The subscriber DSA-enabled device may retrieve a desired base station identifier and/or a preferred operating frequency or channel from a file, or it may obtain or calculate this information based on observed or received signals. If the identifier in a received packet matches a desired or allowed network, the DSA-enabled device may then join the network. In an embodiment, the DSA-enabled device may be configured to use one or more pre-defined networks, each of which may have a unique network identifier. Control information, such as included in a Keep Alive packet, may be transmitted according to a known modulation and data rate format to allow DSA-enabled devices to retrieve the identifier. For example, a modulation scheme may be defined for DSA packet headers, and during operation a packet header may contain a description of the modulation used for the remainder of the packet. A DSA-enabled device also may use an analysis scheme, such as constellation analysis, to determine the modulation scheme used for a received packet, and operate on that scheme while processing the packet. A DSA-enabled device also may operate using its own modulation scheme in response to receiving a packet from another DSA-enabled device, thus placing the burden on the other DSA-enabled device to change modulation schemes to match. DSA-enabled devices also may be able to operate in multiple configurations, one of which is selected by the base station. To join a network, the DSA-enabled devices may try each of the pre-determined configurations until they are able to successfully retrieve the network identifier from a received packet. Pre-defined modulation schemes also may be used for beacon signals. When a DSA-enabled device locates such a signal, the presence of the beacon signal and corresponding modulation scheme would strongly indicate the presence of another DSA-enabled device. Similarly, a DSA-enabled device may be configured to search for cooperative devices on one or more pre-defined channels or regions of spectrum, for example to enable a DSA-enabled device to rapidly locate a cooperative base station when initializing from a cold start.

Still referring to FIG. 21D, after finding and identifying a base station based on identification of a cooperative signal, the subscriber may send a synchronize packet (SYN) to the base station at 3445. The Synchronize packet may contain the same or similar channel information as contained in a Keep Alive packet, such as channel usage data observed or measured by the subscriber DSA-enabled device. For example, it may contain the DSA-enabled device's preferred channel, known cooperative channels that have been detected by the DSA-enabled device, known cooperative channels that have been cleared by a policy module for transmission or cleared for transmission at certain power levels, a list of known channels, or combinations thereof. The channels may be ranked by preference, and more than one channel may be listed. After sending the SYN packet at 3445, a subscriber DSA-enabled device may wait to receive an Acknowledgement (ACK) packet from the base station. The ACK may contain a preferred channel on which the subscriber DSA-enabled device should operate. It may also contain other channel information. If the subscriber device receives an acknowledgement from a cooperative base station at 3446 (i.e., a base station with which the subscriber device is allowed or configured to form a cooperative network), the subscriber DSA-enabled device may enter a channel maintenance mode at 3450. If no ACK packet is received after a certain time, the DSA-enabled device may conclude that there is not a cooperative base station on the selected channel, and/or that the packet received at 3440 is not from a network the DSA-enabled device can join. The DSA-enabled device then may look for another DSA packet, such as a packet having a different network or base station ID at 3440, and/or the DSA-enabled device may select another channel 3443 on which it previously identified a cooperative or potentially-cooperative transmission. For example, if the DSA-enabled device has detected another potential DSA-enabled network on the same channel or channels at 3447, it may return to 3440 to obtain a new network ID. Otherwise, it may return to 3443 to identify a new channel that has a potential cooperative signal.

FIG. 21E shows an example process performed by a subscriber DSA-enabled device operating in a channel maintenance mode according to an embodiment of the invention. After tuning its radio to operate at a preferred channel at 3450 selected by a base station as previously described, the DSA-enabled device may send data packets to the associated base station, and may periodically send a Keep Alive packet to the associated base station at 3451. The subscriber DSA-enabled device also may respond to an Advertise Request received from the base station at 3452 by sending an Advertise Reply packet at 3453 as previously described. Advertise Reply packets may provide channel information obtained by the subscriber DSA-enabled device, so as to inform the base station of the channel environment as detected by the subscriber unit. The channel information may include, for example, a list of channels locally preferred by the DSA-enabled device, known DSA channels, a candidate channel list, and other data. This information may be stored in a neighborhood data structure at the subscriber unit and/or at the base station, and may be used during channel switching operations as previously described. It will be understood that the reception of an Advertise Request response, detection of a non-cooperative device and/or detection of a lost neighbor or empty channel may not occur, may not occur at any particular time, and may not occur in any particular order. Thus, the specific flow shown in FIG. 21E is intended only as an example.

During the channel maintenance mode, the subscriber DSA-enabled device may detect a problem with the current operating channel at 3454 and 3456. Examples of problems that may occur with a channel include conditions such as lost neighbors (i.e., unexpected absence of a DSA-enabled device previously in the network), an empty channel, detection of a non-cooperative radio signal, and other adverse conditions. Upon detecting an adverse condition at 3454, the DSA-enabled device may send a reset packet at 3455.

Different adverse conditions may cause the DSA-enabled device to take various actions or enter other modes. For example, if the DSA-enabled device detects a lost neighbors or an empty channel, the DSA-enabled device may enter a startup mode, such as the mode described with respect to FIG. 21D. If the DSA-enabled device detects a non-cooperative radio or signal, it may enter a channel switching mode.

FIG. 21F shows an example process for a subscriber DSA-enabled device in a channel switching mode according to an embodiment of the invention. The subscriber DSA-enabled device may send a Reset packet at to the base station at 3460 upon detecting a non-cooperative signal or other adverse condition as previously described. The Reset packet may include spectrum usage information, information about the subscriber DSA-enabled device's channel preferences, or other data. The base station may send an Advertise Request that is received by the DSA-enabled device at 3470. As previously described, the DSA-enabled device may send an Advertise Reply at 3462 that is received by the base station and used to determine a common channel among the subscriber unit channel lists. After selecting a channel, the base station may send a Channel Switch Request, change the current communication channel, and transition back to a channel maintenance mode as previously described. A subscriber DSA-enabled device may receive the Channel Switch Request at 3480 and tune its radio to the new communication channel accordingly at 3464. The subscriber DSA-enabled device may then return to a Channel Maintenance mode.

It will be noted that although various packets used during the communication coordination processes are referred to herein using specific names, these names may not describe any specific function or content of the various packets. For example, a keep-alive packet or a synchronize packet may contain additional information, such as channel or frequency information, DSA-enabled device channel preference information, detected environmental conditions, or other data.

Figure 23A:
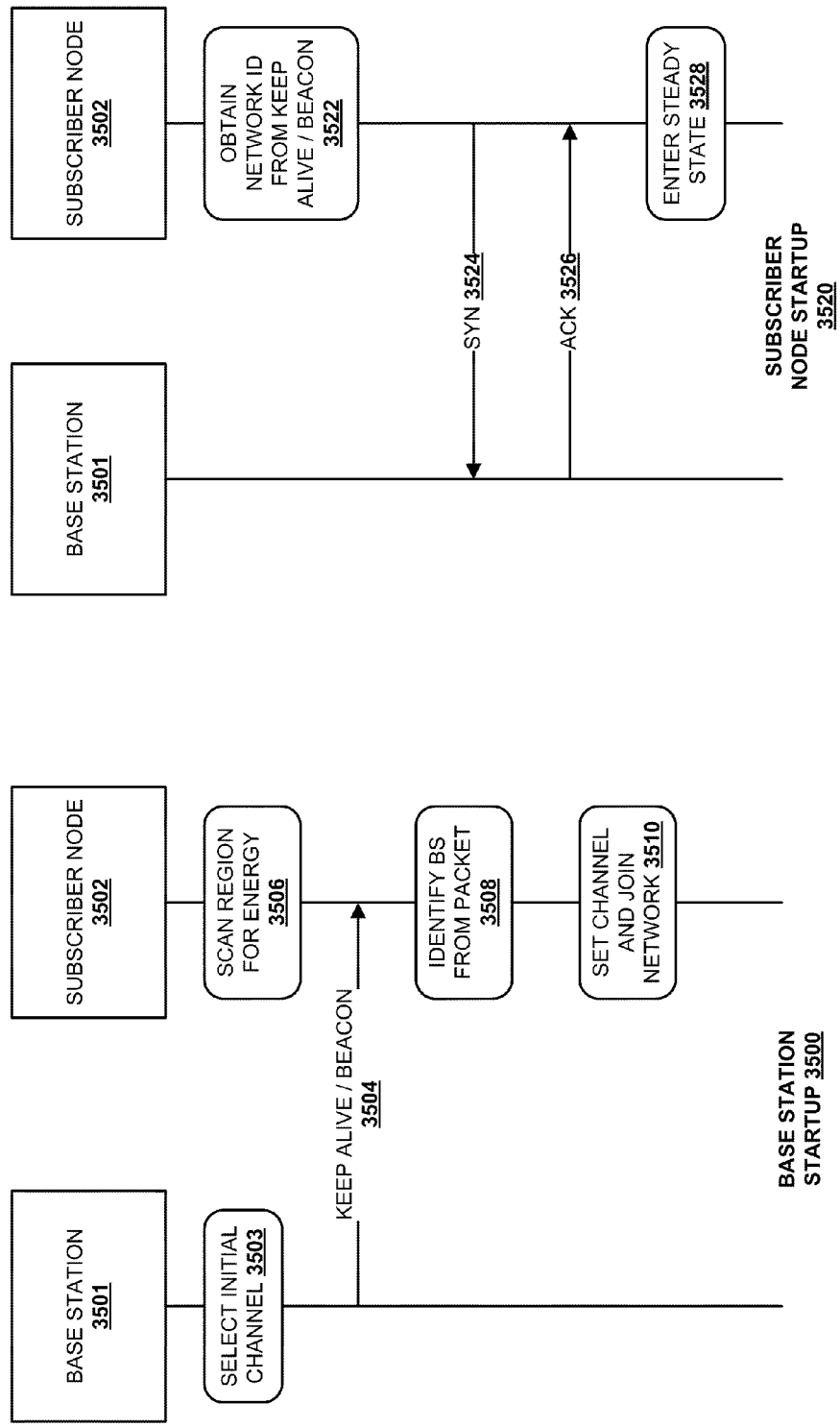
FIG. 23A shows an example communication flow between a base station and a subscriber DSA-enabled device during a startup sequence according to an embodiment of the invention.

FIGS. 23A-D show example message flows for communication coordination according to embodiments of the invention. FIG. 23A shows an example communication flow between a base station and a subscriber DSA-enabled device during a startup sequence. In a base station startup sequence 3500, a base station 3501 may select an initial channel on which to conduct DSA communication at 3503 and begin sending Keep Alive or beacon packets 3504, as previously described. A subscriber DSA-enabled device 3502 may begin by performing spectrum detection (scanning) a geographic and/or spectral region for energy. The subscriber DSA-enabled device may detect and decode a packet sent by the base station at 3504 and identify the base station or DSA network based on information in the packet at 3508. The subscriber DSA-enabled device may then tune its radio to a channel specified in the packet 3504 and join the DSA network at 3510. In a subscriber DSA-enabled device startup sequence 3520, the subscriber DSA-enabled device may obtain a network identifier from a Keep Alive or beacon signal at 3522, and send a Synchronize (SYN) packet to the base station at 3524. The base station may reply with an Acknowledgement (ACK) at 3526, at which point the subscriber DSA-enabled device enters a steady state mode at 3528 in which it can send and receive data within the DSA network.

Figure 23B:
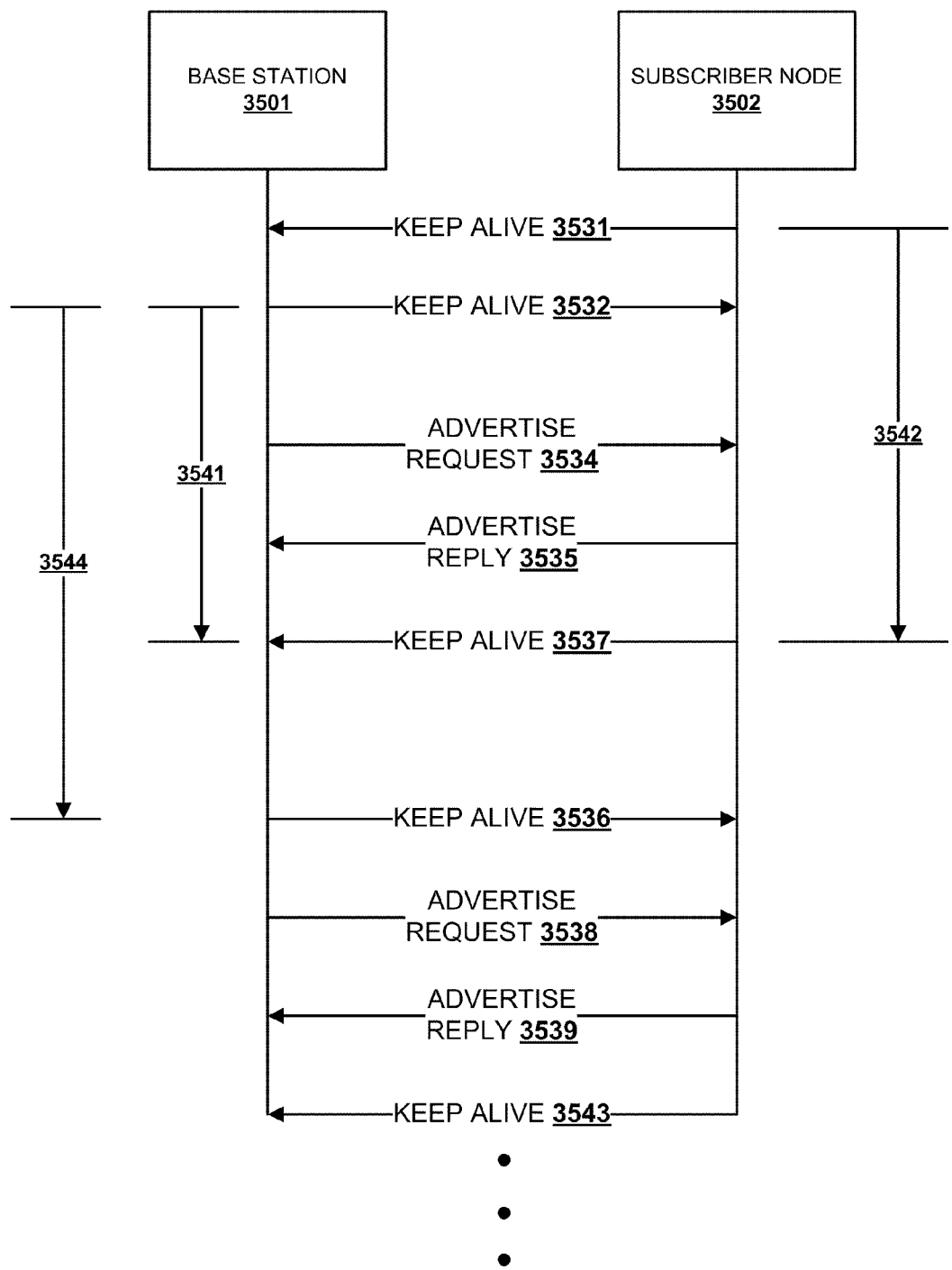
FIG. 23B shows an example communication flow between a base station and a subscriber DSA-enabled device during channel maintenance according to an embodiment of the invention.

FIG. 23B shows an example communication flow between a base station and a subscriber DSA-enabled device during channel maintenance. As previously described, the base station 3501 may periodically send Keep Alive packets 3532, 3536 and Advertise Request packets 3534, 3538 to the subscriber DSA-enabled device 3502, and the subscriber DSA-enabled device may periodically send Keep Alive packets 3531, 3537, and/or 3543, and Advertise Reply packets 3535, 3539 to the base station, with the Advertise Reply packets being sent in response to Advertise Request packets. The Advertise Request packets may provide the BS with channel environment information, such as one or more locally-preferred receive frequencies, known DSA channels, a candidate channel list and other network information as seen by the subscriber DSA-enabled device. Each DSA-enabled device may measure one or more time periods 3541, 3542, which may be used to determine whether a DSA-enabled device has become disconnected from the network. For example, the base station 3501 may measure the time period between sending a Keep Alive packet 3532 and receiving a Keep Alive packet 3537 from the subscriber DSA-enabled device 3502. If the period 3541 exceeds a certain time limit, the base station may determine that the subscriber DSA-enabled device 3502 is no longer available, may cease communicating with the subscriber DSA-enabled device (such as to avoid engaging in unacceptably-delayed communications), or may take other action with respect to the DSA-enabled device. As another example, a time period 3542 may indicate how often a DSA-enabled device sends a Keep Alive packet even in the absence of a request from the base station. Similarly, a time period 3544 may indicate how often the base station sends a Keep Alive packet to the subscriber DSA-enabled device. Other combinations of Keep Alive packets, Advertise Request/Reply packets, and associated time periods may be used.

Figure 23C:
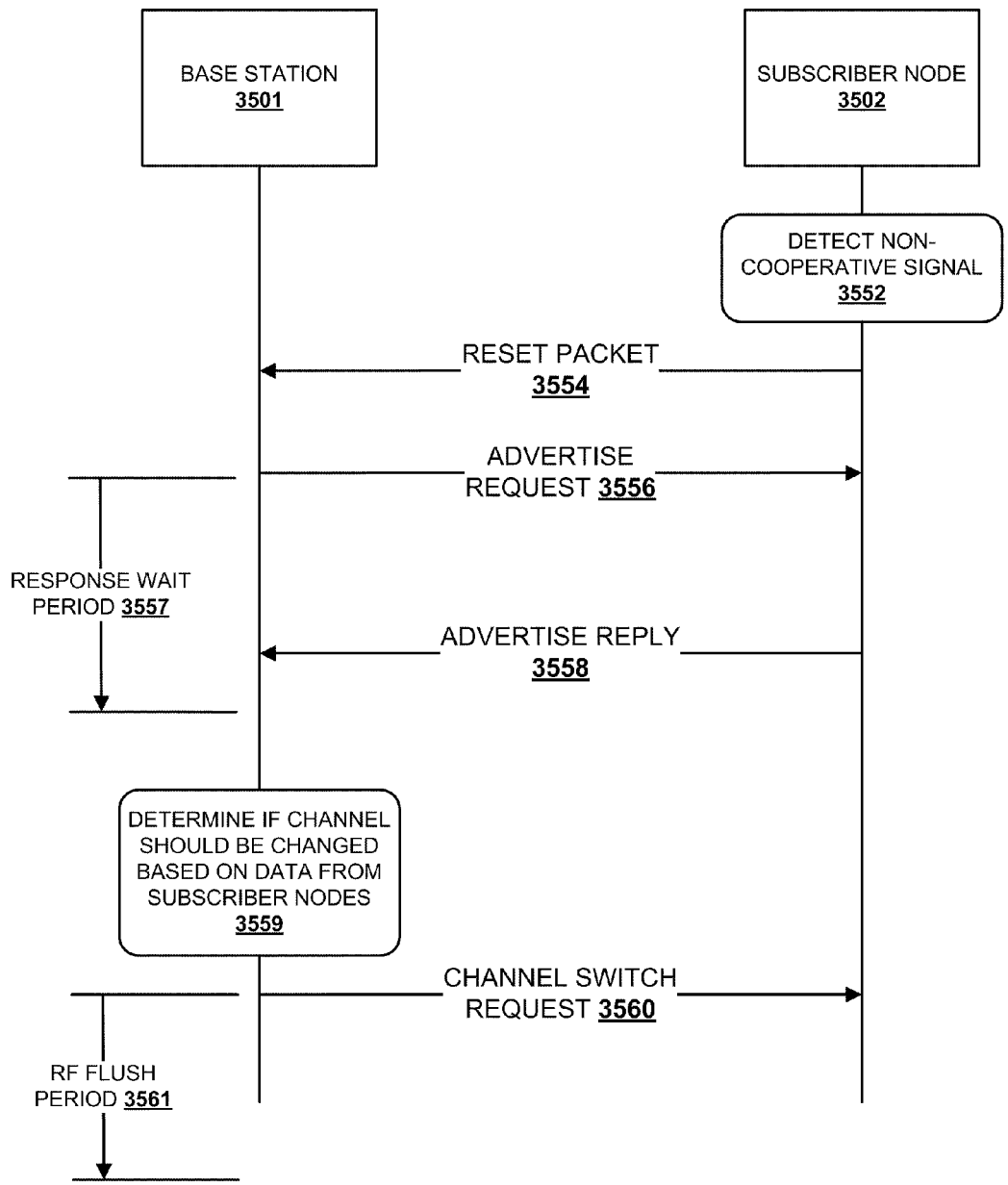
FIG. 23C shows an example communication flow between a base station and a subscriber DSA-enabled device during channel switching initiated by a subscriber DSA-enabled device according to an embodiment of the invention.

FIG. 23C shows an example communication flow between a base station and a subscriber DSA-enabled device during channel switching initiated by a subscriber DSA-enabled device. As previously described, a subscriber DSA-enabled device may detect a non-cooperative signal or other adverse condition at 3552, and send a reset packet 3554 so indicating to the base station. In response, the base station may send Advertise Request packets 3556 to DSA-enabled devices in the cooperative network. During a period of time 3557, the base station may receive Advertise Reply packets 3558 from some or all of the DSA-enabled devices in the network. Replies received after the wait period 3557 ends may be discarded or ignored, or otherwise given less consideration by the base station. Based on channel preference data in the received Advertise Reply packets, the base station may determine whether the channel on which the network is communicating should be changed at 3559. A channel switch request 3560 may then be used to notify subscriber DSA-enabled devices of a change to the operating channel. The base station may wait on the prior channel for a relatively short period of time 3561 after sending a command to switch channels, after which the radio will be ready to perform the next operation.

Figure 23D:
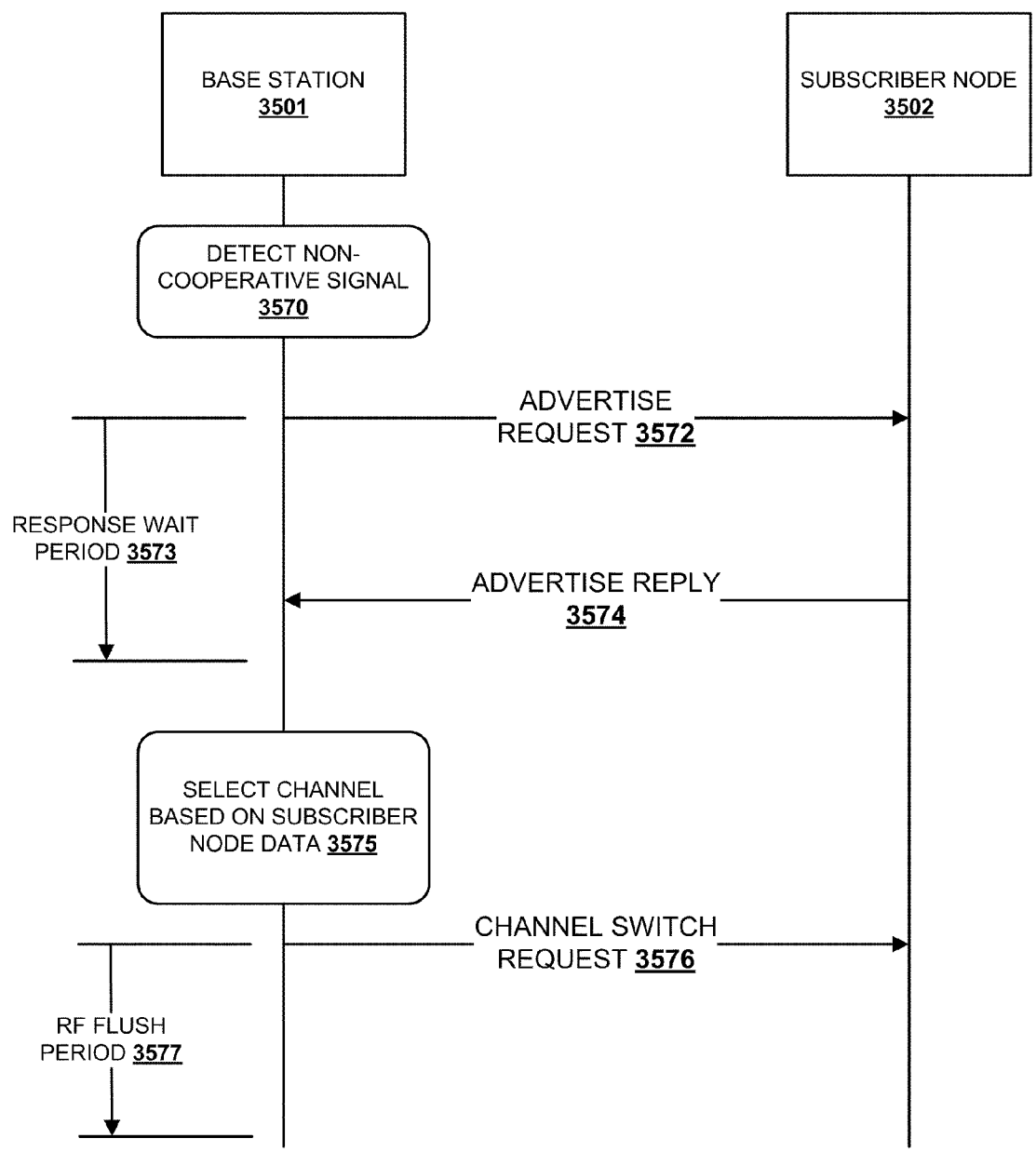
FIG. 23D shows an example communication flow between a base station and a subscriber DSA-enabled device during channel switching initiated by a base station according to an embodiment of the invention.

FIG. 23D shows an example communication flow between a base station and a subscriber DSA-enabled device during channel switching initiated by a base station. As previously described, and similar to the process described with respect to FIG. 23C, a channel switch may be performed due to a non-cooperative signal or other adverse condition detected at 3570 by the base station. The base station may send Advertise Request packets 3572 to DSA-enabled devices in the cooperative network and receive Advertise Reply packets 3574 from some or all of the DSA-enabled devices in the network during a response wait period 3573. Replies received after the wait period 3573 ends may be discarded or ignored, or otherwise given less consideration by the base station. Based on channel preference data in the received Advertise Reply packets, the base station may determine whether the channel on which the network is communicating should be changed at 3575. A channel switch request 3576 may then be used to notify subscriber DSA-enabled devices of a change to the operating channel. Subsequently, the base station may perform a flush of RF data at 3577.

Although not shown, it will be understood that DSA-enabled devices in the DSA network may operate to transmit and receive data during the processes shown in FIGS. 23B-D. In some embodiments, the same channels may be used for control packets (Keep Alive, Advertise Request, etc.) and data packets. In other embodiments, dedicated control channels may be designated and separate channels may be used for data transmissions.

In an embodiment, a DSA-enabled device may perform spectrum sensing and only subsequently tune to, and decode transmissions received on channels where signals are detected. For example, referring to FIG. 21D, a DSA-enabled device may detect and identify signals at 3441-3443 prior to tuning to a particular channel. That is, the DSA-enabled device may first look for energy, and then only attempt to send or receive packets where energy has been detected. Such an embodiment may be particularly suited to environments in which regions of the local spectrum are mostly empty, since it has been found that approaches which assume a mostly-used spectrum may generate an unacceptable rate of false alarms. Such embodiments also may be particularly suited to DSA-enabled devices that incorporate detectors in lieu of modems since the detector may simply look for energy without attempting to demodulate every potential signal.

In general, the spectrum and channel data exchanged among DSA-enabled devices, such as via Advertise Request/Reply and Keep Alive packets, may include any relevant spectrum usage data. For example, a DSA-enabled device may provide data regarding specific measurements made by the DSA-enabled device's detectors (e.g., −92 dBm measured at a particular frequency or channel); derived information regarding spectrum usage (e.g., channels 1-4 are in use by a TV transmitter); policy, regulatory, or other restrictive information (e.g., channels 5-8 are prohibited in the DSA-enabled device's region); local equipment information (e.g., a local detector RF filter is malfunctioning or the DSA-enabled device is unable to detect in a certain spectral region); logical channel data (e.g., logical channel 7 is 35-to-37 MHz) or any other spectrum data available to the DSA-enabled device.

Different protocols may be used to select a preferred channel, such as during a channel-switching process. In an embodiment of the present invention, a hand-shaking approach may be used in which cooperative DSA-enabled devices collectively select a preferred channel before the DSA-enabled devices switch to the new channel. Such an approach may be preferred when a relatively small percentage of the potential spectrum is available for use by the DSA network, so that a suitable channel is chosen efficiently. In another embodiment, each DSA-enabled device may decide to switch to a new channel that is selected only by that DSA-enabled device. This approach may be preferred where a relatively large amount of spectrum, such as 90% of potential spectrum, is available for use by the DSA network, since channel switches are not very likely to cause interference with non-cooperative signals.

Although described above with respect to a base station and subscriber DSA-enabled devices, in some embodiments the rendezvous processes described also may be used to form an ad-hoc network, i.e., one without a pre-determined or fixed base station. For example, if a DSA-enabled device does not detect any DSA signals in a region, or does not detect an appropriate DSA signal, it may begin operating using the methods described for a base station. Subsequent DSA-enabled devices in the region may then detect and identify signals from the first DSA-enabled device as being from a base station, and operate using the methods described for a subscriber DSA-enabled device. Multiple DSA-enabled devices in a region may operate as base stations, which may be in the same or different cooperative networks. In some embodiments, a DSA-enabled device may include hardware, computer-readable instructions, or both to enable the DSA-enabled device to operate as described for both a base station and a subscriber DSA-enabled device. As another example, in a non-base station configuration, a DSA-enabled device may randomly select between operating as a base station or as a subscriber DSA-enabled device. If a base station mode is selected, the DSA-enabled device may advertise itself and wait for subscriber DSA-enabled devices to join its network. If a subscriber operating mode is selected, the DSA-enabled device may search for a base station DSA-enabled device and join a network established by the base station as previously described.

In an embodiment, a DSA-enabled device may maintain a "channel type phonebook" that matches potential networks or networks observed in a particular region to channels on which the networks operate. For example, different networks may be used by different civic services (fire, police, emergency, etc.) in a region. A DSA-enabled device may maintain a list of network identifiers associated with each service. During operation, the DSA-enabled device may track the network identifiers observed in the area and maintain a list of DSA and/or non-DSA channels used by each network/service. A user of the DSA-enabled device then may set the radio to operate with a particular service, without being required to know or identify which channels are used by the desired service. This also may allow the channels used by each service to change dynamically to address immediate needs of each service.

The preceding description of communication coordination referred to a single base station and a number of subscriber DSA-enabled devices. As more DSA-enabled devices are added to a DSA-enabled network, multiple base stations may be used to coordinate communication among the DSA-enabled devices. A DSA cluster may be defined as a local grouping of DSA-enabled devices that perform coordinated sensing and channel planning to maintain connectivity with other members of the group. A DSA-enabled network may include multiple clusters. Once established, a DSA-enabled network may support or implement other types of communication between DSA-enabled devices as may be used in other networks, such as multicast messages, broadcast messages, and other techniques.

Figure 24A:
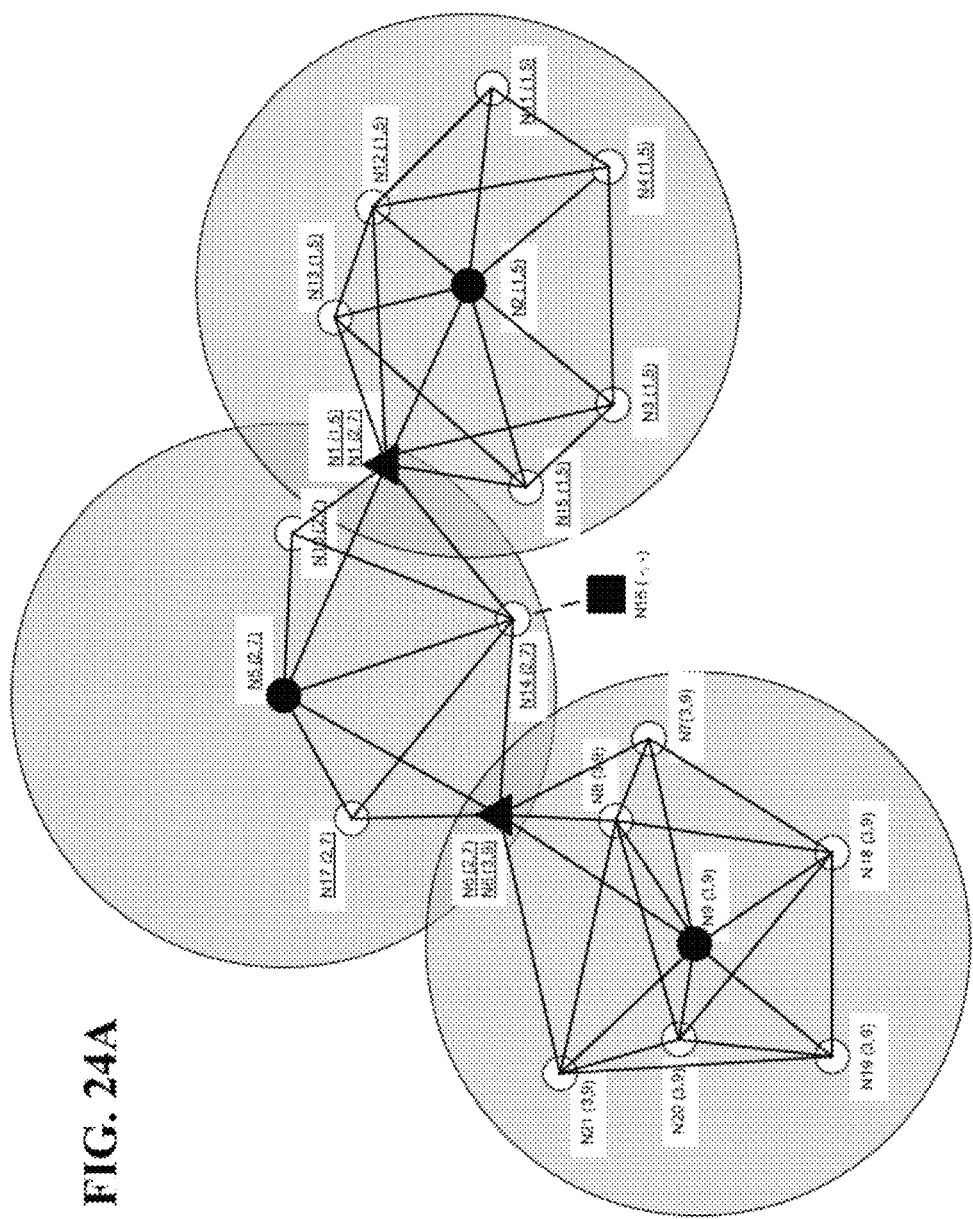
FIG. 24A shows a schematic illustration of a multi-cluster network according to embodiments of the invention.
Figure 24B:
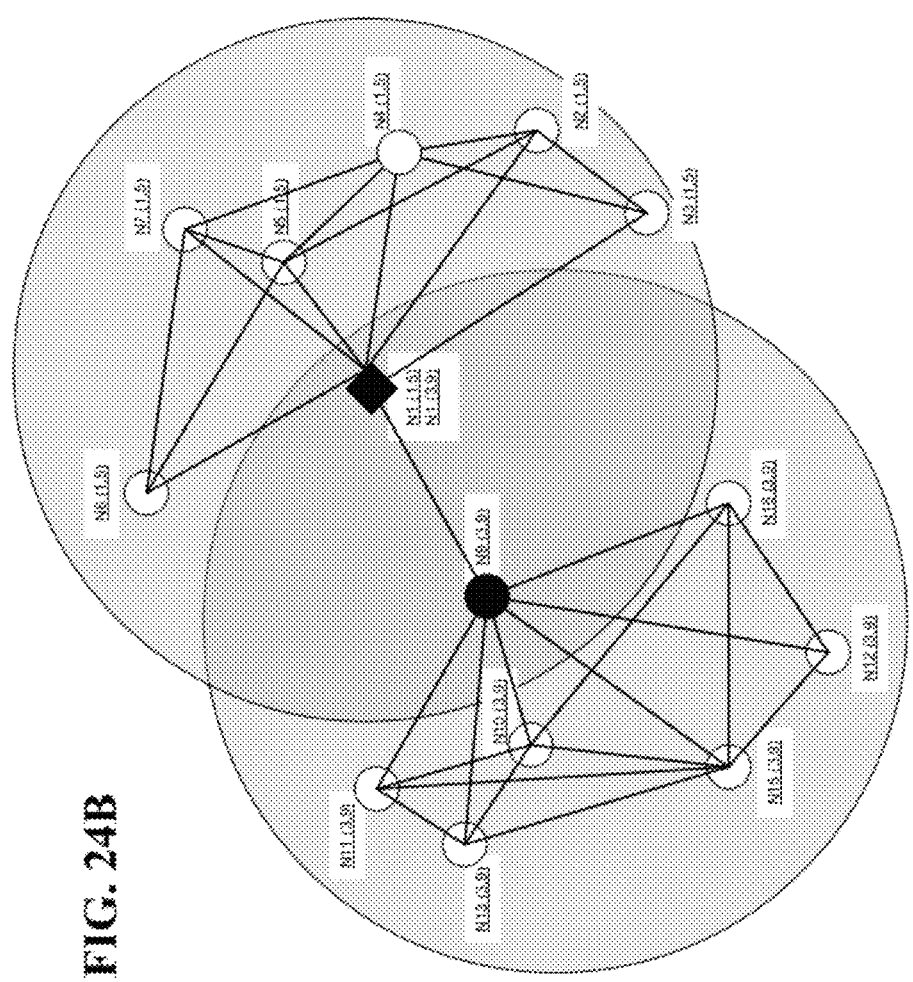
FIG. 24B shows a schematic illustration of a multi-cluster network according to embodiments of the invention.

FIGS. 24A and B show schematic illustrations of multi-cluster networks according to embodiments of the invention. DSA-enabled devices in the network may be defined as unattached (filled square), single-cluster (open circle), multi-cluster (filled triangle), cluster leader (filled circle), and cluster leader/multi-cluster member or "dual-state" (filled diamond). A multi-cluster member may be referred to as a bridge DSA-enabled device or as being in a bridge state. A bridge DSA-enabled device may observe the detection gap for each DSA cluster to which it belongs, and synchronize the detection gap with one or more clusters. A network may include multiple bridge DSA-enabled devices, and each cluster may include multiple bridge DSA-enabled devices that connect the cluster to multiple other clusters. A dual-state DSA-enabled device may remain dual-state temporarily when leaders (typically base stations) come within connectivity range of each other and establish a connection. A dual-state DSA-enabled device may attempt to change its status from dual-state to reduce the processing workload on the DSA-enabled device.

A DSA-enabled device may change its definition in response to changes in its local environment. An unattached DSA-enabled device may perform a subscriber DSA-enabled device communication coordination process as previously described to join one or more DSA-enabled networks. An unattached DSA-enabled device also may perform a base station communication coordination process as previously described, such as to start a new DSA-enabled network. The new DSA-enabled network then may connect to existing DSA-enabled networks via one or more bridge DSA-enabled devices, or may remain a separate network.

As previously described, multiple DSA-enabled networks may operate within the same geographic region, and may be cooperative or non-cooperative with the other DSA-enabled networks in the region. Multiple DSA-enabled networks in a region may interfere with each other's attempts to perform detections. In some embodiments of the invention, DSA-enabled networks may perform a process called "gap synchronization." Gap synchronization may permit multiple DSA-enabled networks to observe the DSA signals of other DSA-enabled networks in a region, and mutually adjust the timing of their detection gaps to coincide. Synchronization of detection gaps may allow a larger number of DSA-enabled networks to operate in a region while maintaining sufficient detection sensitivity to satisfy policy requirements.

In an embodiment, each DSA-enabled network may divide its frame into a number of slices, for example as defined by a parameter n_slice. Each DSA-enabled network may schedule its gap within each frame using a randomly-seeded, pseudo-random sequence (prs) of length n_prs, which is used to determine the location of the gap within the frame, for example in the range of 1 to n_slice or 0 to n_slice-1 for 0-based locations. In an embodiment, each DSA-enabled network stores a parameter g_oft which describes the current position of the network's gap within the pseudo-random sequence. Each network may start with a randomized value of g_oft. This may result in gaps that are not initially synchronized between DSA-enabled networks. Alternative gap scheduling techniques may be used, including schemes that provide a set of known values, including one or more pre-defined values for the random seed, pseudo-random sequence, or starting gap position (g_oft). Alternatively, a pseudo-random sequence generator, random number generator, or other technique for producing sequences of random values may be used. An example 0-based pseudo-random gap schedule of length (n_prs=20) for a frame divided as given by (n_slice=20) is:

[11, 16, 3, 17, 19, 15, 9, 12, 5, 10, 7, 8, 13, 0, 18, 6, 1, 2, 4, 14]

In an embodiment, each DSA-enabled network may independently schedule its gap on a frame by frame basis, on a slice identified by a locally defined g_oft'th entry of the pseudo-random gap schedule sequence, then increments of (g_oft modulo n_prs). The length of the pseudo-random gap schedule may not affect the speed of convergence for the networks, i.e., the rate at which the networks achieve a synchronized gap when starting from an unsynchronized condition.

In an embodiment, each DSA-enabled device that is part of a DSA-enabled network may calculate a transmission schedule for frames for the network. The device also may schedule the network's gap within that frame according to the current value in the pseudo random sequence (prs [g_oft]). From the transmission schedule, the DSA-enabled device may determine when the device should refrain from transmitting, perform environmental sensing (i.e., within a gap), and/or transmit. If a DSA-enabled device detects another DSA-enabled network's transmission during the gap, it considers the detection a failure and records that result. The device may also notify other devices in the DSA-enabled network of a detection failure in accordance with processes described elsewhere.

In an embodiment, each DSA-enabled network may maintain a history window of length n_fail_hist, in which the network or one or more devices in the network stores an indication of the success or failure of its most recent detection attempts. This history may be used by the DSA-enabled network to make decisions about when to attempt to adapt its gap schedule to those of neighboring DSA-enabled networks. The history may also be used to infer the gap schedules in use by neighboring DSA-enabled networks.

In an embodiment, when the failure ratio within the history window rises above a certain level, the network may invoke a predictor to calculate a new gap schedule. In an embodiment this may involve computing a new value of g_oft. The predictor may analyze the collected history data to estimate a new gap schedule that coincides with those of neighboring DSA-enabled networks. The predictor may use one of several techniques to encourage convergence to a common gap schedule. For example, it may use the modal gap schedule of the network's neighbors if one exists or otherwise the gap schedule of the network's nearest neighbor. The predictor may be imperfect and may be modeled as having an accuracy given by p_pred.

In an embodiment, each DSA-enabled network may decide whether to readjust its gap schedule every n_adapt_period frames. Gap schedules may converge more rapidly if networks begin counting this period at a randomized offset relative to each other, because two adjacent networks attempting to adapt their gap schedules at the same time may reduce the rate of convergence. Experimental results indicate that the size of n_adapt_period is, in part, responsible for the speed at which the network converges upon a common gap. Using a longer period makes the algorithm converge more slowly. Using a shorter period makes the algorithm fail to converge. As a specific example, an adaptation period of 100 detections may cause the gap to converge relatively slowly.

In some embodiments, the process of gap synchronization among multiple DSA-enabled networks as described here also may permit DSA-enabled devices to automatically synchronize their gap when combining as part of an ad-hoc network.

A system of DSA-enabled networks in a region may be modeled in terms of an undirected graph with each node in the graph representing a network in the system, in which an edge exists between nodes if the two networks lie within a detection interference radius such that one network cannot successfully detect while the other is transmitting. Using this graph model, groups of adjacent DSA-enabled networks may be described in terms of clusters of nodes and the neighbors of each node. Furthermore, the convergence of networks onto the same gap schedule can be modeled as the propagation of an abstract value (representing a particular gap schedule) through the graph. The parameter g_oft is one possible manifestation of this abstract value.

Experimentally, a set of 10 DSA-enabled networks were simulated as randomly placed in an area of 100×100 arbitrary units (a.u.), with a detection interference radius of 25 a.u. Each node was presumed to have a duty cycle of 30%. The frame was split into 20 slices, and the pseudo-random gap schedule set at a length of 20 a.u. The parameter n_adapt_period was set to 10, indicating that each network reevaluated its gap schedule every 10 detections. The failure threshold at which the network invoked the predictor was 30%. The results of the simulation over 500 frames with no synchronization are shown in the table below:

| Net # | X Pos | Y Pos | Gap Offset | Failure Ratio (overall) | Neighbors |
|---|---|---|---|---|---|
| 0 | 32.81 | 92.69 | 0 | 0.32 | 9 |
| 1 | 10.20 | 58.43 | 16 | 0.70 | 3, 4, 5 |
| 2 | 84.99 | 2.42 | 1 | 0.70 | 6, 7, 8 |
| 3 | 10.87 | 65.98 | 11 | 0.52 | 1, 5 |
| 4 | 21.28 | 39.92 | 3 | 0.28 | 1 |
| 5 | 15.06 | 73.19 | 14 | 0.48 | 1, 3 |
| 6 | 67.76 | 2.58 | 5 | 0.69 | 2, 7, 8 |
| 7 | 81.45 | 2.41 | 17 | 0.68 | 2, 6, 8 |
| 8 | 74.25 | 13.86 | 16 | 0.71 | 2, 6, 7 |
| 9 | 34.16 | 97.95 | 16 | 0.33 | 0 |

As shown, the networks were found to make no attempts to synchronize their gaps. It was found that the failure ratio rises rapidly with the number of neighbors in each cluster of networks. For a network in a given cluster, the failure ratio is roughly equal to $1-(1-d\_net)^n$, where n is the number of neighbors that network has in the cluster and d_net is the duty cycle of the network. In a cluster where one network has three other neighbors, the failure ratio was found to be 0.68-0.71.

In another experiment, a simulation was run using the same network topology and the gap synchronization technique as previously described. As shown in the table below, it was found that the networks synchronized their gaps rapidly even when an inaccurate predictor was used. It was found that nearly perfect synchronization may be achieved within about 250-500 frames, and that the ratio of failed detections is drastically reduced once the system converges, falling to 0.00-0.10 within the biggest cluster. The table below shows the results for an experiment run over 500 frames with the synchronized gap technique previously described:

| Net # | X Pos | Y Pos | Gap Offset | Failure Ratio (recent) | Neighbors |
|---|---|---|---|---|---|
| 0 | 32.81 | 92.69 | 4 | 0.00 | 9 |
| 1 | 10.20 | 58.43 | 16 | 0.10 | 3, 4, 5 |
| 2 | 84.99 | 2.42 | 1 | 0.00 | 6, 7, 8 |
| 3 | 10.87 | 65.98 | 16 | 0.00 | 1, 5 |
| 4 | 21.28 | 39.92 | 17 | 0.20 | 1 |
| 5 | 15.06 | 73.19 | 16 | 0.00 | 1, 3 |
| 6 | 67.76 | 2.58 | 1 | 0.00 | 2, 7, 8 |
| 7 | 81.45 | 2.41 | 1 | 0.00 | 2, 6, 8 |
| 8 | 74.25 | 13.86 | 1 | 0.00 | 2, 6, 7 |
| 9 | 34.16 | 97.95 | 4 | 0.00 | 0 |

Figure 24C:
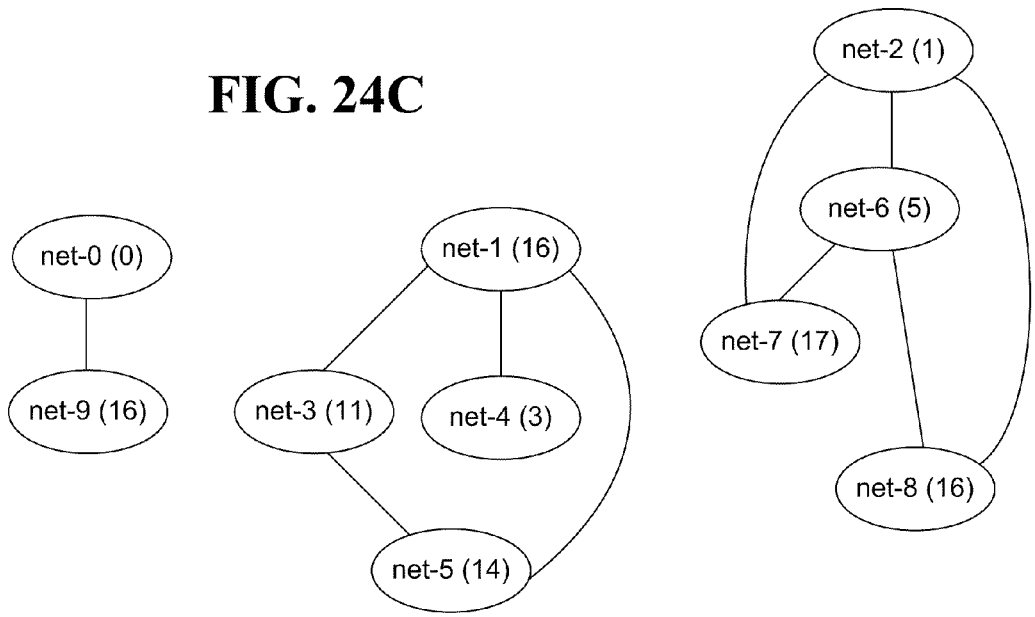
FIG. 24C shows an example network diagram of unsynchronized DSA-enabled networks and associated convergence behavior according to an embodiment of the invention.
Figure 24D:
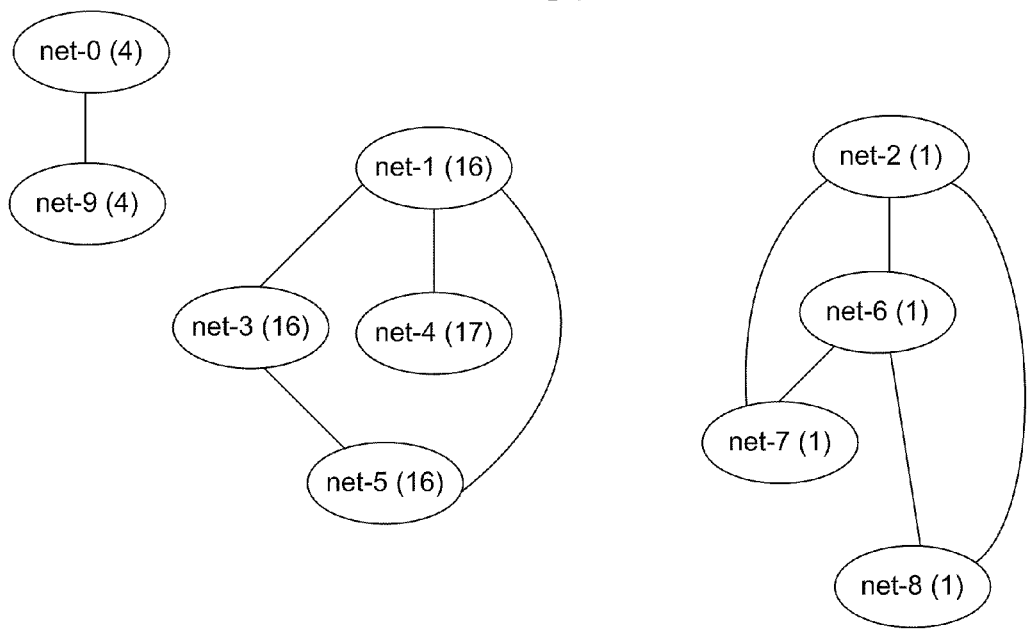
FIG. 24D shows an example network diagram of synchronized DSA-enabled networks and associated convergence behavior according to an embodiment of the invention.

FIGS. 24C and 24D illustrate example network diagrams of the unsynchronized case and the synchronized case, respectively, and the convergence behavior of the networks when a gap synchronization technique according to embodiments of the invention is used. In these figures, the number in parentheses after the network name is the instantaneous value of g_oft after 500 frames. Each different value of g_oft represents a different gap synchronization domain. FIG. 24C shows that when there is no synchronization, adjacent networks may have different values of g_oft and thus unsynchronized gap schedules. This lack of synchronization may result in a high rate of failed detections as shown above. In FIG. 24D, nearly all the adjacent nodes have the same value of g_oft, and are thus operating with synchronized gap intervals.

In general, if two clusters in a DSA-enabled network operate on different channels, the devices in each cluster will not exchange data with devices in the other clusters. To assess operation of DSA nodes in this situation, a simulation was performed in which nodes dynamically discovered available networks, and then decided whether to merge the separate clusters (i.e., one or both clusters would switch so both used the same channel), or to create dynamic gateway "bridge" devices to connect the clusters operating on different frequencies. This type of bridging may be performed as a non-network layer function abstracted from other network protocols, or it may be integrated with existing network discovery/routing protocols such as an optimized link-state routing (OLSR) protocol.

Figure 24E:
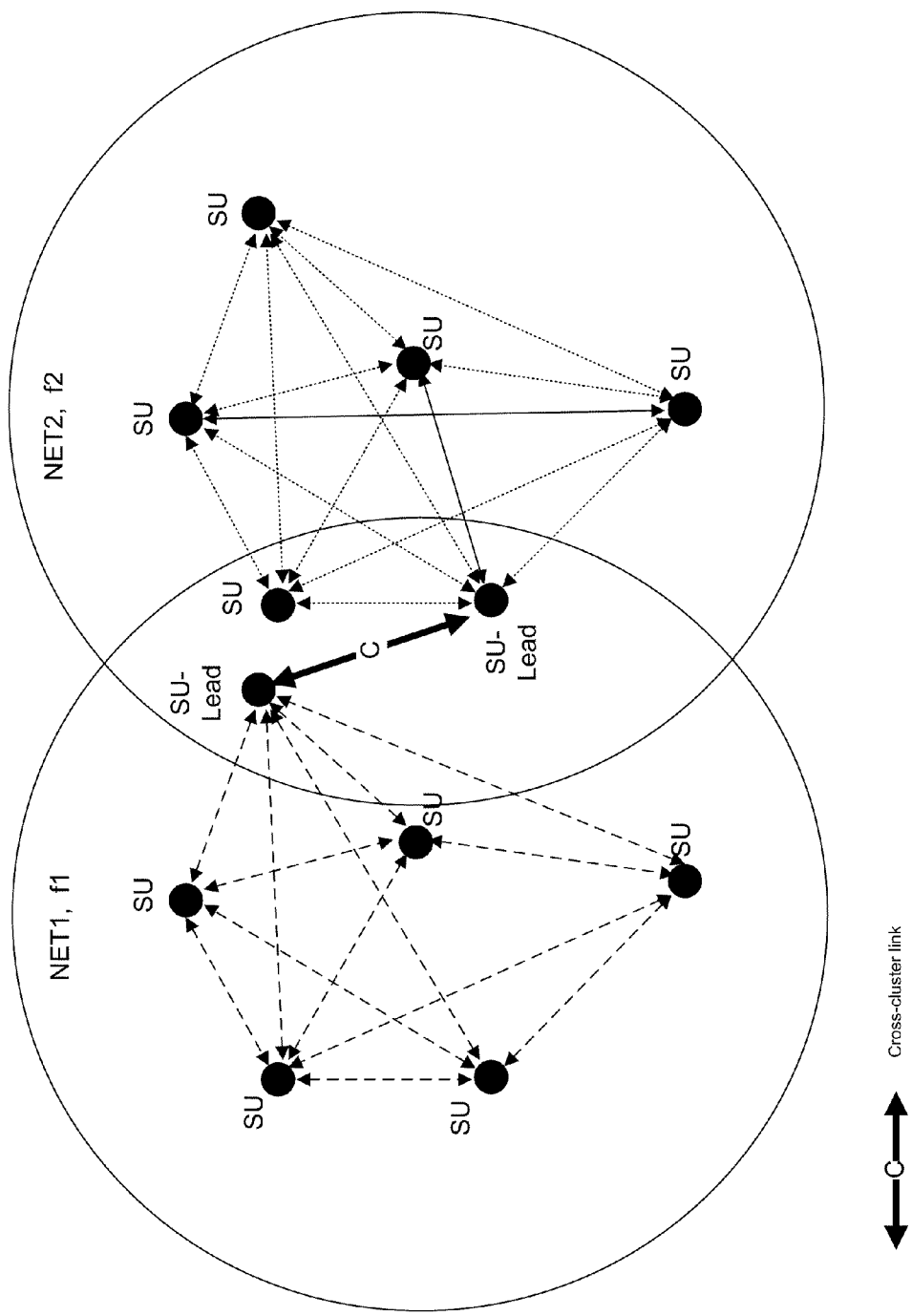
FIG. 24E shows an example network diagram of a DSA-enabled network that includes multiple clusters according to an embodiment of the invention.
Figure 25:
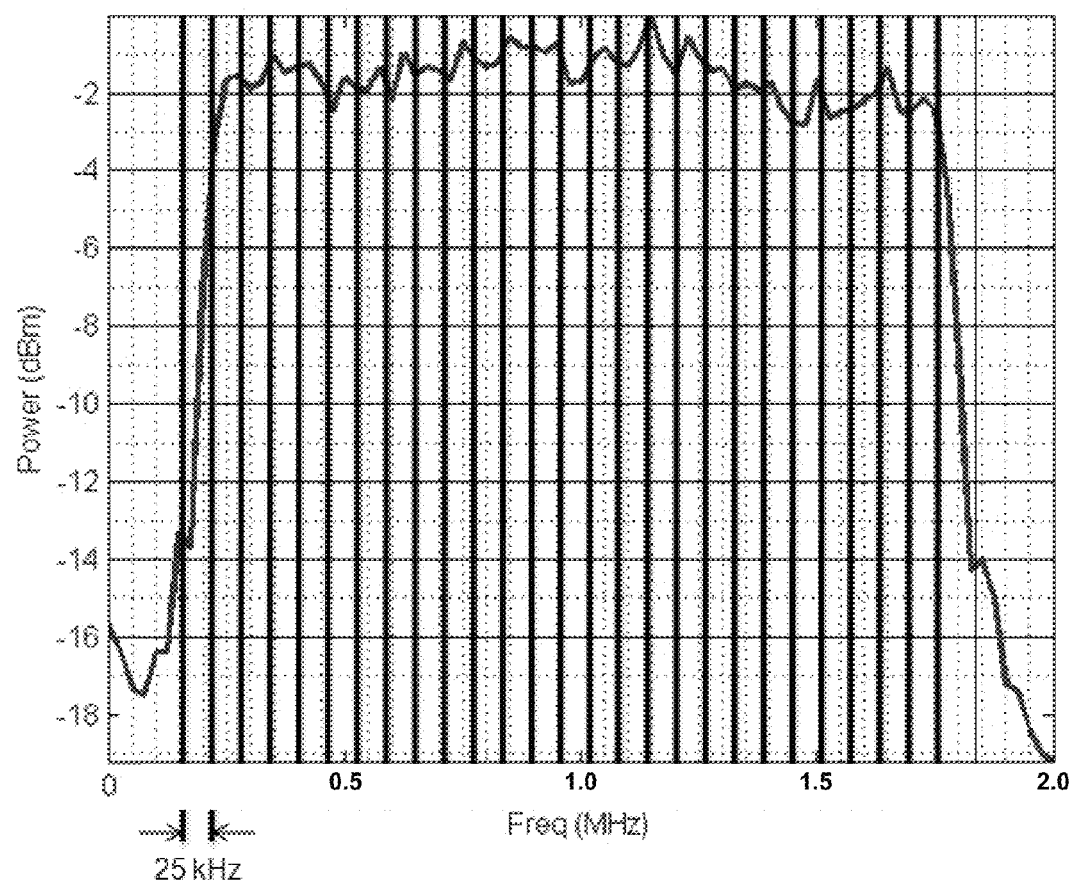

FIG. 24E shows the network topology used in the simulation. In the simulation, clusters were "dynamically bridged" when the "bridge" devices alternated between the channels used by the different clusters on a frame-by-frame basis. As shown, clusters may be located relatively close to each other, or they can be more than 1 "hop" apart, i.e., separated by more than one intermediary device.

It was found from the simulation that clustering of DSA-enabled devices may be capable of increasing the capacity of a DSA-enabled network relative to the capacity typically available in the absence of DSA, by splitting the network into multiple channels. It was also found that the coverage area of a DSA-enabled network may be increased by providing a gateway to devices which cannot be accessed without routing traffic. Decisions within such a network may be made based on operator input. As a specific example, in cell-tower scenarios a network may expand capacity by splitting into clusters, each of which operates on a different channel or channels and includes a subset of the devices in the network. In other cases, the DSA-enabled network may be joined together by bridge devices which connect multi-channel clusters together and increase the coverage area.

In an embodiment, as larger bandwidth ranges are considered for use by DSA systems and, therefore, may be scanned by the DSA detectors, a high-level scheduler may be used to coordinate detection of signals.

The methods and systems for communicating coordination within a DSA network as described herein may allow for various data to be shared among DSA-enabled devices in a DSA-enabled network. The information shared among DSA-enabled devices may include relatively broad spectrum data, such as measurements of energy in various channels observed by the DSA-enabled devices. Data relating to logical channel definitions may be shared, such as where a DSA-enabled device provides channelization information to other DSA-enabled devices in the network. Data relating to channel ranking also may be shared, such as where one or more DSA-enabled devices shares a ranked list of channels preferred by that DSA-enabled device with one or more other DSA-enabled devices in the network. In an embodiment, some or all of the data shared among the DSA-enabled devices may be continually or periodically updated.

One potential impediment to successful operation of a DSA network may be the successful detection of cooperative and/or non-cooperative spectrum users, and the subsequent determination of whether spectrum is available for use by the DSA spectrum in a particular region. For example, if a DSA network has completely uncoordinated transmissions, detection of non-cooperative signals by DSA-enabled devices in a DSA-enabled network may be blocked by DSA transmissions. That is, a DSA-enabled device attempting to detect non-cooperative signals so as to avoid interfering with them, may be unable to do so because those signals are masked or otherwise un-detectable due to transmission by cooperative DSA-enabled devices in the DSA network. For example, a detector may be blocked, desensitized, or otherwise affected by other DSA signals, or the detector may incorrectly determine that spectrum is in use by non-cooperative users.

It has been found that a signal classifier as described herein may be used to discriminate between DSA and non-cooperative signals and eliminate consideration of DSA signals as sources of non-cooperative spectrum use. In general, a signal classifier may detect and characterize each use of a spectrum bandlet, i.e., a region of spectrum which may be used for communication by a network, and estimate any channelization of the bandlet. This may allow a DSA network to avoid coordinating co-channel DSA communications to have specific, scheduled "off periods" to enable the system to "look through" its own transmissions for non-cooperative users that may be coincident in time, frequency, and/or space with the DSA network. That is, in an embodiment of the present invention an efficient classifier may allow for communication among DSA-enabled devices without use of a synchronized detection gap as described herein.

It has also been found that the signal spectrum width and/or shape of a signal may provide a computationally-efficient way to differentiate DSA signals from non-cooperative signals. That is, signals may be identified or classified based on the amount of bandwidth they occupy and/or their correlation to known signal masks. Such a method may be especially computationally cost effective compared to examining other factors that may require additional processing, such as demodulating one or more signals to examine the modulation type of each.

Referring again to FIGS. 1-2, a signal classifier 134 may analyze energy detected within one or more regions of the spectrum, such as output provided by the detector subsystem 112, and characterize channels in which a signal is detected according to the RF signature of the detected signal. The classifier may be configurable to classify signals as belonging to one or more signal classifications from a predetermined set of signal classification types. Examples of predetermined signal classification types, may include, for example, Control, Primary, Cleared, and Non-Cleared. These classification types also may be referred to as channel states, since a DSA-enabled device or system may assign each classification type to one or more channels based upon the signal detected on the channel. Other classification types may be used, such as "Not Allowed" to represent portions of spectrum in which the DSA system is prohibited from operating, such as by policy constraints. Signals in regions of spectrum prohibited by policy constraints may not be analyzed, or may be analyzed but labeled as Not Allowed. In general, virtually any type of signal classification type may be included in the set of signal classification types, and the list and description of signal classification types included herein is provided as an example and is not intended to limit the signal classification types. The classification of signals may be binary (i.e., each signal is or is not a particular signal type) or a classification type assigned to a channel may be weighted by a confidence level.

The classifier 134 may be configured to periodically analyze channels and classify the signals within the channels. Alternatively or in addition, the classifier may be configured to analyze and classify signals within a channel based on an event or command, where the event or command need not be related to passage of time. For example, the classifier may be triggered by arrival of detector outputs, regardless of the frequency or specific time at which the output is provided.

The classifier may analyze channels within a region of spectrum concurrently or may analyze channels in accordance with a schedule or algorithm, such as described herein with respect to the scheduler 122. The classifier may analyze channels based on the information provided by the various detectors and detector types included in the system. As a specific example, detection results provided by a narrowband detector may be used in an analysis of the counterpart channels in which the detector is tuned. As another example, detection results provided by a wideband detector may be used in analysis and classification of signals within a plurality of channels in a region of spectrum.

In some embodiments, the classifier may determine a classification type for signals within a channel by applying one or more predetermined signal masks to detection results provided by the detector subsystem. For example, each classification type may have a counterpart signal mask. The classifier may then determine the classification type based on the results from applying the various signal masks.

In some embodiments, the classifier may only or initially identify each detected signal only as cooperative or non-cooperative, without further classifying the type or function of the signals. This may allow the DSA-enabled device or network to rapidly respond to the primary or only environments in which it should perform specific actions. For example, a DSA network may operate in a regular transmit/receive mode in which data is transmitted among DSA-enabled devices in the DSA network, until a non-cooperative signal is detected which indicates that a different communication channel should be used. As another example, a DSA-enabled device may operate in a detect-only mode until a DSA or cooperative signal is identified, at which point the DSA-enabled device may attempt to join the associated DSA network. Thus, in many cases it may not be necessary for the classifier to classify detected signals or potential signals any further than indicating whether the signal is cooperative or non-cooperative.

For example, the signal classifier may identify a signal that indicates the presence of a DSA-enabled device or network in a particular channel. Such a channel may be marked as a "Control" channel. Similarly, if a non-cooperative signal is detected then the channel may be marked "Primary." As previously described, the classifier may notify a Rendezvous subsystem if a primary signal is identified, which may cause the DSA-enabled device or network to initiate a channel switch. Channels that have neither cooperative nor non-cooperative signals may be marked as "Cleared." A channel also may be marked as Cleared when a certain amount of time has elapsed without detecting a Control or Primary signal on a channel previously identified as a Control or Primary channel. Channels for which there is insufficient detector data to determine a signal classification above a predetermined false alarm rate also may be marked as "Not-Cleared." The specific definitions for various classification types used by the classifier may include additional features, and other classification types may be used.

According to an embodiment, example channel classification types may be defined as shown below:

Not Allowed: A channel or region of spectrum that an active policy restricts the DSA system from using.

Primary: A channel or region of spectrum in which a non-cooperative signal has been detected. The non-cooperative signals may be "primary" signals within a particular channel, such as signals from a TV station operating in a region of spectrum reserved for TV use in a regulatory framework. However, the classification of a signal as Primary may not be limited to identifying users or uses within a region of spectrum that are "primary" within a specific regulatory framework. As a specific example, the detection of a signal that may be considered a secondary signal, such as a white space device operating in a region of spectrum identified as reserved for TV use, may result in a channel being marked as Primary since the secondary use could cause interference to a DSA-enabled device operating within that region of spectrum.

Control: A potential DSA channel. Multiple Control channels may be identified.

Cleared: Neither cooperative nor non-cooperative signals have been detected within a specified time span.

Not Cleared: An allowed channel that cannot be identified as Primary, Control, or Cleared, such as channels outside the bounds of the detector frequency range, and channels where insufficient data has been collected to determine a valid state.

In some embodiments, more or fewer states may be used. For example, in some embodiments only two states (e.g., Cleared and Not Cleared) are used, which may be sufficient to avoid causing unwanted interference with non-cooperative users.

The classifier may update the state of each channel as defined by the channel manager 132 periodically (e.g., every 100 milliseconds, 200 ms, 500 ms, or any other suitable period), whenever one or more detectors completes a scan, or some combination thereof. Other triggering events may cause the classifier to update the channel status, such as an instruction defined by an enforced policy. As described with respect to the detector subsystem 112, the detectors can be configured to scan periodically, but need not necessarily scan synchronously with the updates performed by the channel manager or the classifier, or when instructed by the communication coordinator 124 to go into a freewheel (constant detection) mode.

In some embodiments, the channels marked Control and Cleared define the list of candidate channels that is utilized by the Rendezvous module. A Cleared channel may be relevant to the rendezvous process as a channel that can be used to establish a DSA network. Similarly, a Control channel may be relevant since it is a channel that may be usable to join a pre-existing DSA network.

According to embodiments of the invention, a signal classifier may be configured based on particular constraints or operational parameters imposed on the DSA-enabled devices within a system. For example, the classifier may be different for DSA-enabled devices configured to operate in bands originally licensed to TV broadcast as compared to DSA-enabled devices that are configured to operate in primarily unlicensed bands. Several examples of signal classifier implementations according to embodiments of the invention are described herein. However, the description and operation of each classifier described herein is provided as an example, and does not operate to limit the scope or operation of signal classifiers, in general.

According to an embodiment, a signal classifier may retrieve detector data in the form of Fast Fourier Transfer (FFT) bin results. This type of classifier may be referred to as a "Look-Through Version 1" (LT1) type classifier. Such a signal classifier may receive the FFT results as a plurality of bin magnitudes or as a plurality of complex values.

Figure 25:
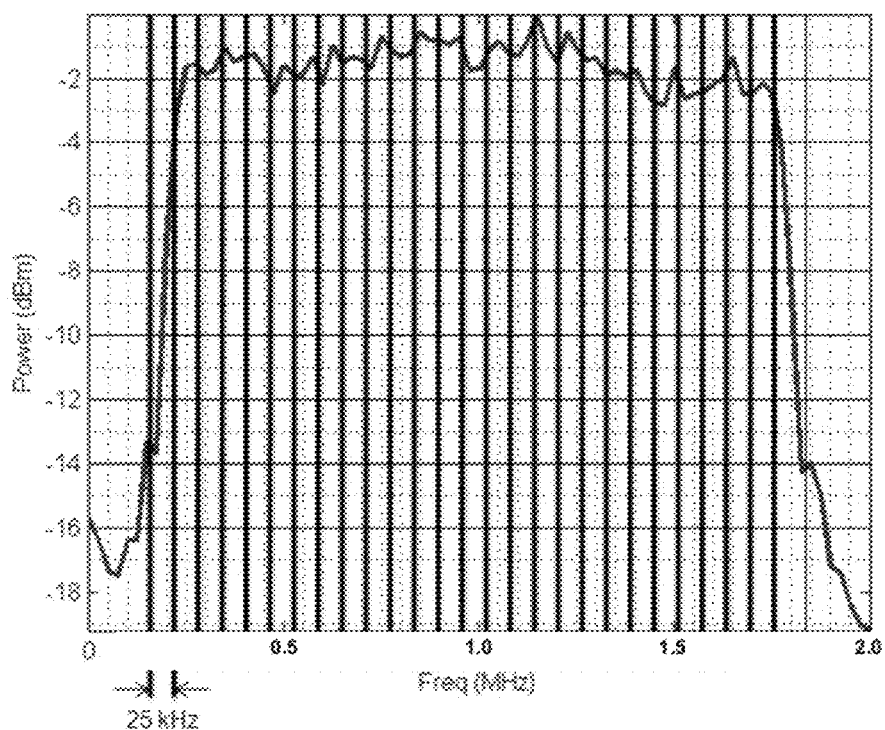
FIG. 25 illustrates a sample DSA 2 MHz channel and its division into 25 kHz slivers according to an embodiment of the invention.

The LT1 signal classifier may receive detector output and divide the received data into a plurality of wideband channels. For example, the detector output may be provided as a plot or list of detected signal or energy levels at each frequency across the detector bandwidth. In a specific example, an LT1 classifier may then divide this data into a plurality of, e.g., 2 MHz channels. Each channel may then be divided into a plurality of bins. For example, a 2 MHz channel may be divided into a plurality of bins each of which spans 25 kHz as shown in FIG. 25 (not to scale, i.e., the correct number of bins is not shown). Other divisions are possible. In general, the precision of a signal mask increases as more bins are used The signal classifier may then record the energy detected in each bin. The signal classifier may identify one or more signals present by applying a predetermined signal mask to one or more of the bins. In an embodiment, a channel may be identified as containing a DSA signal if the percentage of bins having a minimum energy level exceeds a set level. This may correspond, for example, to a configuration where it is known or presumed that a DSA signal typically is wider than a non-cooperative signal expected in the region of spectrum being analyzed. As a specific example, if at least 80% of the bins have at least −140 dBm/Hz, a channel including those bins may be indicated as having a DSA signal by the signal classifier. This value is only illustrative and other values may be used depending on the noise level observed, which may vary with geography, altitude, and other factors as will be understood by one of skill in the art.

In some cases, an LT1-type signal classifier may not provide an acceptable probability of detection, or may generate too many false alarms. In an embodiment of the invention, a Look-Through Version 2 (LT2) signal classifier may be used to improve the probability of detection, decrease the number of false alarms, or both.

Figure 26:
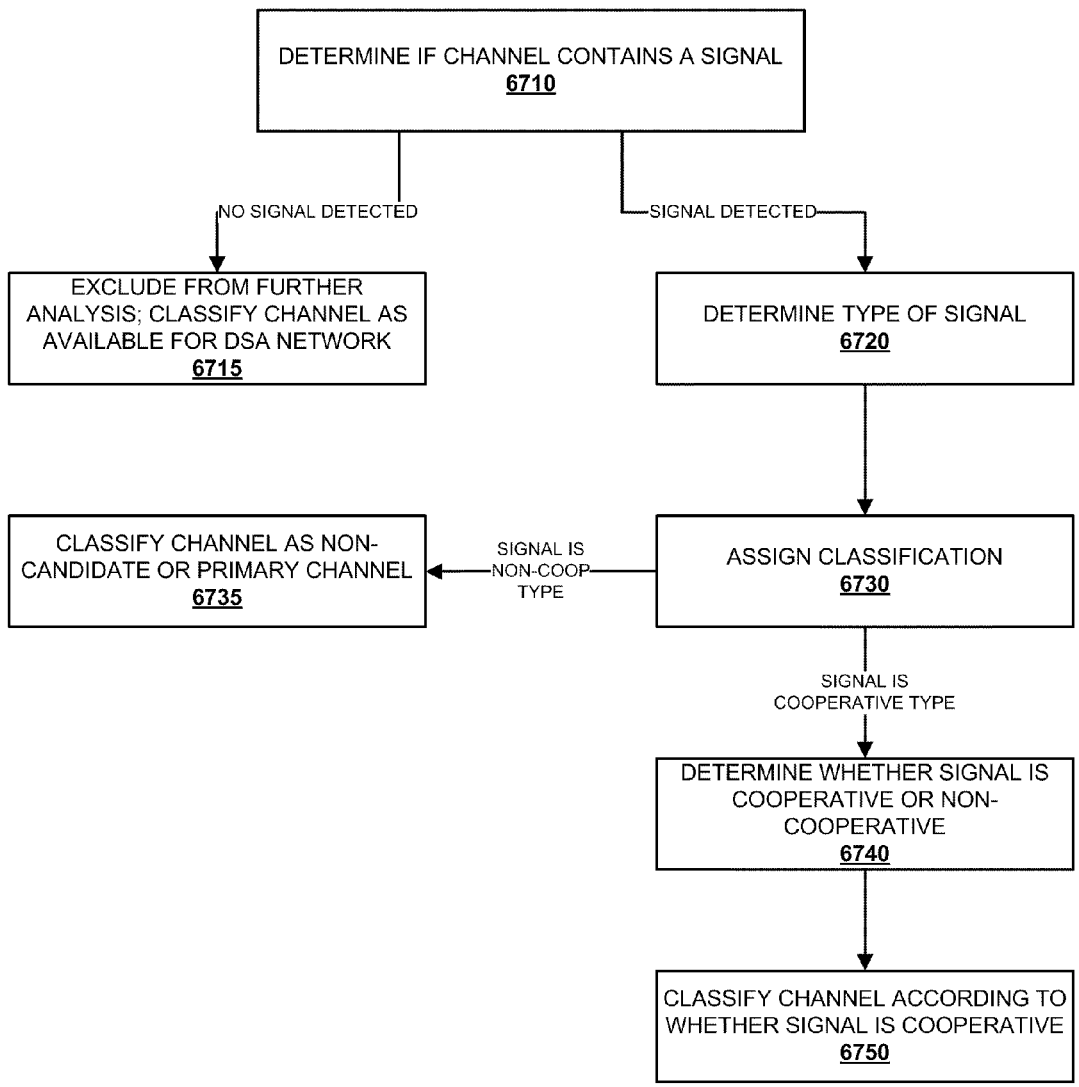
FIG. 26 shows an example process used by a signal classifier according to an embodiment of the invention.

An example process suitable for use by a signal classifier according to embodiments of the invention which include an LT2-type signal classifier, is shown in FIG. 26. At 6710 the signal classifier may first examine energy in the channel as measured by the detector subsystem to determine if the channel contains a signal. The signal classifier may determine that a signal is present, for example, by comparing a signal energy or signal magnitude in the channel to a predetermined threshold. The threshold may be determined, for example, based on the bandwidth of the channel, noise figure of the receiver, false alarm margin, and the like, or combinations thereof. If no signal is detected, such as where only noise is detected in the channel, at 6715 the channel may be excluded from further analysis and may be considered as a candidate channel for use by the DSA network. For example, the channel may be classified as a "cleared" channel as previously described. If a signal is detected, at 6720 the classifier may determine the type of signal detected, such as wideband or narrowband. For example, upon determining that a signal has been detected, the signal classifier may examine portions of the channel for indications of narrowband signals.

Based on this determination, the classifier may assign a classification to the channel accordingly. For example, in an embodiment in which DSA signals are wideband signals, a channel in which a narrowband signal is detected may be classified as unavailable for use by the DSA network. Such a channel may be identified as a "primary" channel or otherwise indicated as a non-candidate channel at 6735. At 6740, if the channel has not been eliminated from further analysis, the classifier may determine whether a detected signal is a cooperative signal or a non-cooperative signal of similar type (e.g., a wideband non-cooperative signal detected by a wideband-type DSA network) As described in further detail, this analysis may be performed by comparing the detected signal to a signal mask that defines the expected form of a cooperative signal. The classifier may then classify the channel accordingly at 6750, such as by marking the channel as "primary" (for a same-type, non-cooperative signal) or "control" (for a cooperative signal).

Other steps may be performed, and some steps may be repeated or omitted. As a specific example, in an embodiment the classifier may first search for a narrowband signal in one or more channels before excluding a channel containing a non-matching signal from further analysis. Such an embodiment is described in U.S. patent application Ser. No. 11/839, 503, filed Aug. 15, 2007, entitled "Methods for Detecting and Classifying Signals Transmitted Over a Radio Frequency Spectrum," the disclosure of which is incorporated by reference herein in its entirety.

Figure 27:
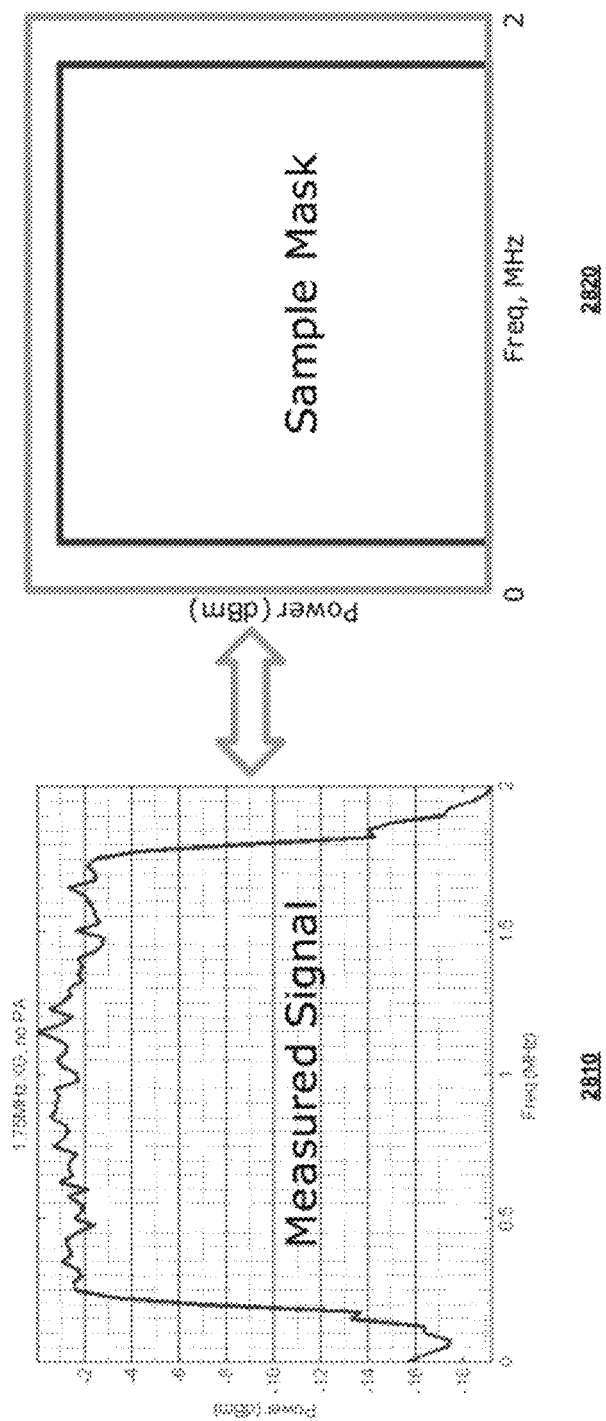
FIG. 27 shows a sample signal mask comparison according to an embodiment of the invention.

In general, an LT2-type signal classifier according to embodiments of the invention may divide detector output into one or more wideband channels, as previously described with respect to LT1-type classifiers. The classifier may then compare the frequency plot of the signal in each channel to one or more signal masks of known cooperative signals. FIG. 27 shows an example signal mask 2820 according to an embodiment of the invention. A detected signal 2810 may be compared to the signal mask 2820 to determine whether the signal is a cooperative or non-cooperative signal. Other signal masks may be used. The signal classifier may store one or more signal masks as, for example, a text file within a designated portion of memory. The classifier may then access each signal mask as needed.

As illustrated by FIG. 27, signal masks used in embodiments of the invention may be modeled as plots of measured power versus frequency, and a similar plot of data collected by the detector subsystem may be compared to the signal mask. By using the signal mask, the probability of false alarms caused by noise captured by the detector may be reduced in contrast to a configuration in which the percentage of spectrum bins containing energy is used to classify a signal, such as in LT1-type classifiers as previously described. For example, in most cases it is unlikely that man-made noise will have the same spectrum shape as a DSA signal represented by a particular signal mask, and such noise may be immediately excluded from consideration as being a cooperative signal. Examples of such noise include man-made noise, spurious signals received by the detector, including internally-generated spurious signals ("detector spurs"), and other similar signals or potential signals.

In an embodiment, the classifier may store multiple signal masks, each of which may correspond to a signal or signal type having a different spectral distribution. The signal classifier may make numerous signal mask comparisons with the different signal mask types or may make numerous comparisons with the same signal mask type, but over detector outputs from different spectrums. For example, the IEEE 802.16 specification supports different channel bandwidths (e.g., 1.75, 3.5, 7 and 10 MHz); a signal classifier configured to operate within such a regime may have a signal mask for each of these bandwidths.

After comparing the detector output in each channel to the signal mask, an LT2 signal classifier may compute a metric that reflects the degree of correlation of the spectrum measurement to the signal mask. Based on this metric, the signal classifier may indicate whether an observed signal is a DSA signal or not. In some embodiments, the classifier may assign a confidence score indicating the likelihood that the signal is a DSA signal. For example, a signal that perfectly matches the signal mask may be given a 100% confidence score.

Figure 28:
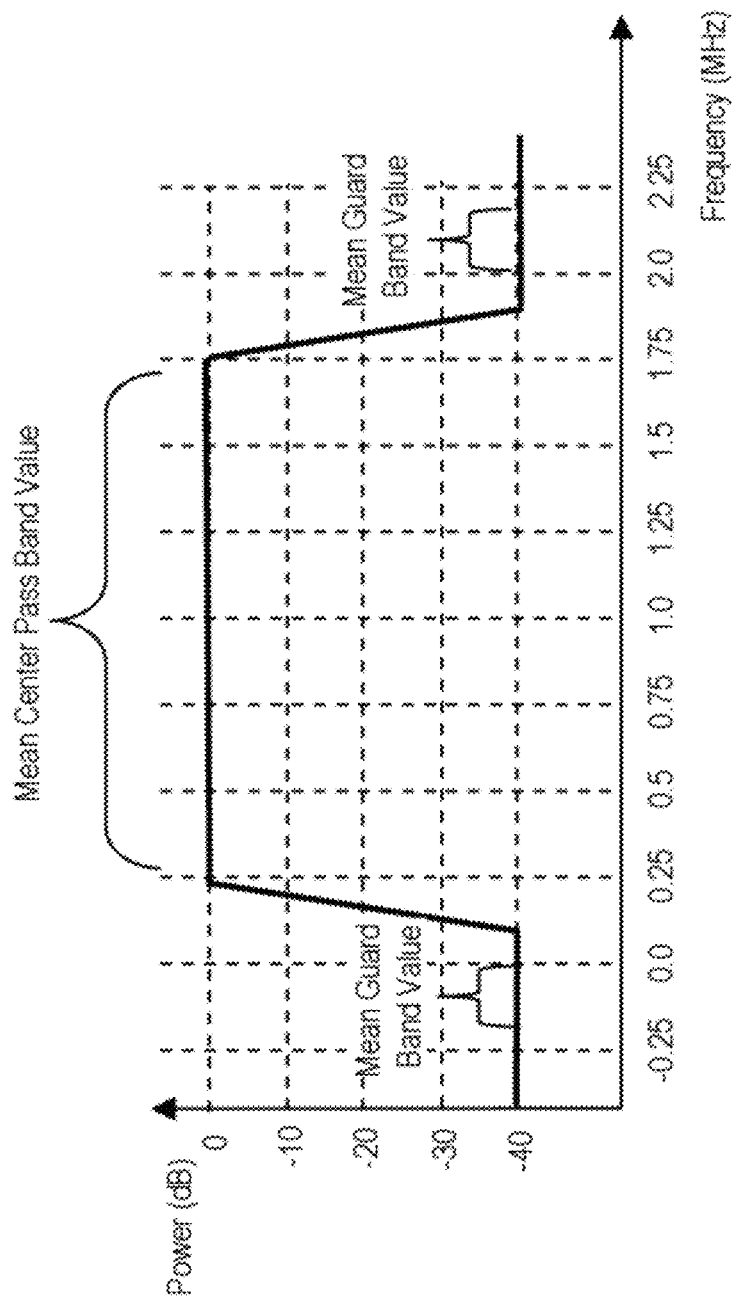
FIG. 28 shows a sample signal mask according to an embodiment of the invention.

In an embodiment, a signal classifier may include a confidence module for determining the confidence score for each signal mask comparison. The formula for calculating the confidence score can depend on several variables, and may be adjustable by a user of the DSA-enabled device to focus on specific scenarios and/or give more weight to certain aspects of the signal mask. For example, an initial check may be performed to verify that a received signal is roughly similar in shape to a target signal mask. This may be done by comparing pass-bands and guard-bands (also referred to as "stop-bands") of the signal and signal mask as shown in FIG. 28. In general, there can be several pass-bands and several stop-bands. A pass-band refers to a portion of spectrum of a signal between limiting frequencies that is transmitted with minimum relative loss. A stop-band refers to a portion of spectrum of a signal between limiting frequencies that is transmitted with maximum relative loss. The signal classifier may use the mean values over a band to substantially eliminate potential errors attributable to signals having high peak-to-valley ratios. It is typically expected that the difference between the mean pass-band value and the mean stop-band values of the received signal will be roughly similar to that of the signal mask. If this is not the case, then the "worst" or lowest possible score may be assigned and the received signal will be classified as a non-cooperative signal. If the received signal passes the initial test, the scoring process may continue further by, for example, performing more detailed comparisons with the signal mask. In an embodiment, only the pass-bands are used in calculating the score, and the transition stop-bands are not used. Such a test may be used in situations in which there is too much variation in the shape of stop-bands between detector scans.

The signal classifier may use various metrics in assigning a confidence score. In an embodiment, the following values may be calculated and used for each or all of the pass- and stop-bands:

D_mean—difference in "mean" values between the signal mask and the received signal in the band D_var—difference in "variance" values between the signal mask and the received signal in the band D_peak—peak-to-mean ratio of the received signal in the band F_man—scaling factor for D_mean (may be user defined and read from a configuration file)

F_var—scaling factor for D_var (may be user defined and read from a configuration file)

F_peak—scaling factor for D_peak (may be user defined and read from a configuration file); in an embodiment if the signal is a low-power signal (e.g., less than 15 dB above noise) then additional weight may be added to D_peak because the shape of the signal becomes difficult to distinguish and the peak-to-mean ratio becomes crucial in avoiding false alarms.

Factor—Normalization factor for the band that is a function of the size of the band in relation to total signal mask size. For example, if a stop-band is 10 frequency bins long and the total signal mask size is 100 bins then the normalization factor for this band is 1/10.

For each of the bands, the score may be calculated as:

$$Score\_band = Factor * ((F\_mean * D\_mean) + (F\_var * D\_var) + (F\_peak * D\_peak)).$$

As a specific example, for a perfect match of a detected signal to a signal mask, D_mean, D_var, and D_peak are equal to zero. Hence, the lower the score the higher correlation between the received signal and signal mask.

The total score of the received signal may be calculated as the sum of scores of all pass- and stop-bands:

$$Score = Score\_band\_1 + Score\_band\_2 + Score\_band\_3;$$

To convert this score into a value within 0-100 range (with 100 meaning perfect match with the signal mask) the following conversion may be performed. For example, a MaxDSAScore value may be the maximum allowed score in order for detected signal to be declared as a cooperative DSA-enabled device, and any signals receiving a score higher than this will be marked as non-cooperative signals.

For a maximum possible score MaxNcScore, if Score is greater than MaxDSAScore then the received signal may be declared as a non-cooperative signal, and:

$$New\_score = MIN(Score, MaxNcScore) - MaxDSAScore$$

$$Inverse\_score = New\_score / (MaxNcScore - MaxDSAScore)$$

$$Confidence\_Score = 100 * Inverse\_score.$$

If Score is less than MaxDSAScore then the received signal may be declared as cooperative and:

$$Inverse\_Score = Score / MaxDSAScore;$$

$$Confidence\_Score = (100 - (100 * Inverse\_Score))$$

Where the resulting Confidence Score is a value between 0 and 100, with 100 meaning the highest confidence in the decision.

Thus, the confidence score may take into account:

The difference in "mean" values between the signal mask and the received signals in the two side guard-bands and center pass-band.

The difference in "variance" values between the signal mask and the received signals in the two side guard-bands and center pass-band.

The above values are being multiplied by user-defined constants in order to increase the weight of a specific criteria (e.g., the difference in variance might be more "important" to a specific user than the difference in mean values).

The difference between the amplitudes of the center pass-band and the side stop-bands.

The peak-to-mean ratio of the signal mask versus the received signal.

As previously described, in general a higher correlation between the signal mask and the received signal results in a higher assigned confidence score.

Various other metrics may be used by a signal classifier according to embodiments of the invention, whether the classifier is an LT2-type or another type of classifier. In general, any method suitable for comparing the similarity of two curves may be used. As a specific example, the classifier may eliminate from consideration any signal values not more than a certain amount above a set or determined noise level. For example, the classifier may consider only signal values more than 5 dB above a determined noise level. Other cutoffs may be used. The classifier may then calculate the absolute difference between the signal and signal mask at each frequency point. The ranking of the signal may then be defined as the sum of these absolute differences, normalized for the number of values considered. This calculation may be done using logarithmic (dB) or linear power values. The use of linear power values may give greater weight to the final ranking, whereas the use of logarithmic (dB) values may cause relatively large signal values to be compressed and given relatively less weight than when linear power values are used. The specific values and calculations used may be selected based on, for example, the expected bandwidth of the cooperative or non-cooperative signals in a region, processing constraints or preferences, or other criteria.

Signal masks and classification algorithms used in LT2-type embodiments of the signal classifier may be implemented for OFDM signals, and may be tailored to these signal's spectrum profiles. In an embodiment, the classifier also may be configured to classify signals that are not OFDM type signals. For example, in an embodiment, the classifier may classify PSK and FSK signals. While the classification approach for other signal types involves generally the same classification process, the representation of suitable signal masks and associated algorithms used to compute correlation metrics may be different than those described above.

Figure 29:
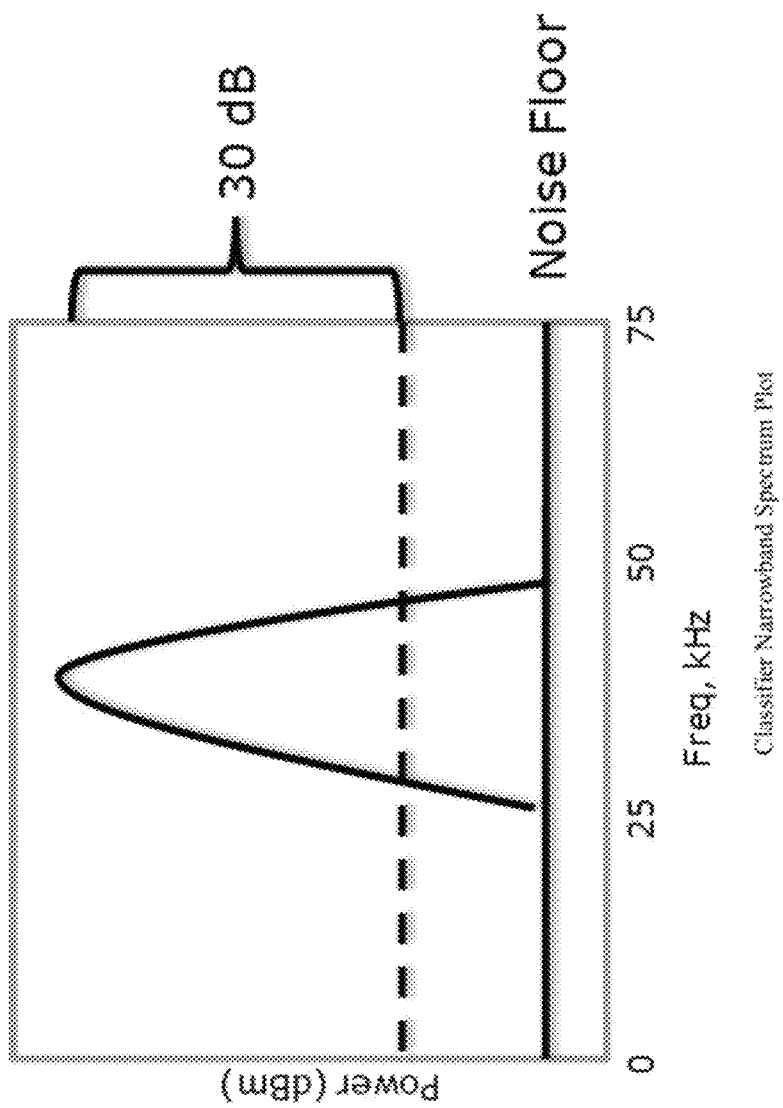
FIG. 29 shows a sample of a narrowband signal analyzed by a classifier according to an embodiment of the invention.

A signal classifier according to another embodiment of the invention may identify and classify narrowband signals. For example, a narrowband signal classifier may analyze a relatively narrow region of the spectrum (e.g., 25 kHz) compared to the LT1- and LT2-type classifiers previously described. An example of a channel suitable for analysis by a narrowband signal classifier according to an embodiment of the invention is shown in FIG. 29. A narrowband signal classifier according to embodiments of the invention may be used in conjunction with, or independent of, the LT1 and/or LT2-type signal classifiers.

In an embodiment, a narrowband signal classifier may analyze a central portion of a relatively narrow channel. For example, a signal classifier may be configured to examine the signal in a central 25 kHz portion of a 75 kHz channel. The classifier may indicate that there is a cooperative signal present if the signal level in the central portion is above an energy threshold observed in the "sidebands," i.e., the portions on either side of the central portion. In the specific example, the classifier may indicate a cooperative signal if a signal of 30 dB or more above the energy in the 25 kHz "sidebands" is observed. Other levels may be used.

Further examples of signal classifiers, specifically LT2-type signal classifiers according to embodiments of the invention, are described in greater detail in U.S. patent application Ser. No. 11/839,503, filed Aug. 15, 2007, the disclosure of which is incorporated by reference herein in its entirety.

In an embodiment, before beginning a classification process a signal classifier may select a "target" (expected DSA) signal bandwidth that is different than the bandwidth of non-cooperative signals expected to be present in the region of spectrum being analyzed. This may allow the classifier to use a relatively simple FFT algorithm to distinguish between cooperative and non-cooperative signals since the classifier can perform accurate signal classification based entirely or substantially on the bandwidth and/or signal mask of the signals, instead of demodulating each received signal. Such an energy-based detector may require fewer processing resources than other techniques, such as modulation or packet shaping approaches.

In an embodiment, a DSA system may track the amount of noise observed in a region of spectrum over time and determine an expected minimum noise in the region. By taking this noise floor into account when classifying detected signals, the classifier may be more sensitive to signals. For example, it is expected that tracking the noise floor may result in about a 5 dB gain in sensitivity relative to a comparable method that does not track observed noise.

Figure 30:
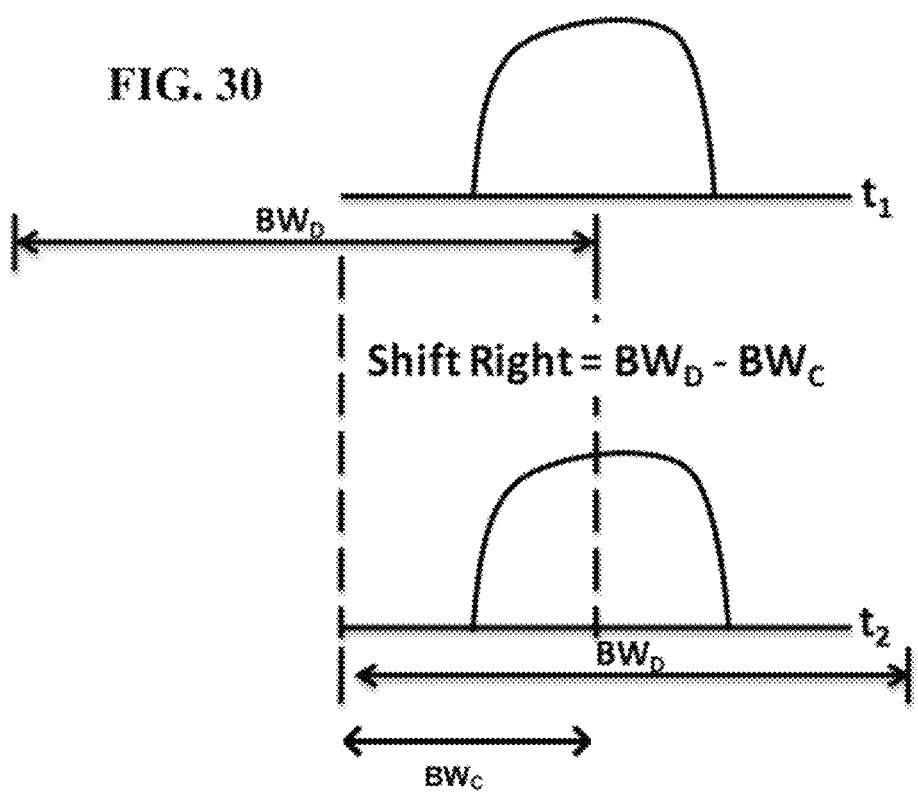
FIG. 30 shows a schematic illustration of overlapping scanning windows according to embodiments of the invention.

In an embodiment, the "scanning window" may be repositioned in time such that sequential windows overlap. That is, the classifier may initially analyze a portion of detector data defined by the detector bandwidth $BW_D$. The next portion of data scanned is selected to begin at a position $BW_D$-$BW_C$, where $BW_C$ is the bandwidth of a cooperative signal, instead of at a position shifted an amount equal to $BW_D$. Similarly, a detector subsystem may use overlapping windows when measuring energy in a region of spectrum. The use of overlapping scanning windows may allow for more efficient detection and/or classification of signals, since it can prevent an observed signal from being "cut" by the arbitrary window boundary and, thus, misinterpreted by the classifier. It also may increase the likelihood of detecting and classifying bursty signals. FIG. 30 shows a schematic illustration of overlapping scanning windows according to embodiments of the invention. For example, in FIG. 30 the initial scan may result in an incorrect classification because only a part of the cooperative signal is included in the scan. However, the cooperative signal is fully included in the second scan, thus allowing for a correct classification. In contrast, if the detector windows had no overlap, this would not be the case because only the second portion of the cooperative signal would have been included in the scan.

In some embodiments, various methods to analyze the shape of a detected signal may be used in addition to or instead of those previously described. For example, the classifier may first define a plurality of frequency bins for detector data as previously described. The classifier may then determine the frequency bin having the peak amplitude and identify the corresponding maximum amplitude, $A_{max}$. The classifier may define the edge of the signal to be a preset level, E, below $A_{max}$, and identify the largest and smallest frequencies having an amplitude equal to the signal edge $A_{max}$-E. The signal bandwidth may then be defined to be the difference between the identified largest and smallest frequencies. The level E may be, for example, 3 dB.

As another example, the signal classifier may generate a cumulative power function from the power versus frequency plot by defining the value at each point of the function to be the sum of the power in a corresponding frequency bin and each lower or previous frequency bin. For example, the value at a first point of the cumulative function may be defined as the power in the first frequency bin of the plot. The value at a second point is defined as the sum of the power in the first and second frequency bins, the value at a third point is the sum of the power in the first, second, and third frequency bins, and so on, with each point corresponding to a frequency bin of the data being analyzed. The cumulative power function may then be normalized for the last point, such that the cumulative power function ranges from at or near zero at the first point to 1 at the last point. The signal bandwidth may be defined to contain a certain portion, for example 90%, of the signal power. Minimum and maximum frequencies may be defined in the region near the ends of the cumulative power function. For example, a minimum frequency may be defined as the frequency where the normalized cumulative power function is 0.05, and a maximum frequency where the normalized function is 0.95. The signal bandwidth may then be defined as the difference between the maximum and minimum frequencies.

In some embodiments, the signal classifier may use fixed channelizations, i.e., the DSA or cooperative spectrum may start and end at known frequencies. In other embodiments, variable or random channel bandwidths may be used when analyzing detector data. Both fixed and variable/random channels may or may not overlap in frequency. If the potential channels overlap, additional processing resources may be required to compare a potential signal to the signal mask since there are substantially more possible frequency offset values than occur for non-overlapping channels. However, the use of one or more channelizations that include overlapping potential channels may allow for more efficient spectrum use by a DSA system. For example, if there is only 10 MHz of spectrum available for use by a DSA signal having a channel size of 2 MHz, using a fixed channelization that does not allow for overlapping channels may allow for a single, relatively narrow (e.g., 25 kHz) non-cooperative signal to cause an entire 2 MHz of spectrum to become unusable by the DSA system. In contrast, if the DSA system uses channels that overlap every 250 kHz, then the non-cooperative signal may only cause 250 kHz of spectrum to become unusable, as all other channels will still be considered clear of non-cooperative use.

Data or instructions from other subsystems may be used to determine an appropriate channelization. For example, the signal classifier may use information from the logical channel table (LCT) as previously described to optimize processing, such as information regarding expected bandwidth or spectrum locations of DSA signals. As a specific example, the LCT may indicate that DSA channels are defined to start only on 1 MHz spectrum boundaries, in which case the classifier may apply a signal mask at 1 MHz intervals, even where the logical channel unit (LCU) size is less than 1 MHz. This may significantly reduce processing requirements. For example, if the LCU size is 250 kHz but DSA channels start on 1 MHz boundaries, the processing load may be reduced by a factor of 4. The classifier also may obtain band-specific sensing requirements or analysis constraints from the LCT. For example, the LCT may specify different co-channel thresholds for different detectors used by the DSA system. Further details regarding the use of the LCT and LCUs have been previously described herein.

In an embodiment, a signal also may be classified in the time domain. In such an embodiment, a detected signal may be compared to one or more transmission lengths expected for a cooperative signal. If the signal matches the appropriate signal mask and has a cooperative transmission length, the signal may be identified as a cooperative DSA signal. If the signal matches the signal mask but does not have an expected cooperative transmission length, it may be identified as a non-cooperative and/or primary signal.

In an embodiment, multiple signal classifiers may be used, and may be matched to one or more detectors or detection techniques. For example, a DSA system may include a signal classifier for each signal type (radar, wireless microphone, etc.) the DSA system can detect.

The signal classifier may enter classification decisions into the LCT as previously described. Various other data also may be entered in the LCT or transmitted to other DSA subsystems. For example, the classifier may enter confidence scores, quality metrics, or various combinations thereof into the LCT. Examples of quality metrics include LCU peak power, average power, and standard deviation around the average power. The channel quality metrics and confidence scores may be used by, for example, the channel manager to distribute spectrum among the use tables.

In some embodiments, the signal classifier may have a restricted operation from that described, or may be omitted altogether. For example, all DSA systems or DSA-enabled devices in a geographic region may utilize a synchronized detection gap and standardized detection timing. Although such a configuration may allow for acceptable operation without the use of a signal classifier, it also may require precise timing of the detection gap. A global synchronization scheme such as the GPS timing system may be used to achieve such synchronization. As another example, a dedicated control channel could be assigned to instruct cooperative devices on how to locate other cooperative devices, or on which a broadcast beacon could be transmitted. As another example, separate classifiers may be used to identify non-cooperative signals and cooperative DSA signals.

In some embodiments, additional signal processing methods such as modulation type determination may be applied by the signal classifier. Such methods may incur additional processing costs, but may provide more accurate signal classifications.

As previously described, a DSA-enabled device or network may use a range of frequencies and bandwidths. To provide control and assurance to regulators and stakeholders that the technology does not cause undesirable interference or have other adverse effects, policies may be implemented on DSA-enabled devices to enforce adherence to regulatory or other requirements. Referring again to FIGS. 1-2, a policy module 140 and related components may be used to implement and enforce these policies in a DSA-enabled device.

As previously described, a DSA-enabled device may be described in terms of multiple modules or logical components, including a communication stack and underlying radio hardware, detection hardware, the DSA system, and a policy module. The various components of a DSA system may interact with the policy module 140 when determining spectrum access opportunities that are currently available, e.g. frequencies, bandwidth, power level, or modulation techniques the device can use to transmit given its current environment. The DSA-enabled device or network may execute applicable strategies needed for transmissions to conform to policies defined within and/or enforced by the policy module.

The policy module may cause the device to operate correctly and refrain from causing harmful interference by enforcing that a DSA-enabled device configures the radio to one of the approved states only and by filtering illegal transmission requests. For example manufacturer may implement custom DSA devices, networks, or other systems. In an embodiment of the invention, the policy module represents a standardized, accredited module in order to conform to regulatory stakeholder requirements as the policy module represents the core "trusted" components on the radio device.

Figure 31:
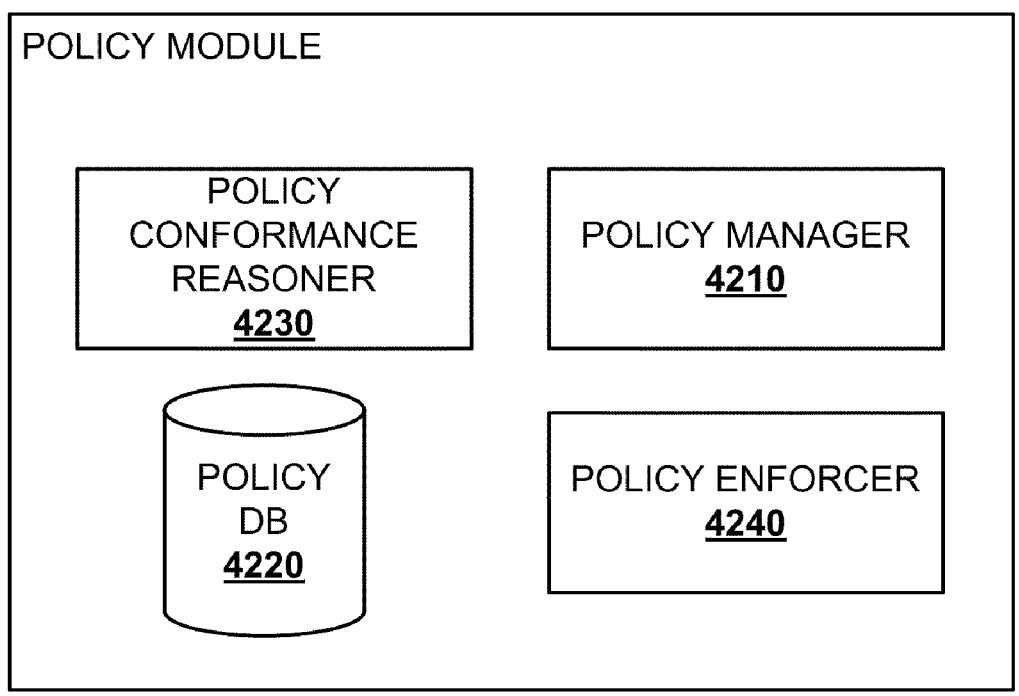
FIG. 31 shows a block diagram of a policy module according to an embodiment of the invention.

FIG. 31 shows a block diagram of a policy module according to an embodiment of the invention. The policy module may include a policy manager (PM) 4210, a database 4220, a policy conformance reasoner (PCR) 4230 and a policy enforcer (PE) 4240. Depending on the resources available to the device, the Policy Module may be a part of a DSA-enabled device. Alternatively, the components of the policy module may be moved to a remote proxy and accessed remotely by the Policy Enforcer on the radio.

The policy manager (PM) 4210 may act as a gateway to an accredited policy module. The PM may process and respond to remote commands from any authorized stakeholder and for maintaining a policy database. The following table lists an example of commands that may be supported by the PM. Other commands and modes may be used.

| Policy | Add | Adds a policy content to a persistent storage and associates the policy with a specific operational mode. The policy is activated if it is part of a running mode. |
| --- | --- | --- |
| | Delete | Removes an association from a specific operational mode. The policy is deactivated if part of a running mode. The policy is removed if no more references exist. |
| Mode | Add | Creates a new blank mode. |
| | Delete | Removes information about a non-running mode. Running mode cannot be deleted. |
| | Switch | Stops currently running mode and starts the new mode. All policies associated with the new mode are activated. All others are deactivated. |
| Statistics | Status Query | Returns information on the current state of all policy components. |
| | Log Query | Queries and returns information about device and policy activities. |
| | Log Manipulation | Clears, prunes, or deletes specific entries from logs. |

In some embodiments, regulatory or service provider requirements may specify that the policy module use secure techniques to manage and enforce policies. As a specific example, the PM may use a X.509 Public Key Infrastructure (PKI) or similar mechanism for authorization, authentication, and accounting of policies or policy requirements.

Example elements of policies according to embodiments of the invention are provided in the table below. These examples are provided for illustration only, and policies used with embodiments of the invention may include additional or alternative elements. Different combinations of policy elements may be used, and various elements may be used or omitted from a particular policy.

| Spectrum Policy Descriptions |
| --- |
| Listen-Before-Talk based types |
| LBT - Same up and downlink frequencies
LBT - Different, but known, up and downlink frequencies
LBT - Different, but known, up and downlink frequencies, band plan known
LBT - TV band (TV detector) |
| Spatial Types |
| Geographic border field strength limits
Database geographic/TV coverage area based |
| Temporal Types |
| Beacon reception required to use band
Time of Day restrictions
Authorization for finite time duration (with periodic renewals) |
| Device Based Types |
| Device Capability - Ability to measure second and third harmonic
Device Capability - XG TX power spectrum density limit
Adjustable C/N Limit for any policy (−6 dB (insignificant interference impact to Primary users) and 20 dB (medium amount of interference impact to peer XG DSA-enabled devices)) |
| Connectivity Based Types |
| Beacon reception required to use band
Connectivity requirement for any policy (can use certain bands only if connected to Spectrum Manager) |
| Group based types |
| Type 1 Group Behavior - Abandon channel if any DSA-enabled device within certain range detects Non-cooperative signal
Type 2 Group Behavior - Determine XG TX power based on estimated interference probability (used Belief, Disbelief, and Ignorance estimates fused with Dempster-Shafer Theory)
DSA-enabled device Identify restrictions (e.g., use while airborne prohibited, use only in fixed applications, Red Cross use only) |
| Distributed control based types |
| Automated policy updates if feedback indicates that existing policy is insufficient for non-interference operations
Automated policy updates notification of policy revocation or update by policy authority |

The PM may maintain a running mode and multiple standby modes. Each mode may be associated with a set of policies that should be enforced when the mode is activated. These may allow for pre-planned policy configurations that the DSA system can switch among as needed.

The policy enforcer (PE) 4240 may restrict access to a spectrum region by a DSA-enabled device, by ensuring that the device's configuration conforms to regulatory and system policies. Filtering of transmission requests may be achieved by evaluating the current configuration of the device, current device component configurations, collected environmental data, and a specific transmission request against policy rules and constraints. If there are no policy constraints that prohibit the requested transmission, the policy enforcer may allow the transmission to take place; otherwise it may be prohibited. The PE may include a component which periodically compares channels considered for potential use by the DSA-enabled device against available policies. The PE maintains representation of the current state of the device as well as a cache of recent approvals and denials to allow for more rapid decisions regarding channel use. For each channel, the PE maintains a set of pre-approved device states that the DSA system must match in order to be permitted to transmit. Each pre-approved state represents a configuration in terms of values and allowed deviation to parameters maintained by the DSA system that are used for matching a request. Alternatively, for each channel the PE may inquire with the policy conformance reasoner (PCR) whether the current state for that channel would be approved. The PE may maintain these decision caches, since PCR calculations may be relatively computation-intensive. The PE may monitor channels the DSA system is attempting to use and proactively enforce that transmissions originating from the local device to satisfy policy requirements.

In some embodiments the PCR may use policies expressed in a policy language. The language may be a declarative language for expressing policies and logic used for guiding operation of the devices. Example frameworks suitable for constructing the policy language include the Web Ontology Language (OWL), and Semantic Web Rule Language (SWRL) available from the World Wide Web Consortium (W3C).

Ontological concepts may be defined for expressing knowledge about a DSA-enabled device, its hardware and software components, protocol stacks, capabilities, and current state. Examples include an operational configuration of a transmitter in terms of power and frequency, with historical data about collected signal detections from a detector. By using a structured language, the system may provide an interoperable framework for sharing and evaluating information across different radio implementations. This may allow manufacturers to implement custom DSA system and stakeholders to certify and reuse the same policy module, or a base version of a policy module, on multiple platforms. The language also may allow stakeholders to express spectrum requirements using an abstract terminology without the need to understand specific radio implementations, such as specific hardware configurations.

In an embodiment, the language defines concepts for expressing restrictions on the devices and their states in terms of SWRL rule constraints. For example, rules may be defined for expressing the applicability of a specific policy and for accordingly determining actions the policy permits or prohibits a device to perform.

In an embodiment, the fundamental modeling primitive of the language is a policy (spectrum access control policy), which is associated with a collection of facts and constraints used to determine whether the policy applies to the radio's current configuration. In general, two types of policies may be used: (i) permissive policies that permit devices to access a spectrum whenever a device and its spectrum use data can satisfy the policy's constraints; and (ii) prohibitive policies that prohibit devices to access a spectrum whenever a device and its spectrum use data violate one of the policy's constraints.

In an embodiment, the language may define terminology for allowing the architecture to operate in the presence of multiple policies from multiple stakeholders. The policy module 140 may include functionality to resolve conflicts among policies when multiple policies are activated. In some embodiments a default de-confliction rule that a prohibitive policy overrides a permissive policy may be used. The rule may be explicitly implemented by the policy module because the system's primary goal is to limit interference. A meta-level vocabulary for defining absolute and relative prioritization of policies may be used to override the default rule. For example, the language may define a vocabulary for assigning numeric priority levels to policies, and/or for relatively ordering policies by defining relationships between pairs of policies. The combination of a default rule and rule prioritization schemata may determine an absolute order among policies, thus assuring enforcement consistence and correctness.

The PCR may evaluate policies, such as for syntax conformance and meta-level validity, to confirm that the policy can be fully implemented and enforced by the policy module. Once validated, the PCR may convert the policy into its internal representation, such as by extracting data defined inside a policy document and loading the data into the policy module internal database 4220. The PCR also may extract rules defined by the policies and convert them into workflows to be used during operation of the DSA-enabled device. During the conversion process, the PCR may optimize the estimated execution time of each workflow by reordering workflow components based on an expected cardinality of answers and computing the complexity of each component. For example, the PCR may defer all geospatial-computational workflow components, which typically are more computationally-intensive, to be processed after knowledge-lookup components.

In an embodiment, the PCR may use a policy's meta-description to place the policy in a list of active policies, which may be sorted by importance or priority. Using this approach, the PCR may dynamically merge and de-conflict policies as they are made available to the radio. The de-confliction technique may apply the default rule for breaking ties between permissive and prohibitive policies, and account for numerical priority levels assigned to policies and relative policy ordering. In such an embodiment, even in the event of one prohibitive policy and one permissive policy each being considered "more important" than each other (i.e. there is a cycle of importance among policies), application of a default rule may insure that a prohibitive policy takes precedence and thus avoids potentially harmful interference by denying a requested transmission. This may reduce the workload required for the PCR to reach a transmission approval decision and to compute available spectrum access opportunities.

Figure 32:
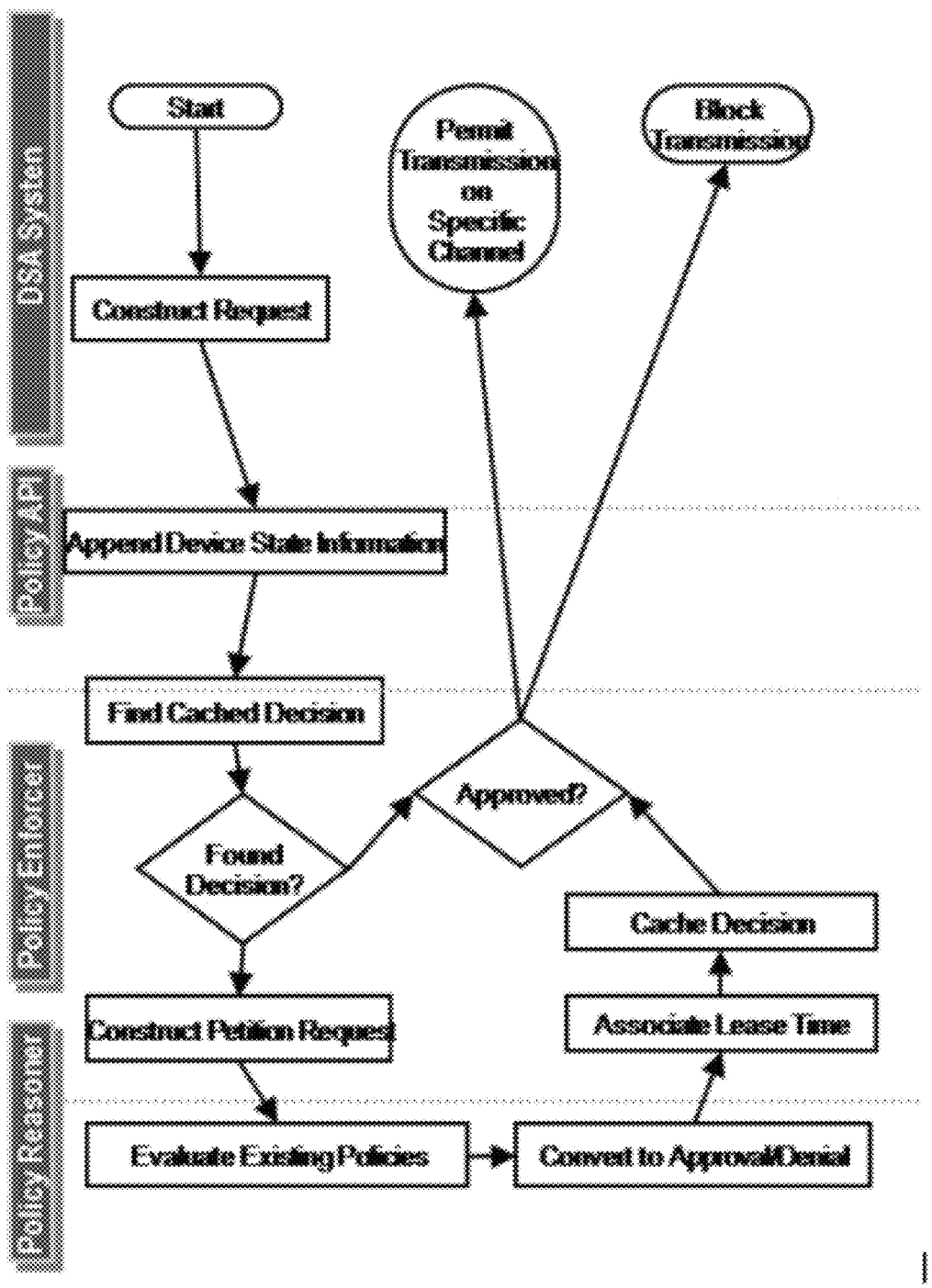
FIG. 32 shows an example process for obtaining approval from a policy module according to an embodiment of the invention.

In an embodiment, the policy module may prevent interference by a DSA system with non-cooperative networks by interrupting transmission commands sent to the radio. Before the radio transmits, the DSA system may first obtain an approval from the policy module. FIG. 32 shows an example process for obtaining approval from a policy module according to an embodiment of the invention. In some embodiments, the policy module may have direct access to the hardware to preclude a DSA system from sidestepping the policy module and transmitting using a disallowed configuration.

In an embodiment, the PE may maintain a set of pre-approved state models for a DSA system based on configuration policies and an associated time period during which the state is valid. The PE may assume that a pre-approved device state would in fact be approved for some period of time. This time period may be a time period as defined in, for example, the Dynamic Frequency Selection (DFS) standard.

In an embodiment, when no pre-approved state is applicable, the PE may generate and send a petition request to the PCR, which evaluates it against an ordered list of policies based on decreasing priority. The PCR may use the first policy in the ordered list that applies to the petition to approve or deny the proposed transmission.

Figure 33:
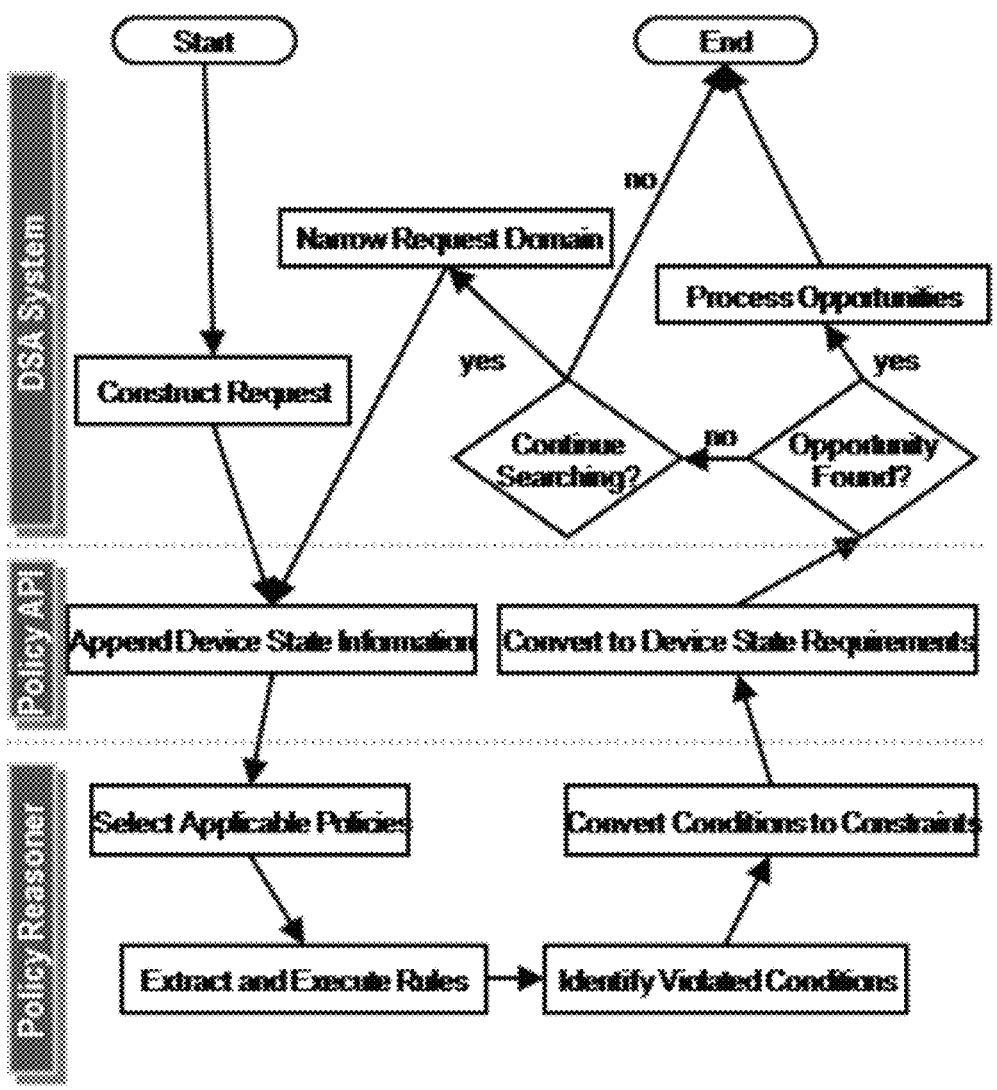
FIG. 33 shows an example process for using policies according to an embodiment of the invention.

Since policies may restrict spectrum access, a DSA system can use the constraints to learn about newly-available channels and requirements that the DSA system should or must meet prior to transmitting on those channels. FIG. 33 which shows an example process according to an embodiment of the invention in which a DSA system obtains additional information about spectrum availability based on policy information. As shown, a DSA system may obtain the opportunities by submitting partially-populated configuration states to the PCR. The PCT may then evaluate the request against policies to identify missing values of unpopulated parameters that would render the request a valid spectrum use. As a specific example, the PCR may discover that for a submitted configuration to be approved, the transmission frequency must be either 2310 MHz or 5180 MHz. In this case, the PCR returns two opportunities.

There may be situations when the PCR cannot find or fully populate an opportunity. If a request does not match any policy or if it violates a policy, then no opportunity is found.

On the other hand, a parameter may not be bound if there is an unbound set of possible values. For example, while a value may be restricted to a certain range, depending on the accuracy available to the system it may be very computationally-expensive to bind a device's position to be within the continental United States by enumerating all matching geospatial coordinates.

As previously described, in general a policy manager 140 may interface with some or all of the other components of a DSA system, and may be involved in various processes performed during operation of a DSA-enabled device or network. In some embodiments, policy may be applied more or less often to different channels or types of channels, and may be applied differently in different situations. For example, some tests have indicated that performing scanning and applying policies to a relatively large number of channels may generate unacceptably high processing requirements. Therefore, some embodiments may apply policy to a subset of all possible channels, as previously described. For example, channels may be classified into several different types, and policies may be applied at different frequencies to each type, or not applied at all to some channel types.

In some cases, a DSA system may apply policy considerations to channels other than those currently used by the system. For example, when a DSA-enabled device performs concurrent sensing and communication, policies may be applied to verify that channels identified as available by a signal classifier are also allowed by one or more policies currently in effect. Checking policy (i.e., providing evidence to the policy module as previously described) at varying rates also may preserve processing power. For example, the system may check policy with a relatively high frequency, and less frequently on other channels since there is no reason to check policy for an unused channel as frequently as the current channel if a signal has recently been detected in the other channel, since the other channel will not be considered available for use by the DSA system regardless. As a specific example, policy may be checked for the current channel about ten times per second on the current channel. The rate at which policy is checked or a channel may be set by regulatory requirements.

Figure 34A:
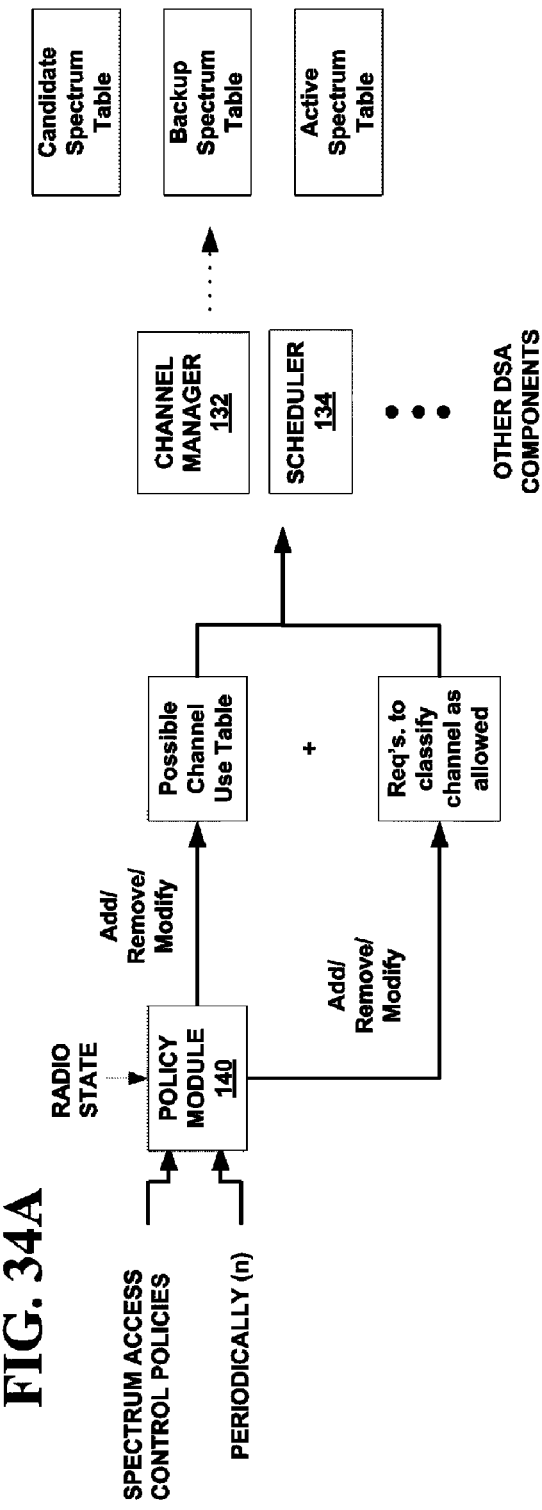
FIG. 34A shows an example logical flow for applying policy requirements to channel use tables according to an embodiment of the invention.

In some embodiments, the policy module may exert different influences over the different channel use tables as previously described. For example, it may uses access control policies to determine what channels are contained in the "possible" table. It also may influence the contents of the other use tables by affecting the sensing and detector requirements which are used in the classification of channels. The requirements may differ per channel. FIGS. 34A and B show example logical flows for applying policy requirements to use tables according to embodiments of the invention. As illustrated, the policy module periodically may evaluate one or more use tables, such as the "possible" and "active" channel use tables. As previously described, the possible use table may be evaluated less frequently than the active table.

Periodically, every n period, the policy module may evaluate the possible use table and the relevant spectrum access control policies to make any changes to the possible table and any associated changes to the requirements for marking a channel as allowed for transmission. The policy module also may evaluate the possible table whenever the spectrum access control policies are changed. Changes to the possible table and the classification requirements may be made available to other DSA system components, and may indirectly influence other spectrum tables in conjunction with other system components as previously described.

Periodically, every m period, the policy module may evaluate the active use table and removes channels that are no longer allowed for use according to active policy requirements. The policy module also may evaluate the active table when classification requirements change or when the channel manager or other system component attempts to add a channel into the active table.

Figure 34B:
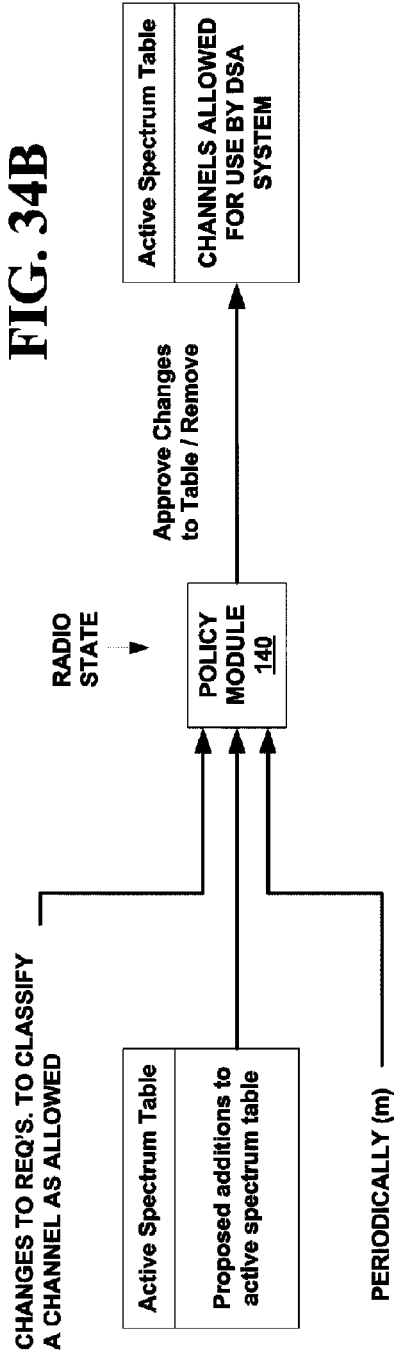
FIG. 34B shows an example logical flow for applying policy requirements to an example channel use table according to an embodiment of the invention.

In some embodiments, the policy module also may perform a policing function for other use tables, such as the active and backup use tables. That is, the policy manager may be able to "veto" or otherwise override whether a system can use a particular channel for transmission. FIG. 34B illustrates an example process on the active use table. The policy module also may apply different rules and requirements to different use tables, such as where active spectrum is policed more vigorously, and backup spectrum is actively, yet less frequently, policed. In some embodiments, the policy manager may not police some use categories at all. For example, possible spectrum often does not need to be policed.

The time periods described with respect to FIGS. 34A and B may vary, or may be pre-set for different configurations. According to an illustrative embodiment, periods of 5 seconds and 60 seconds for the m and n periods, respectively, may be used.

The devices, systems, and methods described herein may have applicability to, and may provide various benefits to, a variety of network types and topologies. A few specific examples of applications and benefits of embodiments of the present invention will now be described. It will be understood that these examples are provided by way of illustration only, and other benefits and applications will be apparent to one of skill in the art.

The spectrum sensing and local adaptation functions described herein may provide information that is currently unavailable to conventional networks, such as nearly continuous estimates of propagation loss between users, spectrum usage measurements with, for example, 10 to 20 dB more sensitivity, and fewer "false positives." This information may improve the performance of local resource allocation and may minimize stability problems because each DSA-enabled device will locally have more and higher quality information to make determinations regarding spectrum usage.

DSA systems and methods also may provide benefits to existing, conventional network types such as, for example, wireless service providers. For example, the use of DSA systems and methods may increase the overall spectrum supply within a network, even where the network is generally restricted to a region of spectrum specified by regulatory requirements, by allowing for more efficient use of the spectrum. DSA systems and methods also may increase utilization of encumbered spectrum, especially in the television bands, by allowing the relatively large portions of allocated but unused spectrum to be used by DSA networks without interfering with primary or co-primary uses or networks. For example, DSA may increase the utilization of the heavily encumbered TV spectrum by using spatial and frequency holes in the spectrum ("white spaces") and reducing or minimizing the risk of interference to primary users. Generally, DSA methods and systems also may reduce wireless system infrastructure costs, by enabling the use of significantly more spectrum than is currently available to providers. It is believed that shared spectrum usage as described herein may more than double the potentially-available spectrum.

DSA methods and systems also may enable spectrum trading and pooling within networks that would otherwise be limited to a set of fixed and/or predefined regions of spectrum. For example, DSA systems enable spectrum trading, leasing and pooling pursuant to the FCC's Secondary Markets initiative, which authorizes spectrum leasing by licensees to other users and networks. It is believed that there is a large amount of spectrum that can be leased by many wireless services, including the Cellular Radio Telephone Service, 700 MHz, Personal Communications Services (PCS), Private Land Mobile Radio (PLMR), and Fixed Microwave Services. Licensees in these services are allowed to trade or lease their existing spectrum rights on a short- or long-term basis with minimal restrictions. Using DSA techniques, under-utilized spectrum may be traded and accessed through private transactions, cooperatives, and third-party band manager approaches. Spectrum license holders may have an incentive to lease spectrum to defray the high costs of spectrum purchases from FCC auctions or as a revenue source. Spectrum-constrained service providers also may make temporary use of more favorably situated spectrum. Other new users can lease spectrum for short-term high-value itinerant applications. In a secondary spectrum market, DSA also may overcome certain impediments to robust leasing including concerns that a lessee's use could cause interference to the licensee. In some cases, it is believed that DSA may enable economical short time period leasing (minutes to months) instead of multiple-year leases.

DSA systems may lead to lower wireless infrastructure costs, including base station equipment. For example, the range of wireless links using conventional technology is limited to short distances, typically hundreds of meters up to about 5 km, unless the DSA-enabled devices are within line-of-sight of each other. More transmitters and antennas are required in higher bands to overcome building and terrain obstructions. Erecting multiple towers, obtaining necessary zoning, variances, and landlord permission is prohibitively expensive in most cases. DSA-based wireless systems may allow for reuse of the lower bands in the UHF and VHF bands, where link range can exceed 15 km even in non-line-of-sight conditions, whereas systems in the higher microwave frequencies have a range of approximately 5 km in non-LOS conditions. The economic benefits of this increased range may include a reduction in the number of base stations. The use of DSA also may reduce the number of new towers needed because it is believed that the existing radio tower infrastructure may be sufficient for up to 100% coverage. Moreover, DSA may allow economical broadband Internet access to reach areas in which it was previously difficult or impossible to provide such access.

In general, embodiments described herein are relatively radio agnostic, i.e., may be used in conjunction with or implemented by any hardware and/or software-defined radio. In some embodiments, upon power-up of the DSA-enabled device, a radio controller or radio interface module may communicates over a radio API to initialize modem hardware and configure transmit/receive MAC data buffers for communication with the modem hardware. After initialization, the radio interface may await inbound packets from the modem or transmits queued packets to the radio for transmission over an assigned wireless channel.

Modem hardware may be implemented, for example, as an independent wireless transceiver, distinct transmitter and receiver modules, or one or more wireless transceiver chips or chip sets. As an example, a wireless transceiver may be based on a commercially available (COTS) 802.16-based modem chip set.

In some embodiments, the data elements transferred to and from the radio may include, for example, the frequency to be used by the radio to transmit and receive; a transmitter on/off signal; transmit/receive MAC data (output/input data queues); whether the radio state is synchronized (in a cooperative DSA network) or unsynchronized (in a free wheel mode) with respect to the detector; the type of radio (subscriber, base station, etc.); whether the local oscillator is locked or unlocked; and whether the power amplifier is on.

In an embodiment, modem capabilities may be stored in a predefined data structure and may include information such as a frequency of operation (e.g. 225-600 MHz), maximum power, etc. The radio may contain a list of frequencies on which the radio is prevented from transmitting.

In an embodiment, a transceiver manager may interface with one or more transceivers and operate to synchronize one or more detection gaps, for example, among DSA-enabled devices. This transceiver manager may differ from the scheduler 122 previously described by also scheduling intra-frame events. In some embodiments, the transceiver manager and the scheduler 122 may be a single module. For example, the scheduler 122 may perform some or all of the functions described herein for the transceiver module. The transceiver manager may also provide an interface to and/or support for creating for a media access control (MAC) layer. In an embodiment, the transceiver manager interfaces to MAC components embodied in a transceiver chip. In another embodiment, the transceiver manager provides the MAC components within the transceiver manager.

In an embodiment, the signal format of a DSA-enabled device may be based on the IEEE 802.16 standard. The signal format is time division multiplexed, and thus, has a time frame format. Each frame has a specific sequence of events, which is described and implemented by the transceiver manager. It will be understood that a DSA-enabled network or particular DSA-enabled devices are not limited to any particular signaling format, nor is a DSA-enabled device necessarily limited to supporting only a single signaling format.

Two modes of operation may be implemented, RadioUDP and a Virtual Network Interface (VNIC) implementation. RadioUDP may be a simulated radio interfacing to another type of network such as Ethernet. A VNIC implementation abstracts a real radio and may vary based on modem vendor type. An example VNIC mode using a COTS 802.16-based chipset according to embodiments of the invention will now be described; extensions and modifications for use with a RadioUDP or other mode will be readily apparent to one of skill in the art.

In such an embodiment, a frame may be initiated by a frame sync signal that sets the start time of the frame. The 802.16 signal format is performed in the COTS 802.16-based chipset/ASIC. The first segment of the frame is reserved for the base station (BS) burst, or uplink. This BS burst includes a preamble, network configuration data, and the MAC data. Before the start of a frame MAC data to be transmitted is queued up for transmission, in the prior frame. At the tail end of the last frame the local oscillator and RF/IF gain components are set. The local oscillator sets the radio center frequency, and requires a set up time, for example, up to 100 microseconds prior to reaching a stable frequency.

After the frame sync, the ASIC initiates a transmission. It toggles the transmit/receive of the radio to transmit. After a software programmed lead time, ASIC outputs digital data samples to, for example, IF hardware, such as an IF card. This lead time allows the RF circuitry to be quiescent in the transmission state. The digital data samples start being converted to analog values within 10 microseconds. The ASIC continues to stream out digital values which are converted to RF energy within the RF/IF cards. At the end of the BS burst the transmit/receive line is toggled to receive at a software controlled lag time after the last digital data is flowed to the IF card. The lag time allows for latency in this process and is set to, for example, 15 microseconds. This ends the BS burst time.

In parallel all subscribers are using synchronized framing events, within the downlink subframe. The subscriber during the first segment of the frame receives the BS burst. In the framing structure there is a gap in time between the BS burst and the first subscriber burst. During this period the transceiver manager can be configured to instruct a subscriber to set the local oscillator and the RF/IF gain components. The local oscillator sets the radio center frequency. The RF/IF gain values are set by an automatic gain control module in firmware. There are generally three categories of gain: the preselector attenuation, the IF attenuation, and digital gain selection. The digital gain selection is used to shift, for example, the bit position of a 10 bit sample value within a 14 bit word analog sample value. This bit shifting is a low latency process since it can occur at the sample rate.

Following the BS burst the BS receives subscriber bursts in a sequence. This sequence is defined within a downlink map. The subscriber's transmits data in a similar fashion as the BS but during their allotted time slots within the downlink portion of the frame. Each subscriber time slot can be advanced to compensate for signal propagation delays that occur when the communication link range is expanded. The radio component parameters are adjusted earlier than this advanced time.

The automatic gain control (AGC) feedback loop is used to set the proper receive attenuation. The subscriber measures the receiving signal strength of the BS burst during its preamble time segment when the radio is time synchronized with the BS. If the signal strength is above the quiescent digital sample word value it increases the desired attenuation setting by one step, if the signal strength is below the quiescent digital sample word value it decreases the desired attenuation setting by one step. The link propagation loss may be assumed to be symmetrical such that the automatic level control (ALC) is tied to the AGC attenuation values. This ensures that the subscriber transmits a signal level that will be properly received at the BS.

The subscriber firmware can be commanded by the DSA software to not exceed a certain power level, for interference mitigation reasons. This command clamps the maximum transmit section gain to not exceed a fixed value.

Following the BS burst and the subscriber bursts there is a reserved time for one or more detection gaps as previously described. During this period the transceiver manager instructs the local oscillator and the RF/IF gain components to be set. The local oscillator sets the radio center frequency. This center frequency may be different than the communication link frequency. The RF/IF gain components are set to keep the signal environmental sensor within its dynamic range. The preselector is adjusted to maintain a low amount of intermodulation products. Once the local oscillator was sensed to have phase locked the detector processing module is initiated. After this process completes the sequence of events is at the beginning of the next frame. This restarts the process of setting the proper components for the start of the frame just prior to the frame sync signal.

In an embodiment, the radio can be configured to use the same amplifier and attenuator circuitry for both transmission and reception. Since in general the receive gain is not identical to the transmission gain the settings for the gains change in within a frame.

In an embodiment, a data queue manager may ensure that control traffic for a cooperative DSA network has low latency. The radio may have two data flows—user data and cooperative DSA network control traffic. To ensure the radio switches rapidly during a rendezvous process, DSA control traffic may be designated as higher priority traffic. For example, user (data) traffic may be placed in a common queue, and the control traffic placed at the front of the queue. Thus, based on packet/message type, the priority of a packet data unit in the queue may be specified. This is an example of DSA QoS (Quality of Service) according to some embodiments, which may dramatically enhance performance of the DSA-enabled network.

As a DSA-enabled device and/or non-cooperative signal source move toward each other, the system may need to switch quickly before an interfering signal strength becomes so strong that it prohibits successful communication. In some cases, the network will need to initiate a cold start process, which may be more time consuming than performing channel switching. In some cases, the transition between frequencies may result in a temporary loss of connectivity, and/or a DSA-enabled device may also enter a "cold start" mode which may result in fairly significant loss of connectivity (100 s of ms to seconds).

Figure 35:
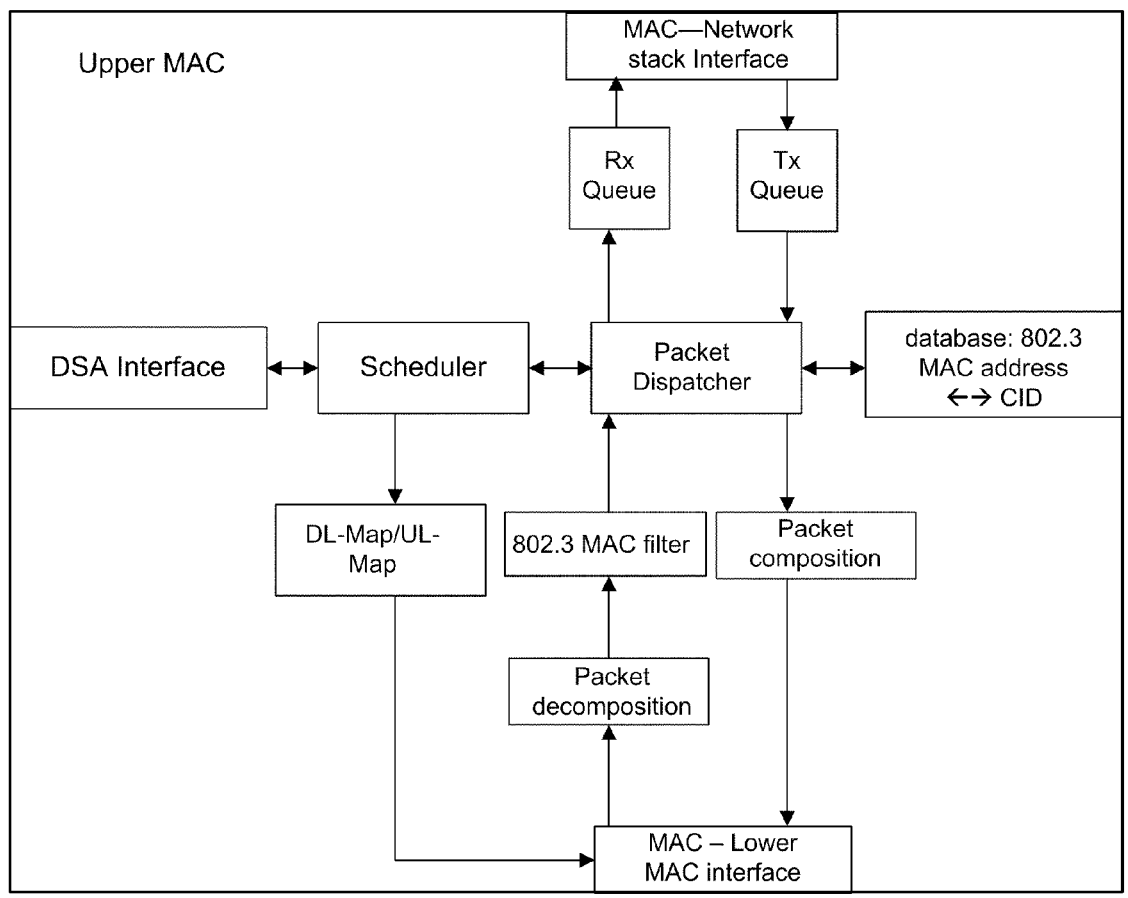
FIG. 35 shows a schematic view of a radio driver architecture that supports queuing according to an embodiment of the invention.

To minimize the effect of this behavior, a DSA-enabled device may alert the underlying radio about impending transitions. In turn the radio may prevent data packets from being transmitted, and buffer them until connectivity is reestablished. The radio driver also may prioritize DSA management packets over all other traffic so as to speed up the connectivity establishment/reestablishment process. An embodiment of the driver architecture that supports queuing is illustrated in FIG. 35.

According to an embodiment, a dynamic transceiver control may dynamically adjust the transceiver RF and IF component settings (amplifier gain, pre-selector RF filter value, etc) to maximize receiver sensitivity and maximize the shape of the transmitted spectrum. This may reduce the need for high performance transceivers in co-site conditions, which significantly reduces radio costs. In some embodiments, when strong co-site signals cause frequency dependent distortion and signal overload in the DSA-enabled device receiver, a DSA system may compensate by changing the operating frequency until a channel with minimal distortion and overload is found. A dynamic transceiver control may enable the DSA-enabled device to change both the transceiver settings and change the operating frequency to find the best radio operating point. By adapting both the transceiver settings and the operating frequency, the DSA-enabled device may obtain better receiver sensitivity, which improves the link range or enables lower cost hardware. Changing frequencies and changing transceiver settings to improve receiver sensitivity use the same basic algorithm, hence, merging them together in a single process is the most efficient implementation. Similarly, Dynamic Transceiver Control the DSA transmitter settings, which may improve the transmitted waveform shape.

Figure 36:
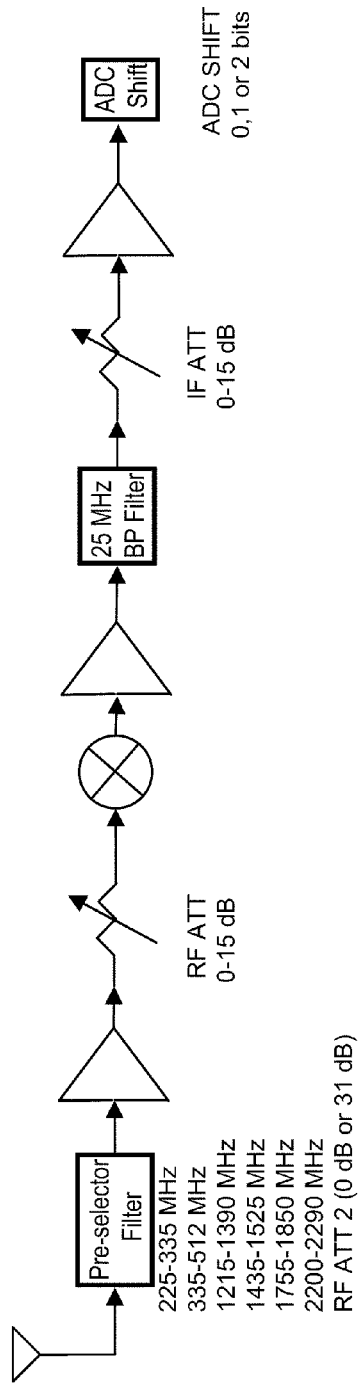
FIG. 36 shows an example DSA receiver RF circuit according to an embodiment of the invention.

FIG. 36 shows an example DSA receiver RF circuit according to an embodiment of the invention. There are four component configuration parameters: (1) The Pre-selector is either tuned to the frequency of interest (in-band setting) or mis-tuned (Next Band) to provide a large (~60 dB) loss. The amount of loss when the pre-selector is mis-tuned is frequency dependent and usually not known. Additionally, the pre-selector has an additional signal path with a variable attenuator (RF ATT 2). This attenuator may have multiple settings e.g., 0 dB and 31 dB. There is no filtering in this path. The purpose of RF ATT 2 is to enable operating in very high co-site conditions. (2) The RF ATT controls the amount of attenuation in the RF section. (3) The IF ATT controls the amount of attenuation in the IF section. (4) The ADC SHIFT controls the voltage range of the AD converter. It can be shifted up, for example, two bits.

In general, increasing the RF ATT, IF ATT or the ADC SHIFT values reduces distortion but increases thermal noise. Without co-site signals and with weak DSA input signals, RF ATT, IF ATT or the ADC SHIFT settings can be minimized to maximize sensitivity. With co-site signals, each of these parameters may be adjusted for optimal performance at a certain frequency. The RF signal path for the modem receiver and the DSA Detector may be optimized with the same or similar hardware configuration parameters since they share the same RF and IF hardware.

The table below shows example DSA Receiver hardware configurations. These configurations can be determined manually based on laboratory measurements of the hardware when in the same co-site conditions of interest. Different co-site conditions would have different hardware configuration values.

Example DSA Receiver Hardware Configurations

| Configuration # | Description | Pre-Selector | RF ATT (dB) | IF ATT (dB) | ADC SHIFT |
|---|---|---|---|---|---|
| 1 | Max Loss | Next Band | 15 | 15 | 2 |
| 2 | Maximum Attenuation | In-Band Setting | 15 | 15 | 2 |
| 3 | Mid Attenuation | In-Band Setting | 10 | 10 | 1 |
| 4 | Low Attenuation | In-Band Setting | 5 | 5 | 0 |
| 5 | No Attenuation (Best NF) | In-Band Setting | 0 | 0 | 0 |

Figure 37:
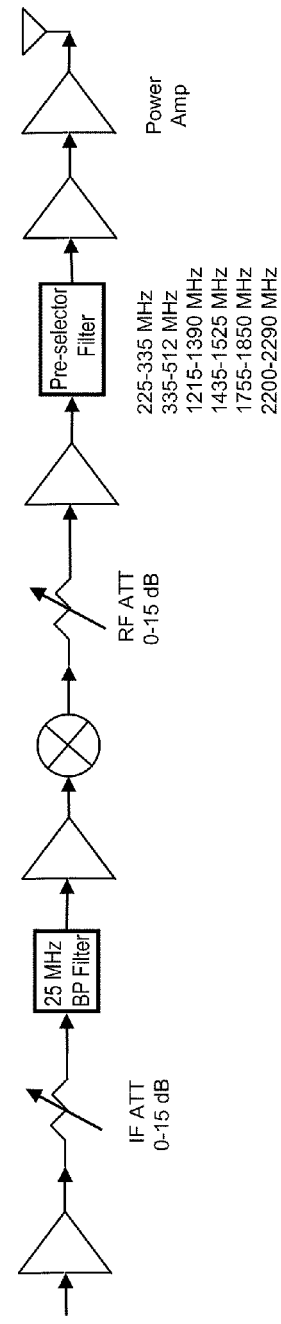
FIG. 37 shows an example DSA transmitter RF circuit according to an embodiment of the invention.

FIG. 37 shows an example DSA transmitter RF circuit according to an embodiment of the invention; specific examples of DSA transmitter hardware configurations are provided in the table below. Inter-modulation distortion may be caused by each amplifier in the transmit circuit that tends to spread the transmitted spectrum, which causes unintended interference to non-cooperative transceivers. By changing the RF ATT and IF ATT values as a function of the operating frequency and the desired power levels, the transmitted spectrum spreading is minimized. These RF ATT and IF ATT may not depend on the co-site signal levels, but rather depend on the operating frequency, the signal bandwidth, the modulation type and the transmit power level.

Example DSA Transmitter Hardware Configurations

| Configuration # | Description | Pre-Selector | RF ATT (dB) | IF ATT (dB) |
|---|---|---|---|---|
| 1 | Maximum TX Power Level | In-Band Setting | 0 | 0 |
| 2 | Medium TX Power Level | In-Band Setting | 5 | 5 |
| 3 | Medium TX Power Level | In-Band Setting | 10 | 10 |
| 4 | Minimum TX Power Level | In-Band Setting | 15 | 15 |

Co-Site Optimization Process Description

This section describes the algorithms used to optimize hardware configuration settings to operate in the DSA system in the co-site environment and the approach used to control these settings during the 802.16 frame.

Sub-Band Frequency Plan

Because the co-site induced distortion effects and the co-site signals are frequency dependent, the hardware configuration settings are varied depending on the signal frequency of interest. The spectrum within each pre-selector band is divided into sub-bands that are X MHz wide as shown in FIG. 37. The value of X is approximately equal to the transceiver IF filter bandwidth. Typical values for X are 5 MHz and 10 MHz. The Detector instantaneous bandwidth is equal or larger than the sub-band width. If the Detector instantaneous bandwidth is less than the sub-band width, then the Detector has to be called multiple times to measure the spectrum within the sub-band. This would be inefficient.

The table below shows in example hardware configuration table. In Sub-band 3, there is a very strong co-site signal at 260 MHz. In this case, the RF ATT, IF ATT and ADC shift are the maximum values so that the signal is attenuated as much as possible.

Example DSA Receiver Configuration Table

| | Signal of Interest | | DSA Receiver Setting | | | |
|---|---|---|---|---|---|---|
| Sub-band | F1 (MHz) | F2 (MHz) | Pre-Selector Band | RF ATT (dB) | IF ATT (dB) | ADC SHIFT |
| 1 | 225 | 235 | 1 | 4 | 0 | 0 |
| 2 | 245 | 255 | 1 | 4 | 0 | 0 |
| 3 | 255 | 265 | 1 | 15 | 15 | 2 |
| 4 | 265 | 275 | 1 | 4 | 0 | 0 |
| 5 | 275 | 285 | 1 | 4 | 3 | 0 |
| 6 | 285 | 295 | 1 | 4 | 0 | 0 |
| 7 | 295 | 305 | 1 | 4 | 0 | 0 |
| 8 | 305 | 315 | 1 | 7 | 0 | 0 |
| 9 | 315 | 325 | 1 | 4 | 9 | 0 |
| 10 | 325 | 335 | 1 | 4 | 0 | 0 |
| 11 | 335 | 345 | 2 | 4 | 0 | 0 |
| 12 | 345 | 355 | 2 | 4 | 10 | 0 |
| ... | ... | ... | ... | ... | ... | ... |

The DSA transmitter hardware settings may be determined to obtain a desired transmit power level, such as by calibration using a spectrum analyzer. An output spectrum is measured for all RF and IF component settings and the measurements ordered by the transmit power level. For each output power level increment, the best spectrum is selected. The associated RF and IF component settings are then used as the table values. In an operational mode, the hardware settings may be changed during, for example, the 802.16 frame for the detector, the transmitter, and the receiver. Each of these operations may be performed at a different frequency. Periodically, during an operation mode, a test may be made to determine if co-site conditions have changed and the above calibration needs to be repeated. A manual trigger may be used to make this decision. Alternatively, an automated trigger may be used, where one or more parameters may be used as the basis of the automated trigger. When triggered, the system will repeat the calibration procedure. All or part of the frequency list will be evaluated.

Example Hardware Functional Description

This section describes the examples of hardware modules and components that were built and used embodying at least portions of the DSA technology described herein. It will be understood that various combinations of hardware and/or software other than the specific examples described herein may be used without departing from the scope of the invention. For example, various hardware components may be combined, omitted, replaced, or otherwise altered from the following examples without changing the functionality or scope of the resulting system, as will be understood by one of skill in the art. Further, the various examples illustrate how DSA may be implemented on a variety of radio types, although types other than those specifically described may be used. Different MAC types (e.g., CSMA, TDMA and push-to-talk), detector types (e.g., FFT, cyclostationary, Ultra-Narrow bandwidth, and RSSI), and processors types (e.g., FPGA, DSP, GPP and limited capability processors) may be used. Different radio data rates also may be used.

An example DSA hardware system according to an embodiment of the invention may include four circuit boards: (1) The RF Board, (2) the IF Board, (3) the Digital Processing Board, and (4) the single board computer. Several different RF boards may be used; several examples of applicable RF Board frequencies are provided in the table below.

| RF Cards Suitable for Spectrum Bands Available to Different Classes of Users | | | |
|---|---|---|---|
| RF Board #1 (MHz) | Public Safety RF Board (MHz) | Wireless (TV) RF Board (MHz) | Commercial RF Board (MHz) |
| 225-512 | 138-174 | 174-216 | 698-941 |
| 1215-1390 | 220-512 | 516-806 | 1390-1435 |
| 1435-1525 | 764-869 | | 1670-2680 |
| 1755-1850 | | | |
| 2200-2290 | | | |

The RF Board's front-end has high filter selectivity and input intercept points, which is required for operation in an intentional interference environment. In contrast, most radios have poor selectivity and will not operate well in a high signal level environment.

In the example embodiment, the IF board converts the IF signal at 1250 MHz or 850 MHz (depending on the RF Board type) to 140 MHz, filters the signal, and samples the 140 MHz signal. This digital data is sent to the Digital Processing Board. Other ranges and frequencies may be used.

Figure 38:
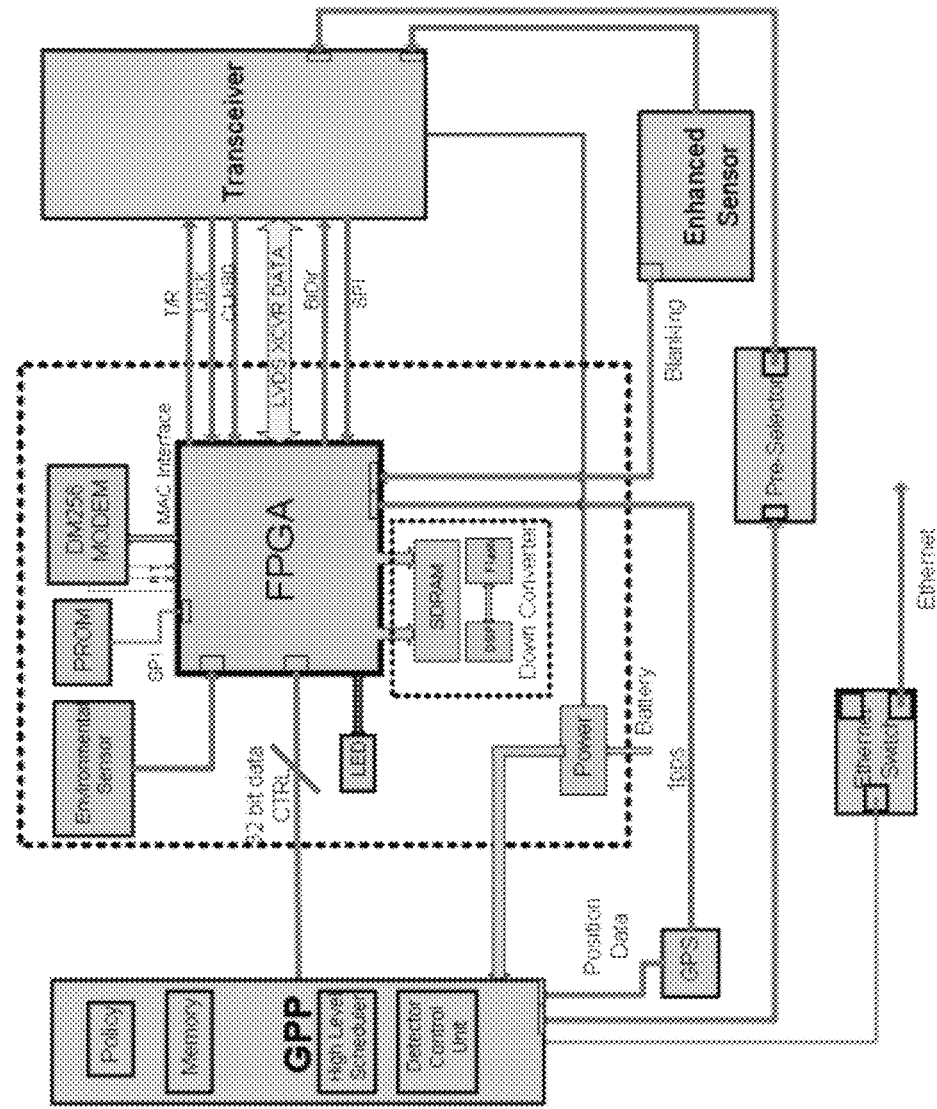
FIG. 38 shows a schematic view of a digital processing board used in a DSA system according to an embodiment of the invention.

The DPB may be, for example, a custom circuit board containing an FPGA, a DSP, and the 802.16-based modem ASIC as shown in FIG. 38. The board may be tailored to DSA requirements and is significantly different than the digital boards of conventional radios. It may support the DSP-based DSA detection (on board), enables the use of an external DSA detector, and controls the transceiver.

Figure 39:
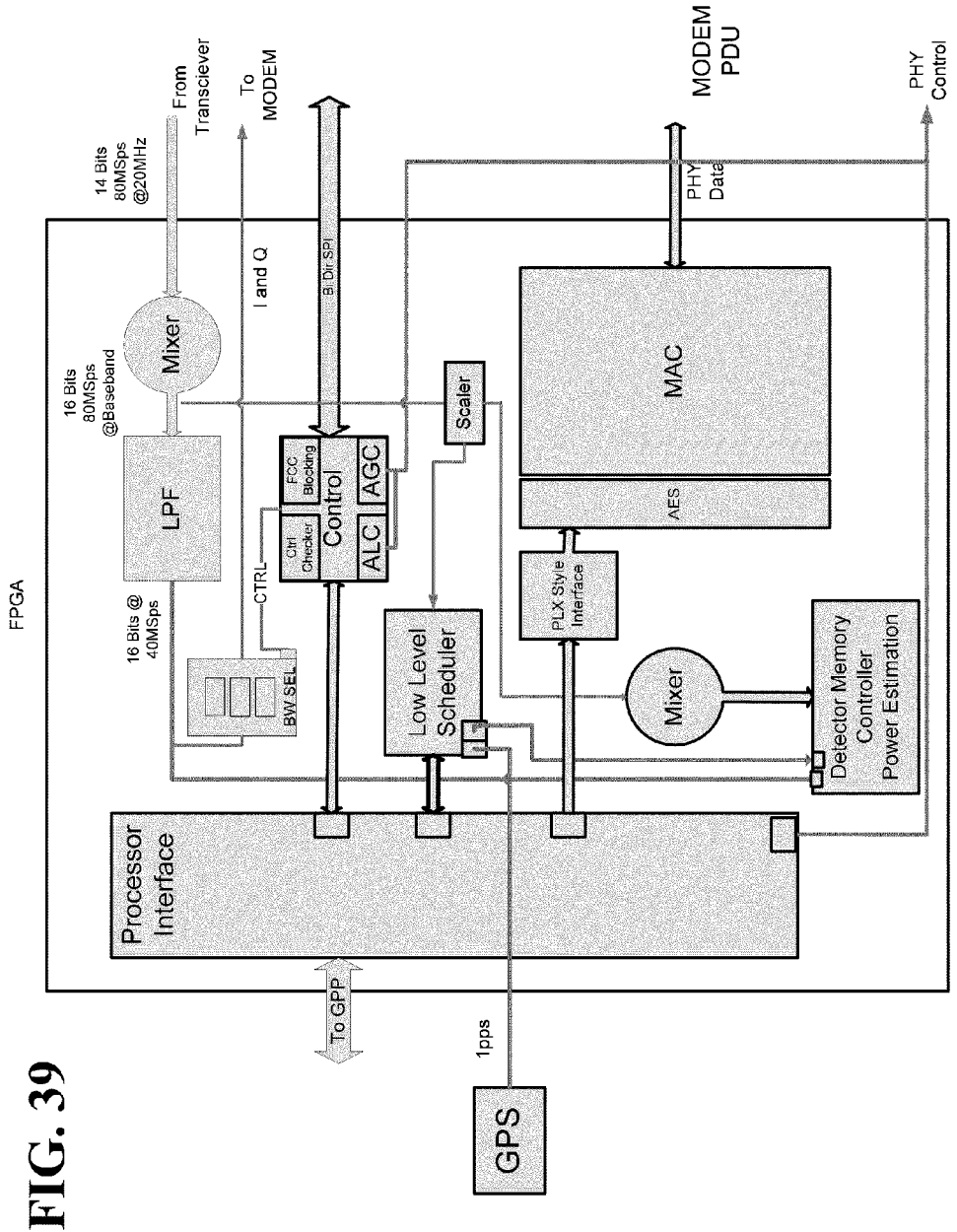
FIG. 39 shows a schematic diagram of functionality implemented by a digital processing board in a DSA system according to an embodiment of the invention.

FIG. 39 shows a schematic diagram of the various functions that may be implemented by the DPB FPGA according to an embodiment of the invention. These functions may include, for example, digitally down-converting the data signal using a mixer and low pass filter (LPF). An automatic gain control (AGC) and an automatic level control (ALC) set the gain in the RF transceiver and the transmit power levels. Different AGC loops are maintained for the modem and for the detector, which is required when the DSA transceivers are close together. The FPGA MAC function supports the 802.16-based chipset MAC function. The DSA detector reads data from the digital processor board memory, which is controlled by the FPGA.

The DPB uses a DSP to host the DSA detection algorithms. The DSP was used to enable the DSA detection algorithms to be easily tailored to the specific non-cooperative signal types. This DSP is a low cost (<$20), integer math engine with limited processing power so that commercially viable (low hardware cost) detection algorithms could be demonstrated. To meet both the performance and cost goals, the DSA detector implementations were designed around these fixed point and processing limitations.

The DSP contains a variety of detectors that are selected based on the signal of interest. The Wide Band Detector is an FFT-based detector that was optimized for execution speed and has limited dynamic range. It most cases, in-band receiver high dynamic range is not needed since the spectrum measurements are usually made of empty spectrum or of very low level signals. There is no requirement to measure high level signals. However, in most cases, there will be large out-of-band signals. This requires high out-of-band receiver dynamic range. For example, in the TV band there is a combination of strong signals and empty spectrum. In this case, an associated detector may only need to measure the empty spectrum accurately. When it measures the strong signals, it is irrelevant if there is distortion or other dynamic range problems since these channels will be judged used and unavailable. However, if the strong signals are close in frequency to the empty channels, then the DSA receiver may require have sufficient dynamic range to reject the out-of-band strong signals when it measures the in-band empty spectrum. A similar situation occurs in co-site conditions near a cell phone tower. The DSA receiver may reject these strong cell phone base station signals when measuring spectrum in other bands. The PolyPhase FIR filter is a building block used by the Cyclostationary Detector and the TV detector.

The IEEE 802.16 compliant modem is based on an ASIC made by a third-party COTS supplier. It is a high bit-rate modem intended to be used in static environments as a wireless local loop modem. Modulation is orthogonal frequency division multiplex (OFDM). OFDM sub-carrier modulation types include BPSK, QPSK, 16-QAM, and 64-QAM. The 802.16 air interface protocol is intended to transport voice as well as data. The IF bandwidth is variable, between 1.75 MHz and 10 MHz. The baseband interface is Ethernet.

The time division multiple access (TDMA) frame structure is variable frame length of between 1 and 20 msec, with distinct uplink and downlink burst time periods within each frame. Each frame has order wire slots which can be used by new network members to request time slots. The frame is very flexible: Uplink and downlink burst time slots depend on traffic loading. Users will be granted more time for their time slots depending upon the amount of data in their MAC queues (which depends on traffic loading).

The General Purpose Processor (GPP) contains most of the DSA algorithms and provides an external interface for control and data. The GPP may be, for example, an x86-based with a PCI, CompactPCI, or PC104/Plus interface that operates with COTS operating systems.

Several different antenna types may be used. The example DSA-enabled device has two antenna inputs, one for <1 GHz and another for >1 GHz. For omni-directional applications, wideband discones antennas are used. A discone antenna is used below 1 GHz. Another antenna type may be used for >1 GHz. In some applications, several types of Log Periodic antennas (LPA) may be used for <1 GHz.

It will be understood that the separation of functions described herein may be altered without departing from the scope of the invention described herein. For example, the signal classifier, channel ranker, and channel selector may be implemented as a single module. Various modules may be implemented entirely in hardware, such as in a special-purpose circuit, processor, or other device, or they may be implemented in various hardware and/or software combinations as will be understood by one of skill in the art. The separation of functionality into specific modules described herein may be modified. For example, the functions performed by each module may be implemented in combinations other than those specifically disclosed, and multiple functions may be combined into a single module even where they are described herein as performed by separate modules.

In the foregoing description, for the purposes of illustration, methods were described in a particular order. It should be appreciated that the methods may be performed in a different order than that described. Additionally, unless indicated otherwise the methods may contain additional steps or omit steps described herein. The methods may be performed by hardware components or may be embodied in sequences of machine-executable instructions, which may be used to cause a machine, such as a general-purpose processor, special-purpose processor, or other circuit or module to perform the methods. These machine-executable instructions may be stored on one or more physical computer-readable storage media, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. In some embodiments, a general-purpose processor or other physical device may operate in accordance with a set of machine-readable instructions to create or operate as a special-purpose device in accordance with the instructions. The methods also may be performed by a combination of hardware and software, which may be referred to as a module or circuit. Thus, as used herein, a "module" or "circuit" may include hardware, software, or any combination thereof, as will be understood by one of skill in the art. Features described in one embodiment may be used in other embodiments.

The disclosure of all references and publications cited above are expressly incorporated by reference in their entireties to the same extent as if each were incorporated by reference individually.

What is claimed is:

1. A method of classifying the status of a channel by a dynamic spectrum access-enabled device, said method comprising:
    determining a channelization for a region of spectrum;
    measuring energy present in a plurality of channels defined by the channelization;
    generating a first confidence score indicating the difference between a predefined signal mask and energy levels measured in a first group of the plurality of channels;
    generating a second confidence score indicating the difference between the predefined signal mask and energy levels measured in a second group of the plurality of channels, the second group of channels including at least one channel comprising a higher frequency than each channel in the first group of channels; and
    in response to at least one of the first and second confidence scores exceeding a predefined threshold, classifying the corresponding group of channels as containing a cooperative signal.

2. The method of claim 1, further comprising classifying the corresponding group of channels as containing a dynamic spectrum access signal.

3. The method of claim 1, the first and second group of channels having at least one channel in common.

4. The method of claim 1, the first and second group of channels having no channels in common.

5. The method of claim 1, wherein the frequency range encompassed by the first and second group of channels corresponds to a predefined channelization.

6. The method of claim 1, wherein the channelization is different than a channelization associated with a non-cooperative signal expected in the region of spectrum.

7. A method of operating a dynamic spectrum access-enabled device, said method comprising:
    determining a channelization for a region of spectrum;
    measuring energy present in at least one channel defined by the channelization;
    based on the measured energy, identifying a signal in the at least one channel;
    comparing the detected signal to a predefined signal mask, the signal mask defining a power-frequency relationship for a modeled signal in the at least one channel;
    calculating a confidence score based on the comparison of the detected signal to the signal mask, the confidence score indicating the likelihood that the signal is a cooperative signal; and
    based on the confidence score, classifying the signal identified in the at least one channel as at least one of a non-cooperative signal, a primary signal, and a cooperative signal.

8. The method of claim 7, wherein the channelization is different than a channelization associated with a non-cooperative signal expected in the region of spectrum.

9. The method of claim 7, further comprising the step of communicating with a cooperative device on the at least one channel.

10. The method of claim 7, further comprising:
    identifying a known non-cooperative signal bandwidth corresponding to a region of spectrum that includes the at least one channel; and
    selecting the signal mask to have a bandwidth different than the non-cooperative signal bandwidth.

11. The method of claim 7, further comprising:
    identifying the type of signal detected in the at least one channel as being a type expected for a cooperative signal.

12. The method of claim 7, further comprising:
    prior to identifying the signal in the at least one channel, measuring noise occurring in the channel for a period of time; and
    reducing the value of the measured energy used to identify the signal in said identifying step based on the noise measured during the period of time.

13. The method of claim 7, said step of calculating the confidence score further comprising:
    calculating the difference in mean values between the signal mask and the detected signal in one or more passbands.

14. The method of claim 7, said step of calculating the confidence score further comprising:
    calculating the difference in mean values between the signal mask and the detected signal in one or more stopbands.

15. The method of claim 7, said step of calculating the confidence score further comprising:
calculating the difference in the variance between the signal mask and the detected signal in one or more pass-bands.

16. The method of claim 7, said step of calculating the confidence score further comprising:
calculating the difference in the variance between the signal mask and the detected signal in one or more stop-bands.

17. The method of claim 7, said step of calculating the confidence score further comprising:
calculating the distance between the amplitude of the center pass-band of the detected signal and the side guard-bands of the detected signal; and
calculating the difference between the calculated distance and the distance between the amplitude of the center pass-band of the signal mask and the side guard-bands of the signal mask.

18. The method of claim 7, said step of calculating the confidence score further comprising:
calculating the difference between the peak-to-mean ratio of the signal mask and the peak-to-mean ratio of the detected signal.

19. A dynamic spectrum access-enabled device comprising:
a detector configured to measure energy present in at least one channel;
a first circuit to:
identify a signal in the at least one channel based on the energy measured by said detector;
compare the detected signal to a predefined signal mask, the signal mask defining a power-frequency relationship for a modeled signal in the at least one channel;
calculate a confidence score based on the comparison of the detected signal to the signal mask, the confidence score indicating the likelihood that the signal is a cooperative signal; and
based on the calculated confidence score, classify the signal identified in the at least one channels as available for use by the device node.

20. The device of claim 19, wherein said first circuit comprises a signal classifier.

21. The device of claim 19, wherein said detector is further configured to measure energy present in at least one of a first side portion and a second side portion of a narrow channel, the first side portion being defined by a first frequency range and the second side portion being defined a second frequency range, the second frequency range being higher than and non-overlapping with the first frequency range.

22. The device of claim 21, further comprising a second circuit to
define an energy threshold equal to the measured energy level; and
measure energy present in a central portion of the narrow channel, the central portion being defined by a central frequency range between the first and second frequency ranges and, if the energy measured in the central portion is at least as great as the threshold, classify a signal detected in the narrow channel as a cooperative signal.

23. The device of claim 19, further comprising:
a second circuit to determine the availability of the at least one channel for use by the device based on signal classification data received from the first circuit.

24. The device of claim 23, further comprising a policy module to specify how often the detector measures energy in the at least one channel.

25. The device of claim 19, wherein said device is a secondary device in the at least one channel.

26. The device of claim 19, wherein said device is a base station.

27. A method of identifying a cooperative signal by a dynamic spectrum access-enabled device, said method comprising:
measuring energy present in at least one of a first side portion and a second side portion of a narrow channel, the first side portion being defined by a first frequency range and the second side portion being defined a second frequency range, the second frequency range being higher than and non-overlapping with the first frequency range;
setting an energy threshold to be the value of the energy measured in said side portion measuring step;
measuring energy present in a central portion of the narrow channel, the central portion being defined by a central frequency range between the first and second frequency ranges;
if the energy measured in the central portion is at least as great as the threshold, classifying a signal detected in the narrow channel as a cooperative signal.

28. The method of claim 27, wherein the narrow channel is defined by a channelization different than a channelization associated with a non-cooperative signal expected in a region of spectrum that includes the narrow channel.

29. The method of claim 27, further comprising the step of communicating with a cooperative device on the narrow channel.

30. The method of claim 27, further comprising:
prior to classifying the signal as a cooperative signal, measuring noise occurring in the channel for a period of time; and
reducing the value of the measured energy used to identify the signal in said classifying step based on the noise measured during the period of time.

* * * * *